US010859756B2

(12) United States Patent
Conrad

(10) Patent No.: US 10,859,756 B2
(45) Date of Patent: Dec. 8, 2020

(54) LED LIGHT SOURCE

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 16/594,246

(22) Filed: Oct. 7, 2019

(65) Prior Publication Data

US 2020/0033528 A1    Jan. 30, 2020

Related U.S. Application Data

(63) Continuation of application No. 15/491,238, filed on Apr. 19, 2017, now Pat. No. 10,514,489.

(51) Int. Cl.
*F21V 8/00* (2006.01)
*F21K 9/61* (2016.01)

(52) U.S. Cl.
CPC .............. *G02B 6/0055* (2013.01); *F21K 9/61* (2016.08); *G02B 6/009* (2013.01); *G02B 6/0051* (2013.01); *G02B 6/0078* (2013.01); *G02B 6/0085* (2013.01); *G02B 6/0088* (2013.01); *G02B 6/0091* (2013.01)

(58) Field of Classification Search
CPC ....... F21W 2131/301; F21W 2131/305; F21W 2131/405; A47F 11/10; A47B 2220/0077
See application file for complete search history.

(56) References Cited

U.S. PATENT DOCUMENTS

| | | | | |
|---|---|---|---|---|
| 2006/0181885 A1* | 8/2006 | Seng Tong | ............. | A47B 96/02 362/382 |
| 2007/0109764 A1* | 5/2007 | Bienick | ................... | F25D 25/02 362/92 |
| 2008/0278932 A1* | 11/2008 | Tress | ..................... | A47B 97/00 362/133 |
| 2010/0157585 A1* | 6/2010 | Diekmann | .............. | F21S 6/002 362/228 |
| 2012/0140440 A1* | 6/2012 | Dam | ....................... | F21V 23/02 362/92 |
| 2015/0279251 A1* | 10/2015 | Matyear | .................. | H02S 40/38 362/183 |
| 2016/0097516 A1* | 4/2016 | Howard | ................. | G09F 3/204 362/98 |
| 2017/0202372 A1* | 7/2017 | Ringel | .................... | A47F 11/10 |
| 2018/0314001 A1* | 11/2018 | Veenstra | ................ | G09F 13/04 |

* cited by examiner

*Primary Examiner* — Andrew J Coughlin
(74) *Attorney, Agent, or Firm* — Philip C. Mendes da Costa; Bereskin & Parr LLP/S.E.N.C.R.L., s.r.l.

(57) ABSTRACT

A shelf includes a LED light source.

9 Claims, 152 Drawing Sheets

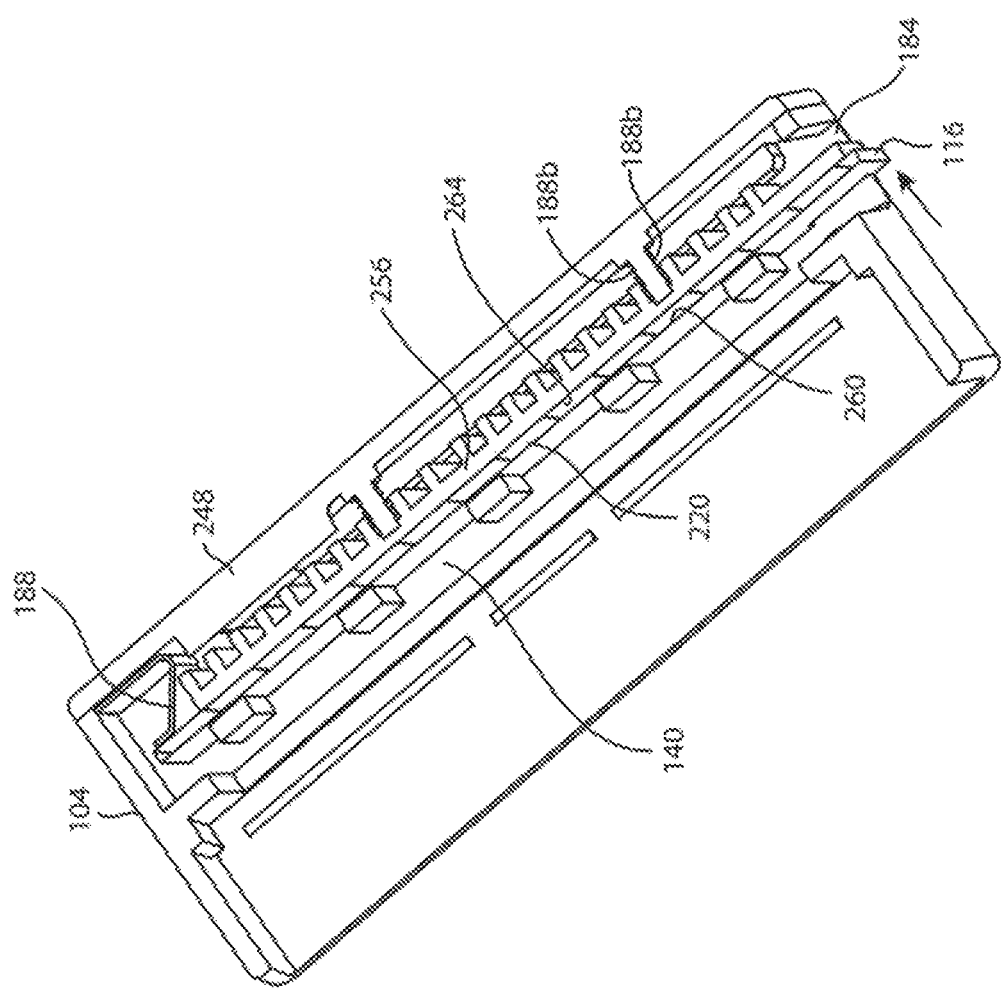

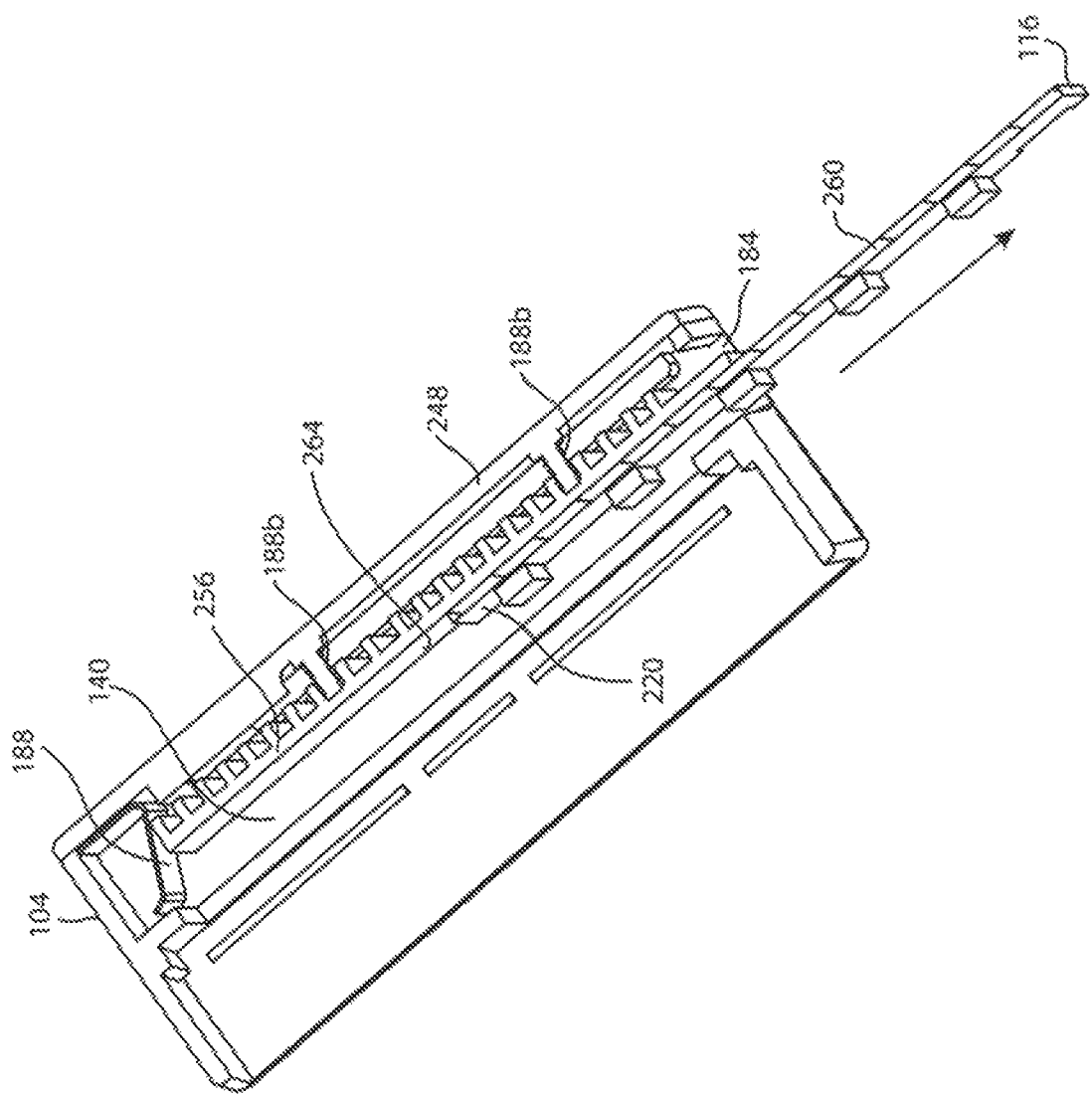

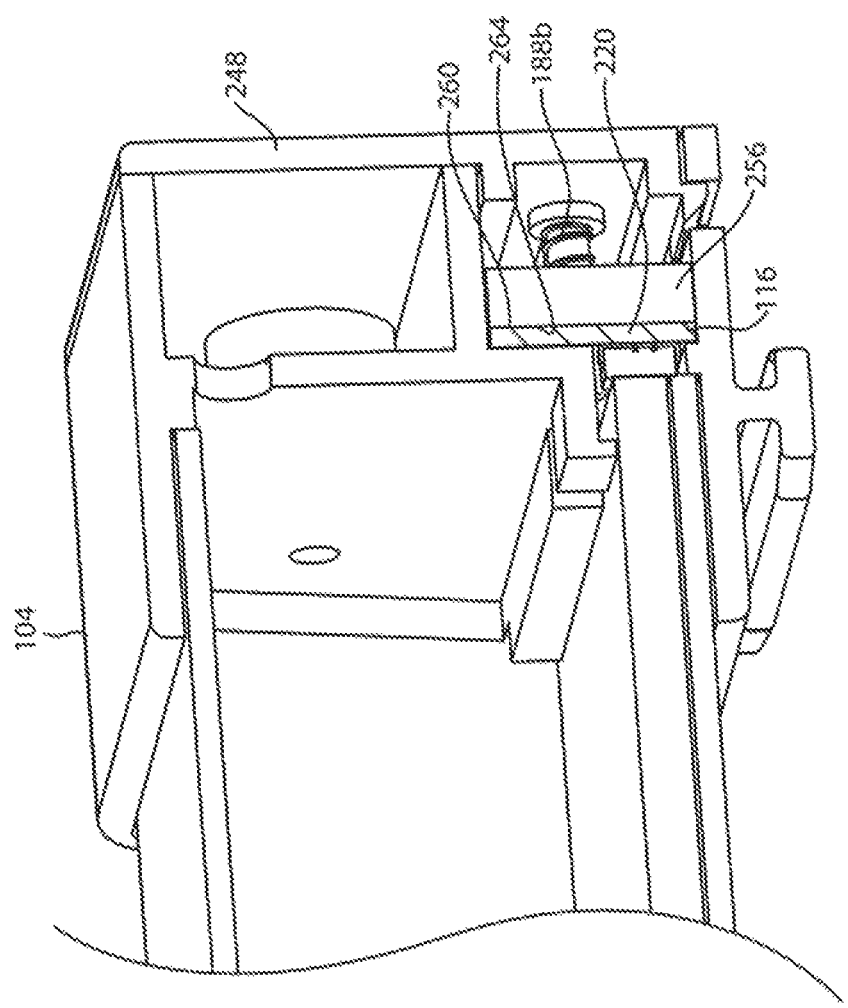

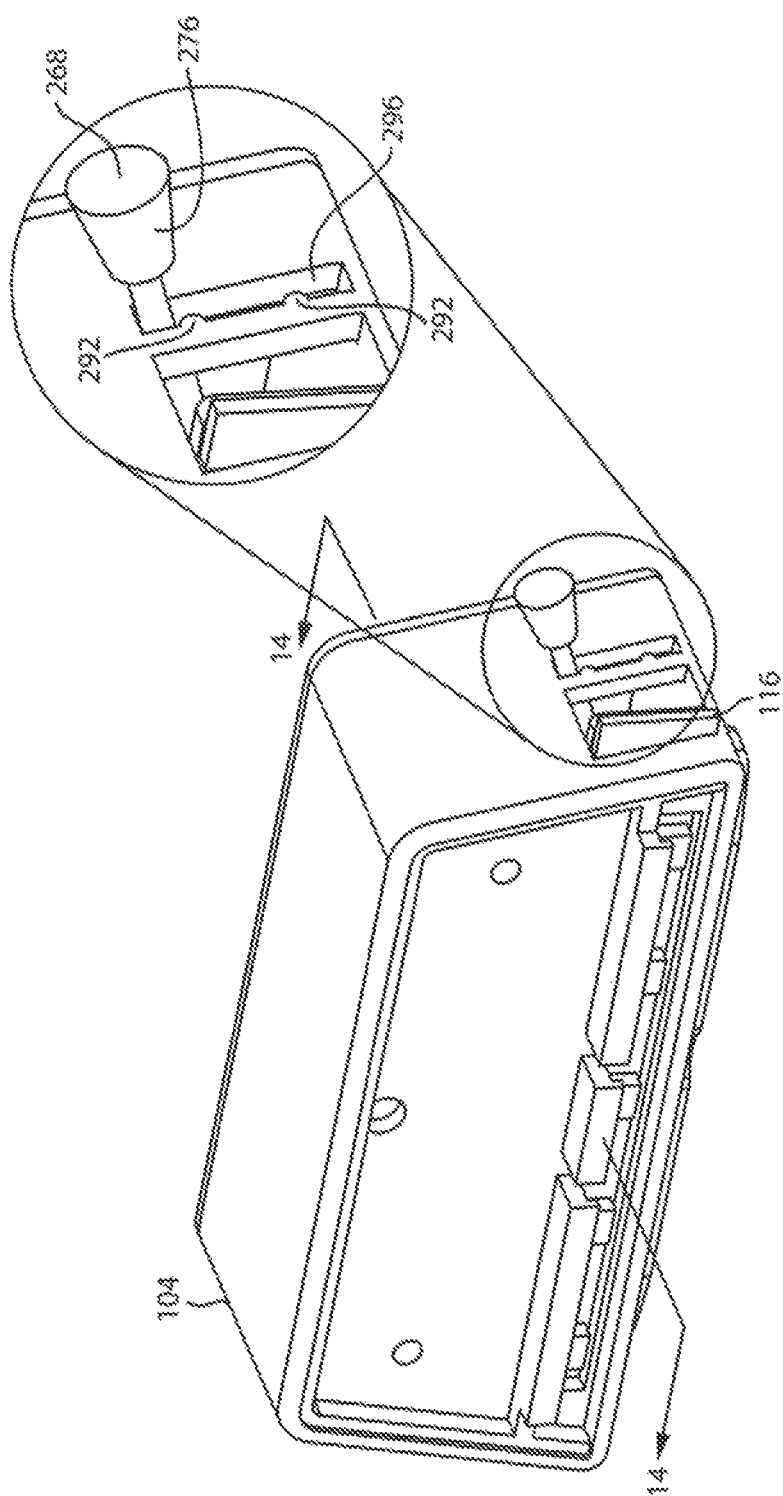

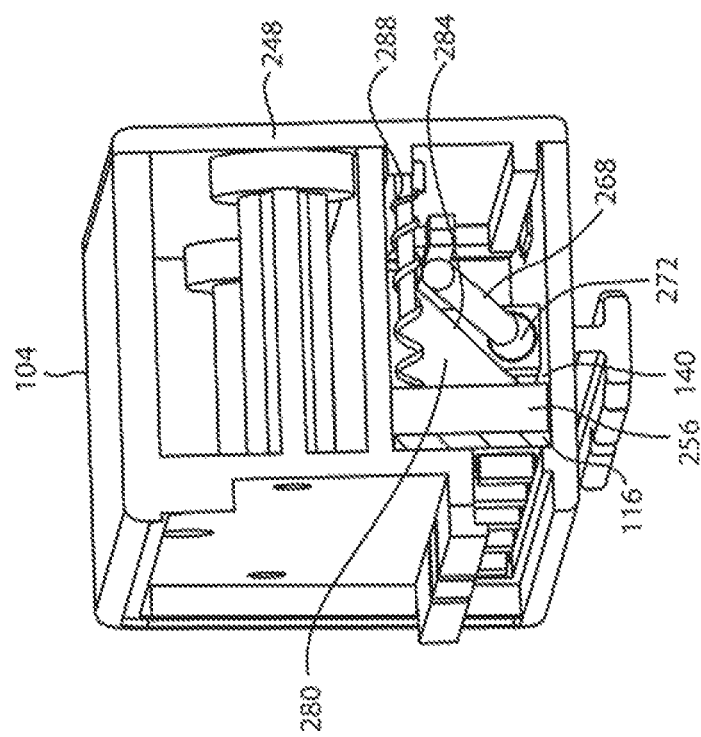

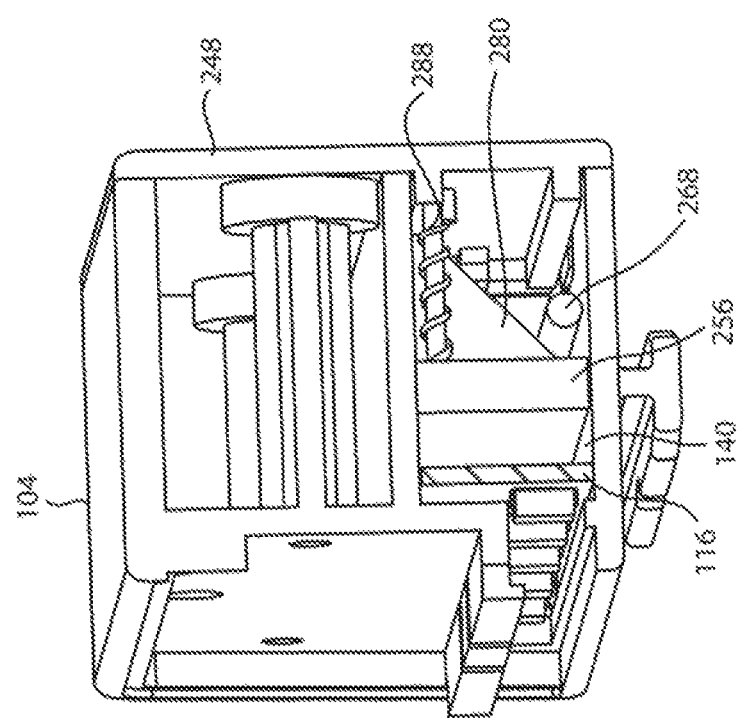

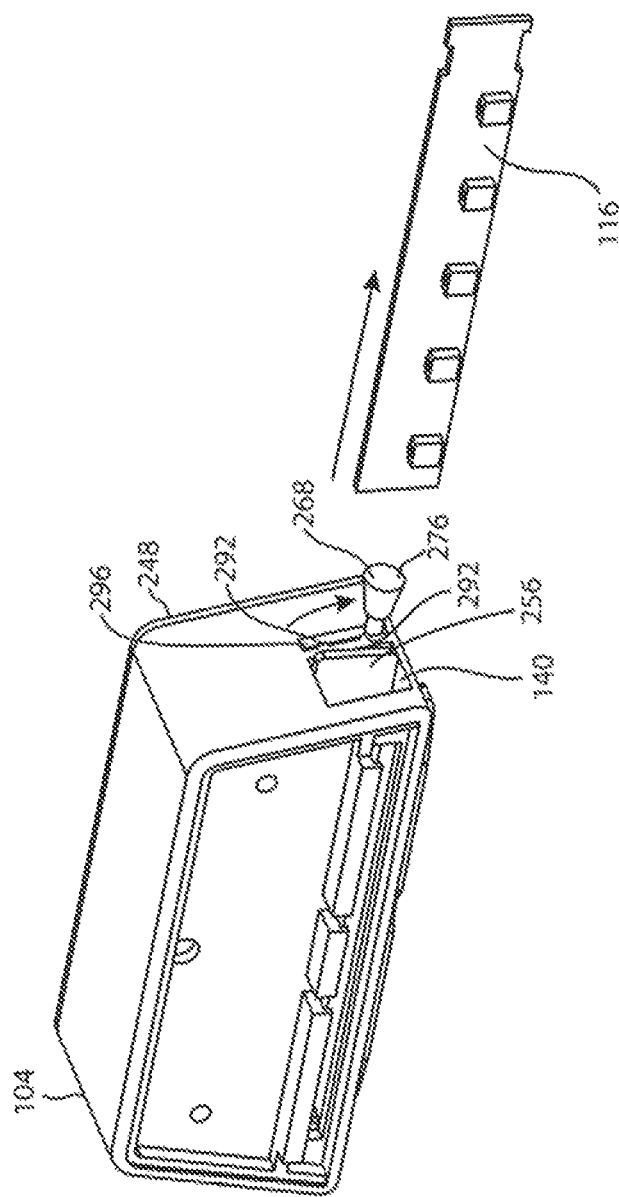

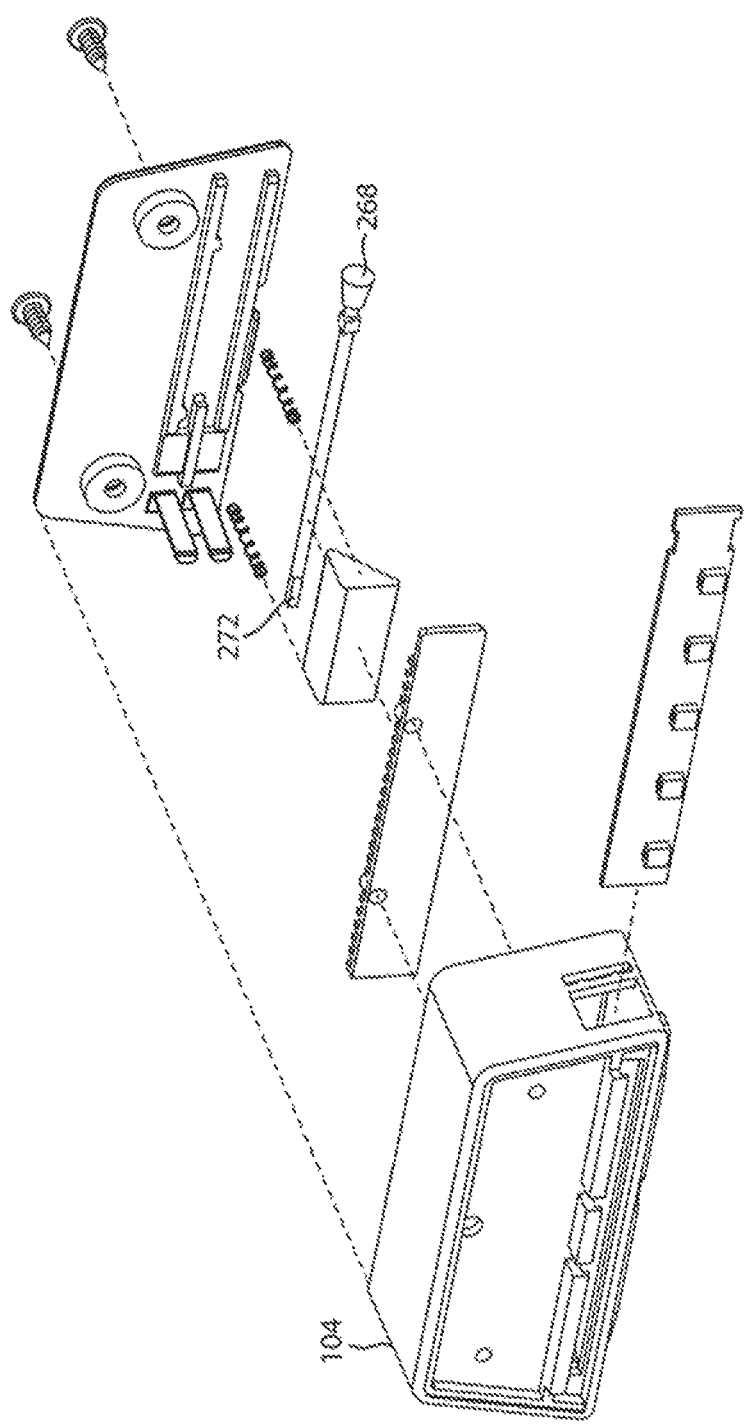

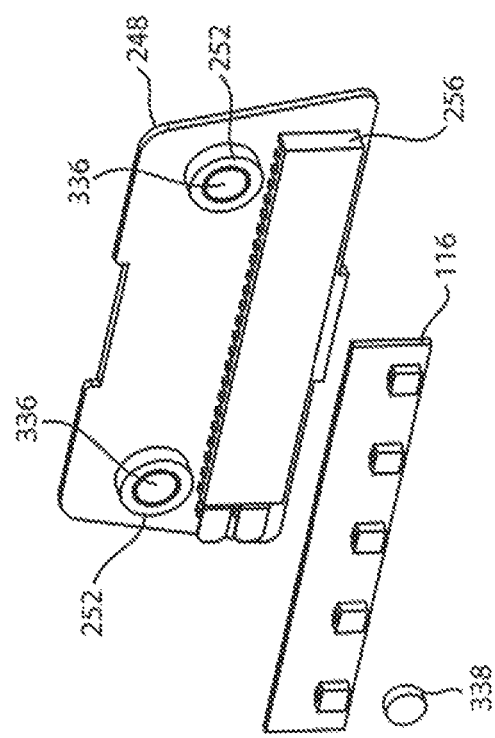
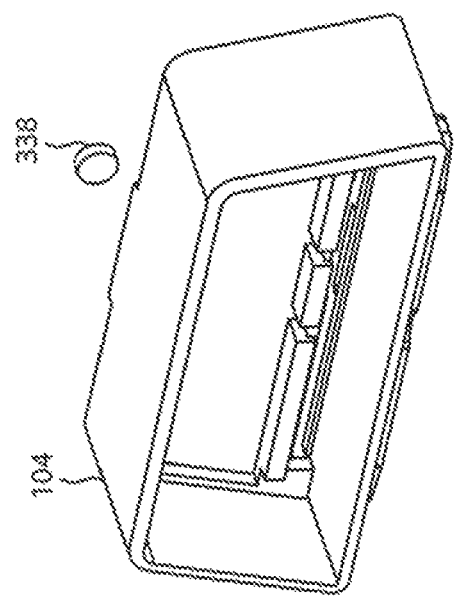
FIG. 34

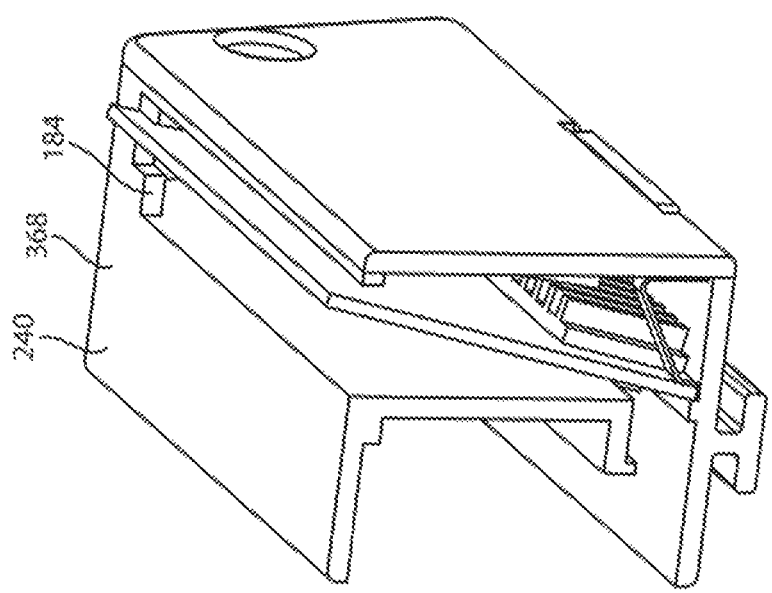

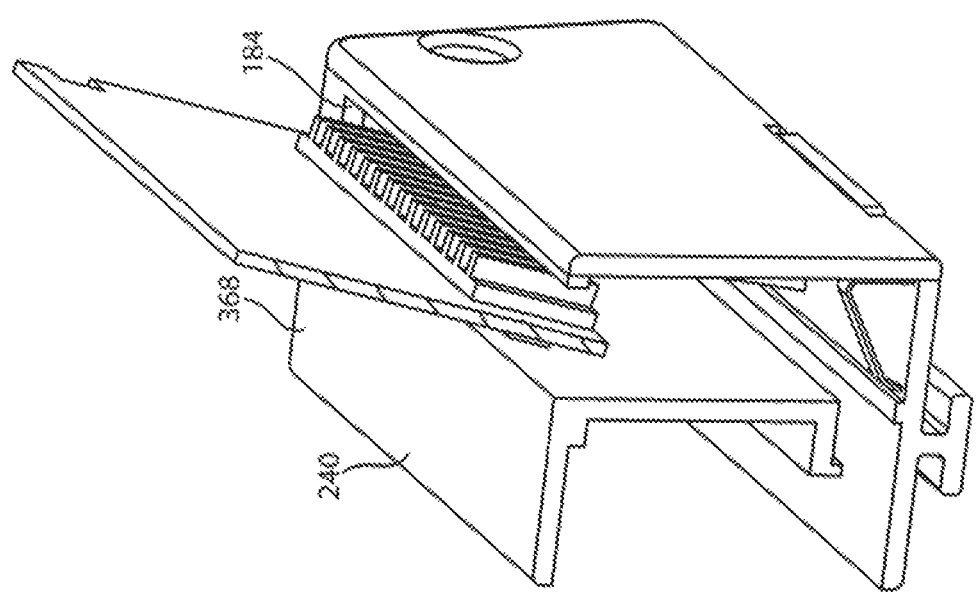

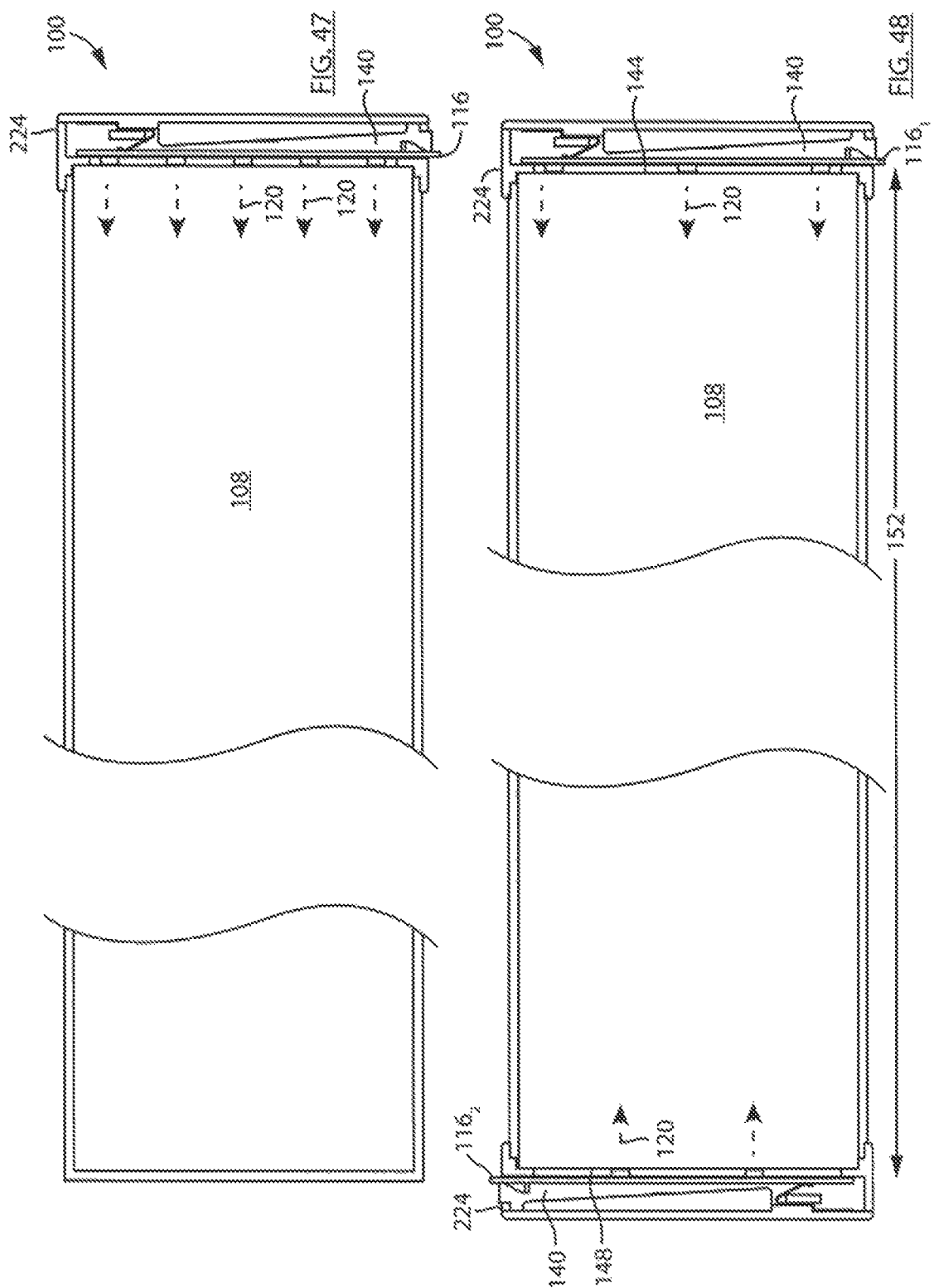

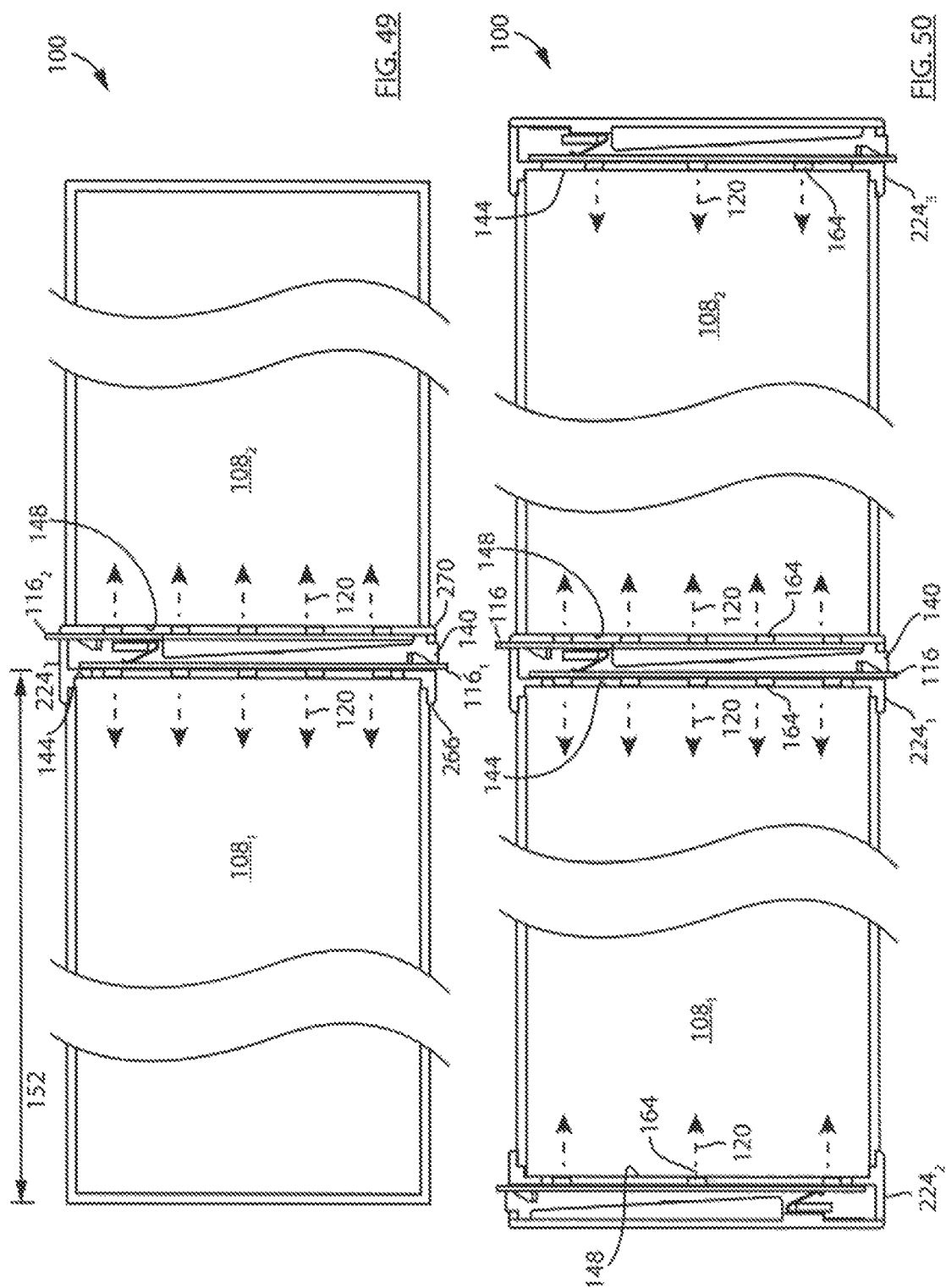

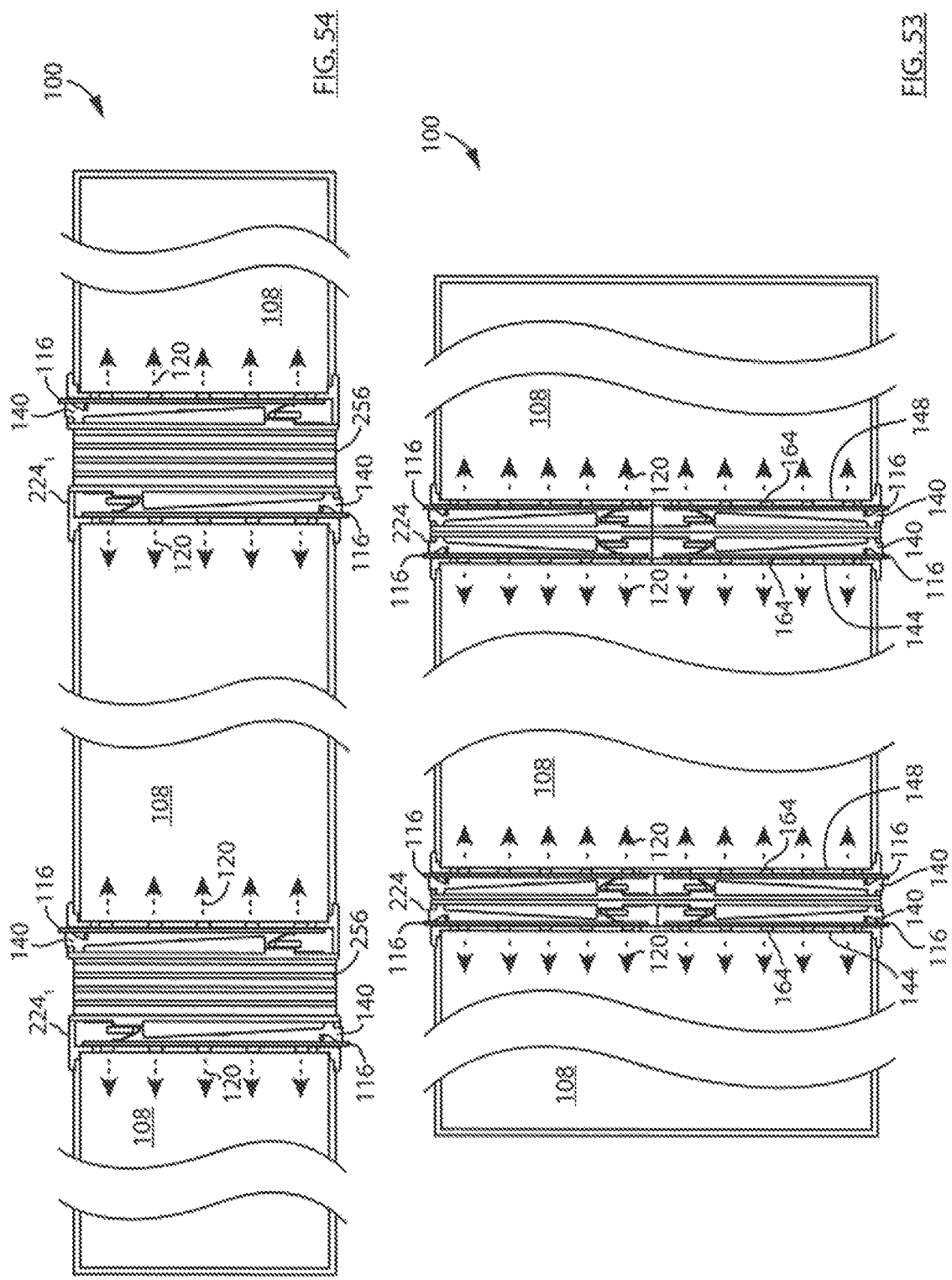

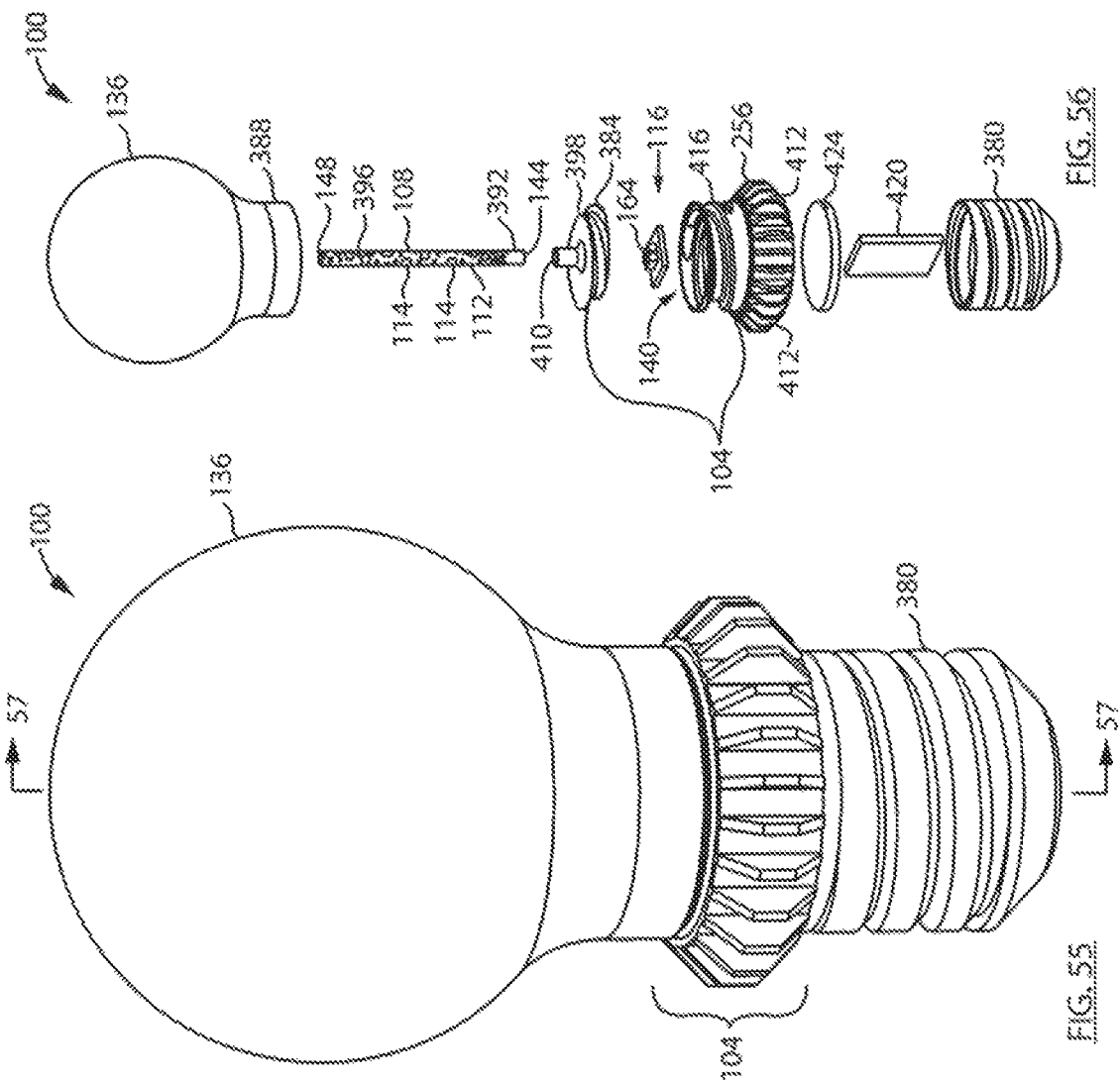

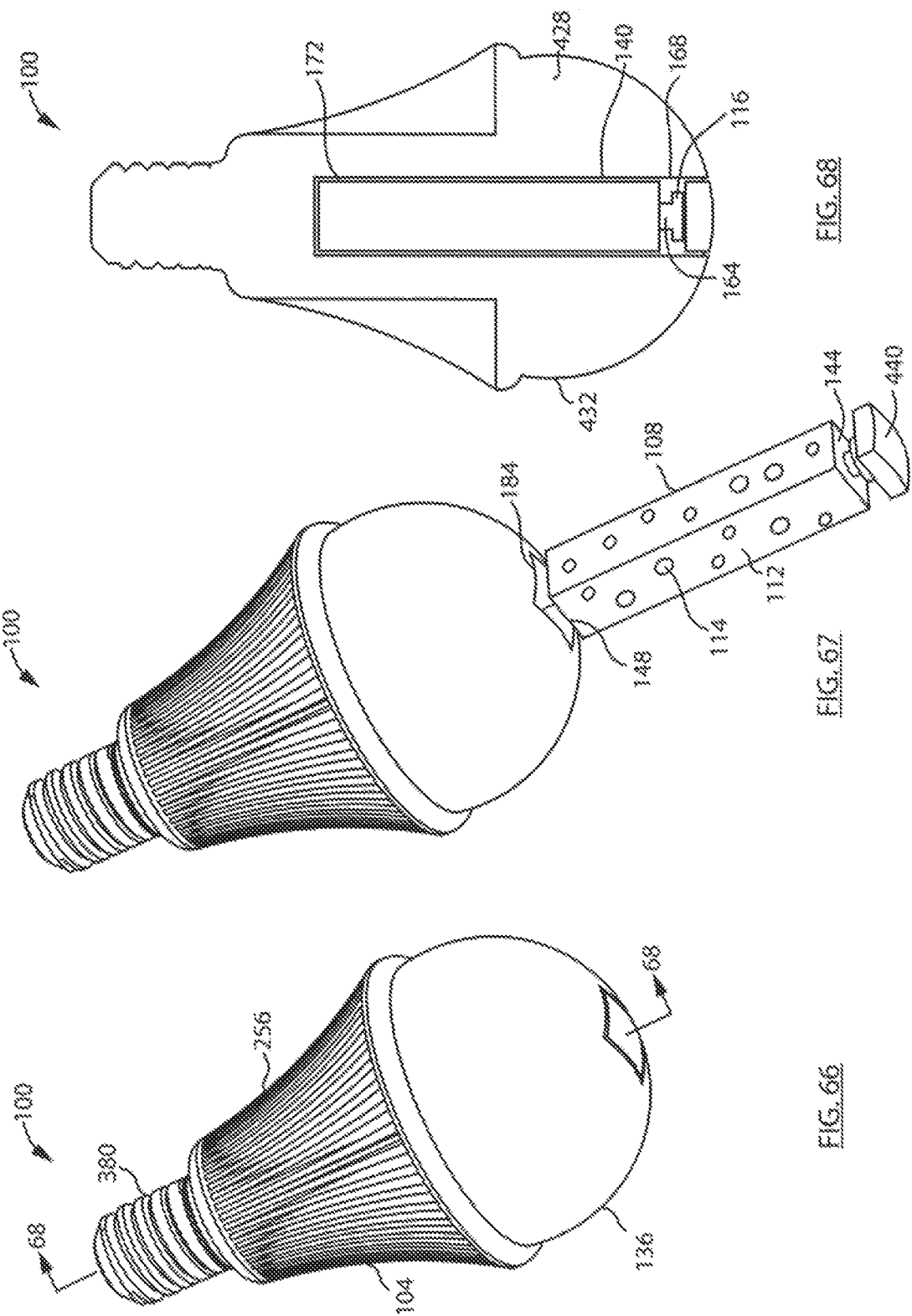

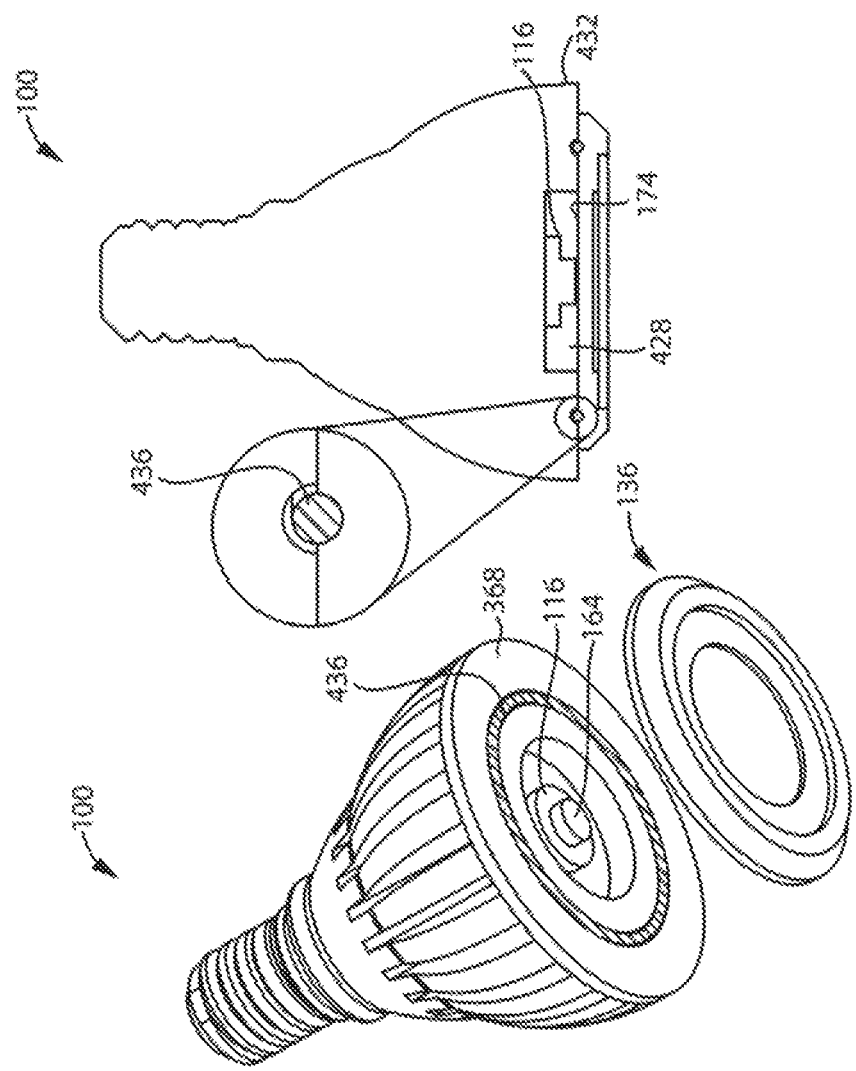
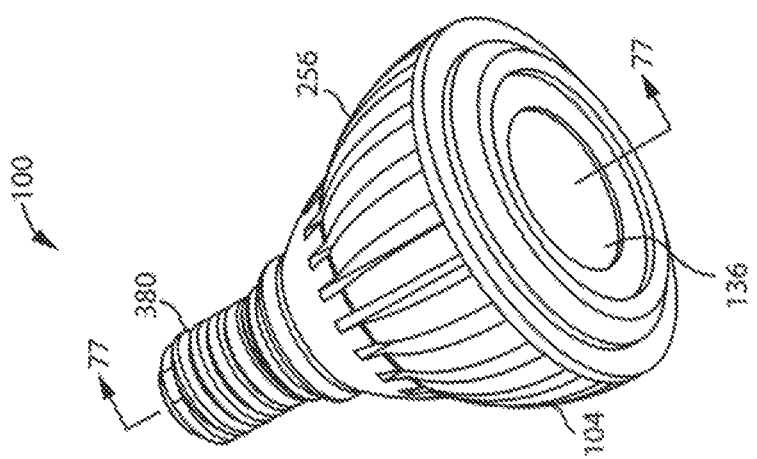

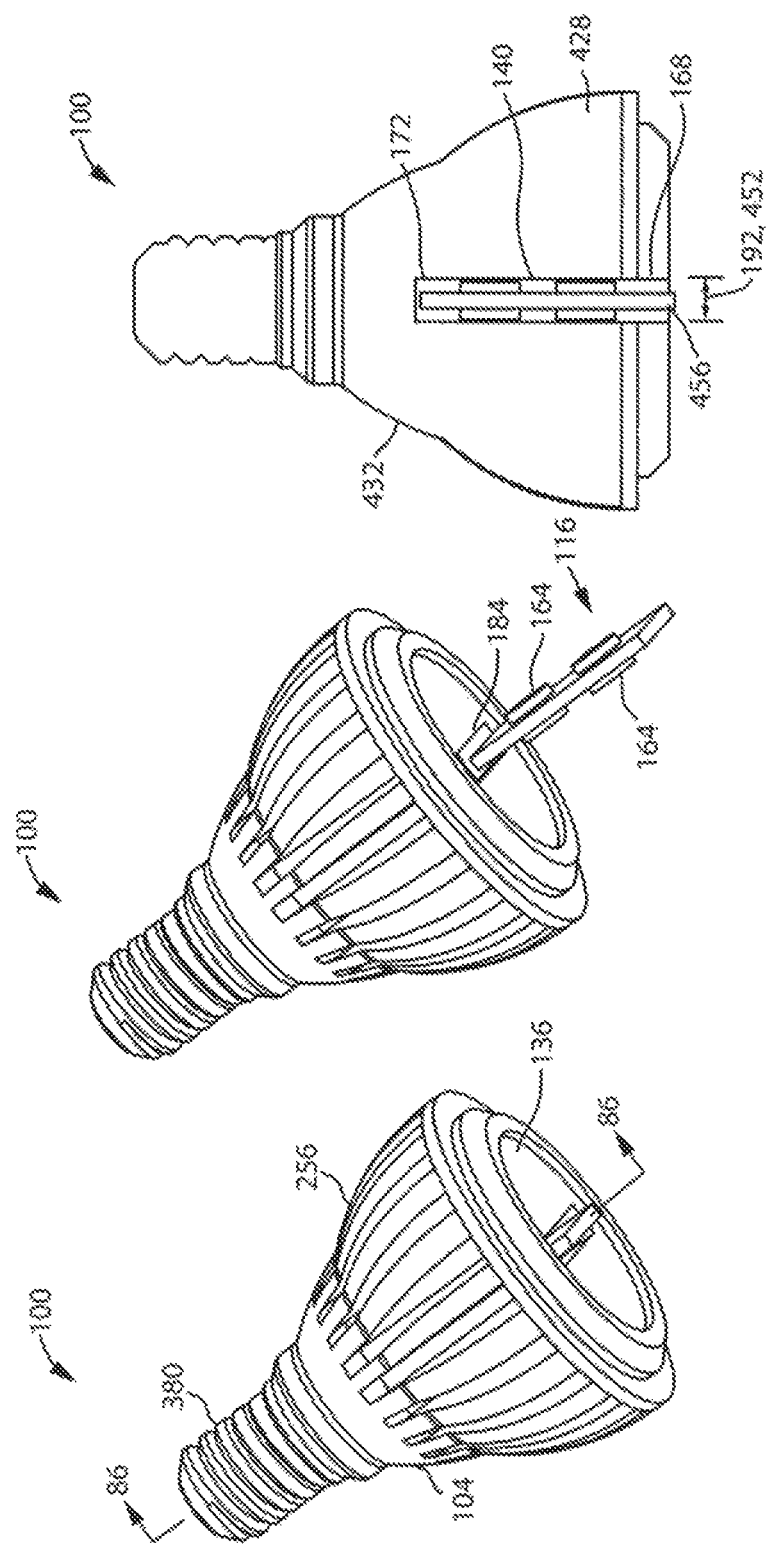

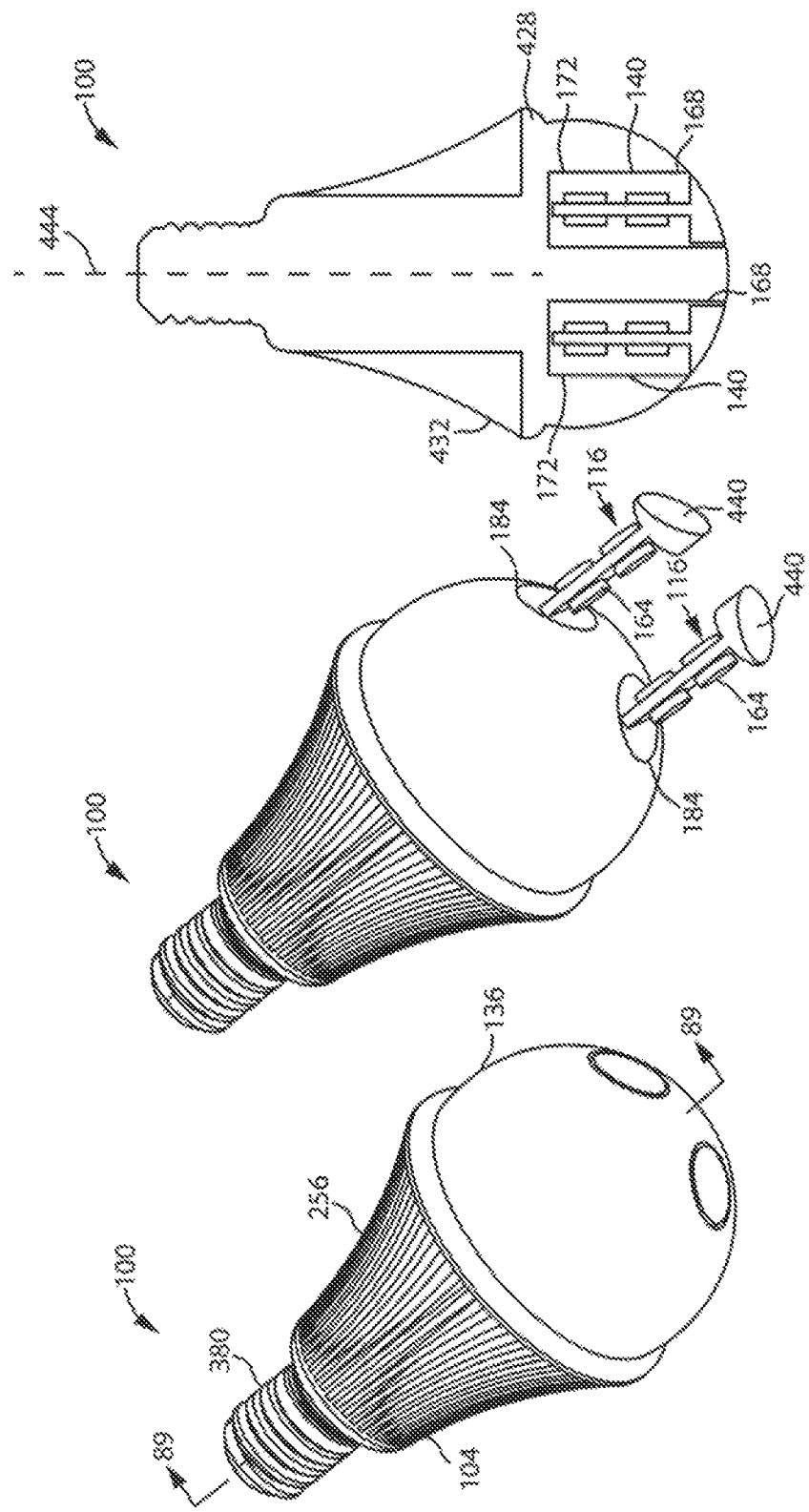

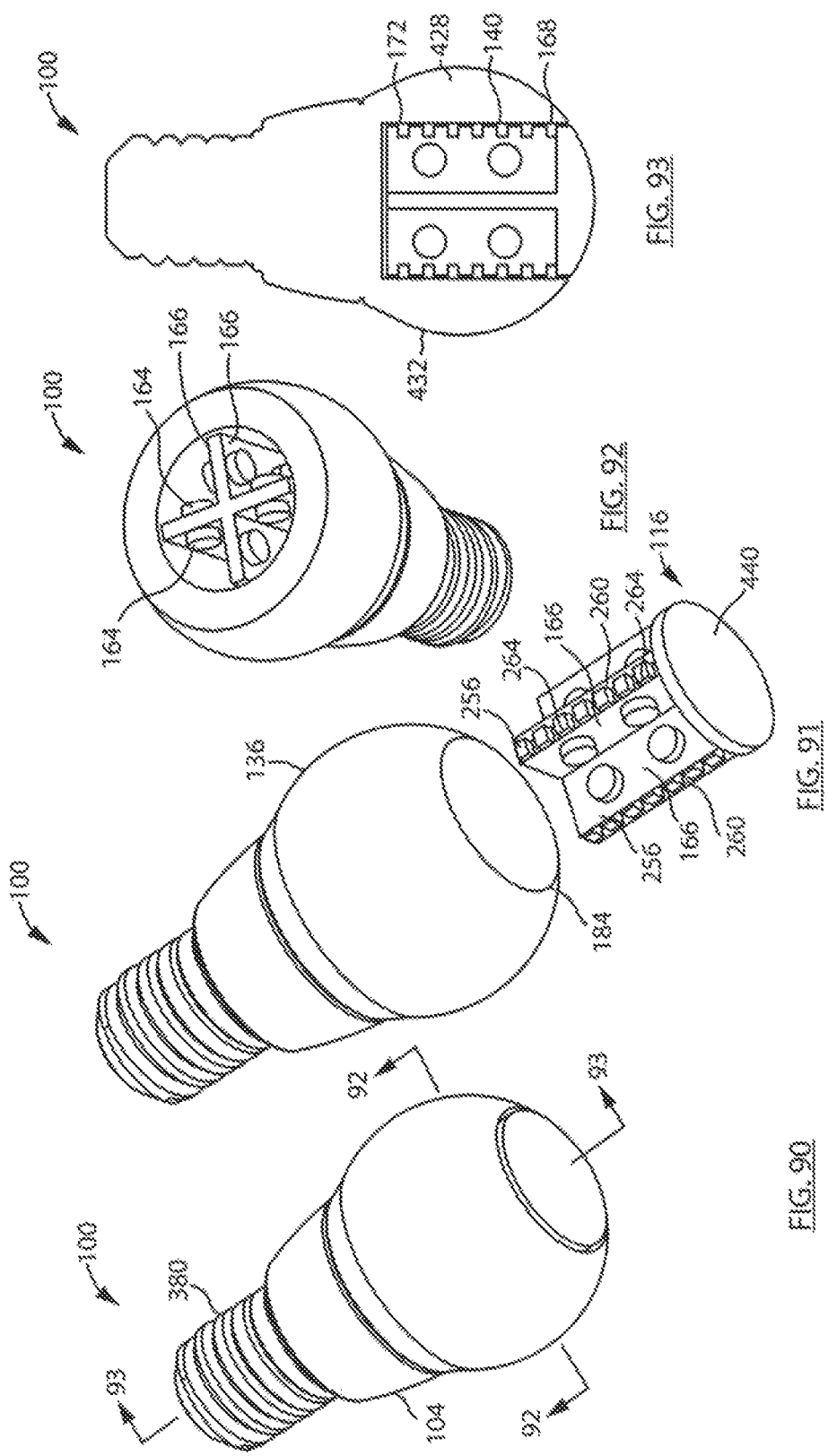

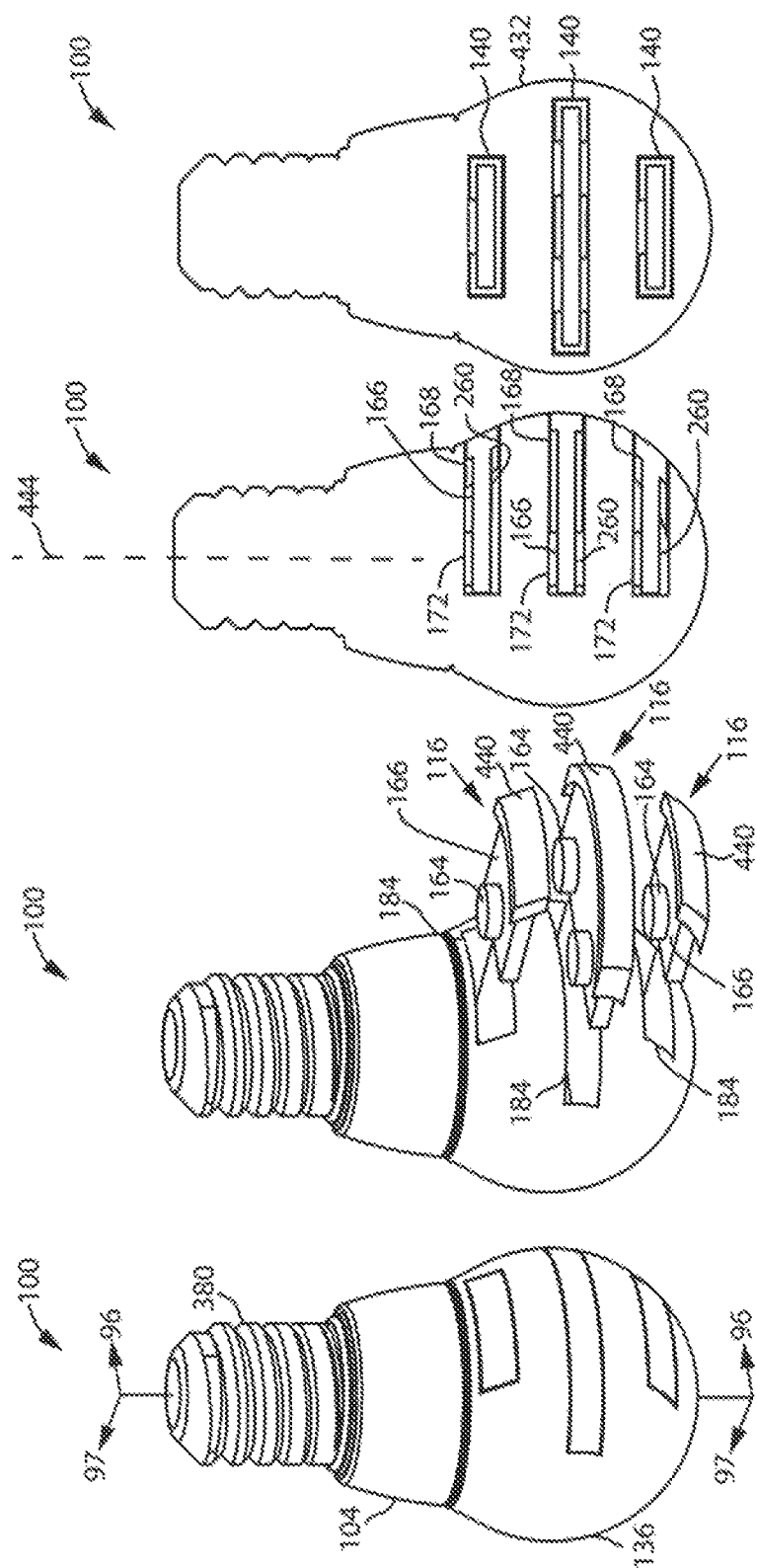

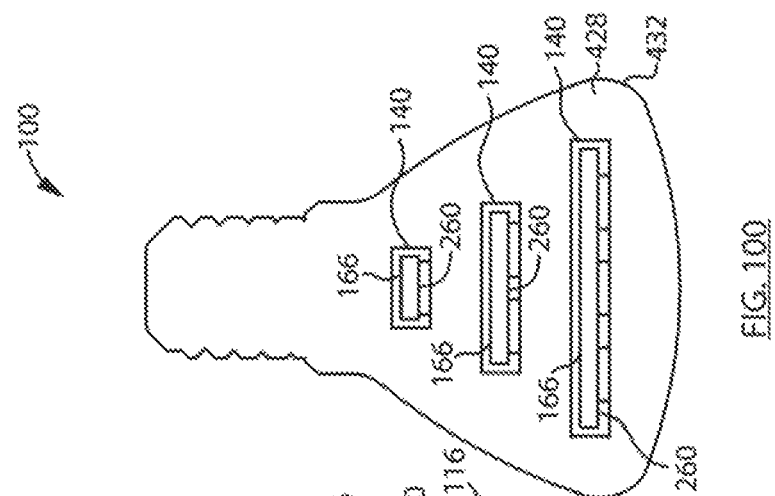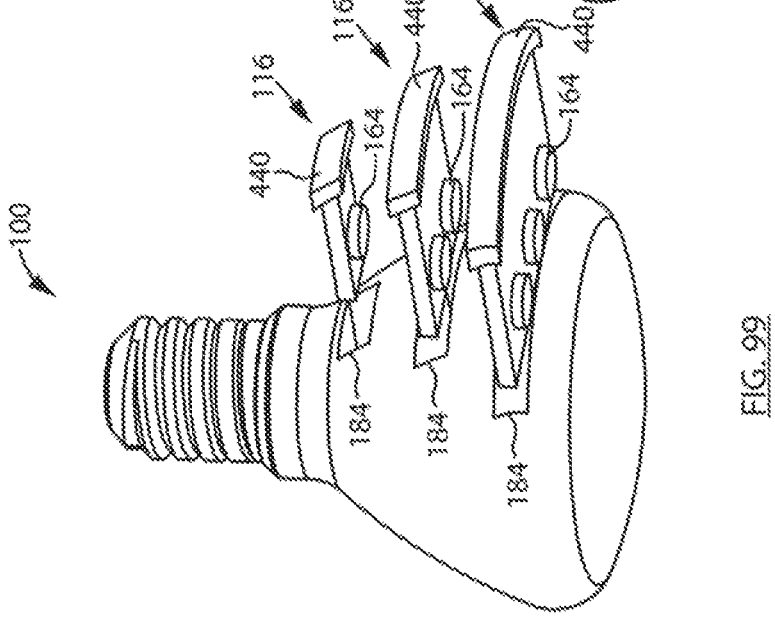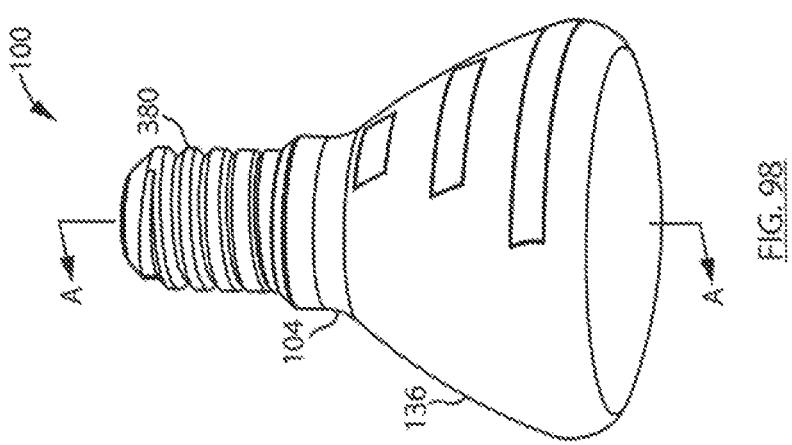

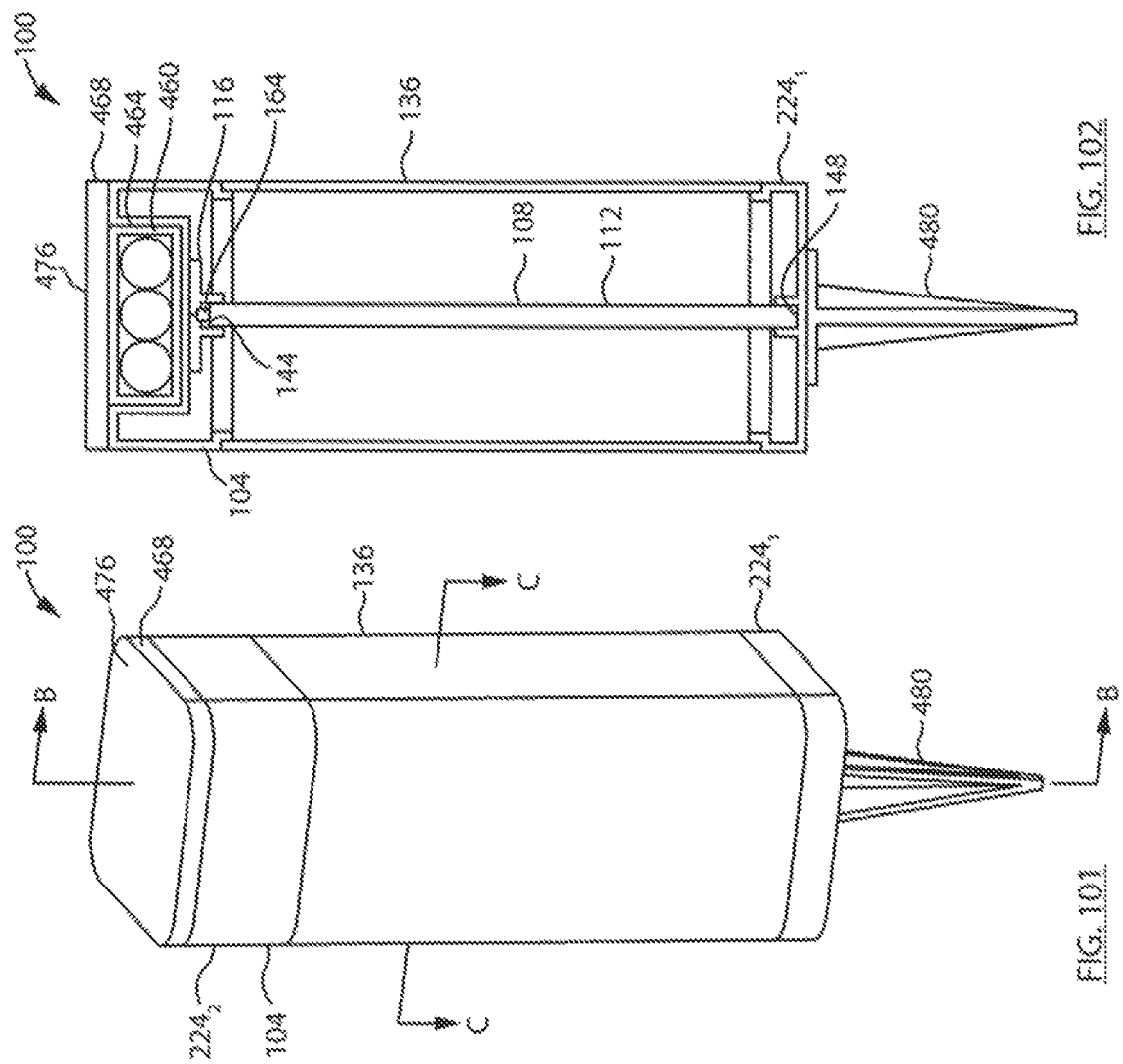

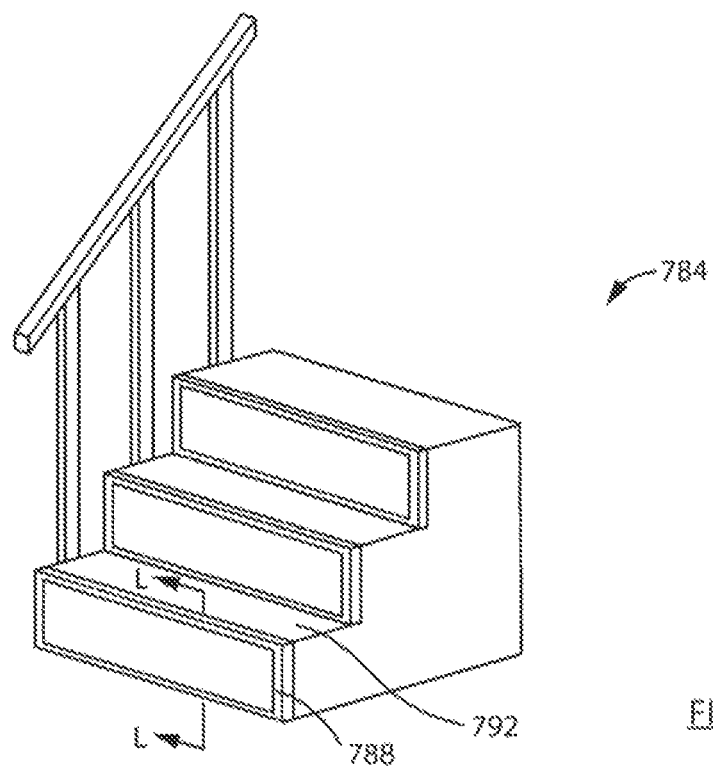
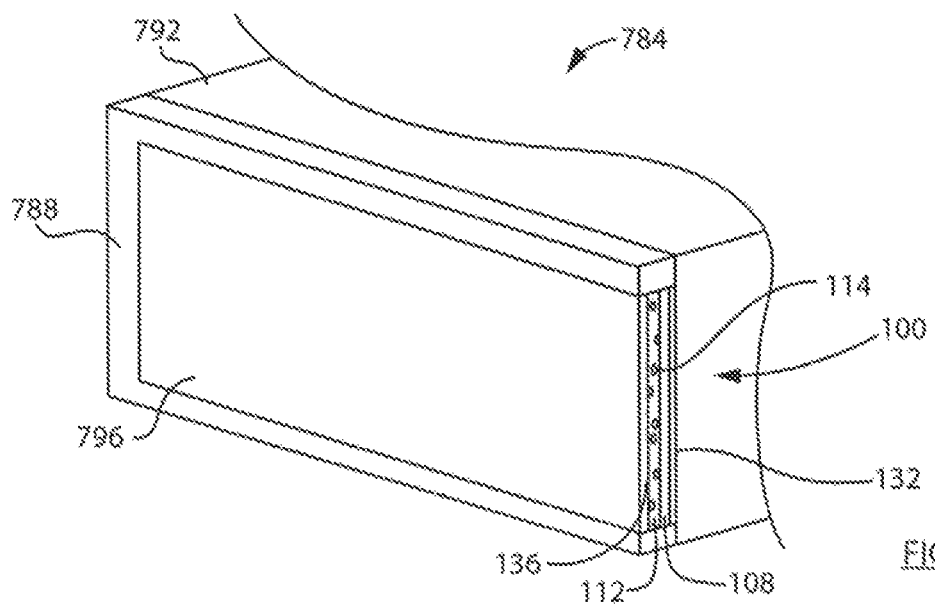

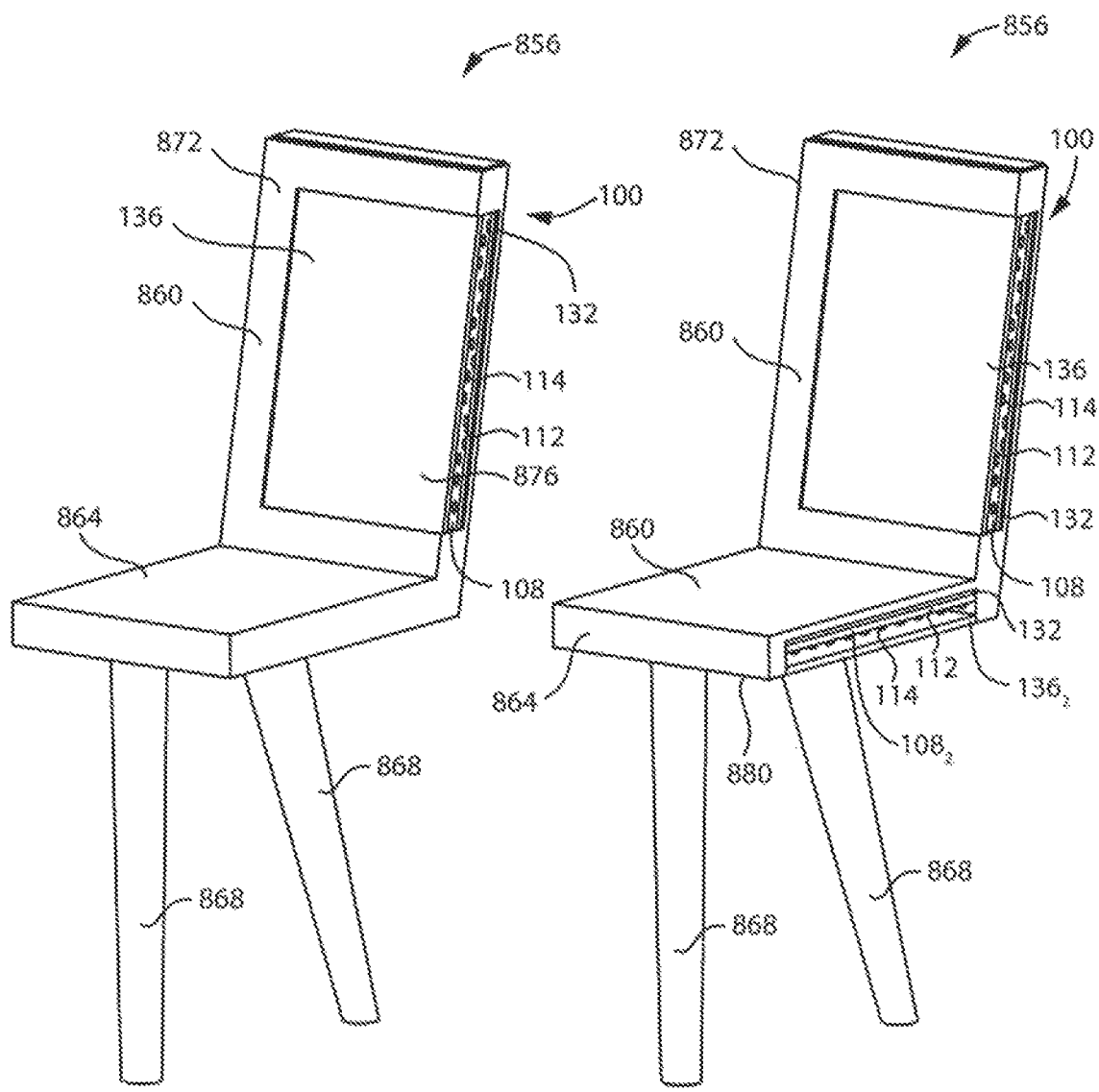

LED LIGHT SOURCE

CROSS-REFERENCE TO RELATED APPLICATIONS

This application is a continuation of U.S. patent application Ser. No. 15/491,238, filed on Apr. 19, 2017, which is herein incorporated by reference in its entirety.

FIELD

This application relates to the field of LED light sources and apparatus including the same.

INTRODUCTION

A light-emitting diode (LED) is a semiconductor light source that emits light when activated. Generally, LEDs have lower energy consumption and longer lifespans as compared with traditional light sources, such as incandescent and halogen lights.

SUMMARY

In one aspect, a LED light source is provided. The LED light source, may include a longitudinally extending first light guide, a housing, and a cartridge. The first light guide having a longitudinally extending light emitting face, the light emitting face having a first end face and a longitudinally spaced apart second end face. The housing having a first recess, the recess having a first side proximate the first end face of the first light guide and a longitudinally spaced apart opposed face, the first recess extending generally transverse to the first light guide from an insertion end to a transversely spaced apart inner end. The cartridge slideably receivable in the first recess and having a plurality of LEDs on a first face of the cartridge, the first face extending generally transverse to the first light guide when the cartridge has been inserted into the first recess, the first face having an inner end and an outer end. The cartridge may be movable from an insertion position in which the inner end of the first face of the cartridge is spaced from the first side of the first recess when the inner end of the first face of the cartridge is positioned at the insertion end, to an inserted position in which the first face of the cartridge is adjacent the first side of the first recess when the cartridge is inserted into the first recess.

In some embodiment, the LED light source further includes a biasing member biasing the cartridge to the inserted position.

In some embodiments, the first recess includes a cam member whereby, as the cartridge is inserted into the first recess, the cartridge is guided towards the inserted position.

In some embodiments, the LED light source may further include a biasing member biasing the cartridge to the inserted position.

In some embodiments, the cartridge is rigid and the biasing member is provided at the inner end of the first recess whereby a biasing force provided by the biasing member when the cartridge is in the inserted position biases the outer end of the cartridge to a position proximate the light guide.

In some embodiments, the LED light source may further include a driving member moveably mounted in the housing and driving the cartridge from a position in which the first face of the cartridge is spaced from the first side of the first recess to the inserted position.

In some embodiments, the LEDs are provided only on the first face of the cartridge.

In some embodiments, the LED light source may further include a second light guide having an first end face and a longitudinally extending light emitting face, wherein the first recess has a third side proximate the first end face of the second light guide and the LEDs are also provided on a second face of the cartridge, wherein when the cartridge is in the inserted position, the second face of the cartridge is adjacent the third side of the first recess.

In some embodiments, the light guides extend in different directions.

In some embodiments, the light guides extend in different directions that re about 90° apart.

In some embodiments, the cartridge further includes a heat sink.

In some embodiments, the cartridge further includes the heat sink.

In some embodiments, the cartridge further includes a substrate, the LEDs are provided on the substrate and the substrate is removable from the heat sink.

In some embodiments, the heat sink is provided in the housing and the cartridge has a side in thermal contact with the heat sink when the cartridge is in the inserted position.

In some embodiments, the LED light source may further include a second light guide extending in the same direction as the first light guide, the second light guide having a first end face and a longitudinally extending light emitting face oriented in the same direction as the light emitting face of the first light guide, and the housing further includes a second recess which slideably receives another cartridge having LEDs on a face thereof.

In some embodiments, the second recess is positioned proximate the first recess and, when inserted the LEDs of the first cartridge face an opposed direction to the LEDs of the second cartridge.

In some embodiments, the second recess is positioned spaced from the first recess and, when inserted the LEDs of the first cartridge face a first direction and the LEDs of the second cartridge face the first direction.

In some embodiments, the LED light source may further include a second recess positioned at the second end face of the first light emitting member and, when inserted, the LEDs of the first cartridge face an opposed direction to the LEDs of the second cartridge.

In another aspect, a LED light source is provided. The LED light source includes a longitudinally extending first light guide, a housing, and a cartridge. The first light guide has a longitudinally extending light emitting face, the light emitting face having a first end face and a longitudinally spaced apart second end face. The housing has a first side proximate the first end face of the first light guide. The cartridge is mountable to the first side of the housing and has at least one LED on a first face of the cartridge, the first face extending generally transverse to the first light guide when the cartridge has been mounted to the housing. When the cartridge is mounted to the first side of the housing, the first face of the cartridge is adjacent the first end face.

In some embodiments, the cartridge has mechanical engagement members which are releasably securable to mating mechanical engagement members of the housing.

In some embodiments, the LED light source may further include at least one screw member that releasably secures the cartridge to the first side of the housing.

In some embodiments, the screw members are non-removably secured to the housing.

In another aspect, a LED light bulb is provided. The LED light bulb may include an engagement end electrically connectable to a socket; a housing having a light transmitting surface and an interior; and, a cartridge removably receivable in the interior and having a plurality of LEDs.

In some embodiments, the LED light bulb has a first recess, the recess having an insertion end proximate an outer surface of the LED light bulb and a longitudinally spaced apart inner end and the cartridge is slideably receivable in the first recess.

In some embodiments, the plurality of LEDs are provided on a first face of the cartridge.

In some embodiments, the LEDs are provided on a plurality of faces of the cartridge.

In some embodiments, the cartridge is generally cylindrical in shape.

In some embodiments, the recess is provided in the engagement end.

In some embodiments, the recess is provided in the housing.

In some embodiments, the housing includes a light guide and the LEDs are positioned against an end of the light guide when installed in the LED light bulb.

In some embodiments, all of an exterior of the housing is made of a material having a light transmitting surface.

In some embodiments, the LED light bulb is in the shape of an incandescent or halogen light bulb.

In another aspect, a LED light source is provided. The LED light source may include a longitudinally extending light guide having a longitudinally extending light emitting face having a length, a first end face and a longitudinally spaced apart second end face and a LED light source is provided at least at the first end face. The light emitting face has a plurality of light emitting locations provided thereon. The density of the light emitting locations increases from the first end face towards the second end face.

In some embodiments, a first LED light source is provided at the first end face and a second LED light source is provided at the second end face wherein the density of the light emitting locations increases from each of the first end face and the second end face to a middle of the light emitting face.

In some embodiments, the light emitting locations are positioned to provide a generally even level of illumination along the length of the light emitting surface.

In some embodiments, a level of illumination provided at the middle of the light emitting surface is ±20% of a level of illumination provided at the first end face.

In some embodiments, a level of illumination provided at the middle of the light emitting surface is ±10% of a level of illumination provided at the first end face.

In some embodiments, an image is provided in front of at least a portion of the light emitting face and the light emitting locations are positioned such that a person viewing the image views a generally evenly illuminated image.

In some embodiments, the image has at least area that has at least one of a different colour or a different density of the image and the light emitting locations are positioned such that a person viewing the image views a generally evenly illuminated image.

In some embodiments, the LED light source is provided only at the first end face wherein the density of the light emitting locations increases from the first end face to the second end face.

In some embodiments, the light emitting locations are positioned to provide a generally even level of illumination along the length of the light emitting surface.

In some embodiments, a level of illumination provided at the second end face of the light emitting surface is ±20% of a level of illumination provided at the first end face.

In some embodiments, a level of illumination provided at the second end face of the light emitting surface is ±10% of a level of illumination provided at the first end face.

In some embodiments, the light emitting locations comprise discontinuities provided in the light emitting face.

In some embodiments, the light emitting locations comprise a light scattering material applied to the light emitting surface.

In some embodiments, the light emitting locations comprise a fluorescent material.

In another aspect, a frame for a work of art is provided. The frame may include at least one side panel extending around a perimeter and defining an inner opening in which the work of art is displayable. The at least one side panel may include a longitudinally extending light guide having a longitudinally extending light emitting face that faces inwards towards another portion of the at least one side panel. The longitudinally extending light emitting face has a length, a first end face and a longitudinally spaced apart second end face and a LED light source is provided at least at the first end face. The light emitting face has a plurality of light emitting locations provided thereon. The density of the light emitting locations increases from the first end face towards the second end face.

In some embodiments, the fame is in the shape of a parallelogram and includes four side panels, each of which includes a longitudinally extending light guide having a light emitting face that faces onwards.

In some embodiments, each light emitting face has an inner side positioned proximate a plane in which the work of art seats when mounted in the frame and a spaced apart outer side and the inner side is position forward of the plane.

In some embodiments, the light emitting face has an inner side positioned proximate a plane in which the work of art seats when mounted in the frame and a spaced apart outer side and the inner side is position forward of the plane.

In some embodiments, a first LED light source is provided at the first end face and a second LED light source is provided at the second end face wherein the density of the light emitting locations increases from each of the first end face and the second end face to a middle of the light emitting face.

In some embodiments, the LED light source is provided only at the first end face wherein the density of the light emitting locations increases from the first end face to the second end face.

In another aspect, a backlight frame for a work of art is provided. The backlight frame may include a frame member extending around a perimeter and defining an inner opening in which the work of art is displayable, and a longitudinally extending light guide positioned rearward of the opening and facing towards the opening. The longitudinally extending light guide has a longitudinally extending light emitting face having a length, a first end face and a longitudinally spaced apart second end face and a LED light source is provided at least at the first end face. The light emitting face has a plurality of light emitting locations provided thereon. The density of the light emitting locations increases from the first end face towards the second end face.

In some embodiments, a first LED light source is provided at the first end face and a second LED light source is provided at the second end face wherein the density of the light emitting locations increases from each of the first end face and the second end face to a middle of the light emitting face.

In some embodiments, the LED light source is provided only at the first end face wherein the density of the light emitting locations increases from the first end face to the second end face.

In some embodiments, the work of art that transmits light is provided in front of at least a portion of the light emitting face and the light emitting locations are positioned such that a person viewing the work of art views a generally evenly illuminated work of art.

In some embodiments, the work of art has at least area that has at least one of a different colour or a different density of the image and the light emitting locations are positioned such that a person viewing the work of art views a generally evenly illuminated work of art.

In some embodiments, the light emitting locations comprise a fluorescent material.

In another aspect, a frame for a work of art is provided. The frame may include at least one side panel defining an inner opening in which the work of art is displayable, the inner opening extending in a plane, the at least one side panel including a longitudinally extending light guide having a longitudinally extending light emitting face that faces inwards towards the inner opening in a direction generally parallel to the plane. The light emitting face has an inner side positioned proximate the plane and a spaced apart outer side and at least one LED providing a light source for the light guide.

In some embodiments, the inner side of the light emitting face is spaced from the plane.

In some embodiments, the inner side of the light emitting face is spaced from 0.25 to 1 inch from the plane.

In some embodiments, the light guide has a first end face and a longitudinally spaced apart second end face and the light source is provided at least at the first end face.

In some embodiments, a first light source is provided at the first end face and a second light source is provided at the second end face.

In some embodiments, the fame is in the shape of a parallelogram and includes four side panels, each of which includes a longitudinally extending light guide having a longitudinally extending light emitting face that faces inwards towards the inner opening in a direction generally parallel to the plane, each light emitting face has an inner side positioned proximate the plane and a spaced apart outer side.

In some embodiments, the light emitting faces are positioned forward of the plane.

In some embodiments, the fame includes a plurality of side panels which meet at corners, at least some of the side panels comprise a longitudinally extending light guide having a longitudinally extending light emitting face that faces inwards towards the inner opening in a direction generally parallel to the plane, each light emitting face has a first end face and a longitudinally spaced apart second end face and the light source is provided at least at the first end face, wherein the light sources are provided in corners of the parallelogram.

In some embodiments, the fame is in the shape of a parallelogram, each of the side panels includes a longitudinally extending light guide and the light sources are provided in the corners of the parallelogram.

In some embodiments, the frame may further include a sensor that detects a condition in a space in front of a location in which the frame is located and a controller that adjusts at least one of a level of intensity of light emitted by the light source and the colour of light emitted by the light source based upon a signal provided by the sensor.

In some embodiments, the condition includes at least one of a level of illumination, a colour of illumination, motion of a body, a noise level, a signal issued by a person.

In some embodiments, the light source includes LEDs of at least two different colours.

In some embodiments, the frame may further include a manually actuatable switch operatively connected to the light source wherein operation of the switch adjusts at least one of a level of intensity of light emitted by the light source and the colour of light emitted by the light source based upon a signal provided by the switch.

In some embodiments, the frame may further include an energy storage member.

In some embodiments, the energy storage member includes a rechargeable battery.

In some embodiments, the at least one LED is operable to selectively emit one or more colours of light.

In some embodiments, the at least one LED is operable to selectively illuminate part of a work of art placed in the fame.

In another aspect, a backlight frame for a work of art is provided. The backlight frame may include a frame member that defines an inner opening in which the work of art is displayable, the inner opening extending in a plane, and a longitudinally extending light guide positioned rearward of the opening and facing towards the opening. The longitudinally extending light guide has a longitudinally extending light emitting face spaced rearward of the plane and having a length, a first end face and a longitudinally spaced apart second end face and a LED light source is provided at least at the first end face.

In some embodiments, the light emitting face is spaced rearward from the plane.

In some embodiments, the light emitting face is spaced from 0.25 to 1 inch from the plane.

In some embodiments, the light guide has a first end face and a longitudinally spaced apart second end face and the LED light source is provided at least at the first end face.

In some embodiments, a first light source is provided at the first end face and a second light source is provided at the second end face.

In some embodiments, the frame may further include a sensor that detects a condition in a space in front of a location in which the frame is located and a controller that adjusts at least one of a level of intensity of light emitted by the light source and the colour of light emitted by the light source based upon a signal provided by the sensor.

In some embodiments, the condition includes at least one of a level of illumination, a colour of illumination, motion of a body, a noise level, a signal issued by a person.

In some embodiments, the light source includes LEDs of at least two different colours and In some embodiments, the frame may further include a manually actuatable switch operatively connected to the light source wherein operation of the switch adjusts at least one of a level of intensity of light emitted by the light source and the colour of light emitted by the light source based upon a signal provided by the switch.

In some embodiments, the frame may further include an energy storage member.

In some embodiments, the energy storage member includes a rechargeable battery.

In some embodiments, the at least one LED is operable to selectively emit one or more colours of light.

In some embodiments, the at least one LED is operable to selectively illuminate part of a work of art placed in the fame.

In another aspect, a LED light source is provided. The LED light source may include a longitudinally extending light guide, at least one LED, and a diffuser. The longitudinally extending light guide may have a first longitudinally extending light emitting face, the first light emitting face having a first end face, a longitudinally spaced apart second end face, and first and second side faces extending between the first and second end faces. The at least one LED is provided at the first end face. The diffuser includes a central panel that is spaced from and facing the first light emitting face.

In some embodiments, the central panel of the diffuser is positioned from 0.25 to 3 inches from the light emitting surface.

In some embodiments, the diffuser is composed of at least one of acrylic, polypropylene and polycarbonate, wherein the diffuser is at least translucent.

In some embodiments, the diffuser extends over the first and second side faces and the light emitting face.

In some embodiments, the diffuser is white.

In some embodiments, the central panel has a first end, a longitudinally spaced apart second end, and first and second sides each of which extends longitudinally between the first and second ends, and the diffuser further includes a first side panel extending between the first and second ends the central panel and provided on the first side of the central panel and a second side panel extending between the first and second ends the central panel and provided on the second side of the central panel.

In some embodiments, the light guide has a second light emitting face spaced from and opposed to the first light emitting face and facing in a direction opposed to a direction that the first light emitting member faces.

In some embodiments, the light guide has a longitudinally extending rear face spaced from and opposed to the first light emitting face, and the LED light source further includes a reflector facing the rear face.

In some embodiments, the reflector is spaced from the rear face.

In some embodiments, the reflector abuts the rear face.

In some embodiments, the reflector has a surface facing the rear face, wherein the surface is provided with a white coating.

In some embodiments, the white coating includes titanium dioxide.

In some embodiments, the LED light source may further include an image provided in front of the light emitting face, the image having at least one portion that has one or more of a different colour or light transmissivity, wherein a surface of the reflector facing the light guide has more than one colour and the colours are positioned to enhance the image when viewed by a user.

In some embodiments, a portion of the reflector has a colour selected to increase the visibility of the portion of the image.

In some embodiments, the reflector has a surface facing the rear face, wherein the surface is provided with a UV paint or fluorescent paint.

In some embodiments, the at least one LED is operable to selectively emit one or more colours of light.

In another aspect, a LED light source is provided. The LED light source includes a longitudinally extending light guide, at least one LED, and a reflector. The longitudinally extending light guide having a first longitudinally extending light emitting face, a longitudinally extending rear face spaced from and opposed to the first light emitting face, the first light emitting face having a first end face, a longitudinally spaced apart second end face, and first and second side faces extending between the first and second end faces. The at least one LED is provided at the first end face. The reflector faces the rear face.

In some embodiments, the reflector is spaced from the rear face.

In some embodiments, the reflector abuts the rear face.

In some embodiments, the reflector has a surface facing the rear face, wherein the surface is provided with a white coating.

In some embodiments, the white coating includes titanium dioxide.

In some embodiments, the white reflector has a surface facing the rear face, wherein the surface is provided with a UV paint.

In some embodiments, the LED light source may further include an image provided in front of the light emitting face, the image having at least one portion that has one or more of a different colour or light transmissivity, wherein a surface of the reflector facing the light guide has more than one colour and the colours are positioned to enhance the image when viewed by a user.

In some embodiments, a portion of the reflector has a colour selected to increase the visibility of the portion of the image.

In some embodiments, the at least one LED is operable to selectively emit one or more colours of light.

In another aspect, a LED light source is provided including a longitudinally extending light guide, and a power supply. The longitudinally extending light guide has a first end face and a longitudinally spaced apart second end face and at least one LED provided at the first end face. The power supply includes a plurality of batteries operatively connected to the at least one LED in a first mode in which the power supply provides a first power to the at least one LED and a second mode in which the power supply provides a second power different to the first power to the at least one LED.

In some embodiments, in the first mode, two or more of the batteries are connected in series.

In some embodiments, in the second mode, two or more of the batteries are connected in parallel.

In some embodiments, the plurality of batteries comprise a first battery and a second battery and, in the first mode, the first and second batteries are connected in series.

In some embodiments, in the second mode, the first and second the batteries are connected in parallel.

In some embodiments, the LED light source may further include a circuit which includes a sensor and the power supply whereby, when the sensor senses a condition, the sensor issues a signal which causes the power supply to change from the first mode to the second mode.

In some embodiments, the sensor includes a motion sensor.

In some embodiments, the sensor includes a noise sensor.

In some embodiments, the sensor includes a light intensity sensor.

In some embodiments, the LED light source may further include a manually operable switch operatively connected to the power supply, the switch having a first position in which the power supply is in the first mode and a second position in which the power supply is in the second mode.

In another aspect, a LED light source is provided. The LED light source includes a circuit including a plurality of LEDs. The LEDs are connected in parallel and each of the plurality of LEDs is individually electrically connected to the circuit by a meltable electrically conductive member.

In some embodiments, the meltable electrically conductive member includes fuse wire.

In some embodiments, the meltable electrically conductive member melts at a temperature corresponding to a temperature produced by a current drawn by a failed LED through the meltable electrically conductive member.

In some embodiments, the meltable electrically conductive member melts at a temperature above about 80 C.

In some embodiments, the meltable electrically conductive member includes fuse wire.

BRIEF DESCRIPTION OF THE DRAWINGS

FIG. 10 is a cross-sectional view of the housing end member of FIG. 8, showing the cartridge in an insertion position;

FIG. 11 is a cross-sectional view of the housing end member of FIG. 8, showing the cartridge being removed;

FIG. 12 is a cross-sectional view of an LED light source having the housing end member of FIG. 8, and showing the cartridge in an inserted position;

FIG. 13A is a perspective view of a housing end member in accordance with another embodiment;

FIG. 14 is a cross-sectional view taken along line 14-14 in FIG. 13A, showing a cartridge in an inserted position and a driving member in a first position;

FIG. 15 is a cross-sectional view taken along line 14-14 in FIG. 13A, showing the cartridge in an insertion position and the driving member in a second position;

FIG. 16 is a perspective view of the housing end member of FIG. 13A showing the driving member in the second position and the cartridge removed;

FIG. 17 is an exploded view of a housing end member in accordance with another embodiment;

FIG. 34 is an exploded view of a housing end member of the LED light source of FIG. 33;

FIG. 45 is a cross-sectional view of the housing end member of FIG. 43 showing the cartridge in an insertion position;

FIG. 46 is a cross-sectional view of the housing end member of FIG. 43 showing the cartridge being removed;

FIG. 47 is a schematic view of a LED light source including one cartridge in one housing end member, in accordance with an embodiment;

FIG. 48 is a schematic view of a LED light source including one cartridge in each of two housing end members, in accordance with an embodiment;

FIG. 49 is a schematic view of a LED light source including two cartridges in one housing end member, in accordance with an embodiment;

FIG. 50 is a schematic view of a LED light source including four cartridges in three housing end members, in accordance with an embodiment;

FIG. 53 is a schematic view of a LED light source including eight cartridges in two housing end members, in accordance with an embodiment;

FIG. 54 is a schematic view of a LED light source including four cartridges in two housing end members, each housing end member including a heat sink, in accordance with an embodiment;

FIG. 55 is a perspective view of a LED light source formed as a lightbulb in accordance with an embodiment;

FIG. 56 is an exploded view of the LED light source of FIG. 55;

FIG. 66 is a perspective view of a LED light source formed as a light bulb in accordance with another embodiment;

FIG. 67 is a perspective view of the LED light source of FIG. 66 with a cartridge removed;

FIG. 68 is a cross-sectional view taken along line 68-68 in FIG. 66;

FIG. 75 is a perspective view of a LED light source formed as a light bulb in accordance with another embodiment;

FIG. 76 is a perspective view of the LED light source of FIG. 75 with a diffuser removed;

FIG. 77 is a cross-sectional view taken along line 77-77 in FIG. 75;

FIG. 84 is a perspective view of a LED light source formed as a light bulb in accordance with another embodiment;

FIG. 85 is a perspective view of the LED light source of FIG. 84 with a cartridge removed;

FIG. 86 is a cross-sectional view taken along line 86-86 in FIG. 84;

FIG. 87 is a perspective view of a LED light source formed as a light bulb in accordance with another embodiment;

FIG. 88 is a perspective view of the LED light source of FIG. 87 with two cartridges removed;

FIG. 89 is a cross-sectional view taken along line 89-89 in FIG. 87;

FIG. 90 is a perspective view of a LED light source in accordance with an embodiment;

FIG. 91 is a perspective view of the LED light source of FIG. 90 with a cartridge removed;

FIG. 92 is a cross-sectional view taken along line 92-92 in FIG. 90;

FIG. 93 is a cross-sectional view taken along line 93-93 in FIG. 90;

FIG. 94 is a perspective view of a LED light source in accordance with an embodiment;

FIG. 95 is a perspective view of the LED light source of FIG. 94 with three cartridges removed;

FIG. 96 is a cross-sectional view taken along line 96-96 in FIG. 94;

FIG. 97 is a cross-sectional view taken along line 97-97 in FIG. 94;

FIG. 98 is a perspective view of a LED light source in accordance with an embodiment;

FIG. 99 is a perspective view of the LED light source of FIG. 98 with three cartridges removed;

FIG. 100 is a cross-sectional view taken along line A-A in FIG. 98;

FIG. 101 is a perspective view of a LED light source including a mounting member, in accordance with an embodiment;

FIG. 102 is a cross-sectional view taken along line B-B in FIG. 101;

FIG. 136 is a partial cross-sectional view taken along line E-E in FIG. 109, in accordance with an embodiment;

FIGS. 137-139 are schematic views of a frame in accordance with various embodiments;

FIG. 140 is an exploded view of the frame of FIG. 139;

FIG. 141 is a cross-sectional view of a LED light source in accordance with an embodiment;

FIG. 142 is a cross-sectional view of a LED light source in accordance with another embodiment;

FIG. 143 is an exploded view of a LED light source in accordance with another embodiment;

FIG. 144 is an exploded view of a LED light source in accordance with another embodiment;

FIG. 145 is a side view of a LED light source in accordance with another embodiment;

FIG. 146 is a side view of a LED light source in accordance with another embodiment;

FIG. 147 is an exploded view of a frame in accordance with another embodiment;

FIG. 148 is a partial cross-sectional view of the frame of FIG. 147;

FIG. 149 is another partial cross-sectional view of the frame of FIG. 147;

Figure 150:
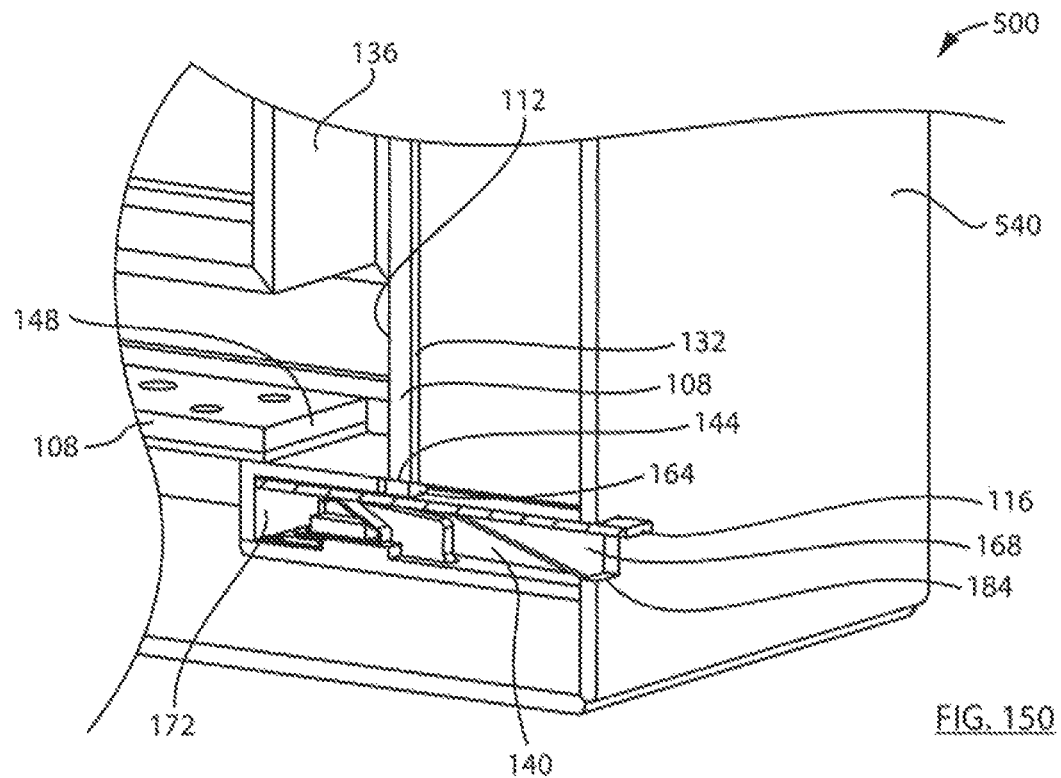
Figure 151:
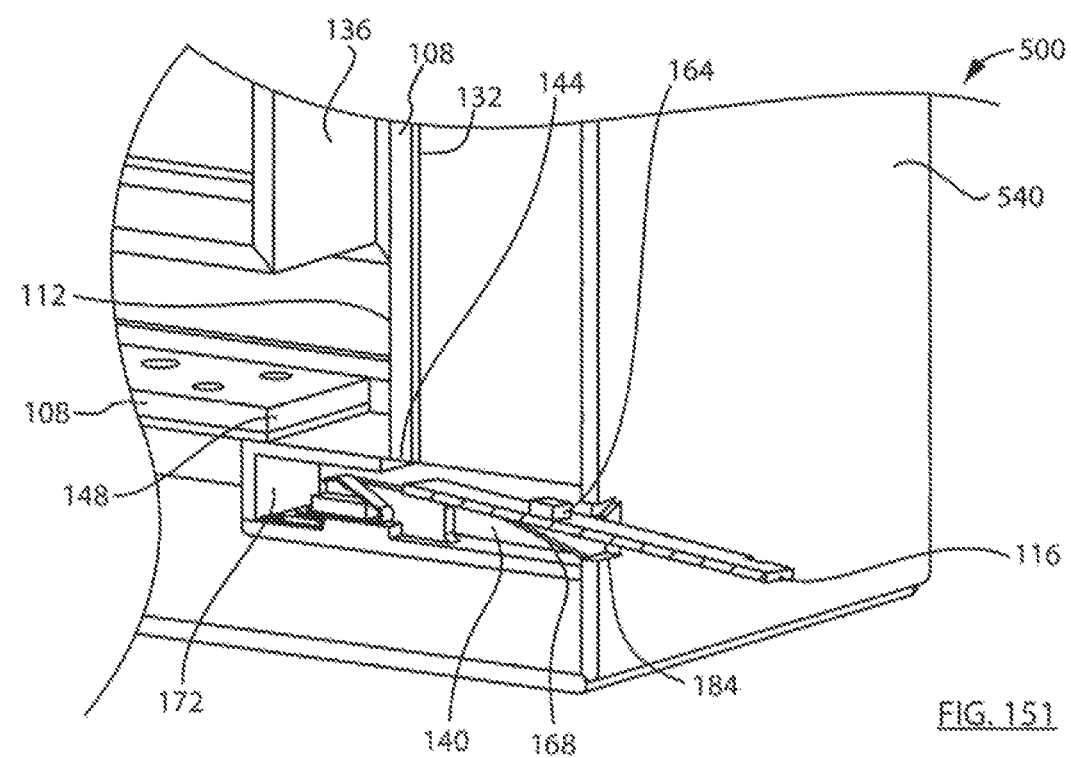
Figure 152:
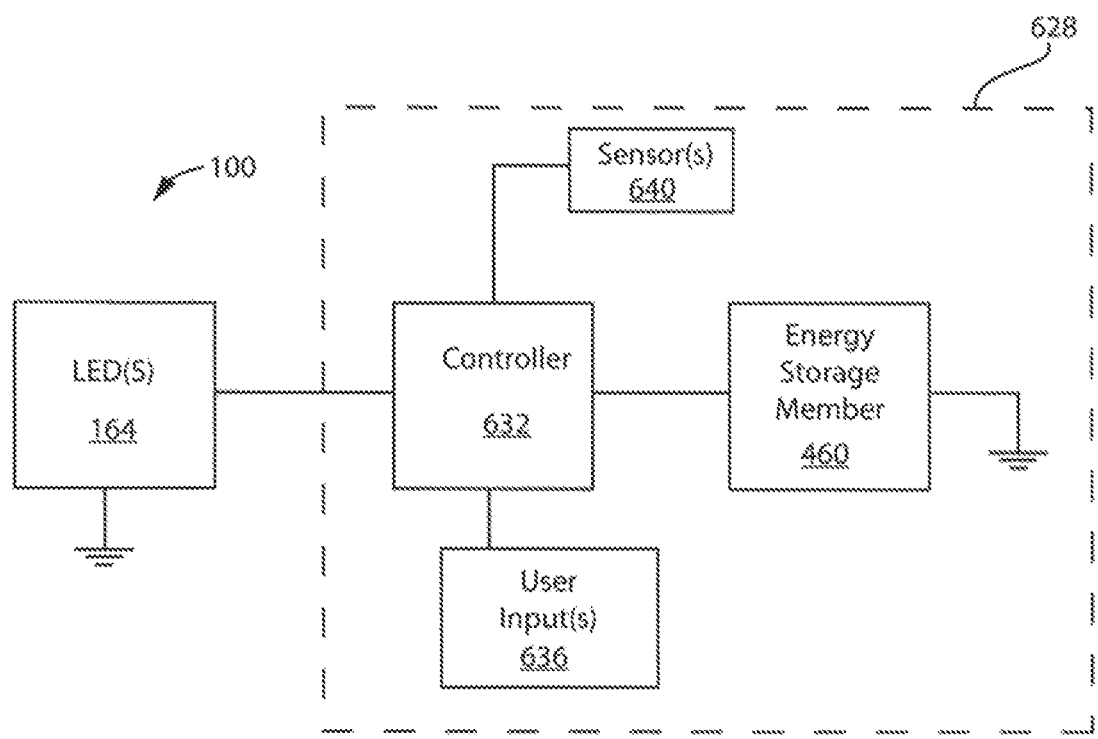
Figure 153A:
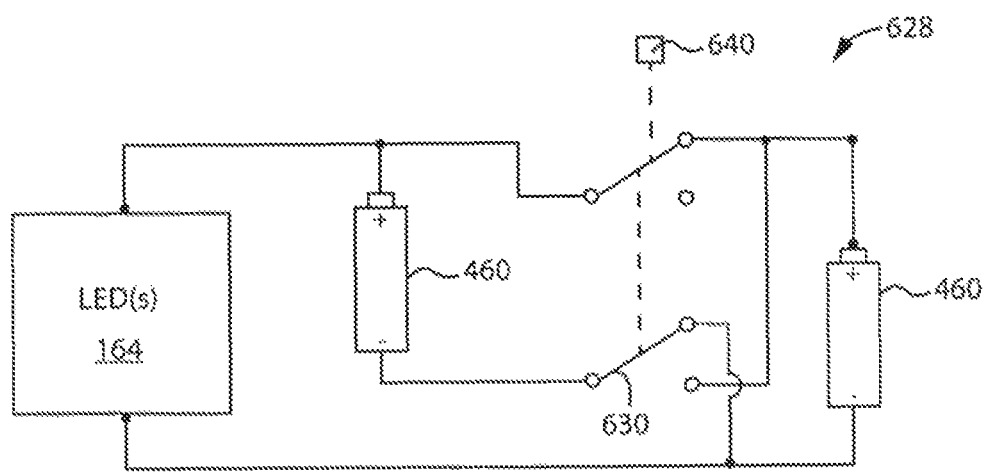
Figure 153B:
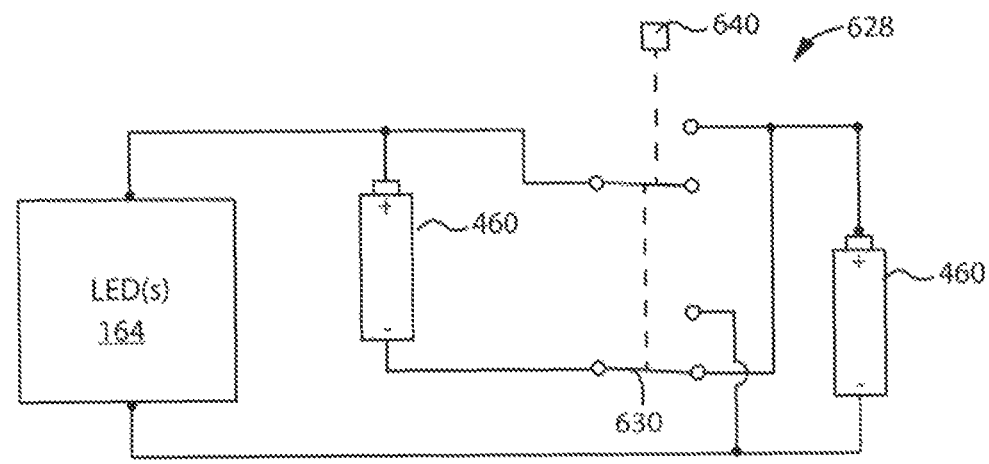
Figure 154:
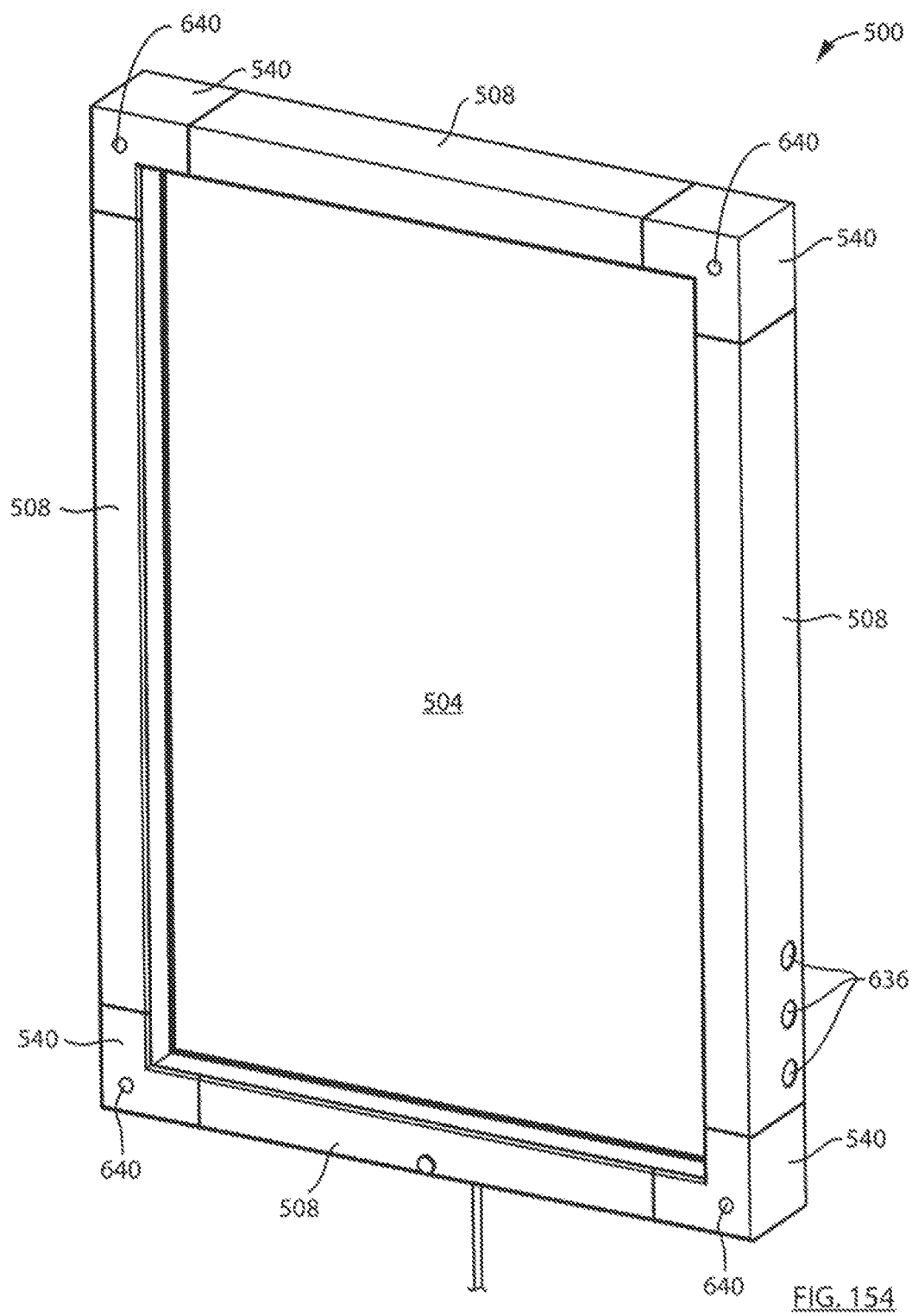
Figure 155:
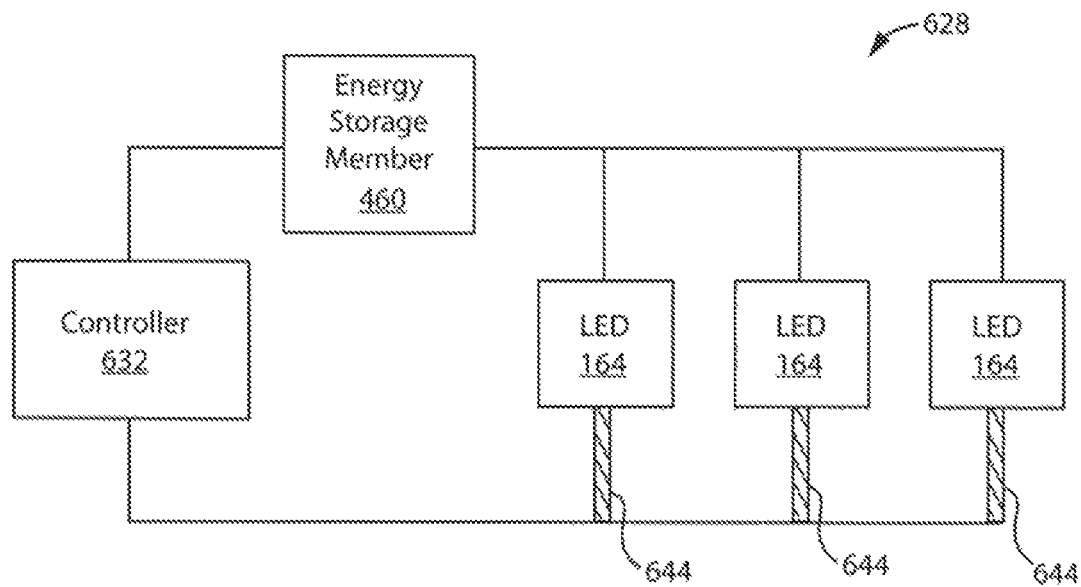
Figure 156:
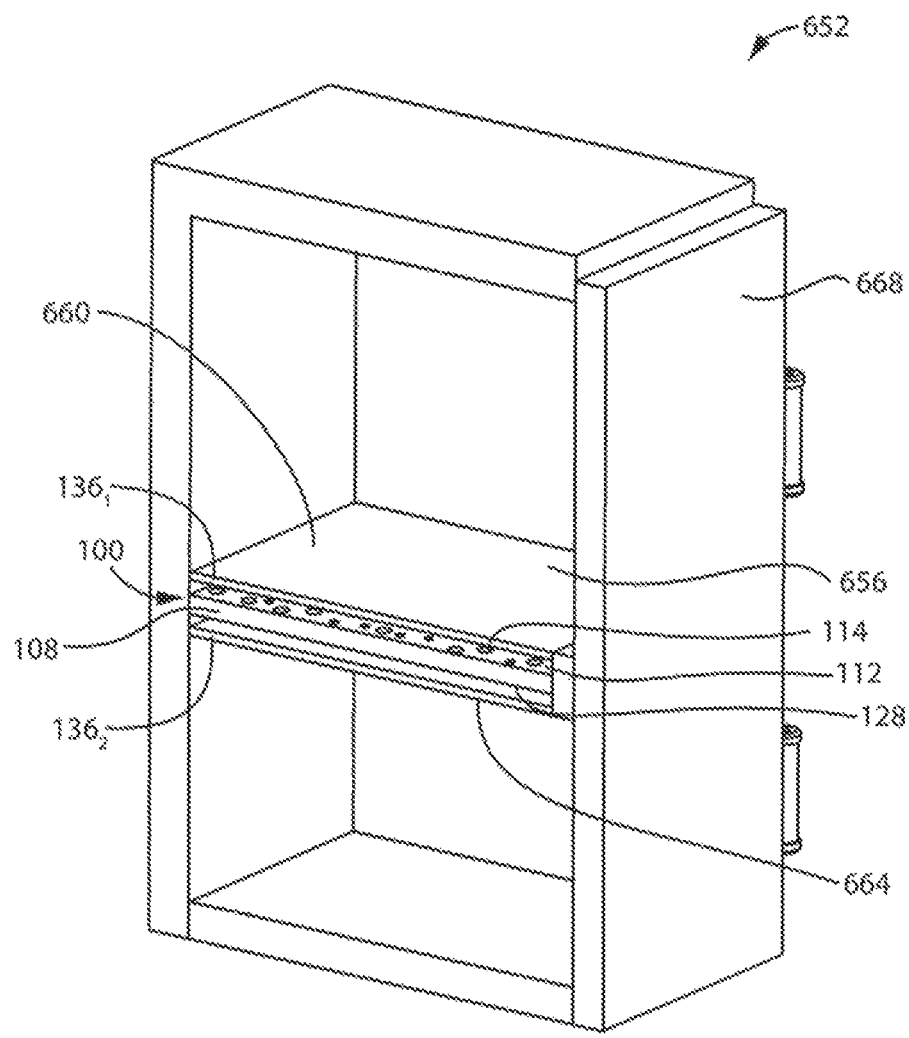
Figure 157:
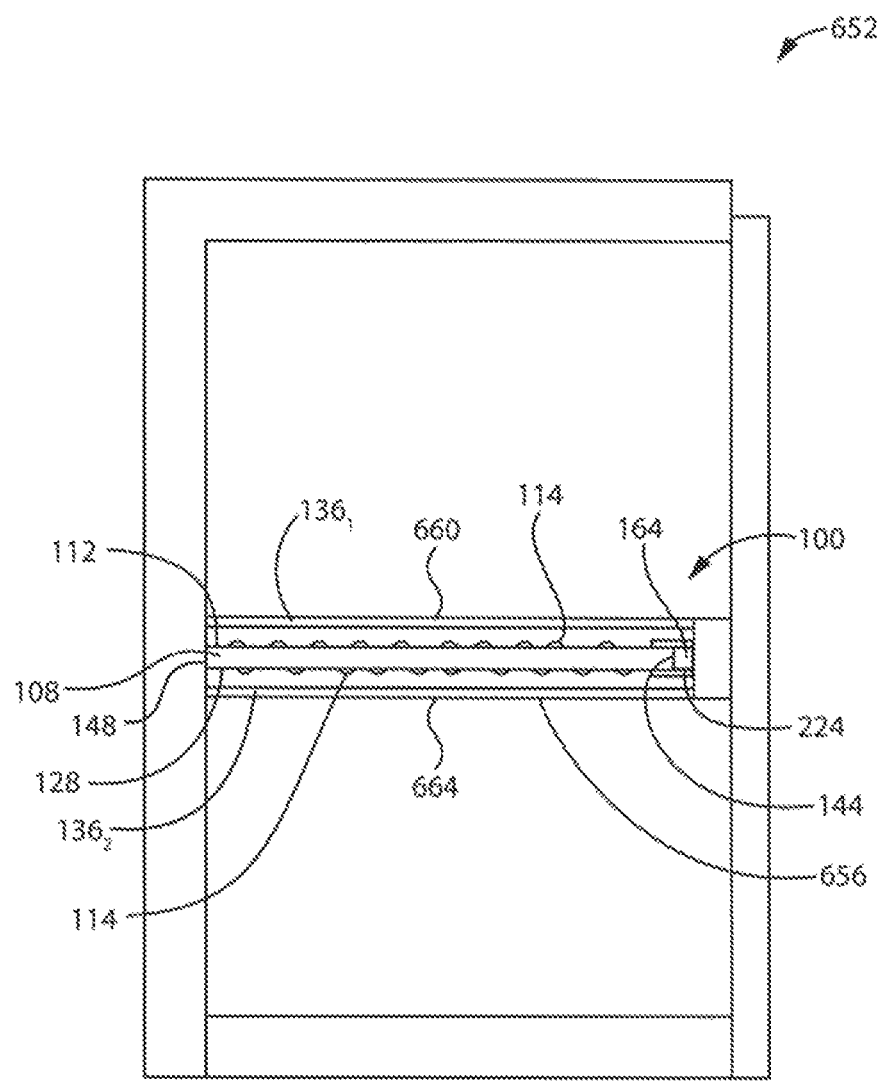
Figure 158:
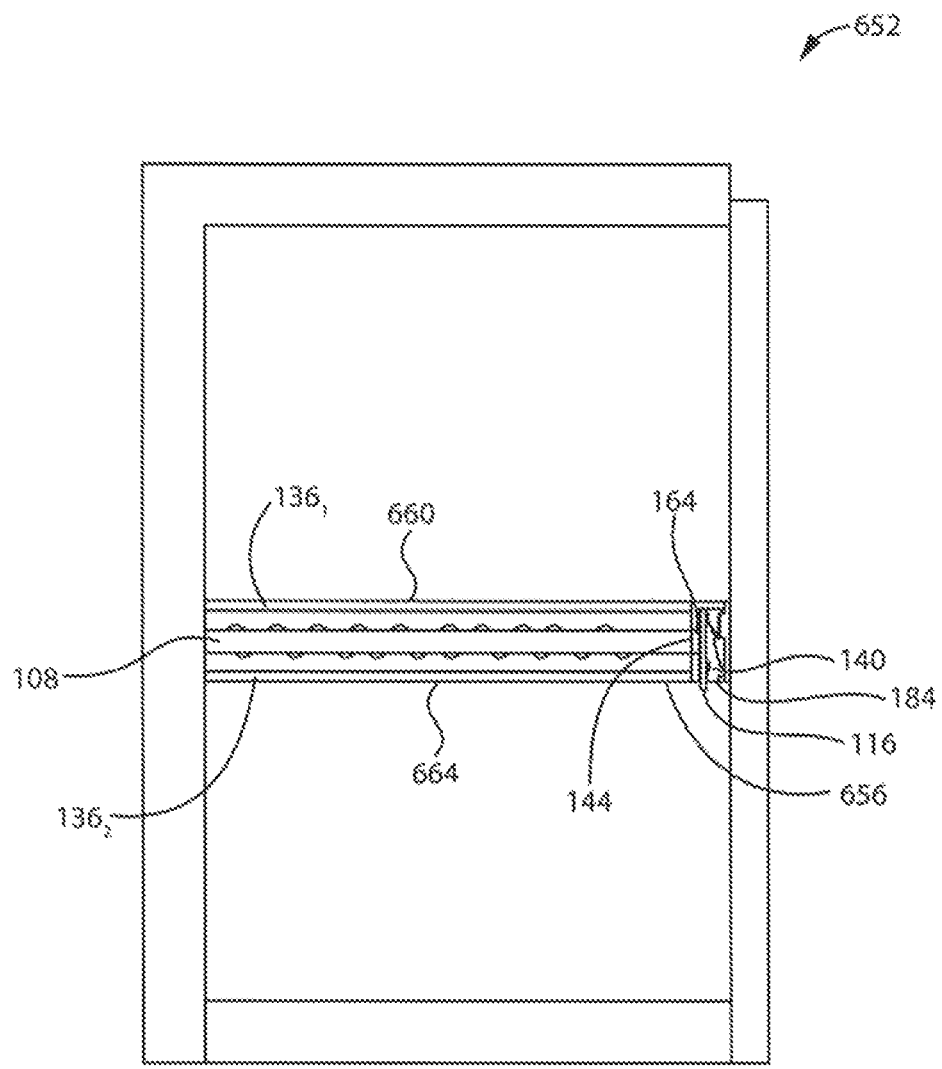
Figure 159:
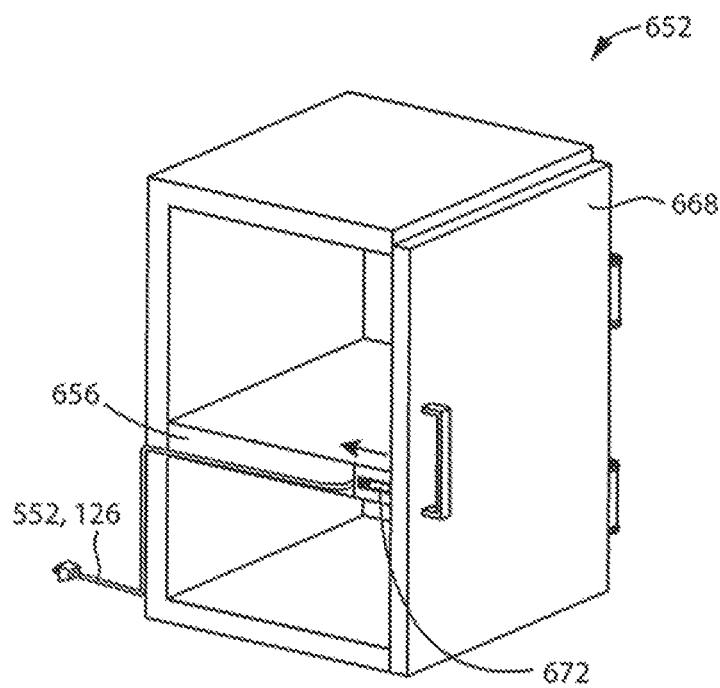
Figure 160:
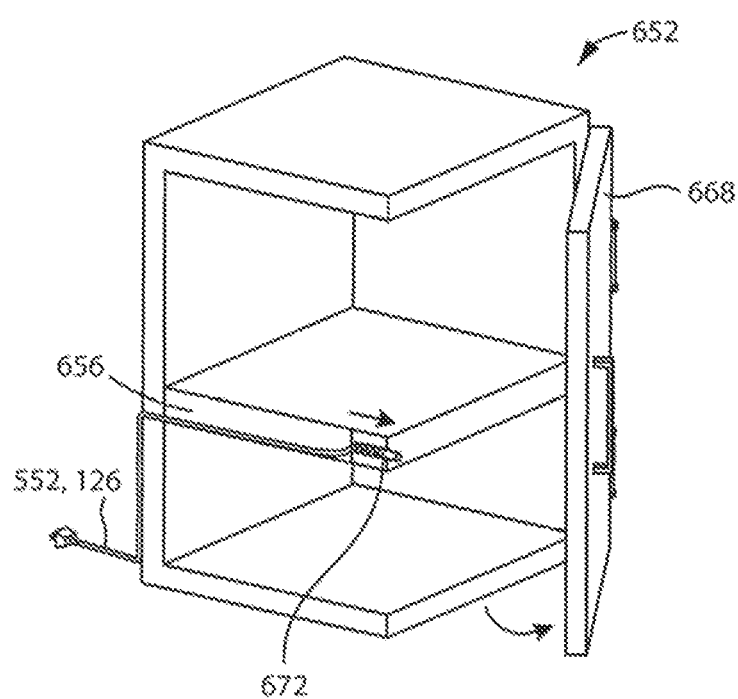
Figure 161:
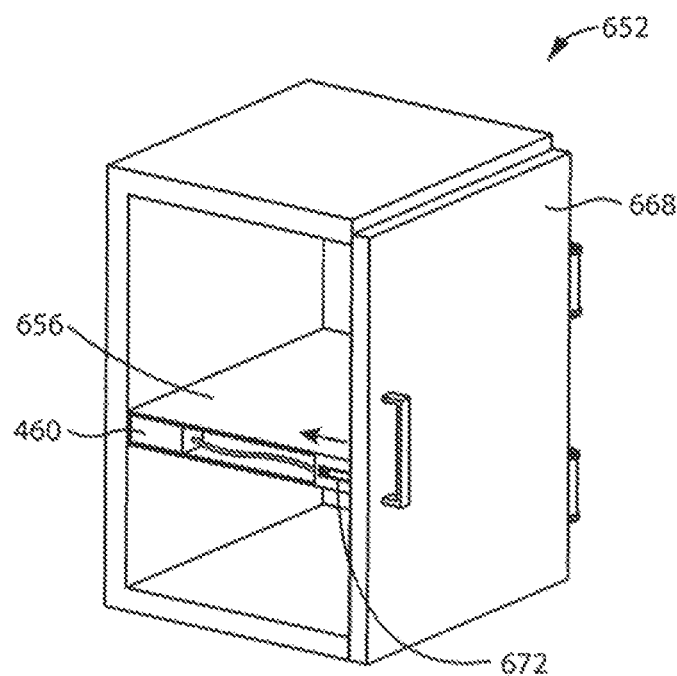
Figure 162:
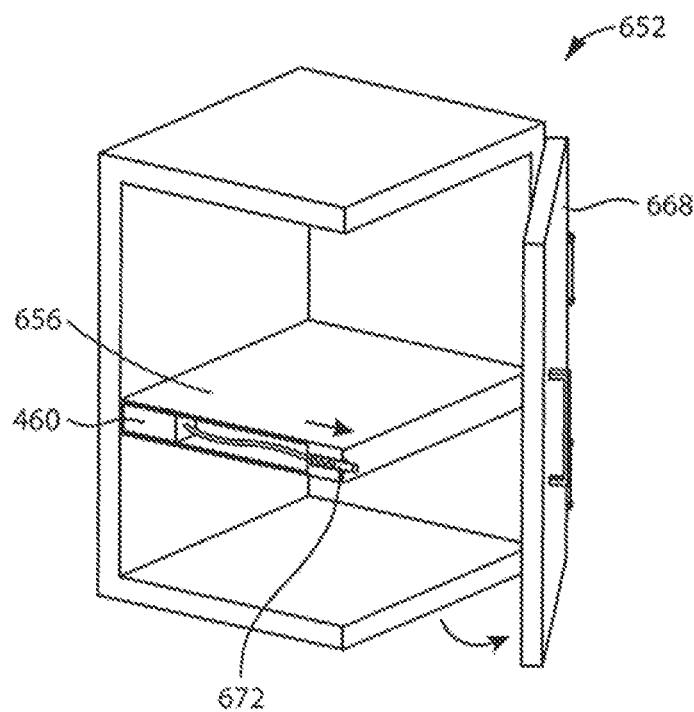
Figure 163:
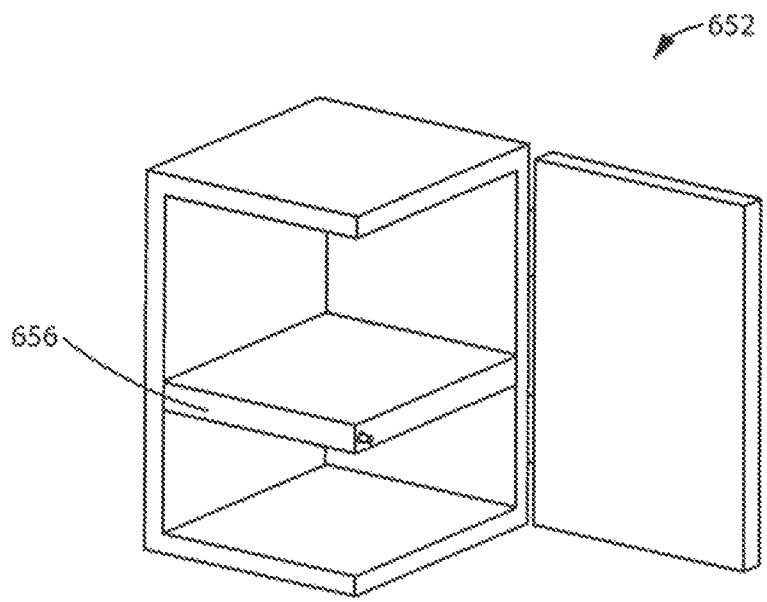
Figure 164:
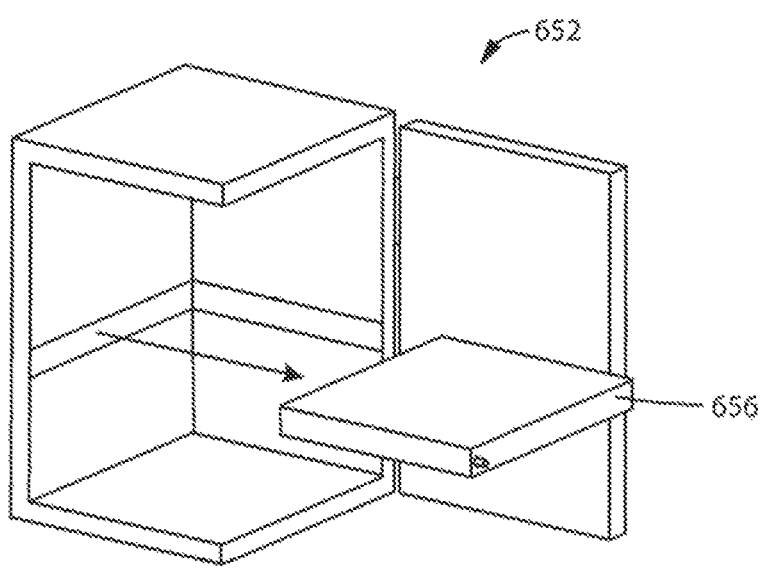
Figure 165:
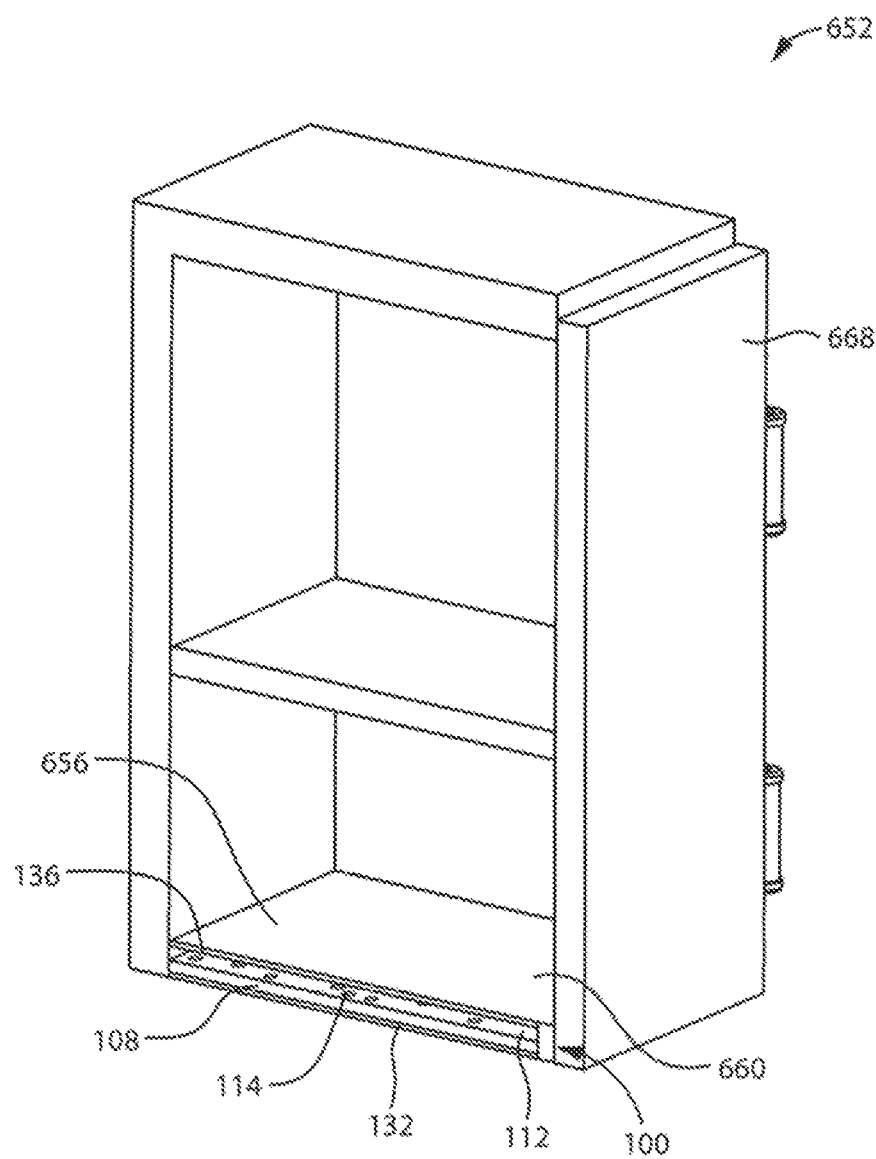
Figure 166:
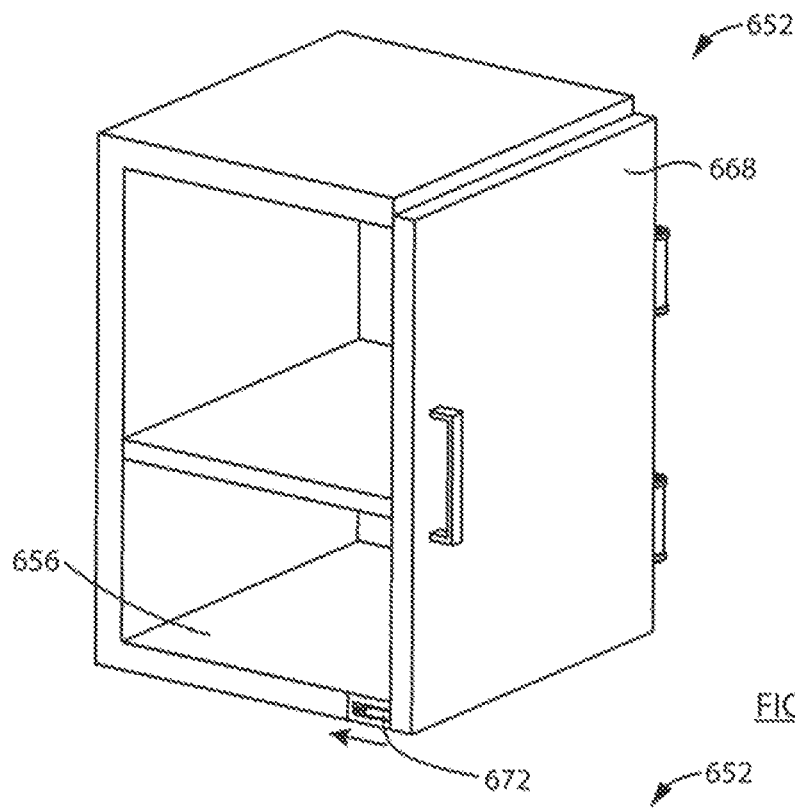
Figure 167:
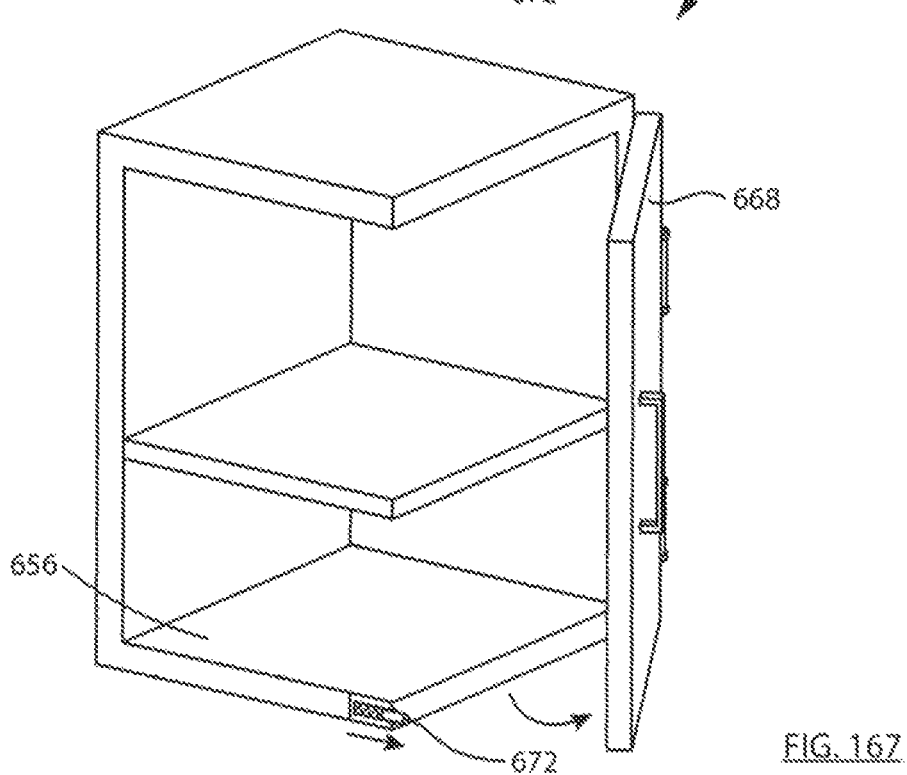
Figure 168:
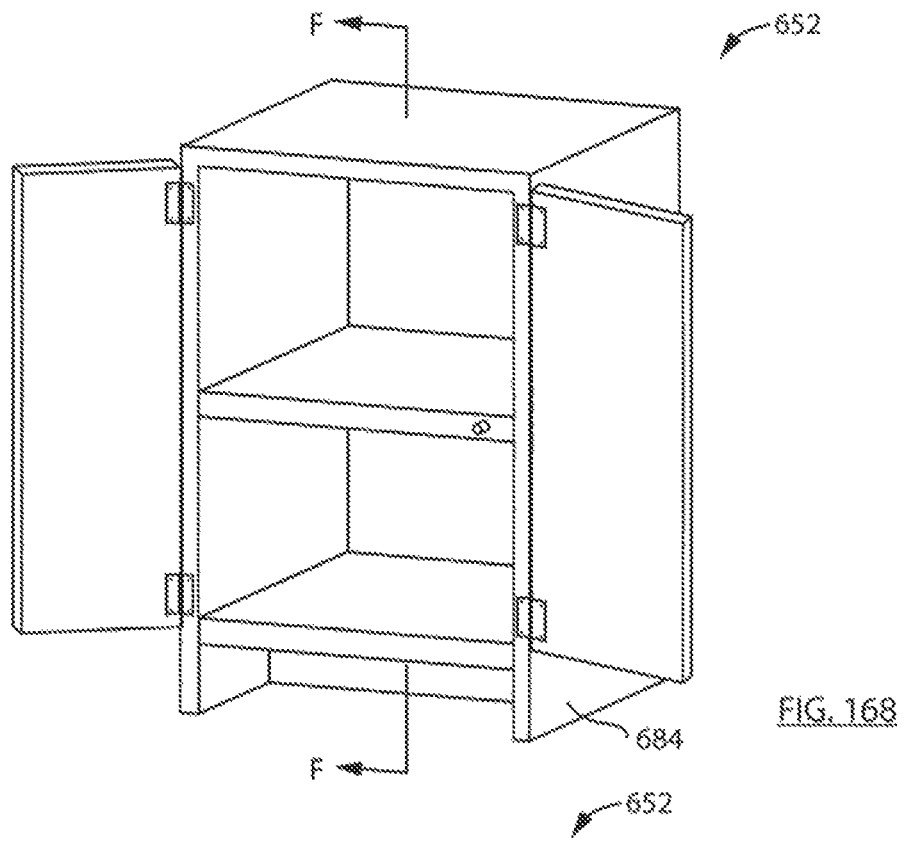
Figure 169:
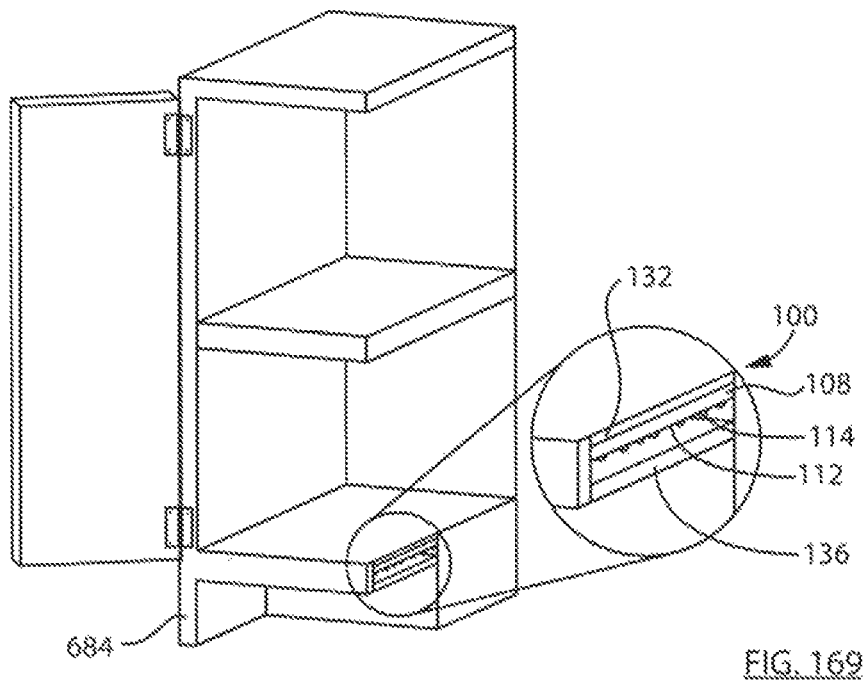
Figure 170:
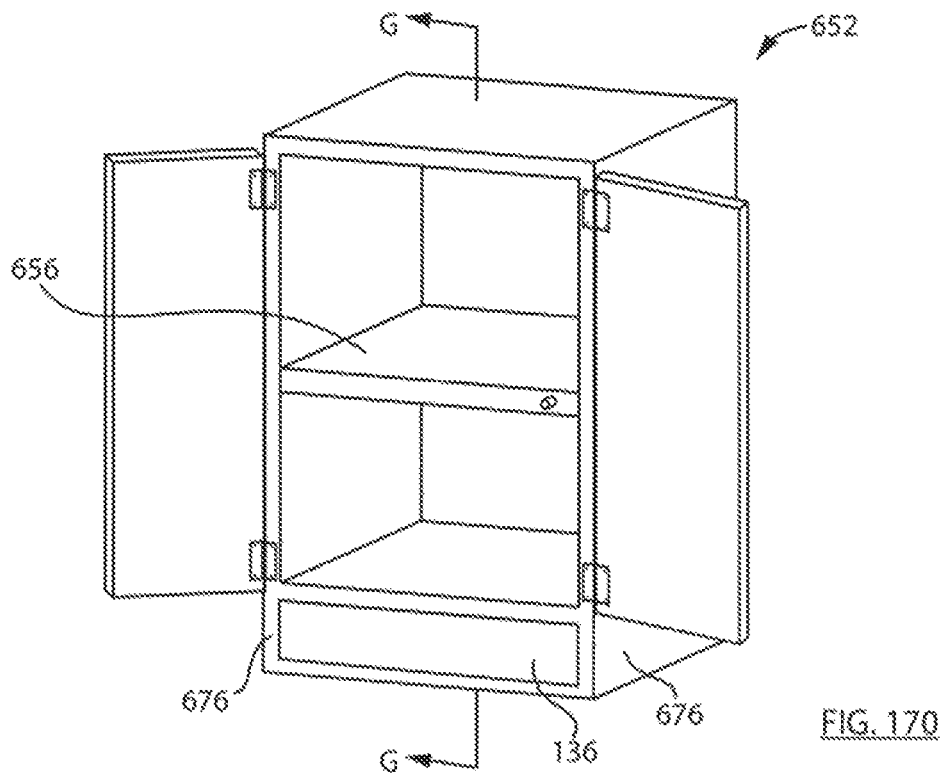
Figure 171:
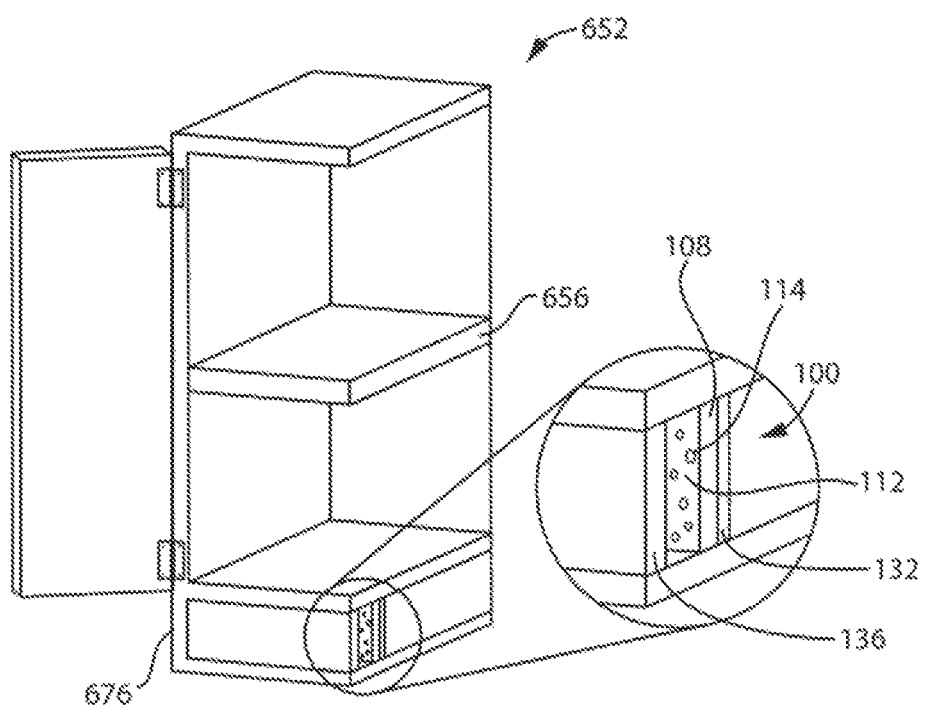
Figure 172:
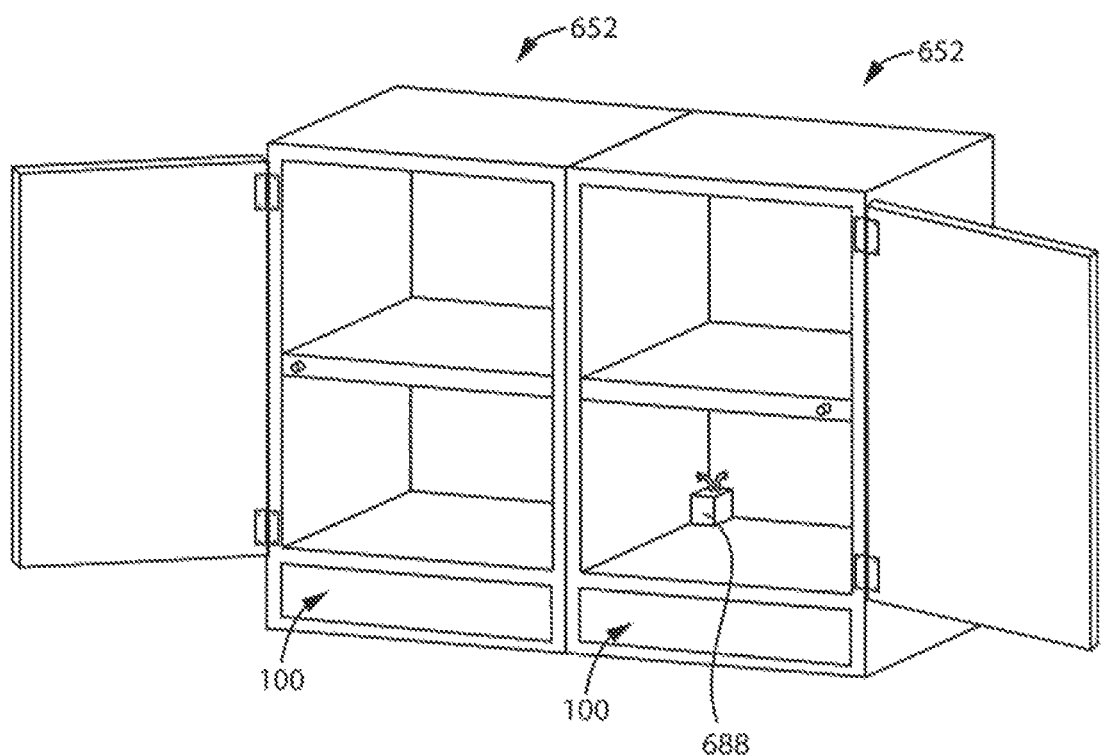
Figure 173:
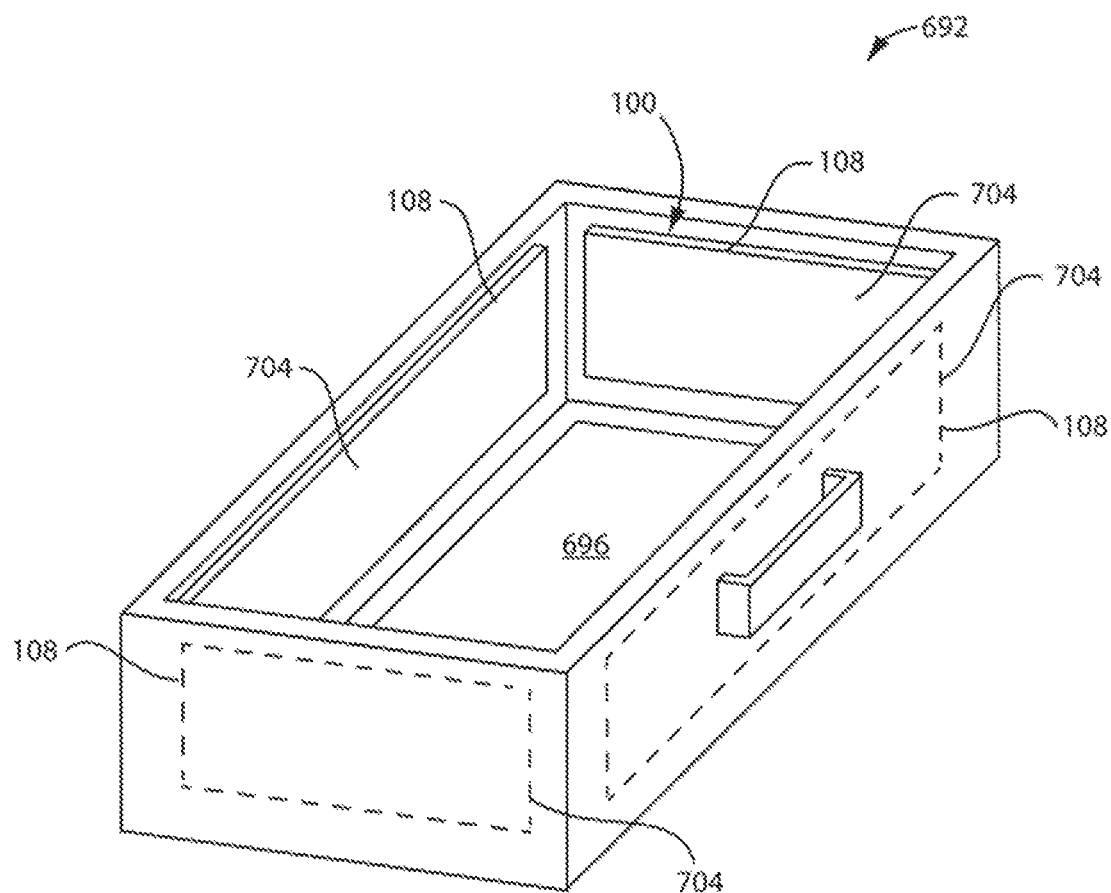
Figure 174:
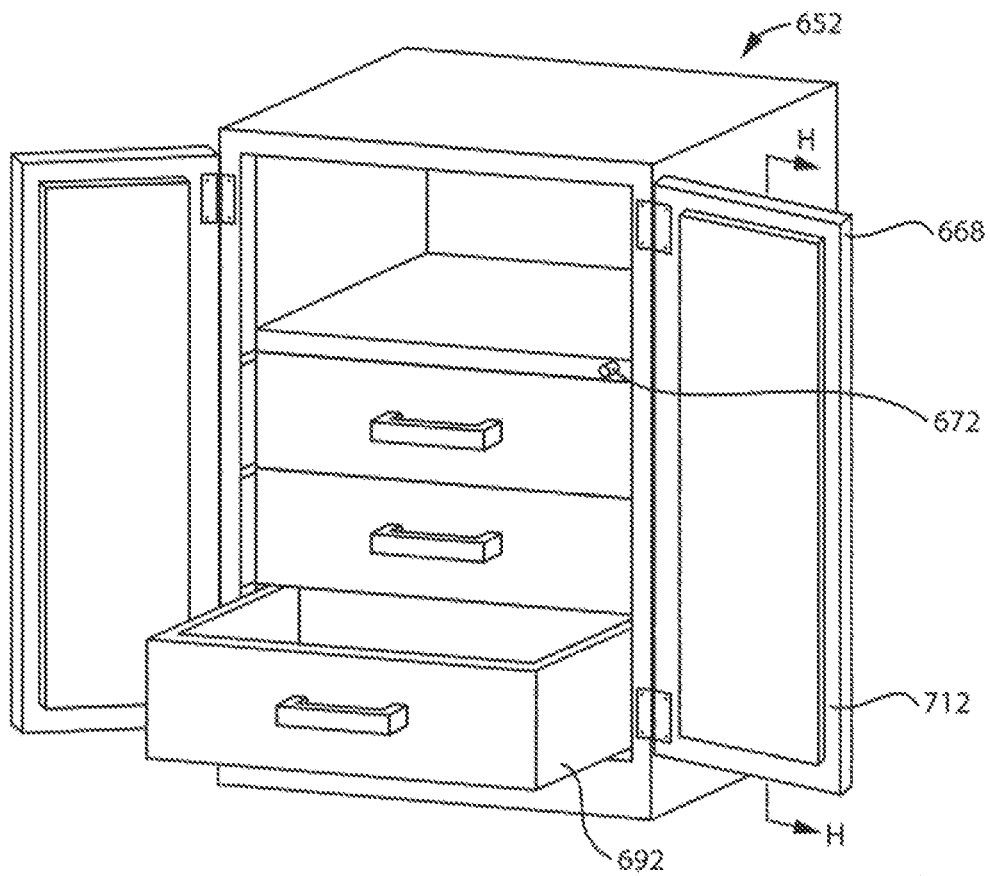
Figure 175:
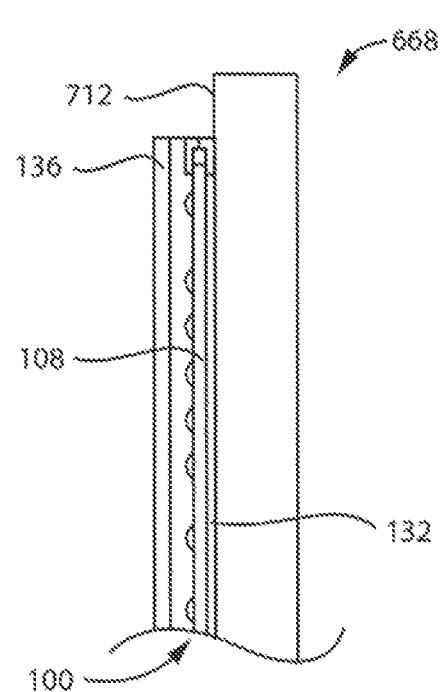
Figure 176:
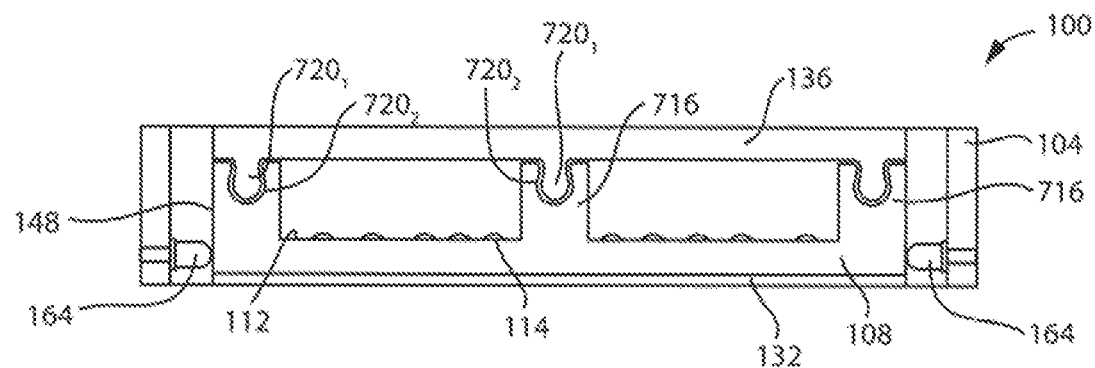
Figure 177:
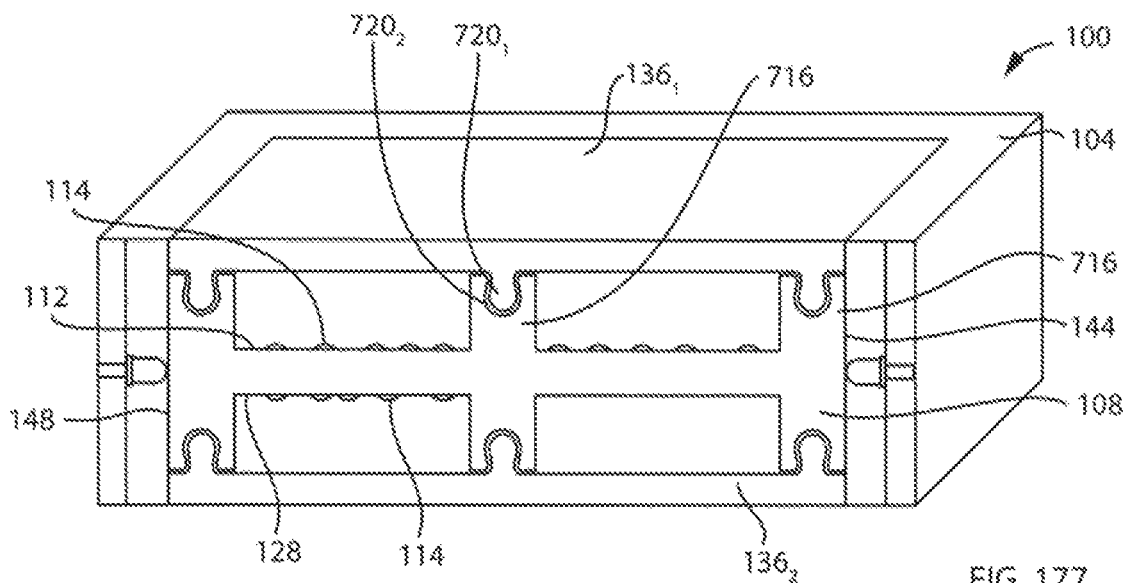
Figure 179:
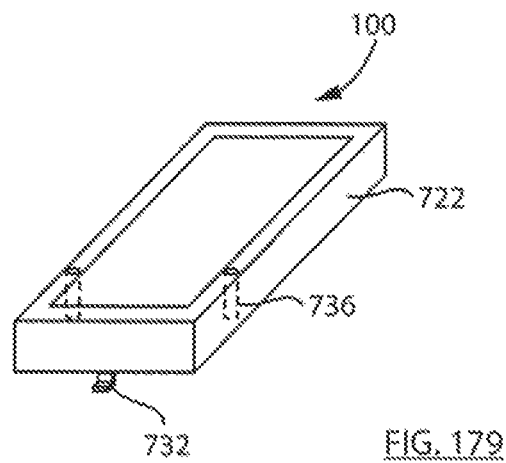
Figure 178:
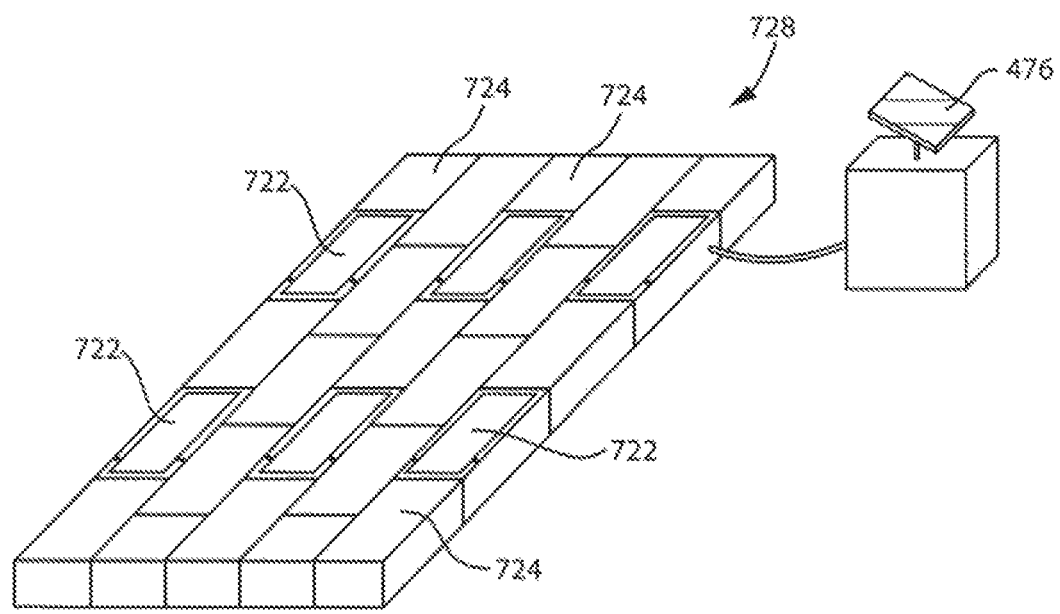
Figure 180:
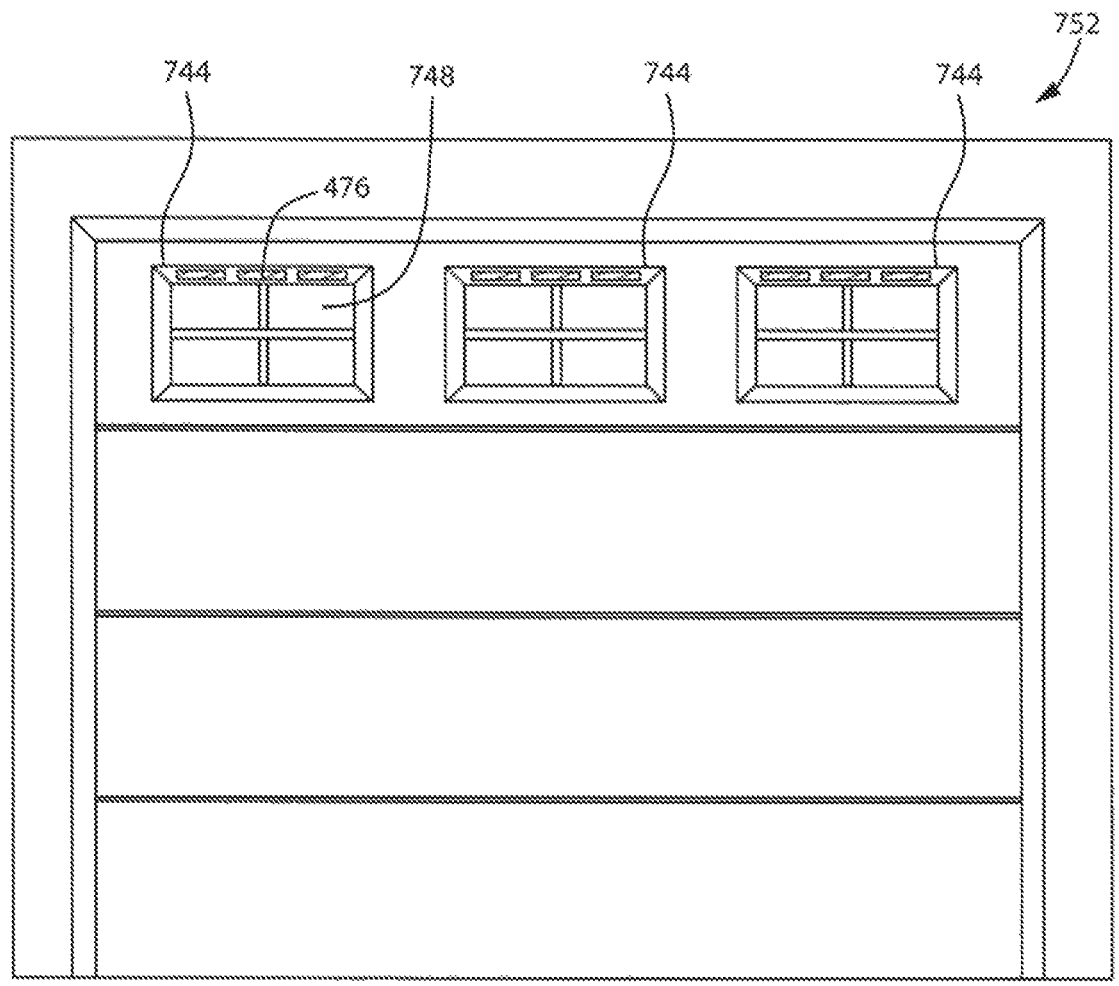
Figure 181:
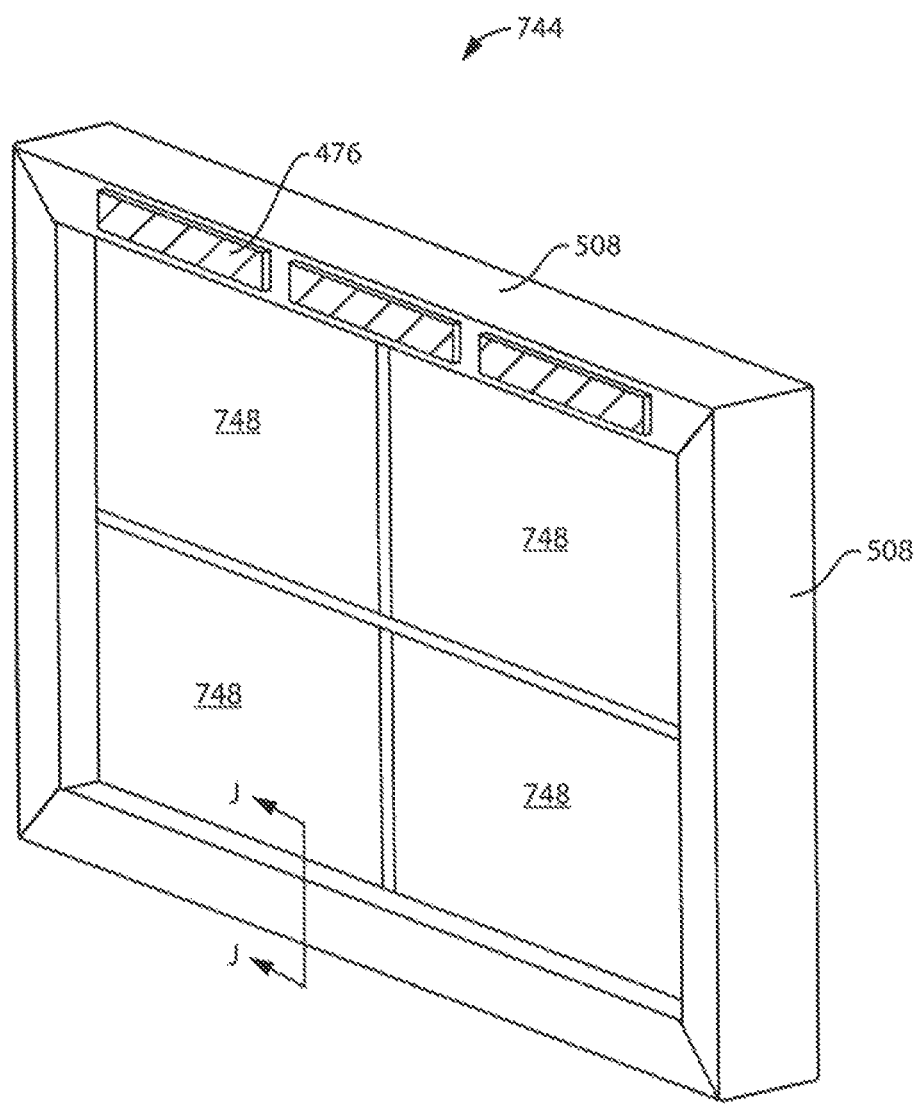
Figure 182:
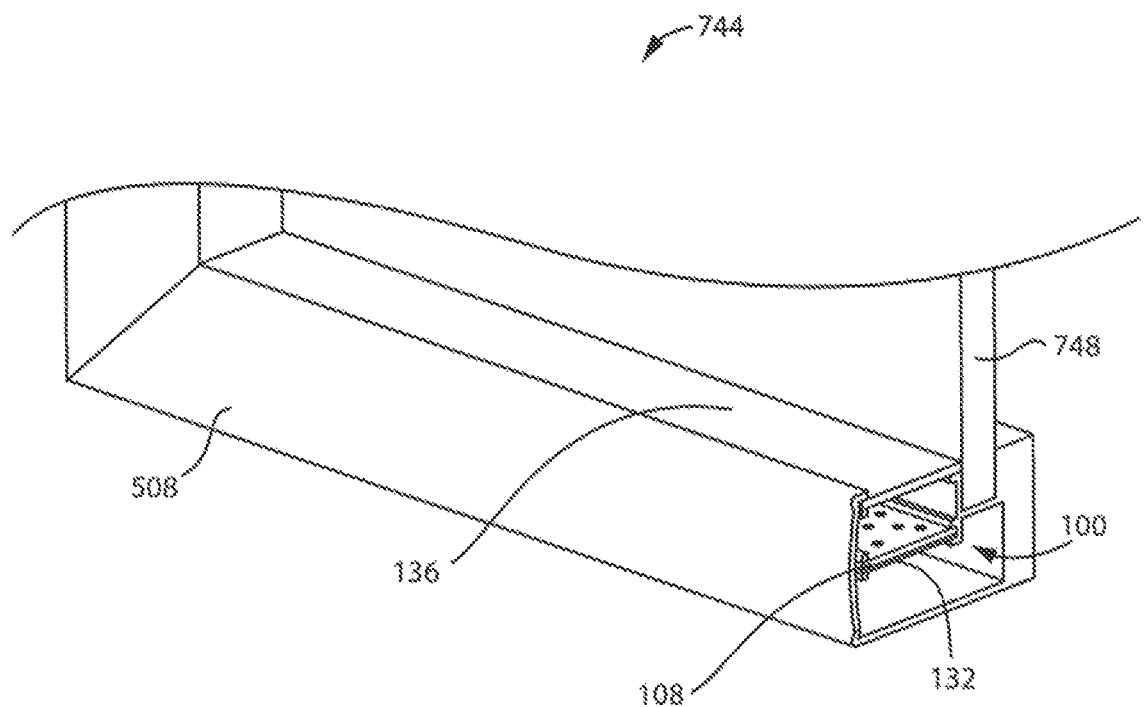
Figures 183, 184:
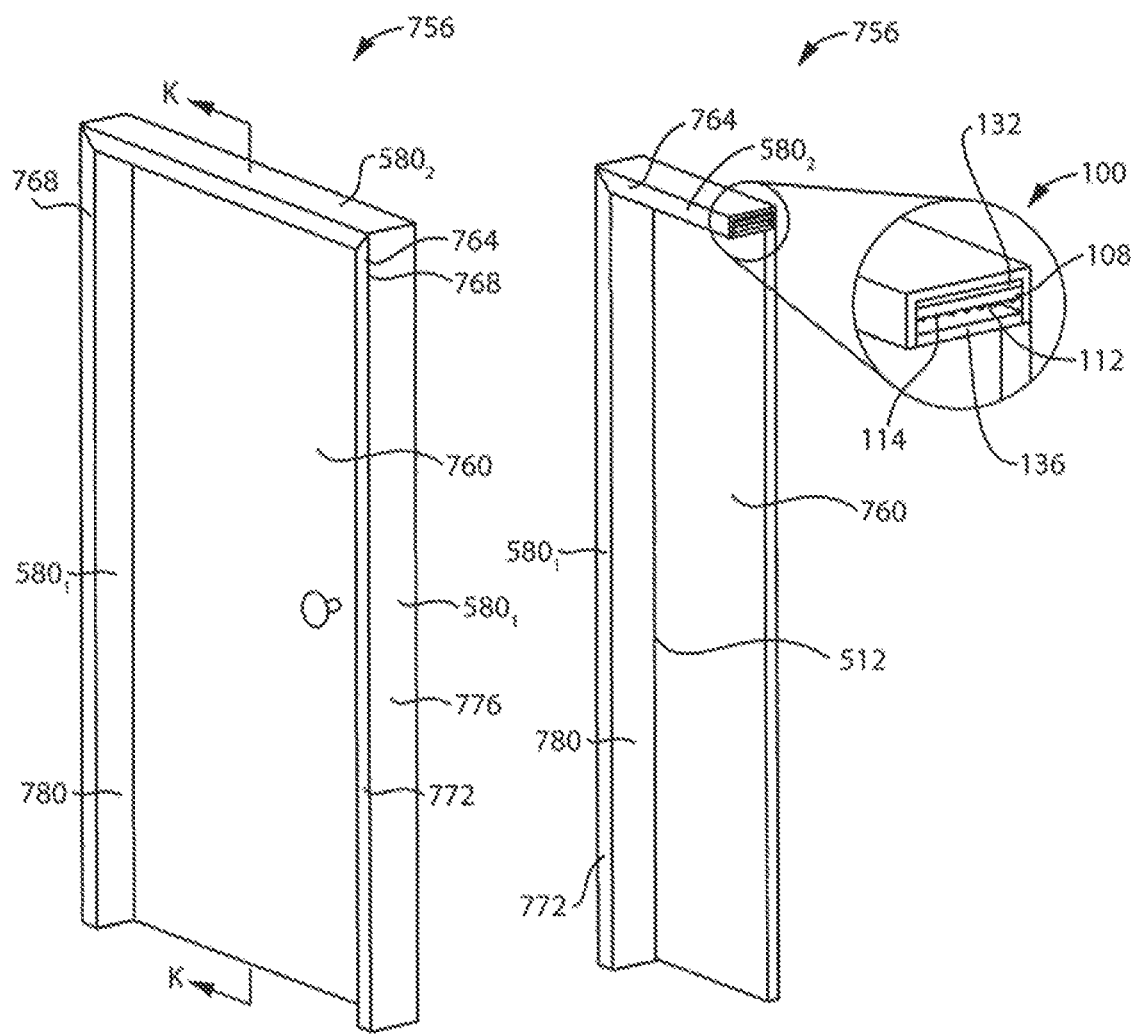
Figure 187:
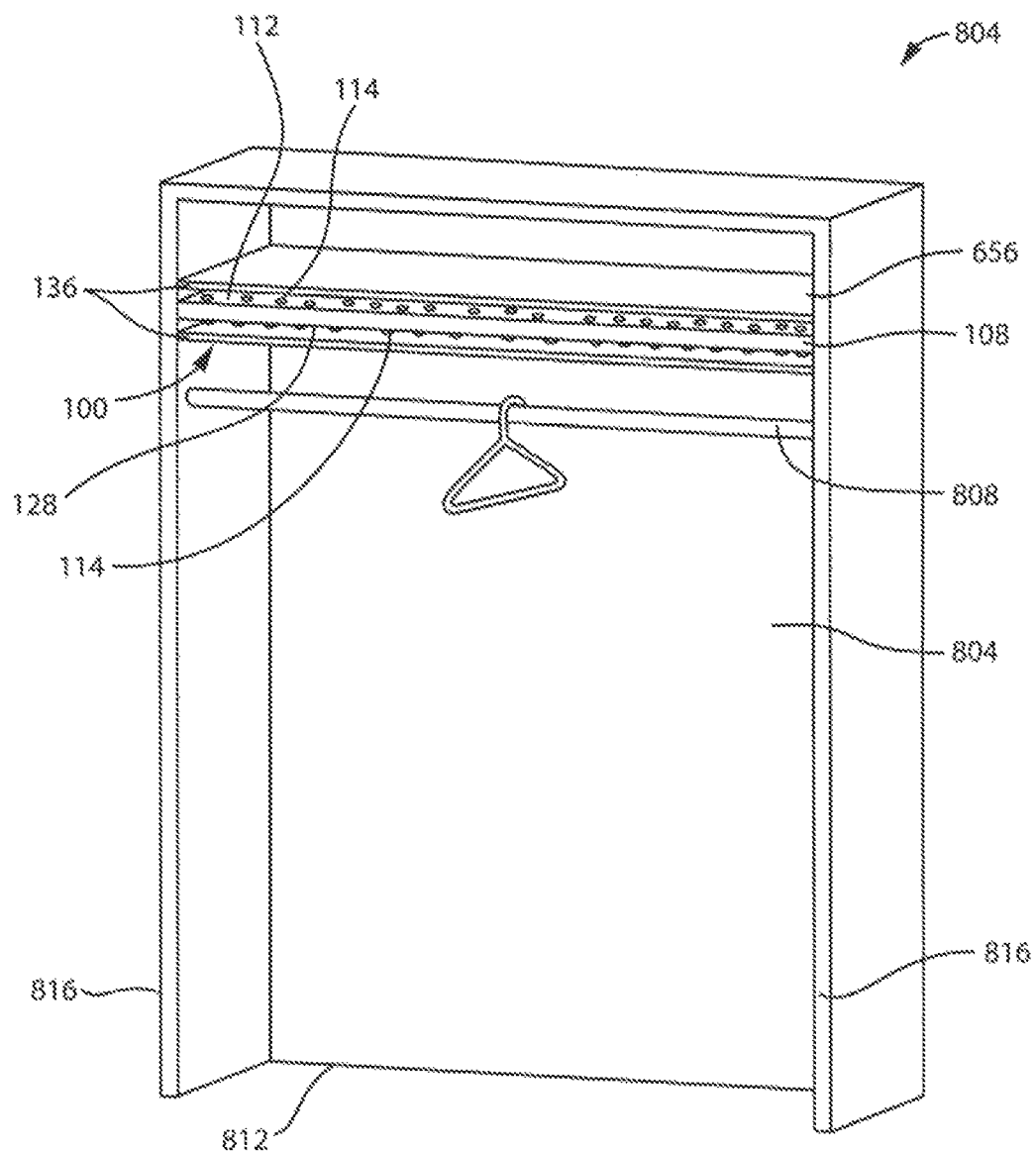
Figure 188:
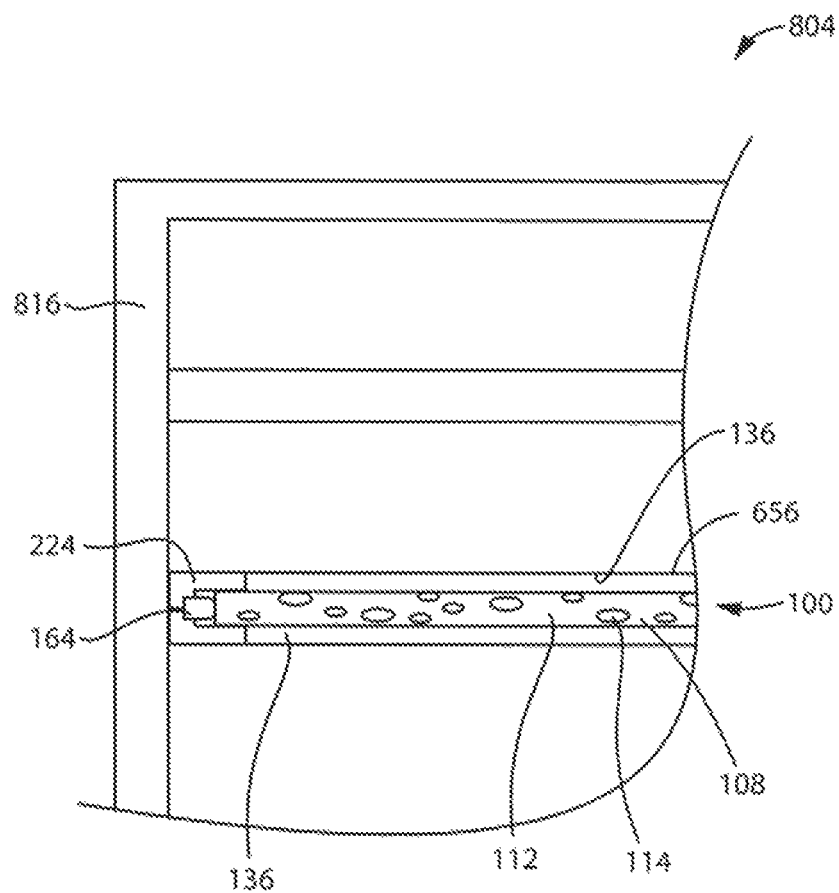
Figure 189:
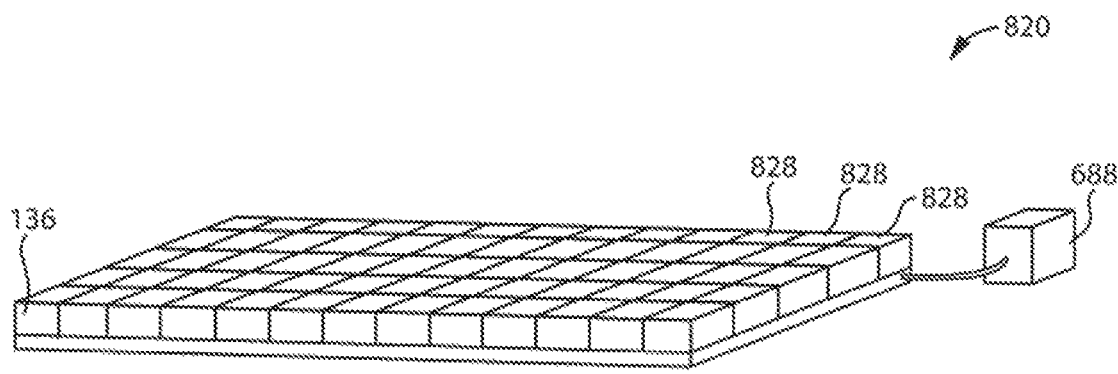
Figure 190:
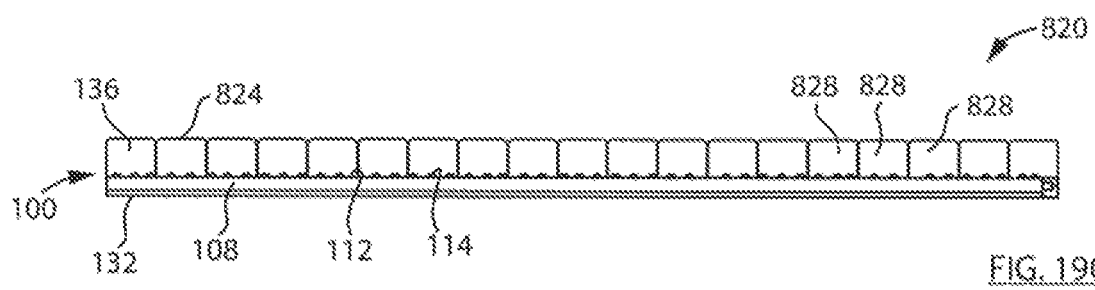
Figure 191:
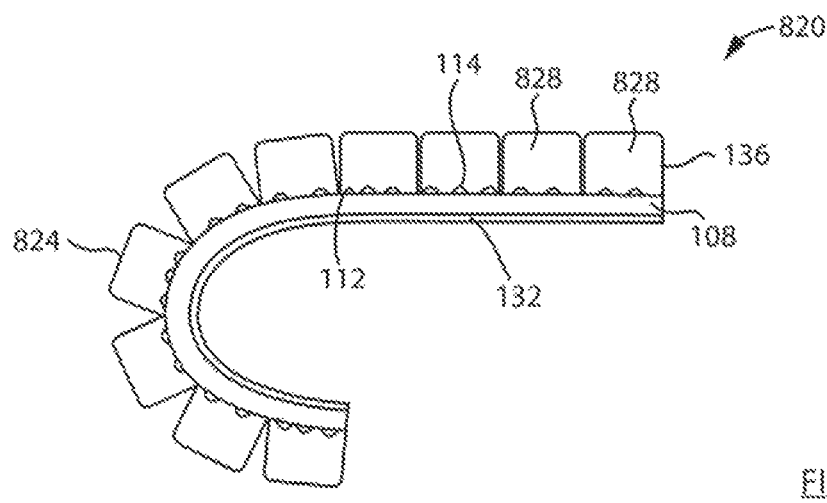
Figure 192:
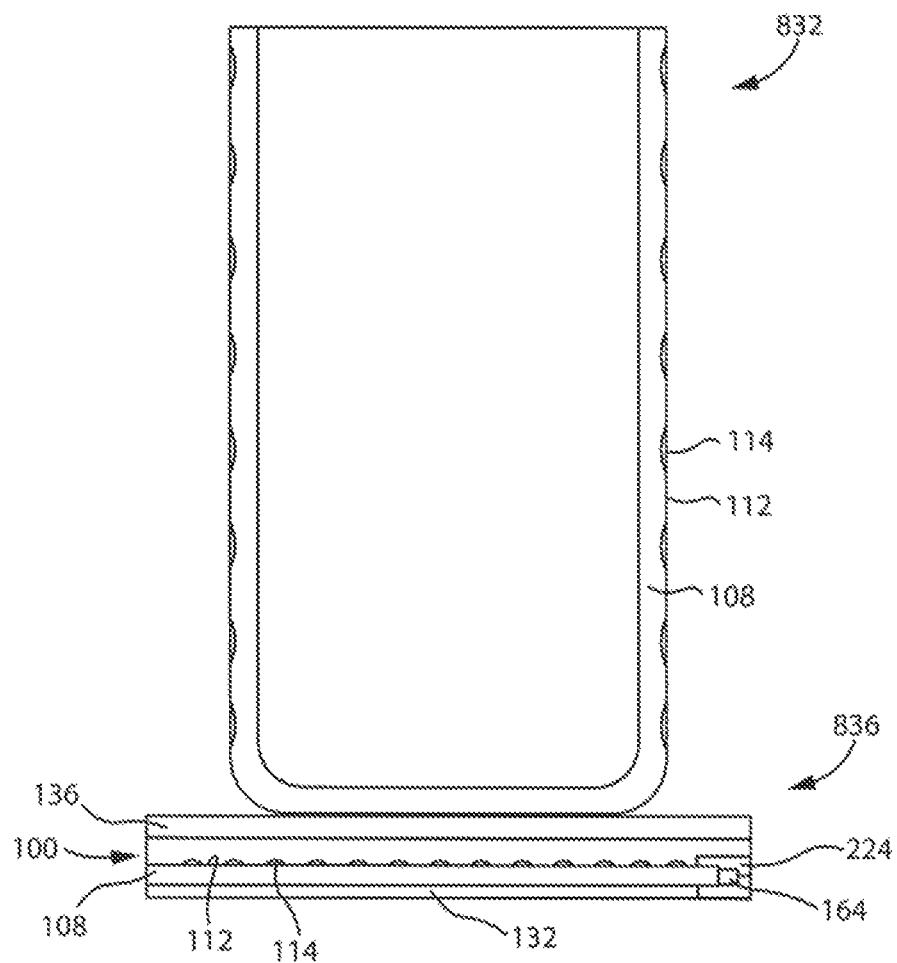
Figures 193, 194:
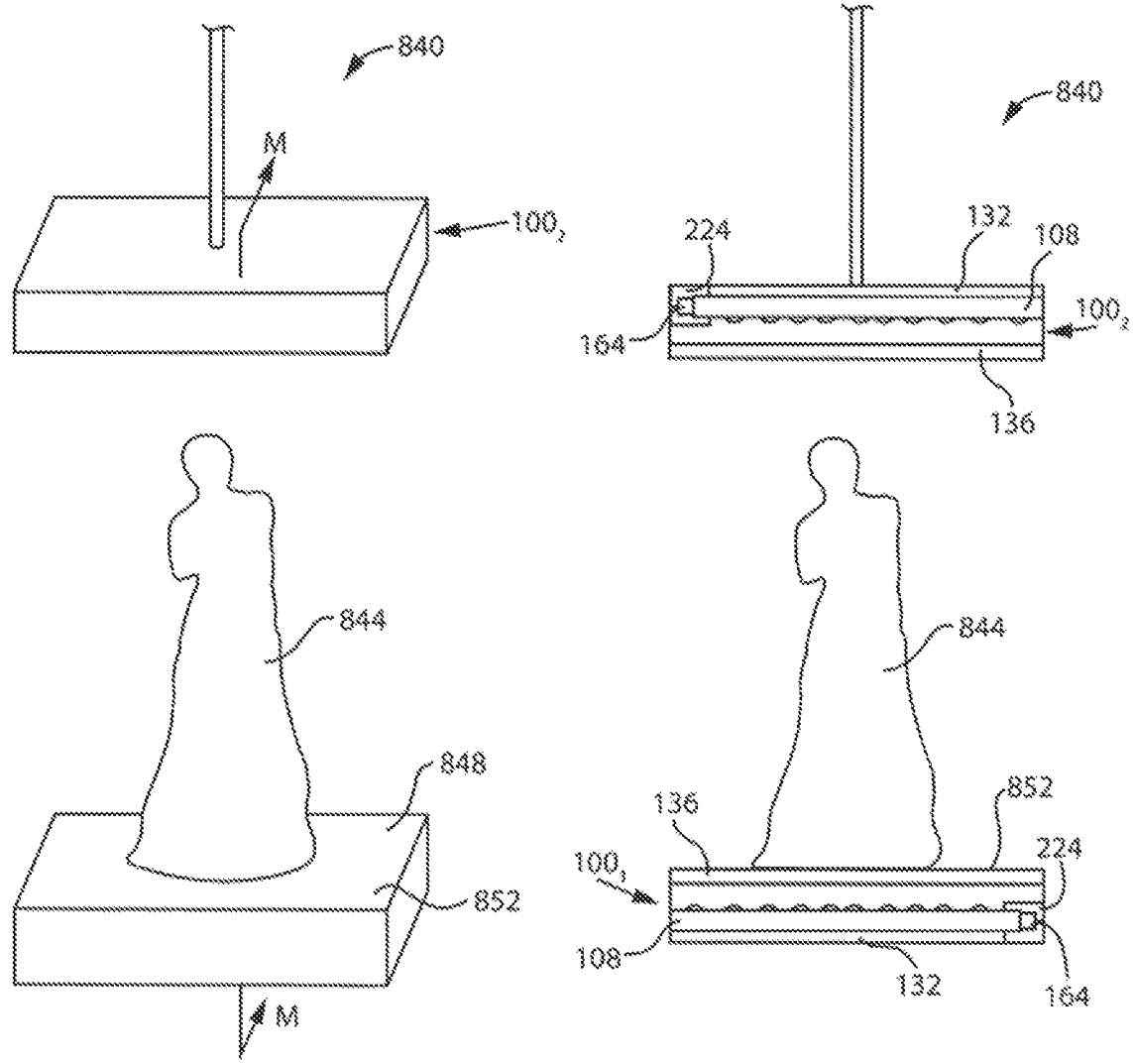
Figure 195:
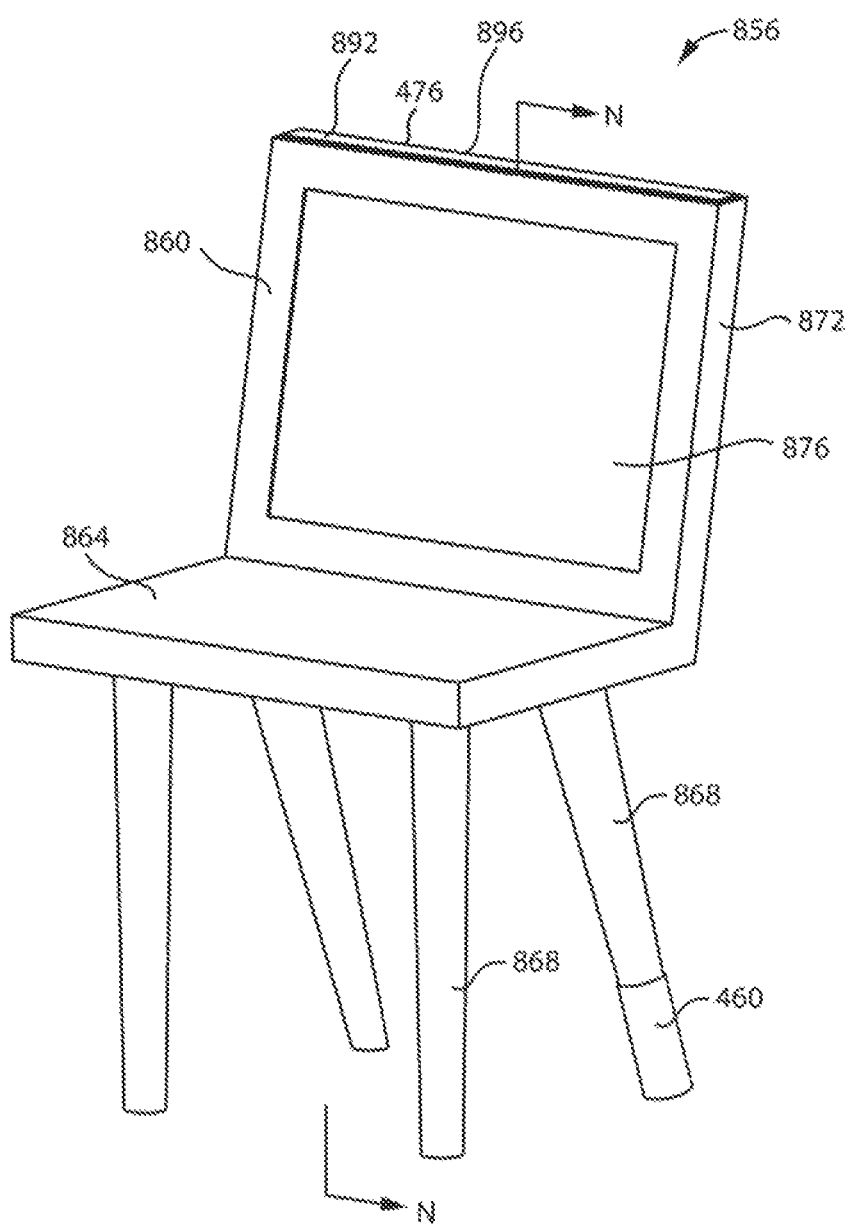
Figure 198:
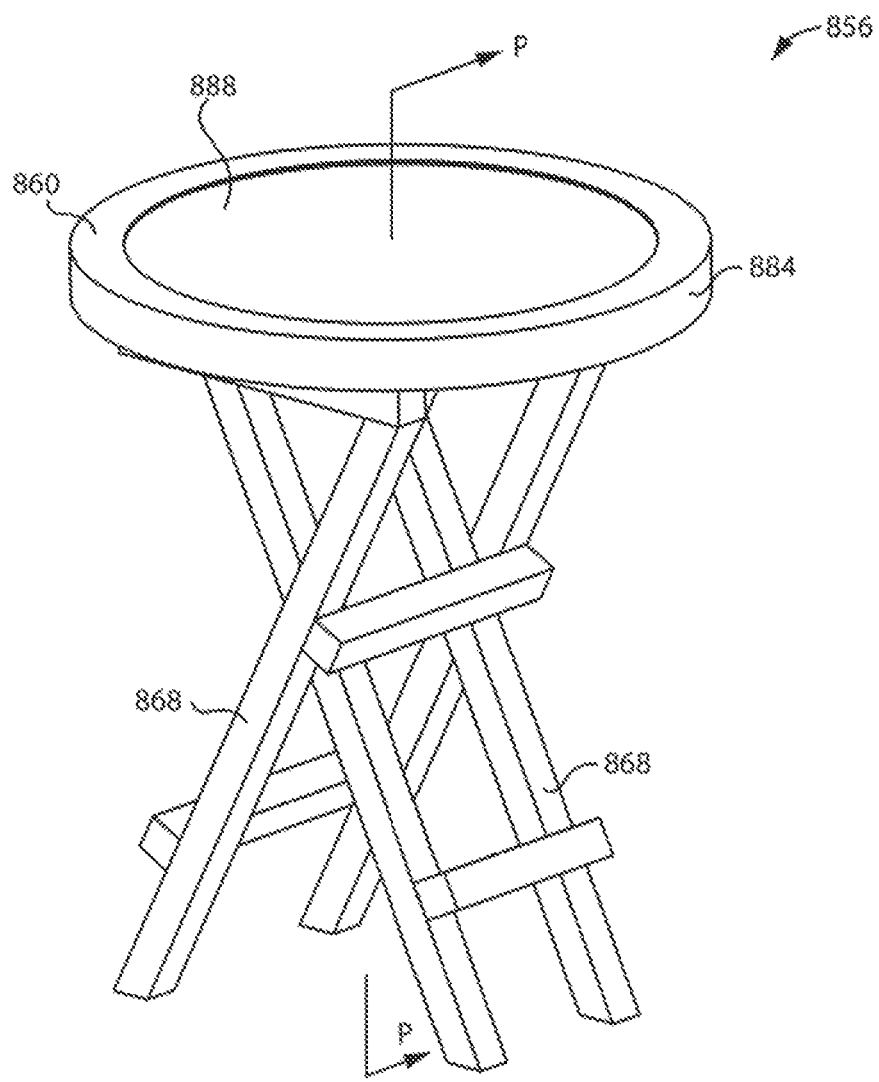
Figure 199:
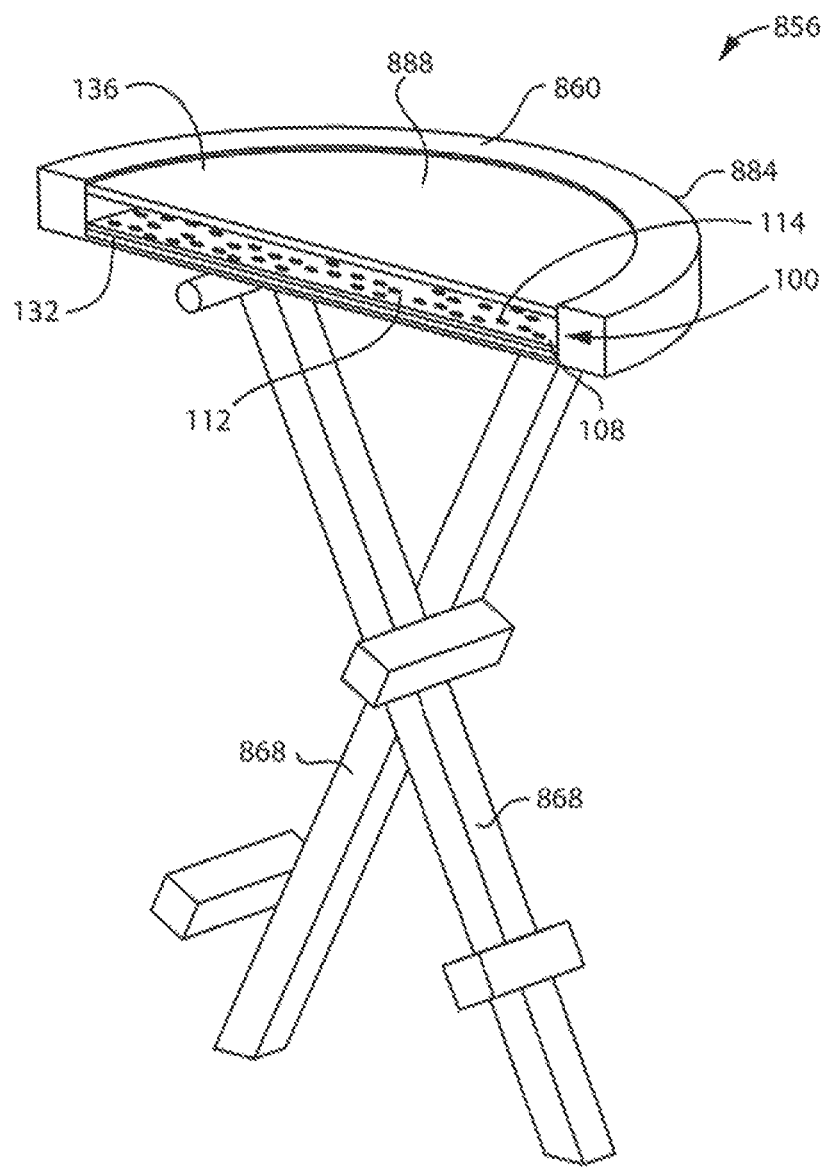
Figure 200:
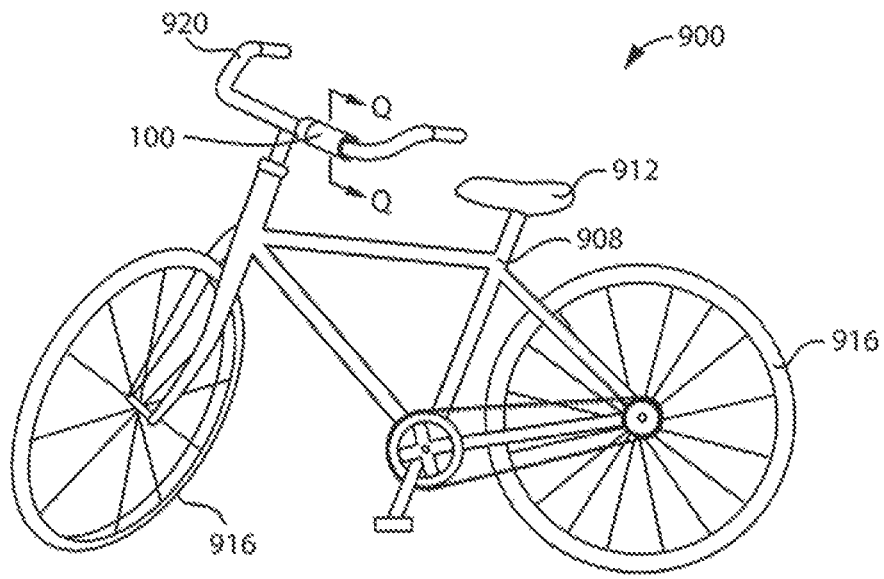
Figure 201:
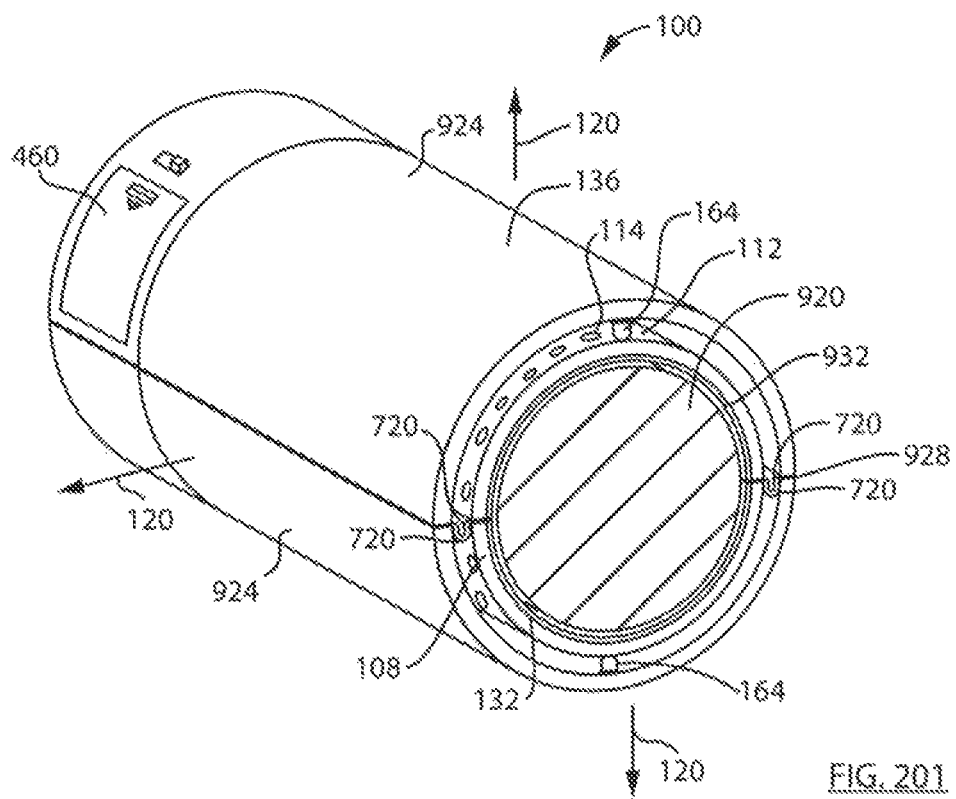
Figure 202:
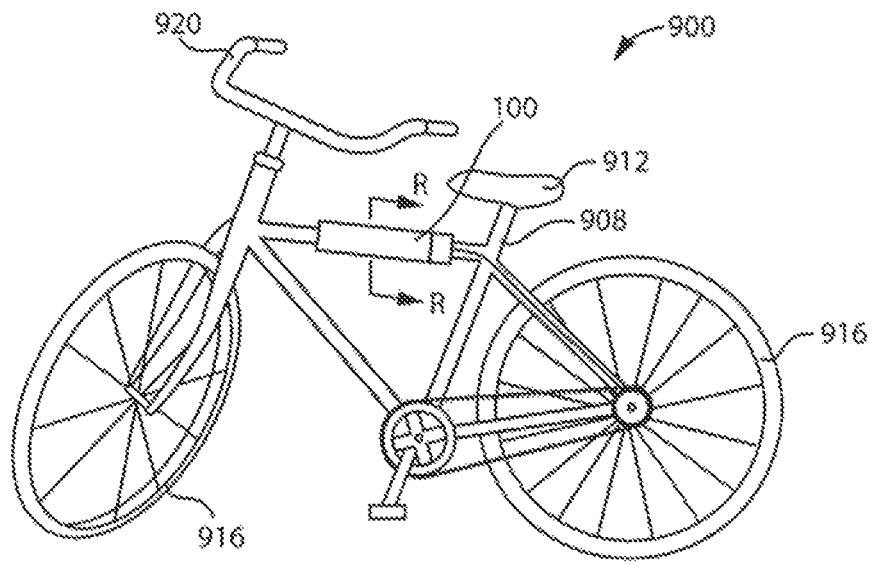
Figure 203:
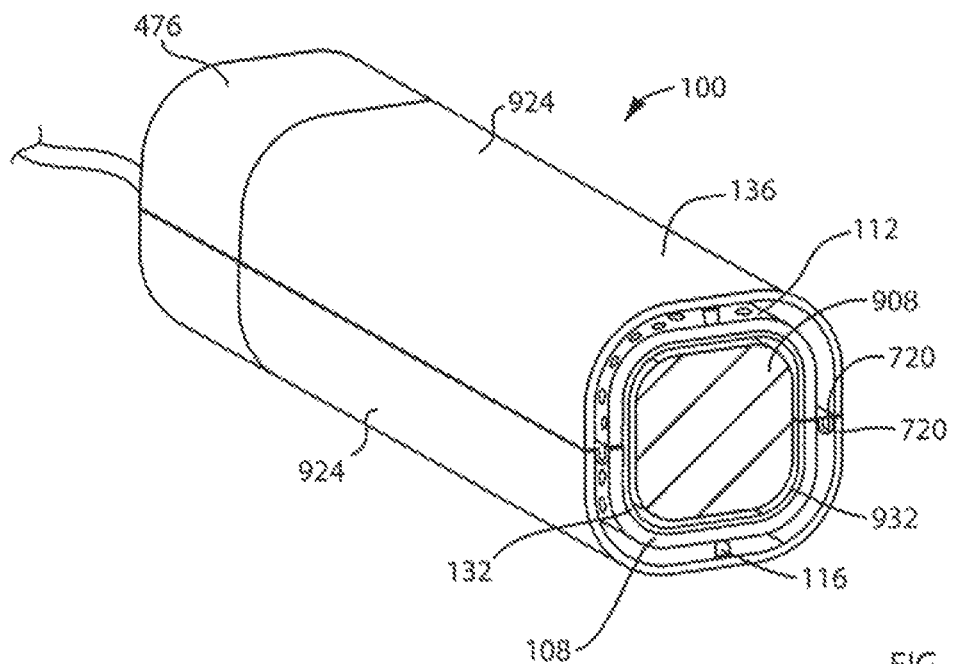
Figure 204:
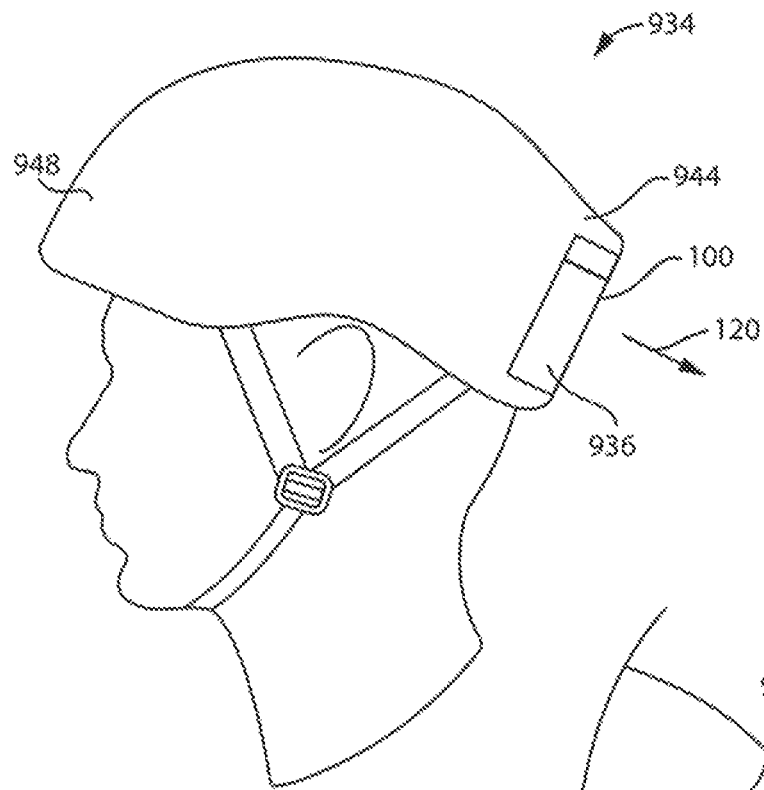
Figure 205:
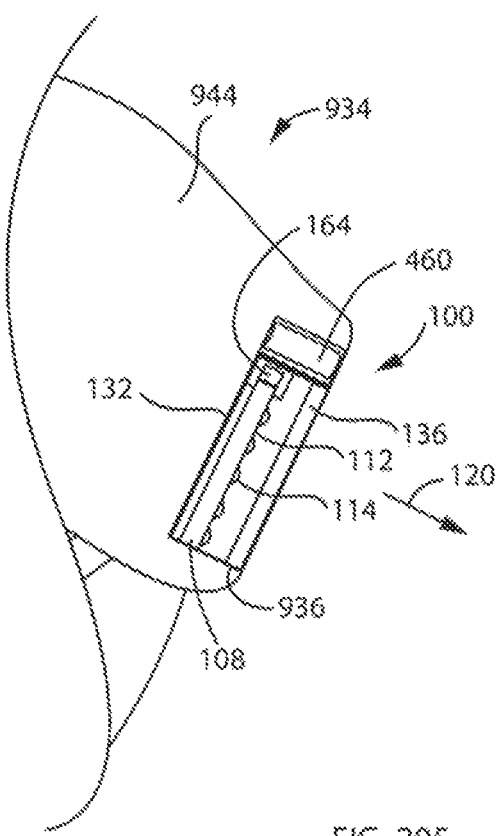

FIG. 150 is a partial cross-sectional view of a frame showing a cartridge in an inserted position, in accordance with another embodiment;

FIG. 151 is the partial cross-section of FIG. 150 showing the cartridge being removed;

FIG. 152 is a schematic illustration of a circuit of an LED light source in accordance with an embodiment;

FIG. 153A is a schematic illustration of another circuit of an LED light source, showing energy storage members connected in parallel;

FIG. 153B is the schematic illustration of FIG. 153 showing the energy storage members connected in series;

FIG. 154 is a perspective view of a frame in accordance with another embodiment;

FIG. 155 is a schematic view of a circuit of a LED light source in accordance with another embodiment;

FIG. 156 is a perspective cross-sectional view of a shelving unit in accordance with an embodiment;

FIG. 157 is a cross-sectional view of a shelving unit in accordance with another embodiment;

FIG. 158 is a cross-sectional view of a shelving unit in accordance with another embodiment;

FIG. 159 is a perspective cross-sectional view of a shelving unit showing a door in a closed position in accordance with an embodiment;

FIG. 160 is the perspective cross-section of FIG. 159 showing the door in an open position;

FIG. 161 is a perspective cross-sectional view of a shelving unit showing a door in a closed position in accordance with an embodiment;

FIG. 162 is the perspective cross-section of FIG. 161 showing the door in an open position;

FIG. 163 is a perspective cross-sectional view of a shelving unit showing a door in an open position and a shelf installed;

FIG. 164 is the perspective cross-section of FIG. 163 showing the shelf removed;

FIG. 165 is a perspective cross-sectional view of a shelving unit in accordance with another embodiment;

FIG. 166 is a perspective cross-sectional view of the shelving unit of FIG. 165 showing a door in a closed position;

FIG. 167 is a perspective cross-sectional view of the shelving unit of FIG. 165 showing the door in an open position;

FIG. 168 is a perspective view of a shelving unit in accordance with an embodiment;

FIG. 169 is a perspective cross-sectional view taken along line F-F in FIG. 168;

FIG. 170 is a perspective view of a shelving unit in accordance with another embodiment;

FIG. 171 is a perspective cross-sectional view taken along line G-G in FIG. 170;

FIG. 172 is a perspective view of a shelving unit in accordance with another embodiment;

FIG. 173 is a perspective view of a drawer in accordance with an embodiment;

FIG. 174 is a perspective view of a shelving unit in accordance with another embodiment;

FIG. 175 is a cross-sectional view taken along line H-H in FIG. 174;

FIGS. 176-177 are cross-sectional and perspective cross-sectional views of a LED light source in accordance with an embodiment;

FIG. 178 is a perspective view of a walkway in accordance with an embodiment;

FIG. 179 is a perspective view of a floor tile in accordance with an embodiment;

FIG. 180 is a front elevation view of a garage door in accordance with an embodiment;

FIG. 181 is a perspective view of a window in accordance with an embodiment;

FIG. 182 is a partial cross-sectional view taken along line J-J in FIG. 181;

FIG. 183 is a perspective view of a doorway in accordance with an embodiment;

FIG. 184 is a cross-sectional view taken along line K-K in FIG. 183;

FIG. 185 is a perspective view of a staircase in accordance with an embodiment;

FIG. 186 is a partial cross-sectional view taken along line L-L in FIG. 185;

FIG. 187 is a perspective cross-sectional view of a closet in accordance with an embodiment;

FIG. 188 is a partial cross-sectional view of a closet in accordance with another embodiment;

FIG. 189 is a perspective view of a floor mat in accordance with an embodiment;

FIG. 190 is a side elevation view of the floor mat of FIG. 189 in a flat configuration;

FIG. 191 is a side elevation view of the floor mat of FIG. 189 in a partially rolled configuration;

FIG. 192 is a cross-sectional view of a food container supported on a supporting member, in accordance with an embodiment;

FIG. 193 is a perspective view of an art display in accordance with an embodiment;

FIG. 194 is a cross-sectional view taken along line M-M in FIG. 193;

FIG. 195 is a perspective view of furniture in accordance with an embodiment;

FIG. 196 is a perspective cross-sectional view taken along line N-N in FIG. 195, in accordance with an embodiment;

FIG. 197 is a perspective cross-sectional view taken along line N-N in FIG. 195, in accordance with another embodiment;

FIG. 198 is a perspective view of furniture in accordance with another embodiment;

FIG. 199 is a perspective cross-sectional view taken along line P-P in accordance with an embodiment;

FIG. 200 is a perspective view of a bicycle equipped with an LED light source in accordance with an embodiment;

FIG. 201 is a partial cross-sectional view taken along like Q-Q in FIG. 200;

FIG. 202 is a perspective view of a bicycle equipped with an LED light source in accordance with another embodiment;

FIG. 203 is a partial cross-sectional view taken along line R-R in FIG. 202;

FIG. 204 is a side elevation view of a user wearing a helmet having an LED light source in accordance with an embodiment; and, FIG. 205 is a partial side elevation view of the user wearing the helmet of FIG. 204, showing a cross-section of the LED light source.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined" or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", or "directly fastened" where the parts are connected in physical contact with each other. As used herein, two or more parts are said to be "rigidly coupled", "rigidly connected", "rigidly attached", "rigidly joined", or "rigidly fastened" where the parts are coupled so as to move as one while maintaining a constant orientation relative to each other. None of the terms "coupled", "connected", "attached", "joined", and "fastened" distinguish the manner in which two or more parts are joined together.

General Description of a LED Light Source

The following is a general description of a LED light source that may use any of the features disclosed herein and may be of various configurations as disclosed herein.

Figure 1:
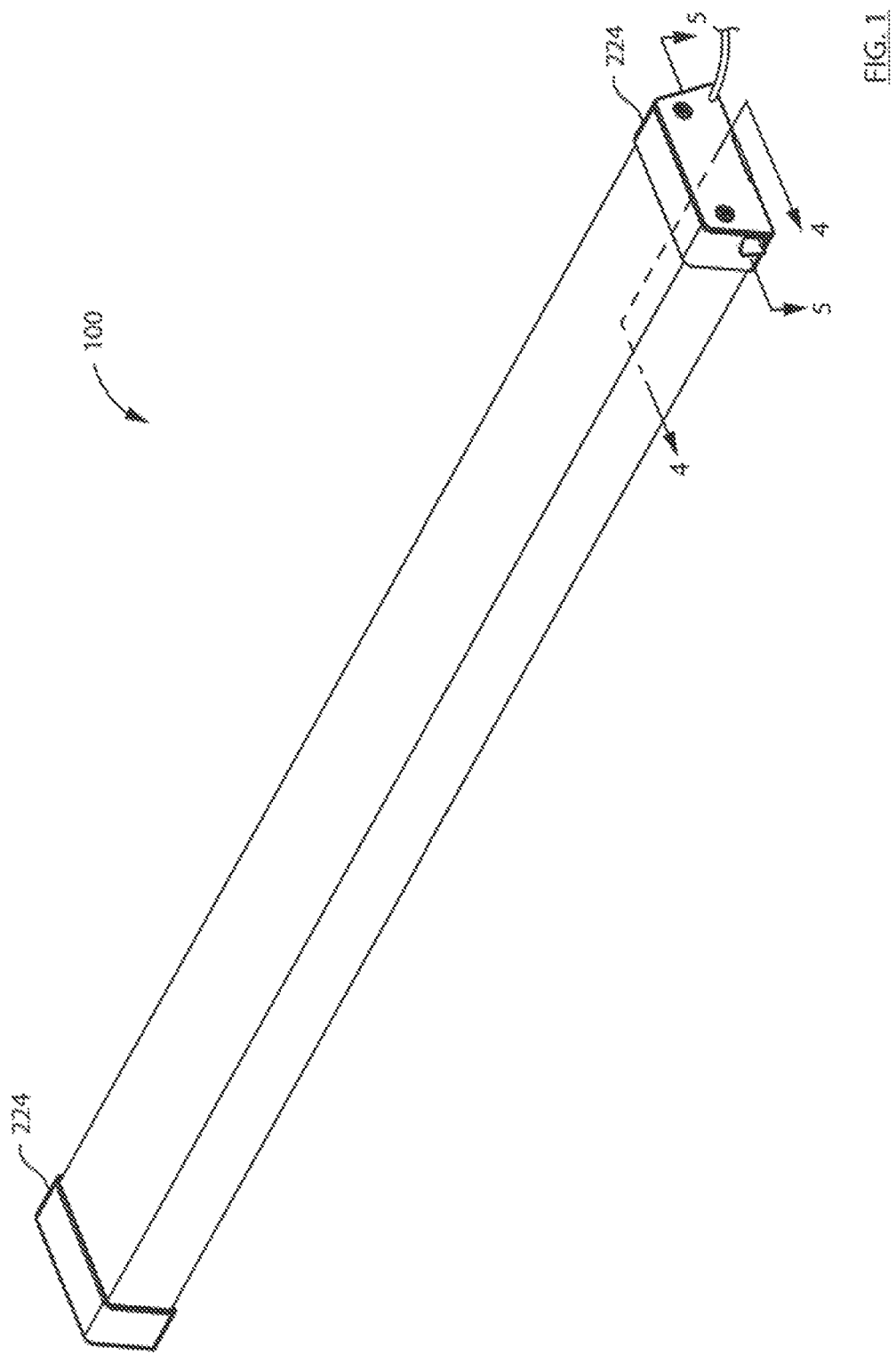
FIG. 1 is a perspective view of an LED light source in accordance with an embodiment.
Figure 2:
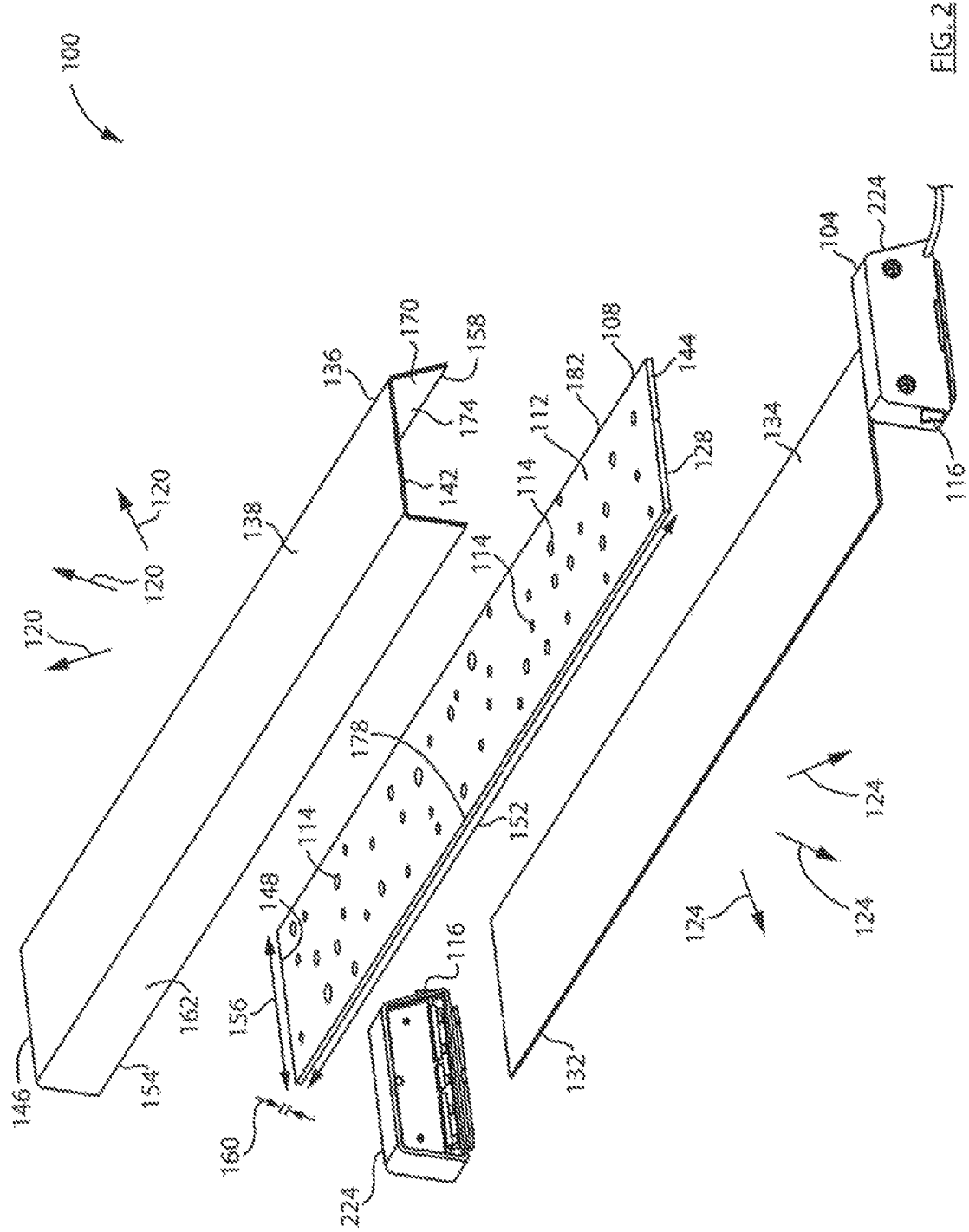
FIG. 2 is an exploded view of the LED light source of FIG. 1.

FIGS. 1 and 2 exemplify a LED light source 100 which includes a housing 104, a light guide 108 having a light emitting face 112, and a cartridge 116 having one or more LEDs. As exemplified herein. housing 104 may be of various designs which position cartridge 116 so as to emit light into an end face 144 of light guide 108. Light guide 108 may be any light guide known in the art. The light reflects internally as it travels longitudinally within light guide 108 and re-emits from light emitting locations 114 on light guide light emitting face 112 towards a subject to be illuminated, such as artwork, advertising media, furniture, or an area of an indoor or outdoor space.

Light emitting locations 114 may be formed in any manner suitable for causing at least a portion of light that internally strikes the light emitting locations 114 to emit from light guide light emitting face 112, or that causes light emission in response to light internally striking the light emitting locations 114. In some examples, light emitting locations 114 may be spaced apart discontinuities (e.g. bumps or divots) or light scattering material that interrupt the internal reflection of light within light guide 108, or photoluminescent spots (e.g. fluorescent or phosphorescent spots) that absorb internally incident light and then emit light outwardly.

Unidirectional Light Source

In accordance with one aspect of this disclosure, which may be used with one or more other aspects disclosed herein, a LED light source 100 is provided wherein light is inhibited from being emitted in one or more directions. Accordingly, in some embodiments, LED light source 100 may preferentially emit light in particular directions. For example, LED light source 100 may preferentially emit light in light emitting directions 120, and emit substantially no light in non-light emitting directions 124. An advantage of this design is that it allows the light emitted by the LED light source 100 to be concentrated towards a subject to be illuminated.

In one embodiment, light may not be emitted from a rear surface. Accordingly, as exemplified, light guide 108 may have a rear face 128 opposed to light emitting face 112, and an opaque member, which may have a reflective surface, such as reflector 132, may overlie rear face 128. Reflector 132 may reflect light emitted from light guide rear face 128. For example, an LED light source 100 may be suspended from a ceiling to illuminate a room, and have a reflector 132 that prevents the LED light source 100 from illuminating the ceiling. Reflector 132 may also improve the power efficiency of LED light source 100 by intensifying the light directed in light emitting directions 120.

Figure 4:
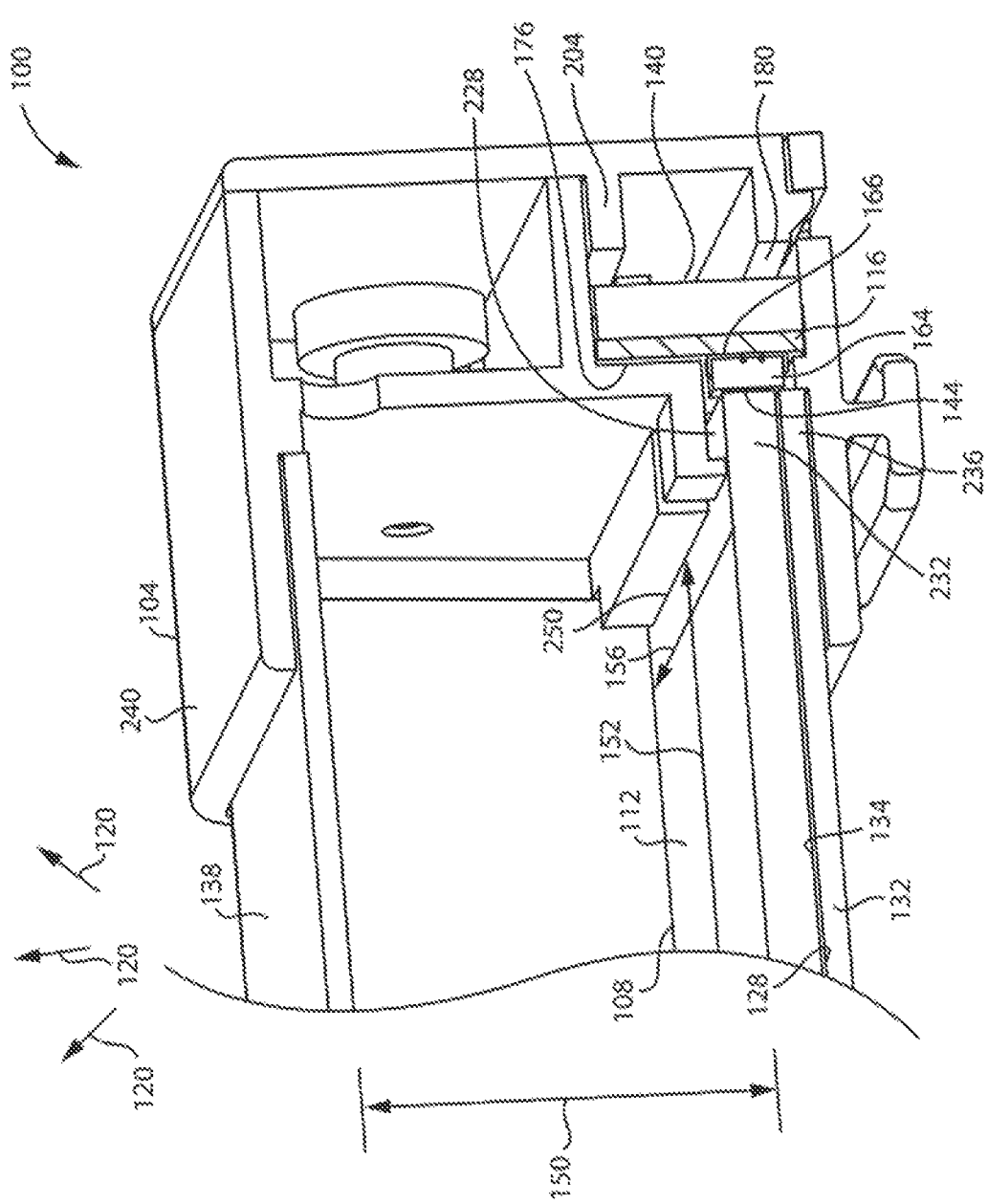
FIG. 4 is a cross-sectional view taken along line 4-4 in FIG. 1.

Reflector 132 has a reflective surface 134 that faces light guide rear face 128 to reflect light escaping light guide rear face 128. Reflective surface 134 can be made of any reflective material. In some embodiments, reflective surface 134 includes a white coating. An advantage of this design is that it allows reflector 132 to provide a neutral reflection with little or no effect on the color of the reflected light. In some embodiments, reflective surface 134 is coated with a highly reflective coating (e.g. greater than 90% reflectivity), such as titanium oxide. This can reduce light attenuation at the point of reflection to improve the efficiency of the LED light source 100. As shown in FIG. 4, reflector 132 may be positioned with reflective surface 134 abutting light guide rear face 128. This can allow reflector 132 to reflect all light emitting from light guide rear face 128. In some embodiments, reflective surface 134 is in physical contact with light guide rear face 128.

Returning to FIG. 4, reflector 132 may be a component of housing 104. For example, reflector 132 may provide a rear wall of housing 104. Alternatively, reflector 132 may be a discrete component (separate from housing 104) that is positioned behind light guide rear face 128. In some embodiments, reflector 132 is a reflective coating (e.g. paint) applied to light guide rear face 128.

In some embodiments, LED light source 100 does not include reflector 132. An advantage of this design is that it allows LED light source 100 to emit light in more directions, which can be desirable in some cases such as to simultaneously illuminate a room below and ceiling art above. For example, light guide 108 may include light emitting locations 114 on both of faces 112 and 128 so that light is emitted from both of faces 112 and 128.

Diffuser

In accordance with another aspect of this disclosure, which may be used with one or more other aspects disclosed herein, a LED light source 100 may be provided with a diffuser to soften the point effect of light emitted from light emitting face 112. While the use of light emitting locations 114 on light emitting face 112 may reduce the point effect of light provided by a LED (as compared with the LED facing directly towards the area to be illuminated) a diffuser may provide a more even distribution of light.

Accordingly, as exemplified in FIG. 2, LED light source 100 may include a light transmitting surface 136 (also referred to herein as a diffuser) that overlays light guide 108 to further diffuse and soften the light emitted by LED light source 100. Diffuser 136 is at least translucent (i.e. at least semi-transparent). In other words, diffuser 136 is not completely opaque. In the illustrated example, at least a portion of diffuser 136 is formed as a cover that is spaced apart from light guide 108. This can allow the diffuser 136 to be relatively larger in area than light guide light emitting face 112, which can thereby enhance the light diffusion capability of diffuser 136. In the illustrated example, diffuser 136 is shown having a central panel 138 which is spaced apart from light guide light emitting face 112, and which extends longitudinally between first and second diffuser ends 142 and 146. Diffuser central panel 138 may be spaced apart from light guide light emitting face 112 by any distance sufficient to allow the light from light guide light emitting face 112 to disperse over central panel 138. For example, referring to FIG. 4, diffuser central panel 138 may be spaced apart from light guide light emitting face 112 by a distance 150 of between about 0.25 to 3 inches.

Returning to FIG. 2, in some embodiments, diffuser 136 may be non-planar (e.g. curved or angular) which can further enhance the light diffusion capability of diffuser 136 with additional surface area and light emitting directions 120. In the illustrated embodiment, diffuser 136 includes first and second sides 154 and 158 including first and second diffuser side panels 162 and 170, each of which extends between the first and second diffuser ends 142 and 146. As shown, first and second diffuser sides 154 and 158 are oriented at a (non-zero) angle to diffuser central panel 138. Together, diffuser central panel 138 and diffuser sides 154 and 158 may form a concave inner diffuser surface 174 that extends over the light guide light emitting face 112 and over longitudinally extending light guide sides 178 and 182. An advantage of this design is that it can allow diffuser 136 to capture and diffuse light emitted by light guide 108 through face 112 and light that may escape through light guide sides 178 and 182.

Diffuser 136 can be made of any material suitable for diffusing light emitted by light guide 108. For example, diffuser 136 may be made of at least one of acrylic, polypropylene, and polycarbonate. In some embodiments, the diffuser 136 may be white in color. This can reduce or eliminate the effect the diffuser 136 has on the color of the diffused light. In other embodiments, diffuser 136 may be intentionally non-white to provide a desired color effect.

In alternative embodiments, LED light source 100 may not include a diffuser 136 or other member that overlays light guide light emitting face 112. An advantage of this design is that it allows unfiltered light to be focused on an object to be illuminated. A further advantage of this design is that it mitigates the light attenuation associated with diffuser 136, and therefore improves the lighting efficiency of the LED light source 100.

Light Source with a Removable LED Cartridge

In accordance with another aspect of this disclosure, which may be used with one or more other aspects disclosed herein, a LED light source is provided wherein the LEDs are removable so that they may be replaced when, e.g., one or more of the LEDs fails. For example, as exemplified herein, the LED light source may removable receive a cartridge 116 which comprises one or more LEDs.

Figure 3:
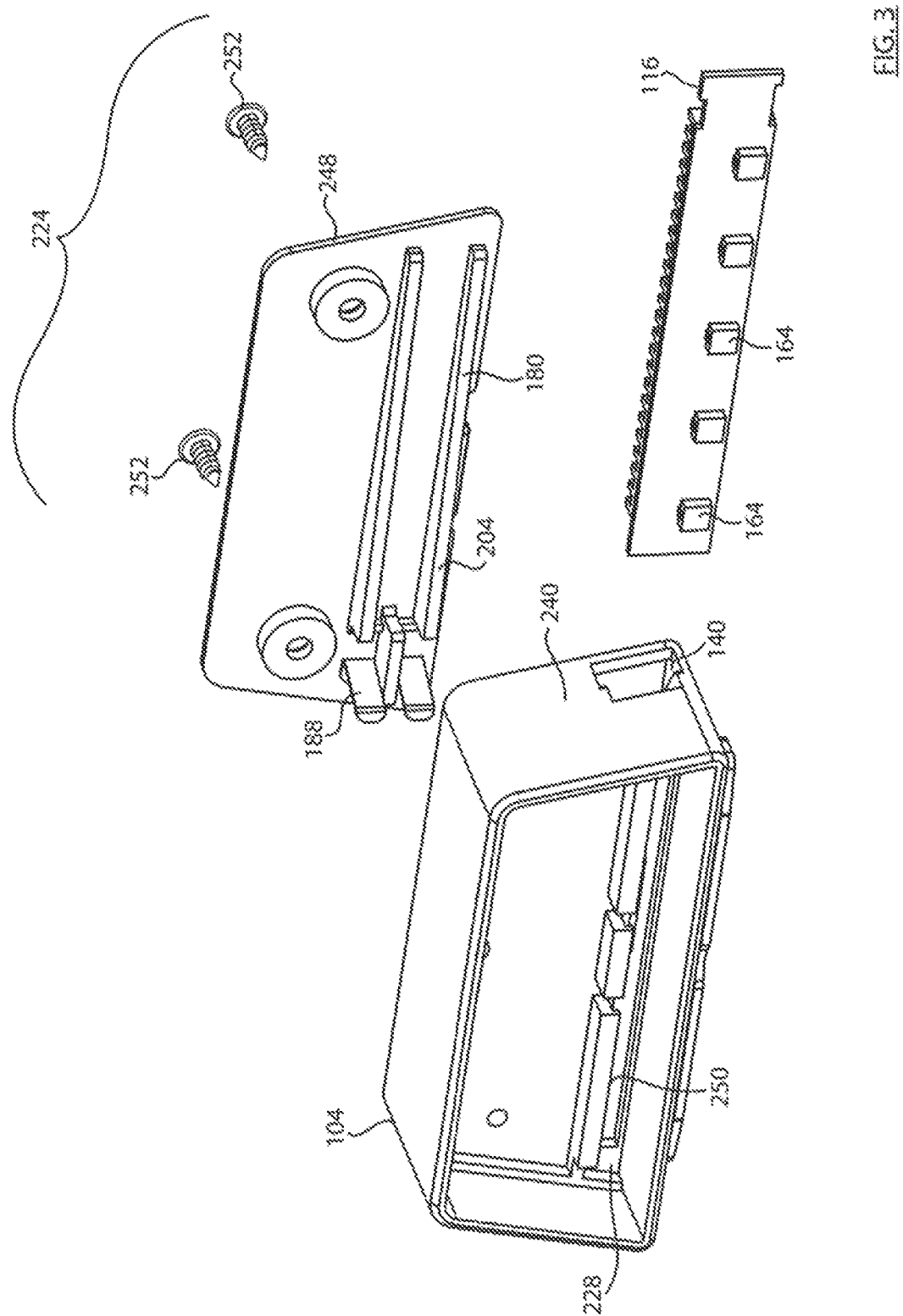
FIG. 3 is an exploded view of a housing end member of the LED light source of FIG. 1.

As exemplified in FIG. 3, cartridge 116 may be removably receivable in housing 104. An advantage of this design is that it allows cartridge 116 to be removed, for repair or disposal, and replaced. This contrasts with traditional light fixtures in which a disposable light tube is removably connected to a ceiling ballast. The light tube includes not only an LED or fluorescent lighting module but also a diffusing covering, and other components. LED light source 100 provides a reusable light guide 108 (FIG. 2) and optional diffuser 136 which need not be disposed with cartridge 116. As a result, cartridge 116 is smaller, lighter, less expensive, and more environmentally friendly than the disposable light tubes of traditional light fixtures. Cartridge 116 also provides greater flexibility to the shape and physical configuration of LED light source 100 because LED light source 100 need not be designed around accommodating a long cylindrical light tube.

Cartridge 116 can be removably receivable in housing 104 in any manner that allows cartridge 116 to be powered and positioned to emit light into light guide 108 (FIG. 2). In the illustrated embodiment, housing 104 includes a recess 140 provided on an outer surface of the light source into which cartridge 116 is slideably receivable. This allows cartridge 116 to be conveniently inserted and removed from LED light source 100, without the need to disassemble the light source which can be particularly significant where LED light source 100 is positioned in difficult-to-reach (e.g. high-up) areas or where there are many (e.g. dozens to thousands) of LED light sources 100 to maintain in a facility (e.g. an office building).

Figure 5:
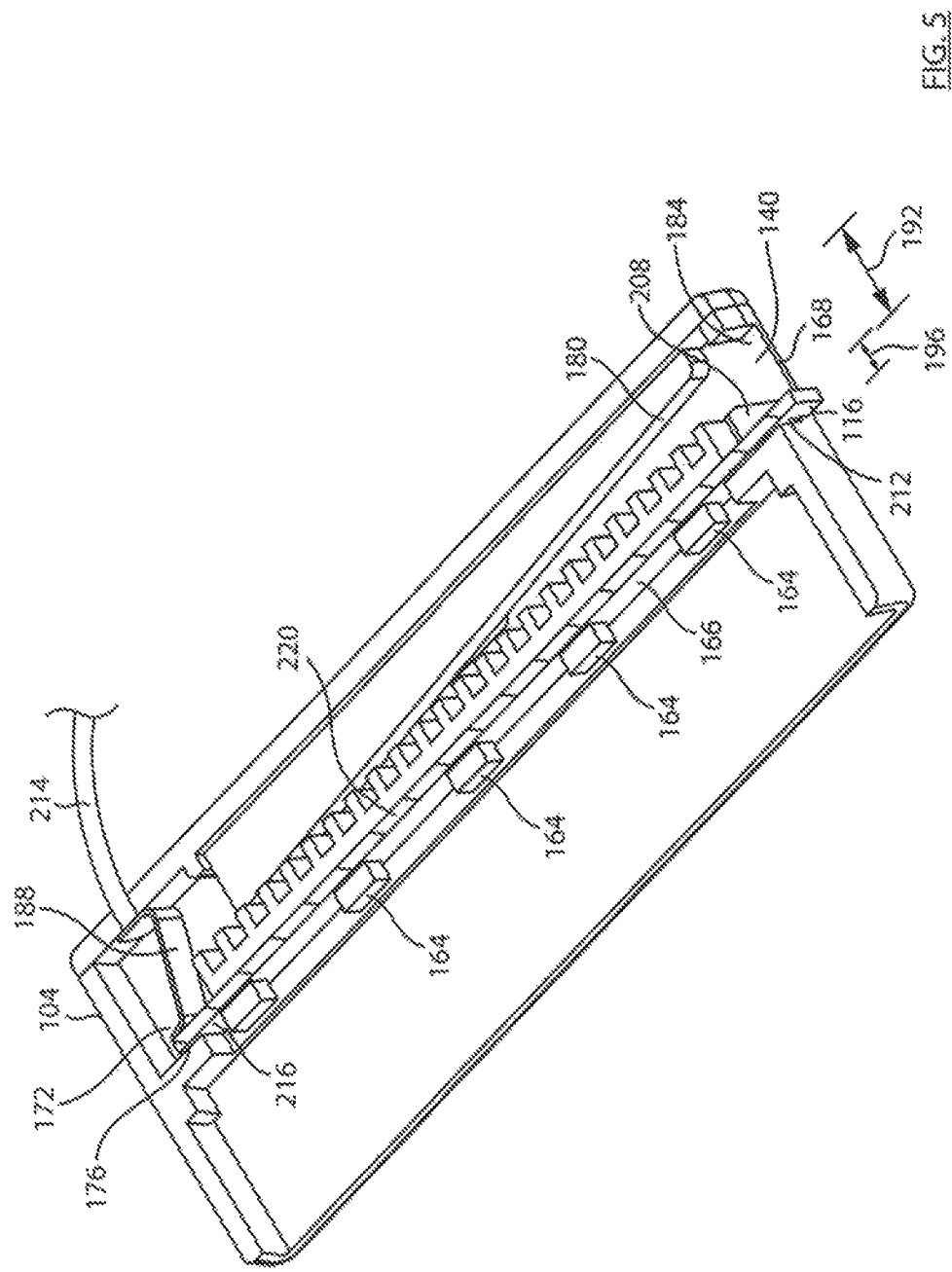
FIG. 5 is a cross-sectional view taken along line 5-5 in FIG. 1 and showing a cartridge in an inserted position.

Returning to FIG. 2, light guide 108 extends longitudinally from a first end face 144 to a second end face 148. Light guide 108 has a longitudinal length 152, a transverse width 156, and a thickness 160. As shown in FIGS. 4 and 5, cartridge 116 may include a plurality of LEDs 164 which are positioned and oriented on a first cartridge face 166 that extends transversely to light guide 108 to emit light into light guide first face 144 when cartridge 116 is received in housing 104. The light travels along longitudinal length 152 of light guide 108 and is re-emitted from light guide light emitting face 112 at light guide light emitting locations. An advantage of this design is that cartridge 116 may be sized according to light guide transverse width 156 instead of light guide longitudinal length 152. This allows cartridge 116 to be smaller, lighter, and less expensive as compared with traditional disposable light tubes that are sized to extend substantially the longitudinal length of the light fixture.

Figure 6:
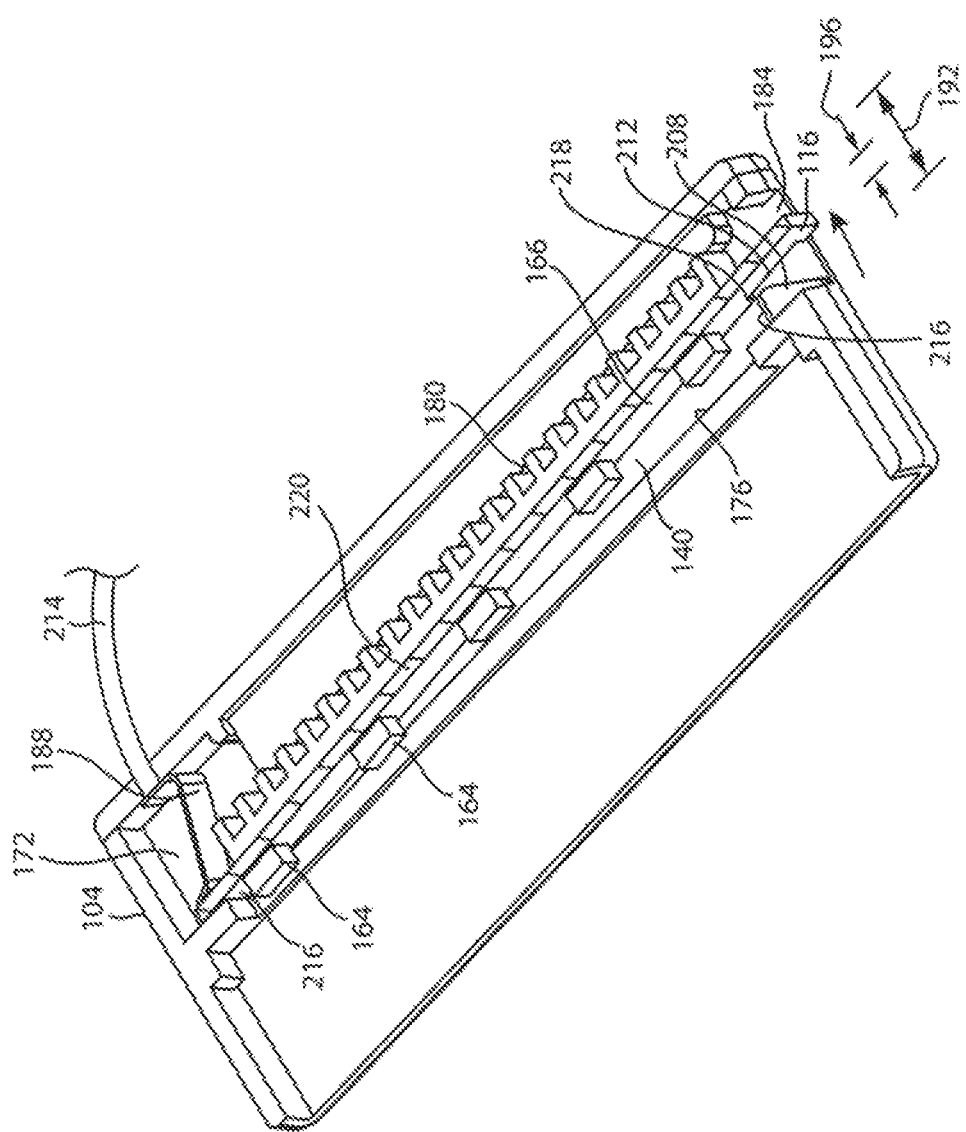
FIG. 6 is a cross-sectional view taken along line 5-5 in FIG. 1 and showing the cartridge in an insertion position.
Figure 7:
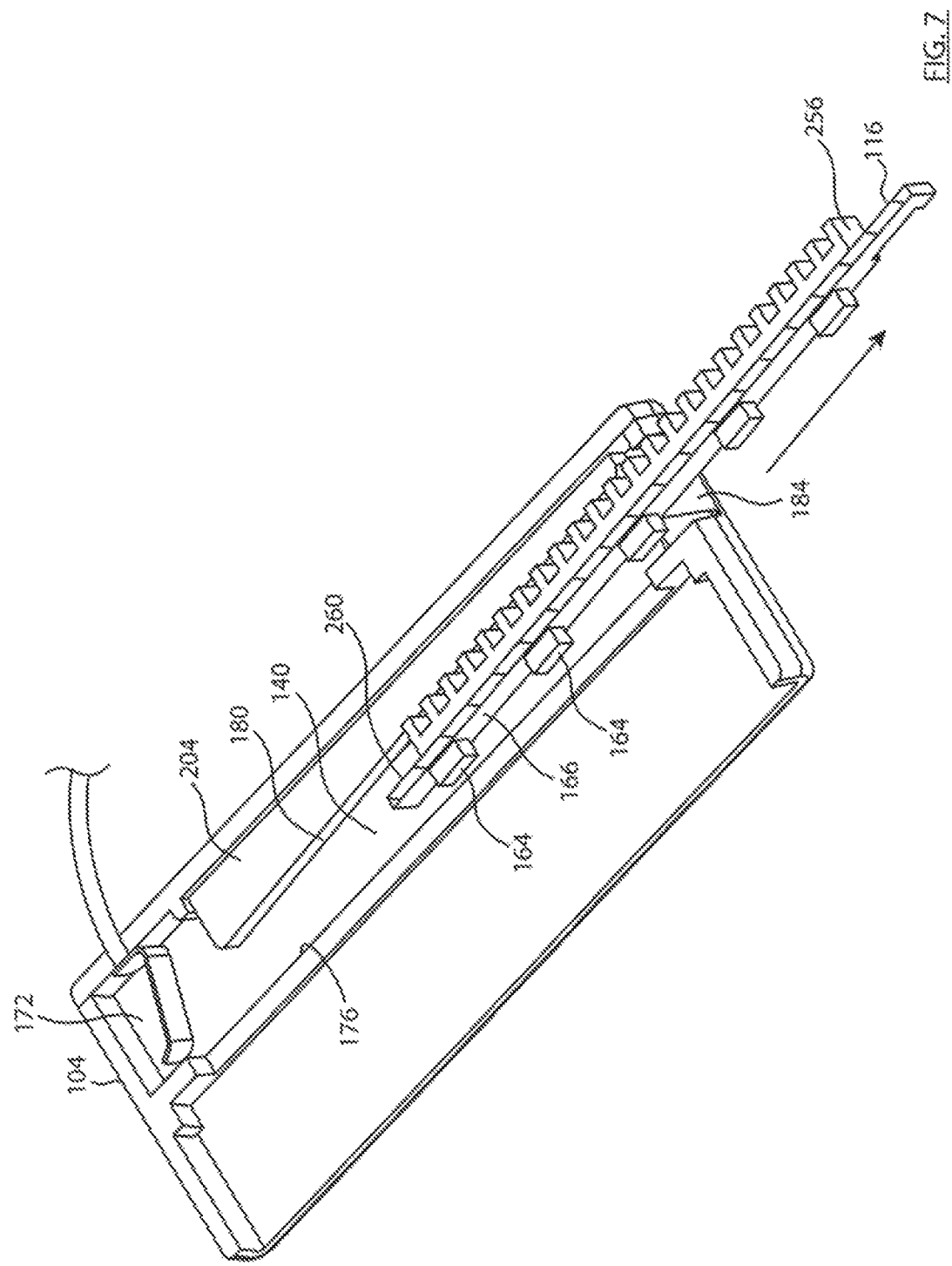
FIG. 7 is a cross-sectional view taken along line 5-5 in FIG. 1 and showing the cartridge being removed.

As exemplified in FIGS. 4 and 5, cartridge 116 may be slideably receivable in housing recess 140. As shown, housing recess 140 may extend from an insertion end 168 transversely of light guide 108 to an inner end 172, and from a first side 176 longitudinally away from light guide 108 to an opposed face 180. Housing recess insertion end 168 may define an insertion opening 184 sized to receive cartridge 116. In use, cartridge 116 may be moved transversely relative to the longitudinal length 152 of the light guide 108 from an insertion position (FIG. 6) to an inserted position (FIG. 5) and vice versa. As shown in FIG. 4, in the inserted position, light guide first end face 144 and cartridge first face 166 abut housing recess first side 176 and face each other so that LEDs 164 are oriented and positioned to emit light into light guide 108. As shown in FIG. 6, in the insertion position, cartridge first face 166 is at least partially spaced apart from housing recess first side 176. From the insertion position (FIG. 6), cartridge 116 can be moved longitudinally towards light guide 108 to the inserted position (FIG. 5), or withdrawn from the housing 104 transversely through the housing insertion opening 184 as seen in FIG. 7. It will be appreciated that, in the inserted position, the LEDs or the face of cartridge 116 facing the light guide may contact the face of the light guide. Alternately, they may be spaced apart.

Returning to FIGS. 4 and 5, housing 104 may be configured to retain cartridge 116 in the inserted position, whereby LEDs 164 are positioned in close proximity to light guide first end face 144 for efficient transmission of light from LEDs 164 into light guide 108. In some embodiments, when cartridge 116 is in the insertion position (FIG. 6), housing 104 may bias cartridge 116 to move to the inserted position (FIG. 5). For example, housing 104 may include a biasing member 188 that urges cartridge 116 to move from the insertion position to the inserted position. An advantage of this design is that it allows the housing recess 140 to provide greater clearance for easy insertion of the cartridge 116 into housing recess 140. For example, housing recess opening 184 may have a longitudinal width 192 that is substantially wider than the corresponding dimension 196 of cartridge 116, and biasing member 188 may be relied upon to move cartridge 116 toward housing recess first side 176, away from housing recess opposed face 180, to close the gap between LEDs 164 and light guide first end face 144.

Referring to FIGS. 4 and 7, in some embodiments, housing recess 140 may narrow in longitudinal width between housing recess insertion opening 184 and housing recess inner end 172. An advantage of this design is that allows for a wide housing recess insertion opening 184 for easy insertion of cartridge 116, and also guides cartridge 116 to move toward the inserted position as the cartridge 116 is moved inwardly. In the illustrated example, the narrowing width of housing recess 140 is effected by a cam 204 that defines a portion of housing recess opposed face 180 and that rises towards housing recess first side 176 between housing recess insertion opening 184 and housing recess inner end 172. It will be appreciated that cartridge 116 may be moved manually into the inserted position shown in FIG. 5 or alternately a drive member, as discussed hereinafter, may be used.

As exemplified in FIGS. 5 and 6, cartridge 116 may be prevented from being withdrawn from housing recess 140 when in the inserted position. Instead, it may be required to move cartridge 116 to the insertion position to release cartridge 116 from housing recess 140. An advantage of this design is that cartridge 116 is prevented from accidental withdrawal. Biasing member 188 may retain cartridge 116 in the inserted position, whereby withdrawal of cartridge 116 is prevented, until a deliberate action (e.g. manual user action) is taken to move cartridge 116 to the insertion position. In the insertion position, cartridge 116 can be freely withdrawn.

Cartridge 116 may be prevented from withdrawal when in the inserted position, in any manner. For example, each of housing 104 and cartridge 116 may include a locking member 208, 212. Locking members 208 and 212 can be any components which interact when cartridge 116 is in the inserted position to inhibit withdrawal of cartridge 116 from housing recess 140. As exemplified, locking members 208 and 212 may include faces that abut in the inserted position to obstruct withdrawal of cartridge 116 from housing recess 140. In the illustrated example, housing locking member 208 is formed as a protrusion including an inner end face 216, cartridge locking member 212 is formed as a slot including an inner end face 218, and end faces 216 and 218 abut when housing locking member 208 is received in cartridge locking member 208 in the inserted position (FIG. 5) to prevent withdrawal of cartridge 116 from housing recess 140.

Referring to FIGS. 5 and 6, biasing member 188 can take any form that urges cartridge 116 from the insertion position to the inserted position. In the illustrated embodiment, biasing member 188 is an electrical contact that supplies electricity from a power source (e.g. an electrical wire 214 connected to an energy storage member or an electrical wall plug) to cartridge 116 for powering LEDs 164. An advantage of this design is that the biasing member 188 performs double duty as a biasing member and electrical conductor thereby avoiding the complexity, weight, and expense of having a separate component act as a biasing member.

Still referring to FIGS. 5 and 6, biasing member 188 can apply a biasing force to any portion of cartridge 116 that is suitable for urging cartridge 116 to the inserted position (FIG. 5). In the illustrated embodiment, biasing member 188 is positioned in housing recess 140 proximate housing recess inner end 172 to apply a biasing force to an inner end portion 216 of cartridge 116. An advantage of this design is that biasing member 188 does not act upon cartridge 116 until cartridge 116 is moved into the insertion position within housing recess 140. This allows LEDs 164 to align with light guide first end face 144 (FIG. 4) before biasing member 188 urges cartridge 116 into the inserted position, for example.

In the illustrated example, cartridge 116 is substantially rigid. For example, cartridge 116 may include a rigid substrate 220 (e.g. a printed circuit board) that defines cartridge first face 166, on which LEDs 164 are arranged. As shown, biasing member 188 may urge cartridge first face 166 to lay flat against housing recess first side 176. As a result, cartridge 116 is urged to rotate about cartridge inner end portion 216 towards housing recess first side 176 (and light guide first end face 144, FIG. 4). Thus, the rigidity of cartridge 116 may cooperate with biasing member 188 to move cartridge 116 into the inserted position (FIG. 5) by application of the biasing force to cartridge inner end portion 216. Referring to FIG. 6, it can be seen that housing recess cam 204 helps to guide cartridge inner end portion 216 into engagement with biasing member 188. This helps to prevent misalignment of cartridge 116 when it is inserted into housing recess 140.

Referring to FIGS. 3 and 4, LED light source 100 can include any housing 104 suitable for holding light guide 108 and cartridge 116, and optionally hold one or both of a reflector 132 and a diffuser 136. For example, housing 104 may hold these components in relative positions that allow for efficient transmission and distribution of light from cartridge LEDs 164 to light emitting directions 120. In the illustrated example, housing 104 includes first and second end members 224 (FIG. 1). Each housing end member 224 may include a light guide retention slot 228 sized to receive an end portion 232 of light guide 108. In the illustrated example, retention slot 228 is sized to receive light guide end portion 232 and a reflector end portion 236. An advantage of this design is that it allows housing 104 to hold reflector 132 against light guide 108 for efficient light reflection. In the illustrated example, housing end member 224 includes a transversely extending sidewall 240 and a transversely extending inner wall 250, which are spaced apart to define retention slot 228.

Referring to FIG. 2, LED light source 100 can include any number of cartridges 116. For example, LED light source 100 may include a cartridge 116 removably receivable in each of the housing end members 224. An advantage of this design is that it allows cartridges 116 to emit light into both light guide end faces 144 and 148, which may help to more evenly distribute light emitted from light guide light emitting face 112, and reduce the average number of internal reflections in light guide 108 for greater light transmission efficiency. In other embodiments, LED light source 100 includes just one cartridge 116 that is removably receivable in just one of housing end members 224. An advantage of this design is that LED light source 100 has only one cartridge 116 to replace which can reduce replacement time and maintenance costs considerably in environments that have hundreds or thousands of LED light sources 100 installed (e.g. office buildings).

Turning to FIG. 3, housing end member 224 may include an end wall 248 that defines housing recess opposed face 180. As shown, housing end wall 248 may be connected to housing sidewall 240 in opposition to retention slot 228. Housing end wall 248 may include housing recess cam 204 and biasing member 188. Housing end wall 248 may be integrally formed with housing sidewall 240, or discretely formed as shown and then permanently or removably connected to housing sidewall 240. In the illustrated example, housing end wall 248 is connected to housing sidewall 240 with fasteners 252 (e.g., screws).

In several of the examples, the housing recess 140 is illustrated as having a housing insertion opening 184 on a lateral side of housing sidewall 240, which allows cartridge 116 to be inserted and removed in a transverse direction parallel to light guide light emitting face 112. However, it will be appreciated that housing insertion opening 184 may be positioned elsewhere on housing sidewall 240 and that cartridge 116 may be insertable in different directions. The position of housing insertion opening 184 and cartridge insertion direction may be selected based on, for example the orientation of the LED light source 100 when installed. For example, in some applications it may be preferable to position housing insertion opening 184 for easiest user accessibility (for removing or inserting cartridge 116) or alternatively to conceal cartridge 116 (for aesthetics or to avoid tampering).

As exemplified in FIGS. 42-46, insertion opening 184 may be positioned on an upper side 368 of housing sidewall 240. As shown, cartridge 116 is moveable from an inserted position (FIG. 44) to an insertion position (FIG. 45), and then withdrawable through housing insertion opening 184 in a direction normal to light guide light emitting face 112.

Heat Sink

In accordance with another aspect of this disclosure, which may be used with one or more other aspects disclosed herein, a heat sink may be provided to assist in withdrawing head produced by the LEDs. As exemplified in FIG. 7, the LED light source may include a heat sink 256 thermally connected to cartridge substrate 220. The heat sink may be part of the cartridge 116 (see for example the embodiment of FIG. 7) or, alternately, it may be thermally connected to the cartridge 116 when the cartridge 116 is in the inserted position (e.g., it may abut the cartridge 116 when cartridge 116 is in the inserted position). Heat sink 256 can have any design suitable for dissipating heat generated by cartridge 116, and in particular LEDs 164. In the illustrated example, heat sink 256 is thermally connected to cartridge second face 260, which is opposed to cartridge first face 166. As shown, heat sink 256 may have a plurality of fins extending away from cartridge substrate 220 to increase convective surface area for efficient heat dissipation.

In the illustrated embodiment, cartridge 116 includes heat sink 256, such that heat sink 256 is removable from housing 104 with cartridge 116, and optionally disposable with cartridge 116. For example, heat sink 256 may be integrally formed with cartridge 116, or discretely formed and permanently or removably attached to cartridge 116. An advantage of including heat sink 256 in cartridge 116 is that it may promote better thermal contact between heat sink 256 and substrate 220 which can lead to better thermal conduction. This thermal contact may be improved by interposing thermal compound (e.g. high thermal conductivity paste or gel) between heat sink 256 and substrate 220. By allowing heat sink 256 to be disposable with cartridge 116, the user may avoid having to ensure proper thermal contact or reapply thermal compound between heat sink 256 and substrate 220.

Figure 8:
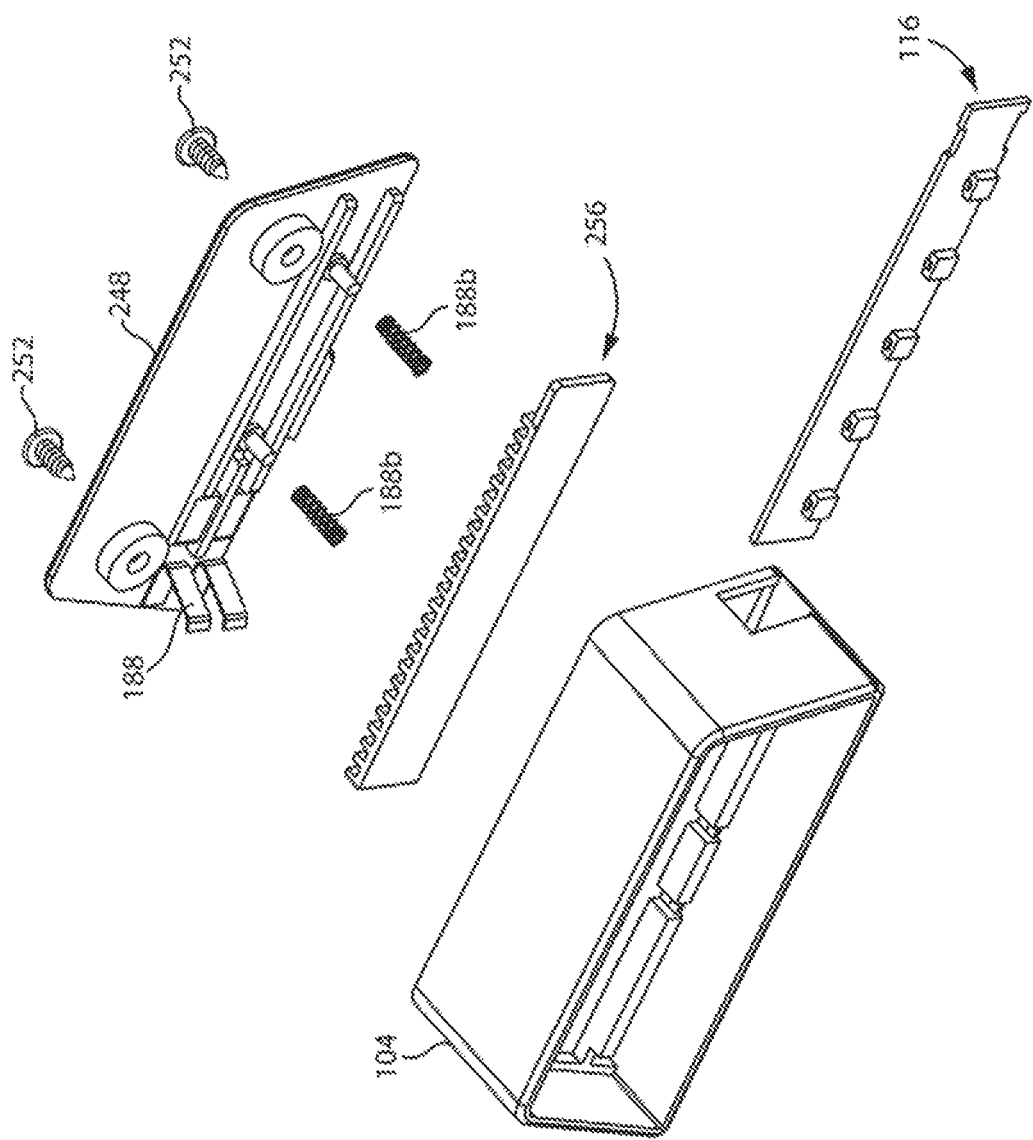
FIG. 8 is an exploded view of a housing end member in accordance with another embodiment.

Referring to FIG. 8, heat sink 256 may be a separate component from cartridge 116 in some embodiments. For example, heat sink 256 may be a component of housing 104.

Figure 9:
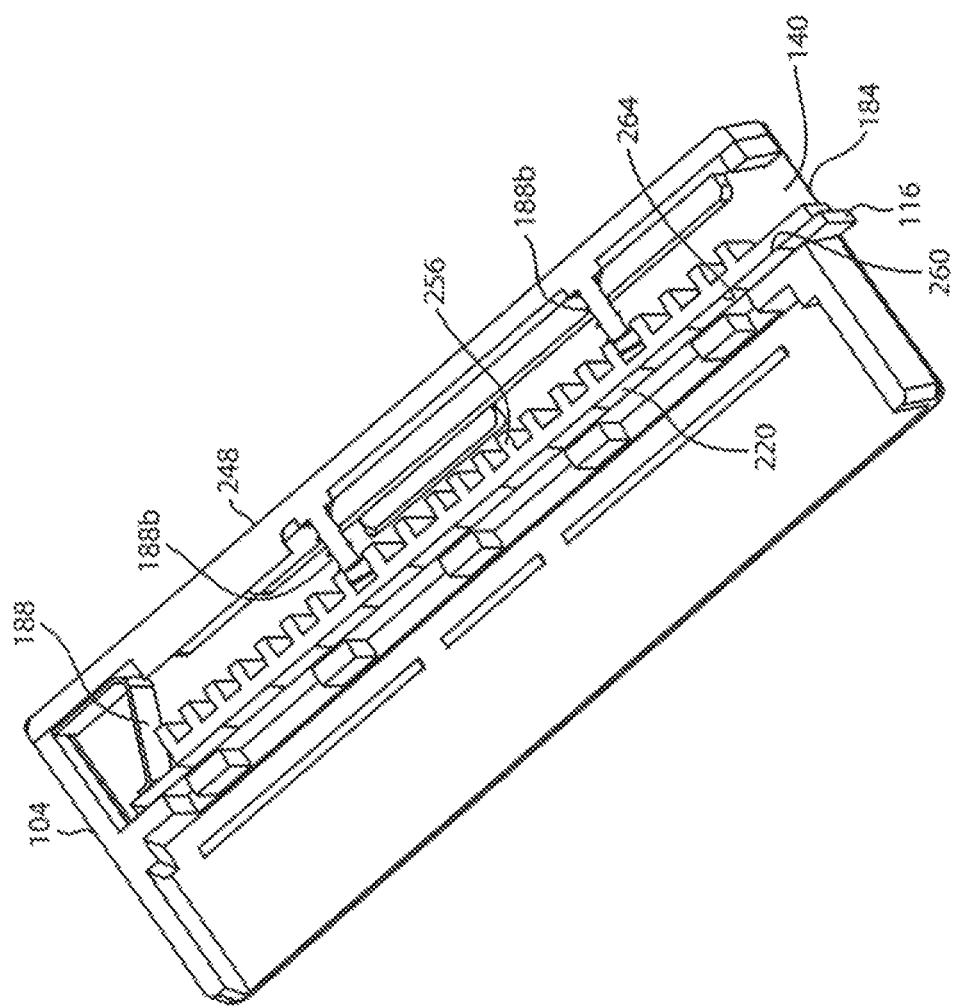
FIG. 9 is a cross-sectional view of the housing end member of FIG. 8, showing the cartridge in an inserted position.

Cartridge 116 may be free of heat sinks. An advantage of this design is that heat sink 256 may be a reusable non-disposable component that is retained with housing 104 as cartridge 116 is removed and replaced. This further reduces number of components in disposable cartridge 116, which can make cartridge 116 less expensive, smaller, and lighter (and consequently less expensive to ship and easier to store). Turning to FIGS. 9-11, cartridge 116 makes thermal contact with heat sink 256 in the inserted position (FIG. 9), and is thermally disconnected and physically separated from heat sink 256 when removed from housing 104 (FIG. 11).

Referring to FIGS. 9-12, heat sink 256 may be urged into physical contact with cartridge 116 as cartridge 116 is biased into the inserted position (FIGS. 9 and 12). An advantage of this design is that the pressure at the interface of cartridge 116 and heat sink 256 can collapse small particles (e.g. dust or dirt), and thereby promote better thermal contact between cartridge 116 and heat sink 256. As exemplified, cartridge substrate 220 and heat sink 256 have complimentary faces 260 and 264, which make flush physical contact when cartridge 116 is in the inserted position (FIGS. 9 and 12). Faces 260 and 264 can have any complimentary surface profiles that promote efficient heat transfer when in flush physical contact. In the illustrated example, cartridge substrate face 260 and heat sink face 264 are flat planar surfaces.

Optionally, one or both of faces 260 and 264 includes thermal compound that accommodate surface defects to enhance the thermal contact. In some embodiments, the thermal compound is pre-applied to cartridge substrate face 260 (e.g. in the retail package). An advantage of this design is that the user is not required to apply the thermal compound, which avoids potential complications associated with misapplication of the thermal compound. In other embodiments, the thermal compound is user applied to heat sink face 264. An advantage of this design is that the cartridge 116 can be provided free of thermal compound, and therefore at a lower weight and cost. Manufacturing and packaging of cartridge 116 are also simplified. Also, the thermal compound applied to heat sink face 264 may remain effective for use in connection with several cartridges 116 before reapplication is required, such that less thermal compound may used overall.

Heat sink 256 can be permanently connected or integrally formed with housing 104, or removably connected to housing 104. In the illustrated embodiment, heat sink 256 is positioned in housing recess 140. As shown, heat sink 256 may be connected to housing end wall 248 by biasing members 188$b$. Biasing members 188$b$ urge heat sink 256 in the longitudinal direction towards cartridge 116 to move cartridge 116 from the insertion position (FIG. 10) to the inserted position (FIGS. 9 and 12). To remove cartridge 116, the user may apply force to cartridge 116 in opposition to biasing members 188 to move cartridge 116 from the inserted position (FIGS. 9 and 12) to the insertion position (FIG. 10), and then pull cartridge 116 transversely out of housing recess 140 through housing insertion opening 184 (FIG. 11).

Housing 104 can include any number of biasing members 188$b$, which can be any type of biasing member suitable for urging heat sink 256 against cartridge 116. In the illustrated example, housing 104 includes two spaced apart biasing members 188$b$, which as shown may take the form of helical compression springs. This configuration can allow biasing members 188$b$ to provide distributed biasing force against heat sink 256 for more even pressure at the interface of heat sink 256 and cartridge 116. In alternative embodiments, housing 104 may include just one biasing member 188$b$, or more than two biasing members 188$b$. Moreover, biasing member 188$b$ may take another form, such as a resiliently deformable pad for example.

Referring to FIG. 8, in some embodiments, housing end wall 248 may be removably connected or movably connected (e.g. pivotally connected) to housing 104. An advantage of this design is that it can provide access to heat sink 256 (e.g. for repair or replacement of heat sink 256, or for application of thermal compound to heat sink 256). Housing end wall 248 can be removable connected or movably connected to housing 104 in any manner. For example, housing end wall fasteners 252 may be removable to release housing end wall 248 from housing 104.

Driving Member

In accordance with another aspect of this disclosure, which may be used with one or more other aspects disclosed herein, a driving member may be provided to assist in moving, or to move, the cartridge to the inserted position. As exemplified in FIGS. 13A and 13B, driving member 268 may be movably mounted in housing 104, and operable to drive cartridge 116 from the insertion position to the inserted position. The driving member 268 can drive a heat sink 256 against cartridge 116 as shown, or can drive a cartridge 116 including an integrated heat sink.

Referring to FIGS. 14-16, driving member 268 may be movable between a first position (FIG. 14) in which the driving member 268 acts to drive and retain cartridge 116 in the inserted position (FIG. 14), and a second position (FIGS. 15-16) in which driving member 268 releases cartridge 116 from the inserted position, whereby cartridge 116 can move to the insertion position (FIG. 15) and then be withdrawn from housing recess 140 (FIG. 16).

Figure 13B:
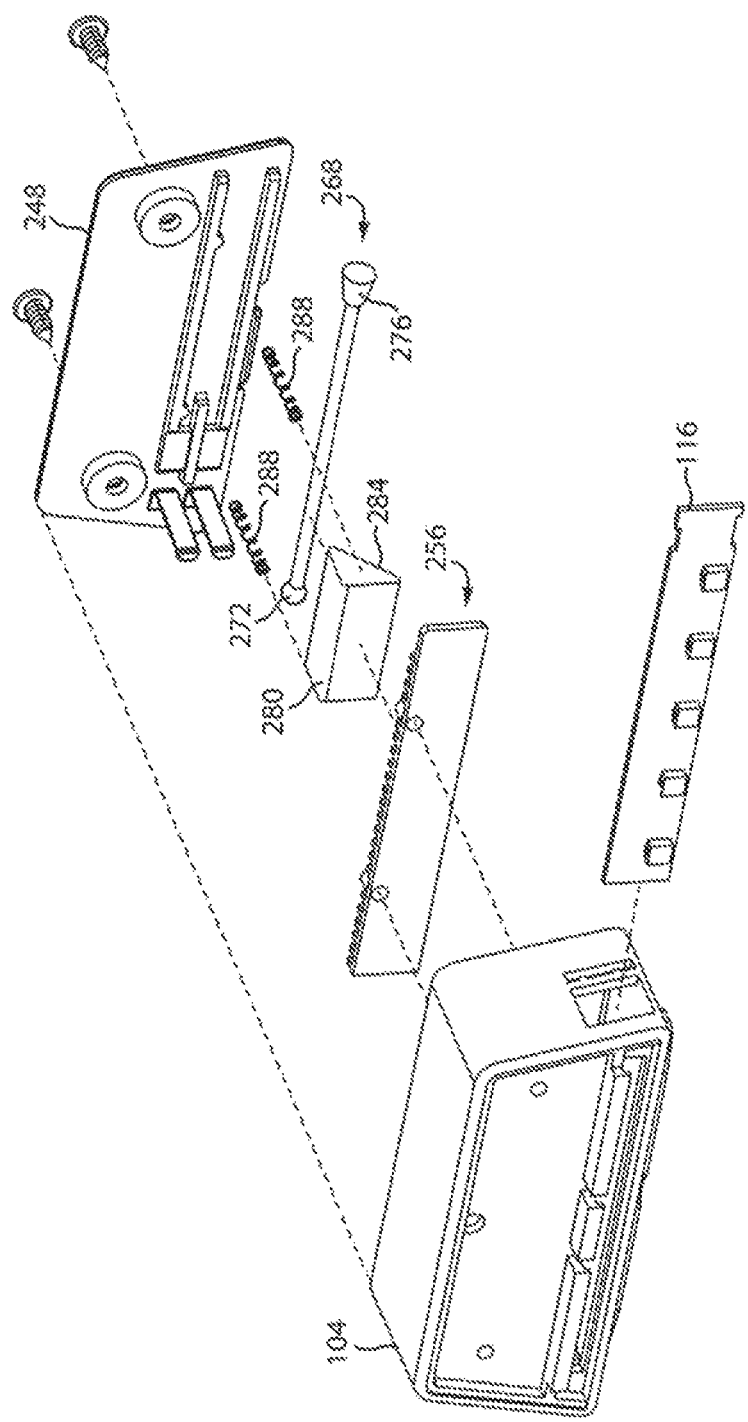
FIG. 13B is an exploded view of the housing end member of FIG. 13A.

Referring to FIGS. 13B and 14, driving member 268 can have any construction suitable for selectively driving cartridge 116 between the insertion position and the inserted position. In the illustrated embodiment, driving member 268 is formed as a movable shaft having an inner end 272 pivotally mounted to housing 104. Driving member 268 may also have an outer end 276 which protrudes from housing 104, and provides a handle for a user to grasp to manually move the driving member 268 between its first and second positions. As shown, a driving cam 280 may be positioned between the driving member 268 and the cartridge 116. Driving cam 280 may include a cam surface 284 that interacts with driving member 268 as driving member 268 moves to the first position, whereby the driving cam 280 is moved longitudinally to drive cartridge 116 to the inserted position.

Driving member inner end 272 may be pivotally connected to housing 104 in any manner. In the illustrated embodiment, driving member inner end 272 and housing 104 form a ball and socket joint. In other embodiments, driving member inner and 272 and housing 104 may form another type of pivotal connection, such as a hinged joint.

Cam surface 284 can have any configuration that allows driving member 268 to move driving cam 280 towards cartridge 116 as driving cam 280 is moved to the first position (FIG. 14). In the illustrated embodiment, cam surface 284 is planar and sloped relative to vertical and horizontal, and driving member 268 is vertically movable between the second and first positions. Driving member 268 rides along cam surface 284 as driving member 268 is moved upwardly to the first position, which causes driving cam 280 to slide longitudinally towards cartridge 116. In other embodiments, cam surface 284 may be non-planar, which may provide a different movement profile.

As shown, heat sink 256 may be connected to housing 104 and positioned between driving cam 280 and cartridge 116. In this embodiment, moving driving member 268 to the first position (FIG. 14) drives driving cam 280 and heat sink 256 against cartridge 116, thereby urging cartridge 116 to move to the inserted position. The pressure that forms at the interface of heat sink 256 and cartridge 116 may help to improve thermal contact between them. In alternative embodiments, cartridge 116 includes heat sink 256, or LED light source 100 includes no heat sink.

Referring to FIGS. 13A-16, LED light source 100 may include one or more biasing members 288, which act against driving member 268 to retract driving cam 280 when driving member 268 is in the second position (FIG. 15). An advantage of this design is that it allows cartridge 116 to be easily removed (FIG. 16) once driving member 268 is moved to the second position. Biasing member 288 can have any configuration suitable for urging driving cam 280 away from cartridge 116 when driving member 268 is moved to the second position (FIG. 15). In the illustrated example, housing 104 includes two spaced apart biasing members 288, formed as tensile springs, which are connected to heat sink 256 and housing end wall 248. As shown, when driving member 268 is moved to the second position (FIG. 15), biasing members 288 pull heat sink 256, along with driving cam 280, longitudinally towards housing end wall 248 away from cartridge 116. This provides clearance for cartridge 116 to move longitudinally to the insertion position (FIG. 15), and then removed from housing 104 (FIG. 16).

Referring to FIGS. 13A and 16, housing 104 may include one or more retention members 292 that act to retain driving member 268 in the first or second positions. For example, retention members 292 may retain driving member 268 in position against the force of gravity or biasing members. Retention members 292 can have any configuration suitable for retaining driving member 268 in position. In the illustrated embodiment, driving member outer end 276 extends through a guide slot 296. The guide slot may guide and constrain the movement of driving cam 280 (FIG. 13B) to a path between the first position (FIG. 13A) and the second position (FIG. 16). As shown, guide slot 296 may include retention members 292 formed as inward protrusions, which narrow a small portion of guide slot 296. Driving member 268 can be moved along guide slot 296 past the retention members 292 into or out of the first or second position with a bit of force. Consequently, retention members 292 impede driving member 268 from moving out of the first or second positions until a user deliberately applies sufficient force to move driving member 268 past the retention member 292.

Figure 18:
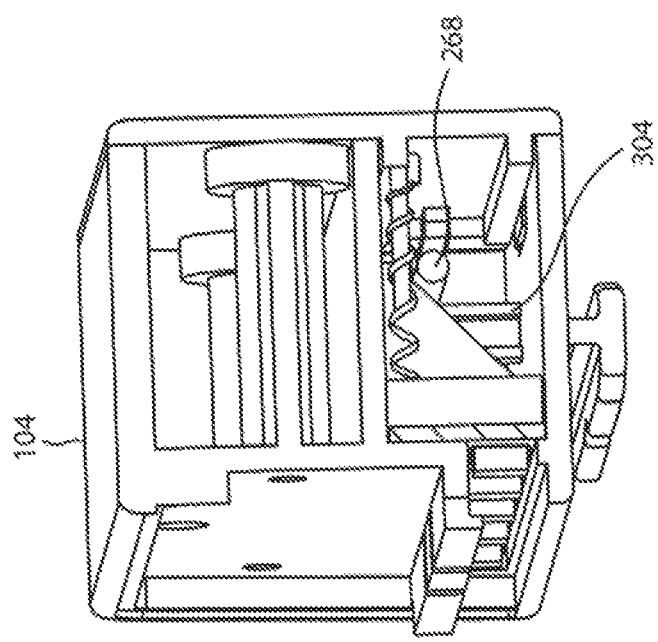
FIG. 18 is a cross-sectional view of the housing end member of FIG. 17, showing a cartridge in an inserted position and a driving member in a first position.
Figure 19:
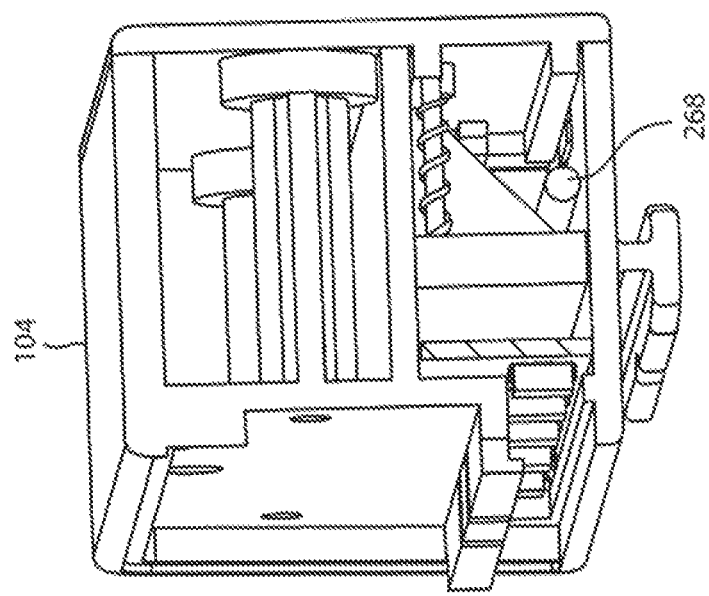
FIG. 19 is a cross-sectional view of the housing end member of FIG. 17, showing the cartridge in an insertion position and the driving member in a second position.

Reference is now made to FIGS. 17-19. In alternative embodiments driving member 268 may be slideably mounted to housing 104. Driving member 268 may be slideably mounted to housing 104 in any manner that allows driving member 268 to move between the first and second positions. In the illustrated example, housing 104 includes a track 304, and driving member inner end 272 is slideably mounted to track 304 for movement between the first position (FIG. 18) and the second position (FIG. 19).

Figure 20:
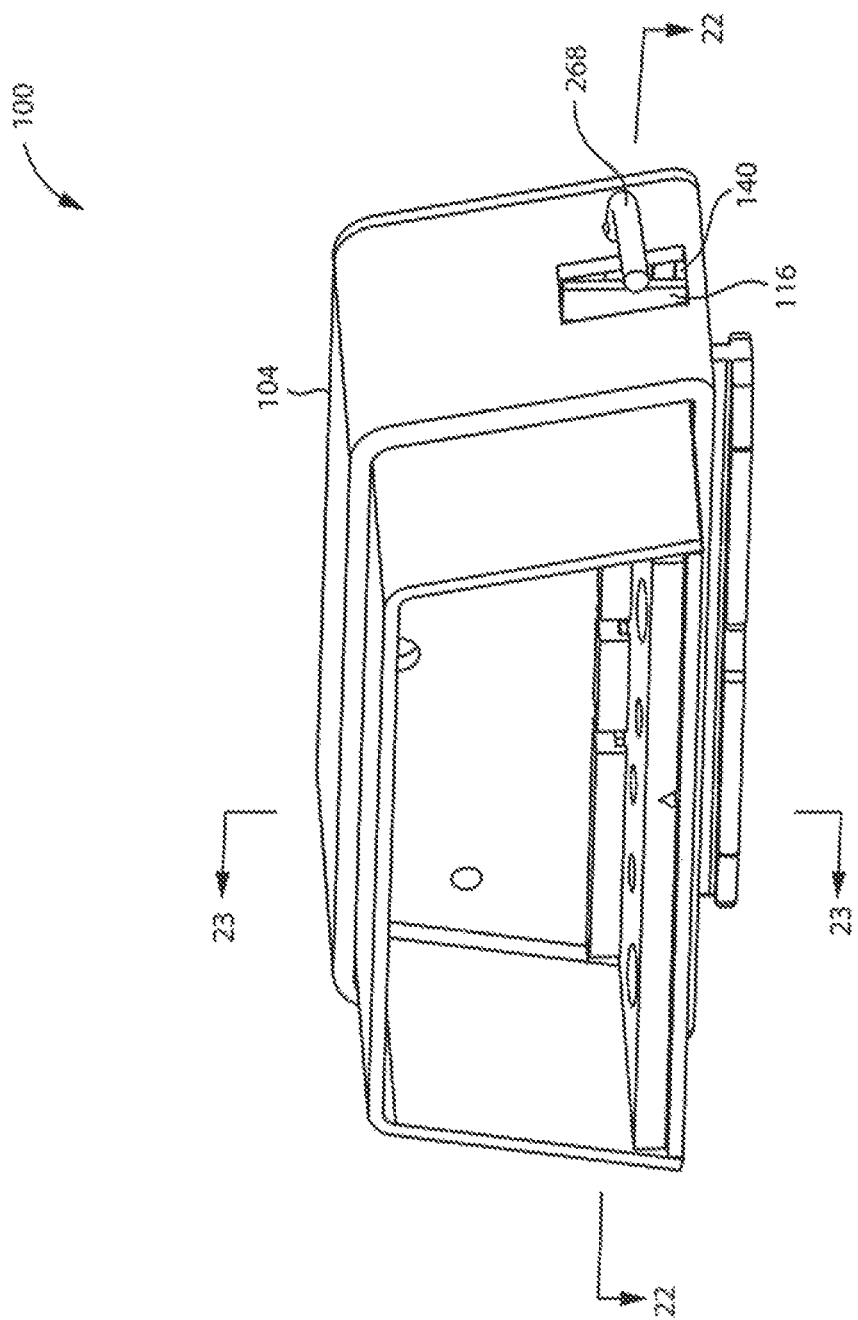
FIG. 20 is a cross-sectional view of an LED light source in accordance with another embodiment.
Figure 21:
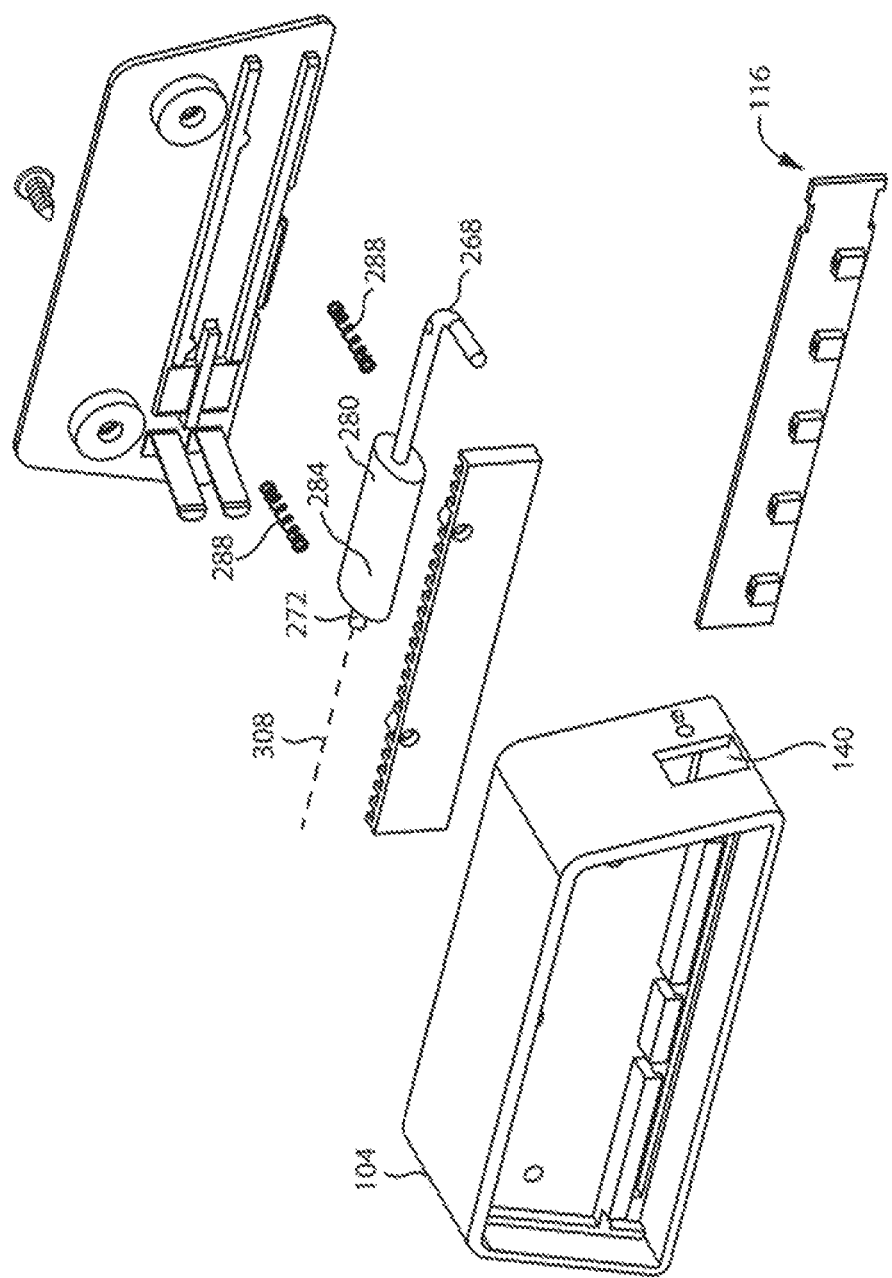
FIG. 21 is an exploded view of a housing end member of the LED light source of FIG. 20.
Figure 22:
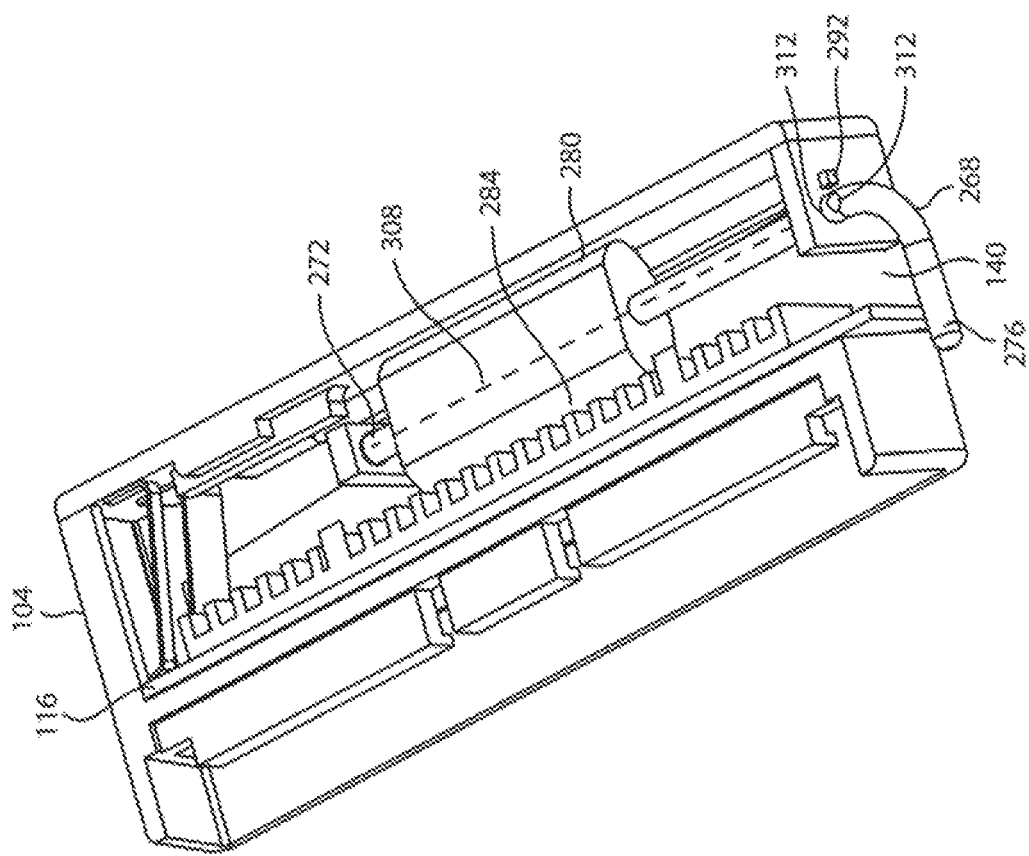
FIG. 22 is a cross-sectional view of the housing end member, taken along line 22-22 in FIG. 20, showing a cartridge in an inserted position and a driving member in a first position.
Figure 23:
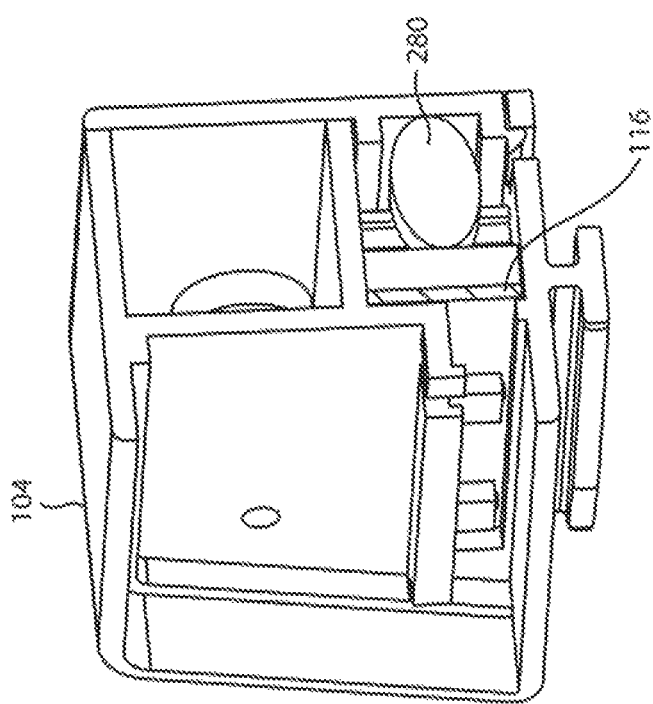
FIG. 23 is a cross-sectional view of the housing end member, taken along line 23-23 in FIG. 20, showing the cartridge in the inserted position and the driving member in the first position.
Figure 24:
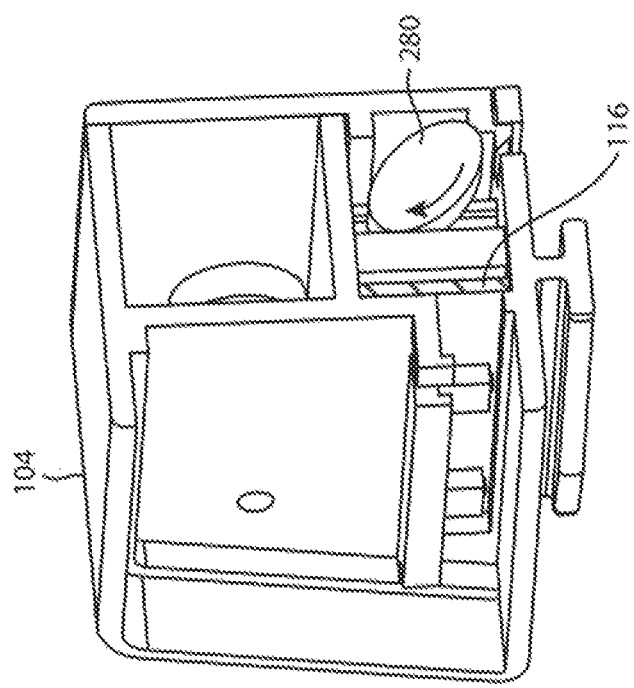
FIG. 24 is a cross-sectional view of the housing end member, taken along line 23-23 in FIG. 20, showing the cartridge in the inserted position and the driving member in an intermediate position.
Figure 25:
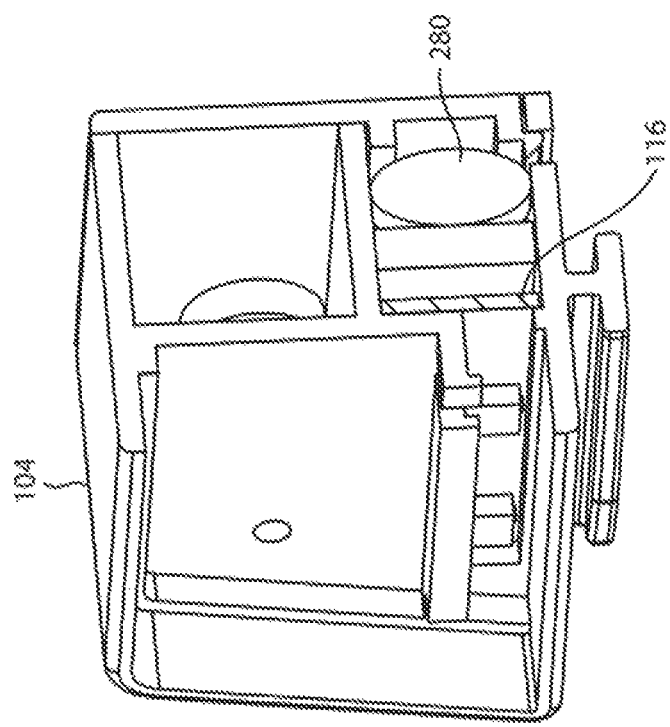
FIG. 25 is a cross-sectional view of the housing end member, taken along line 23-23 in FIG. 20, showing the cartridge in the inserted position and the driving member in a second position.

Reference is now made to FIGS. 20-22. In some embodiments, driving member 268 is rotationally mounted to housing 104. For example, driving member 268 may be rotated (e.g. around an axis 308 of driving member 268) to drive cartridge to the inserted position. In the illustrated example, driving member inner end 272 is rotatably connected to housing 104, and driving member 268 is rigidly connected to driving cam 280, such that they rotate together.

Figure 26:
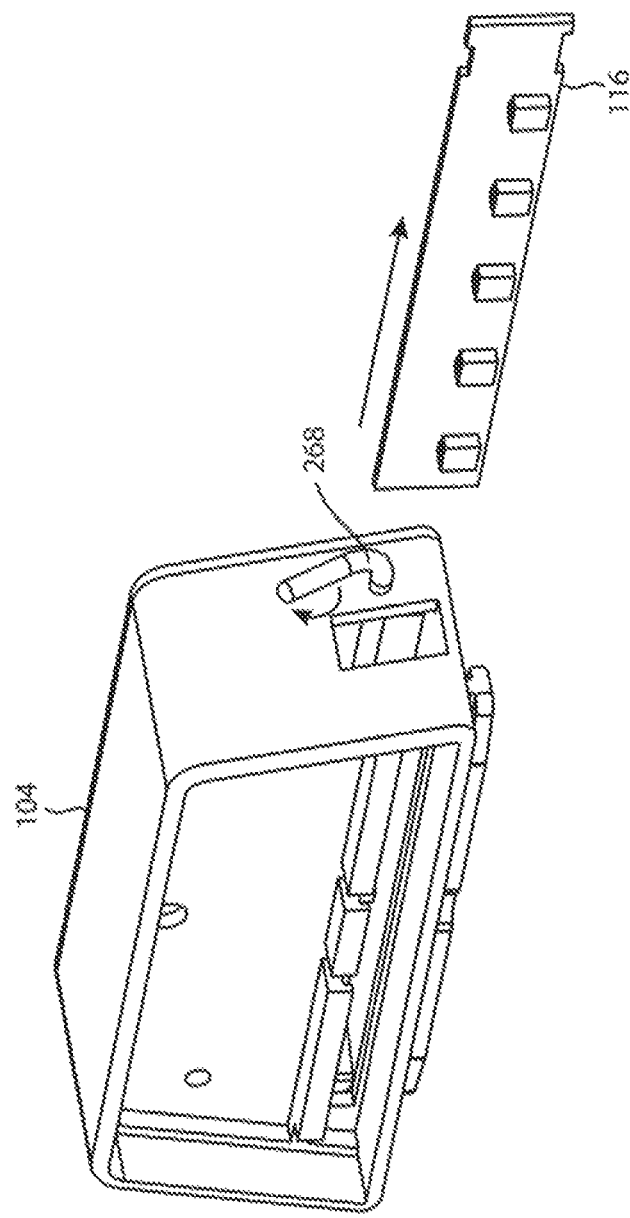
FIG. 26 is a perspective view of the housing end member of the LED light source of FIG. 20, showing the driving member in the second position and the cartridge removed.

Driving cam 280 can have any shape that can drive cartridge 116 towards the inserted position (FIG. 22) when driving cam 280 is rotated to a particular rotary position. For example, driving cam 280 may have a cross-sectional shape normal to rotary axis 308 that is either non-circular (e.g. oblong), or non-centered on rotary axis 308, or both. Consequently, the distance between cam surface 284 and housing recess 140 changes as driving cam 280 is rotated. In the illustrated example, driving cam 280 has an oblong cross-sectional shape centered on rotary axis 308. As shown in FIGS. 23-26, driving cam 280 can rotate (by rotating driving member 268) between a first position (FIG. 23) in which driving cam 280 drives cartridge into the inserted position, through an intermediate position (FIG. 24), to a second position (FIG. 25) in which driving cam 280 releases cartridge 116 from the inserted position. In the second position, cartridge 116 is free to move to the insertion position (FIG. 25), and then be removed from the housing 104 (FIG. 26).

Turning to FIG. 22, driving member outer end 276 may extend through an opening 312 in housing 104 to provide user accessibility to manipulate driving member outer end 276 for rotating driving member 268 about driving member axis 308. In the illustrated embodiment, housing 104 includes a retention member 292 that acts to resist rotation of driving member 268 from the first position to the second position. As shown, retention member 292 may be a protrusion from housing 104 that makes contact with a protrusion 312 on driving member 268 to resist rotation of driving member 268 to the second position. When in the first position, the user may deliberately apply a force to driving member outer end 276 that overcomes the resistance by retention member 292 to rotate driving member 268 to the second position (and vice versa). Thus, retention member 292 may retain driving member 268 in the first position against, e.g. the force of biasing members 288 (FIG. 21) or resilient compressibility of cartridge 116.

Figure 27:
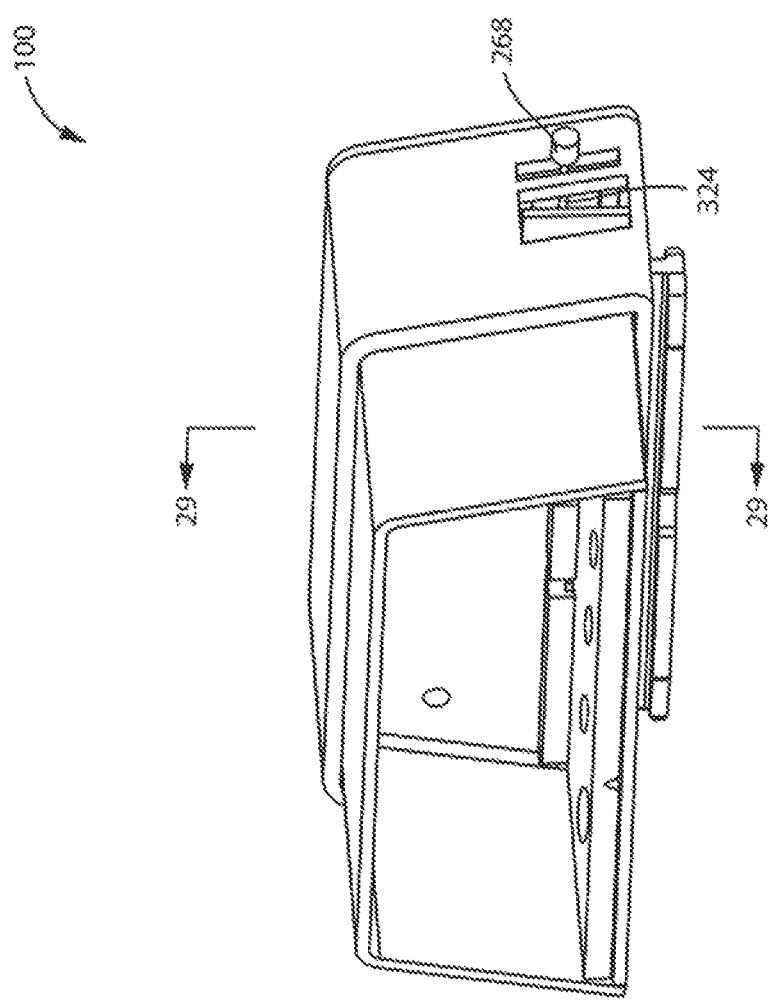
FIG. 27 is a cross-sectional view of an LED light source in accordance with another embodiment.
Figure 28:
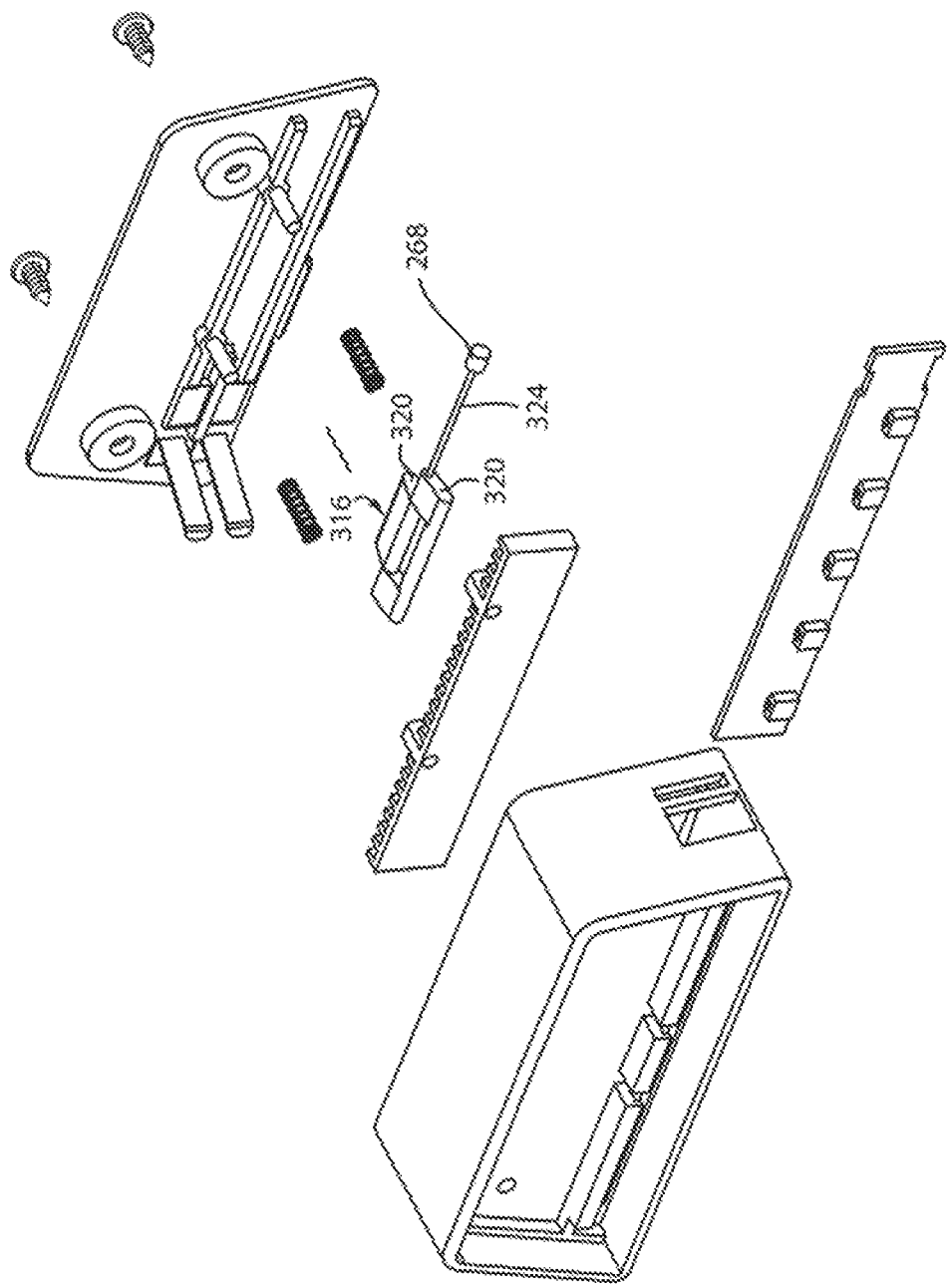
FIG. 28 is an exploded view of a housing end member of the LED light source of FIG. 27.
Figure 29:
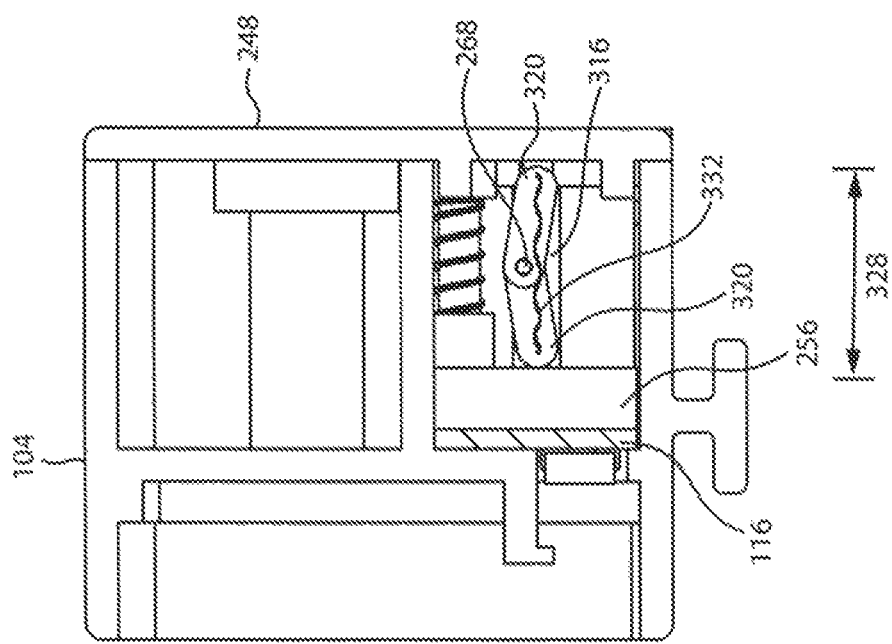
FIGS. 29-30 are cross-sectional views of the housing end member, taken along line 29-29 in FIG. 27, showing a cartridge in the inserted position and a driving member in a first position.

Reference is now made to FIGS. 27-29. In some embodiments, driving member 268 includes a toggle joint 316. As shown, toggle joint 316 may include first and second pivotally connected arms 320. Driving member 268 may also include an arm 324 that extends from toggle joint 316, and that is manually user operable to articulate the toggle joint 316.

Figure 30:
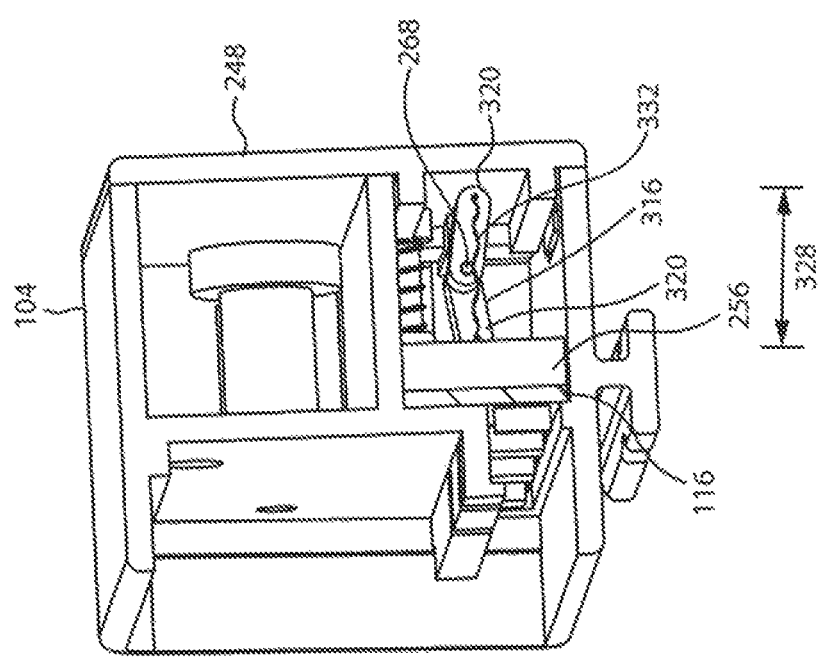
Figure 31:
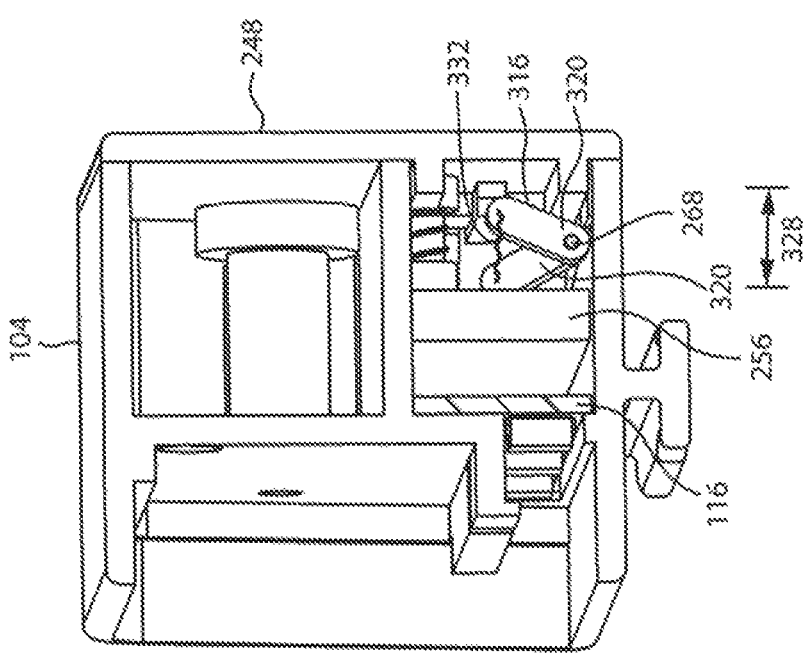
FIG. 31 is a cross-sectional view of the housing end member, taken along line 29-29 in FIG. 27, showing the cartridge in the inserted position and the driving member in a second position.
Figure 32:
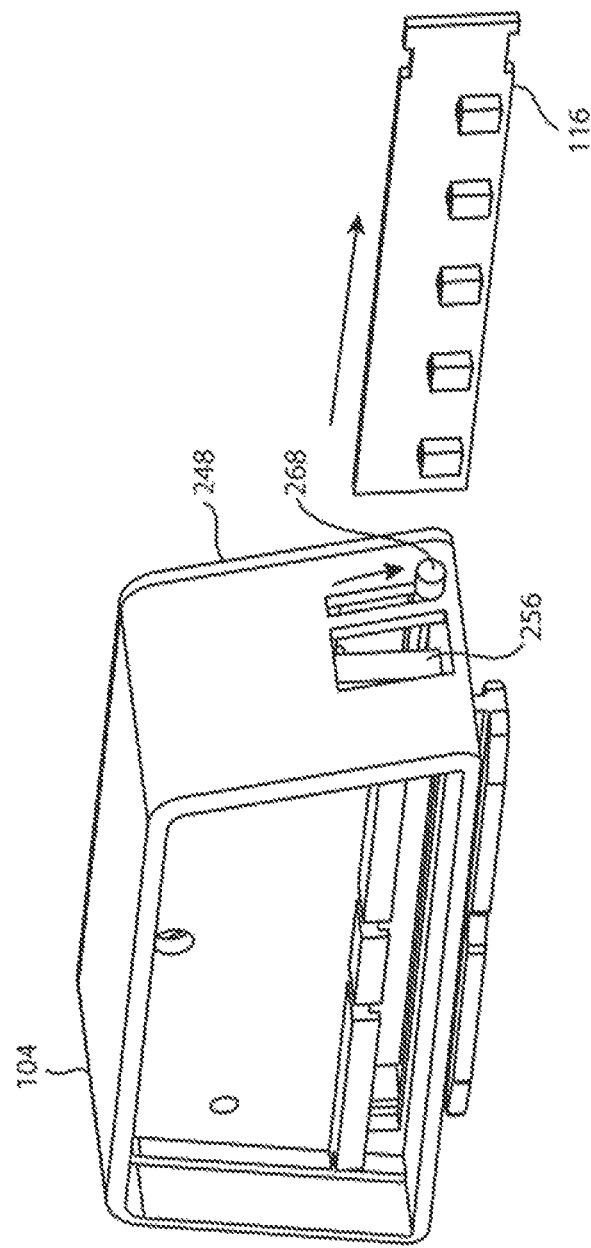
FIG. 32 is a perspective view of the housing end member of the LED light source of FIG. 27, showing the driving member in the second position and the cartridge removed.

Referring to FIGS. 29-32, driving member 268 is movable between a first position (FIGS. 29 and 30) in which driving member 268 drives cartridge 116 to the inserted position, and a second position (FIG. 31) in which driving member 268 releases cartridge 116 from the inserted position, which allows cartridge 116 to be moved to the insertion position and then withdrawn from housing 104 (FIG. 32). As shown, moving driving member 268 between the first position (FIGS. 29 and 30) and the second position (FIG. 31) includes articulating the toggle joint 316. Toggle joint arms 320 are pivotally connected to each other end-to-end, and oriented so that a longitudinal length 328 of the toggle joint 316 changes as the toggle joint 316 is articulated (i.e. as the pivotal connection between the toggle joint arms 320 is articulated). The longitudinal length 328 of toggle joint 316 governs the longitudinal separation of cartridge 116 and housing end wall 248, whereby increasing longitudinal length 328 moves cartridge 116 towards the inserted position.

In the first position (FIGS. 29 and 30), the toggle joint arms 320 may be parallel or nearly parallel (e.g. within 15 degrees of parallel). The longitudinal length 328 of toggle joint 316 drives the cartridge 116 (and heat sink 256 in the example shown) away from housing end wall 248 into the inserted position. In the second position (FIG. 31), the toggle joint arms 320 are substantially folded (i.e. collapsed) into a V-shape, such that the longitudinal length 328 of toggle joint 316 is reduced as compared to the first position. This provides the cartridge 116 (and heat sink 256) with longitudinal clearance to move to the insertion position.

In some embodiments, moving the driving member 268 between the first and second positions may include inflecting the toggle joint 316. Toggle joint 316 may have a maximum longitudinal length 328 at an intermediary position between the first and second positions. An advantage of this design is that the inflection operates to retain the toggle joint 316 in the first position (FIG. 30) until a deliberate force is applied to overcome the inflection and move the toggle joint 316 to the second position (FIG. 31). The force required to overcome the inflection may be based on a resilient compression or deformation of cartridge 116 or toggle joint arms 320 at the point of inflection, or a biasing member 332 for example.

Still referring to FIGS. 30 and 31, in the illustrated example, biasing member 332 is connected to toggle joint 316 and acts to resist longitudinal lengthening of toggle joint 316. In some embodiments, biasing member 332 may also bias toggle joint 316 to the second position (FIG. 31). Biasing member 332 can be any biasing device, such as a tensile spring or elastic band for example.

Openable End Wall

Figure 33:
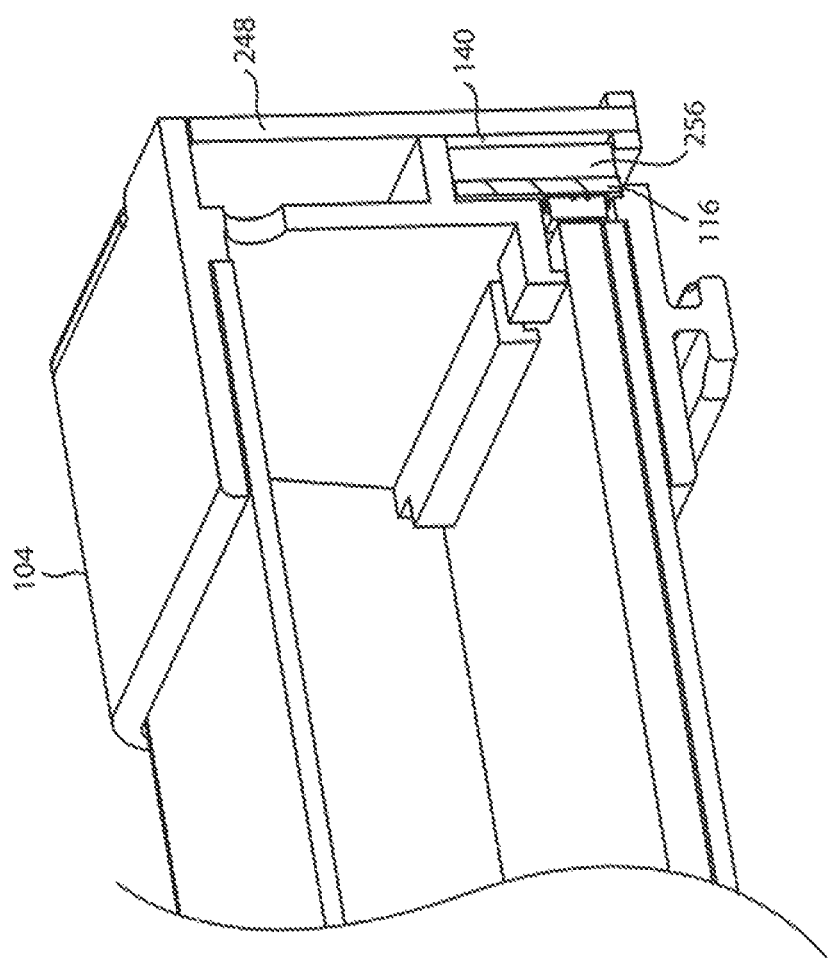
FIG. 33 is a cross-sectional view of an LED light source in accordance with another embodiment.
Figure 35:
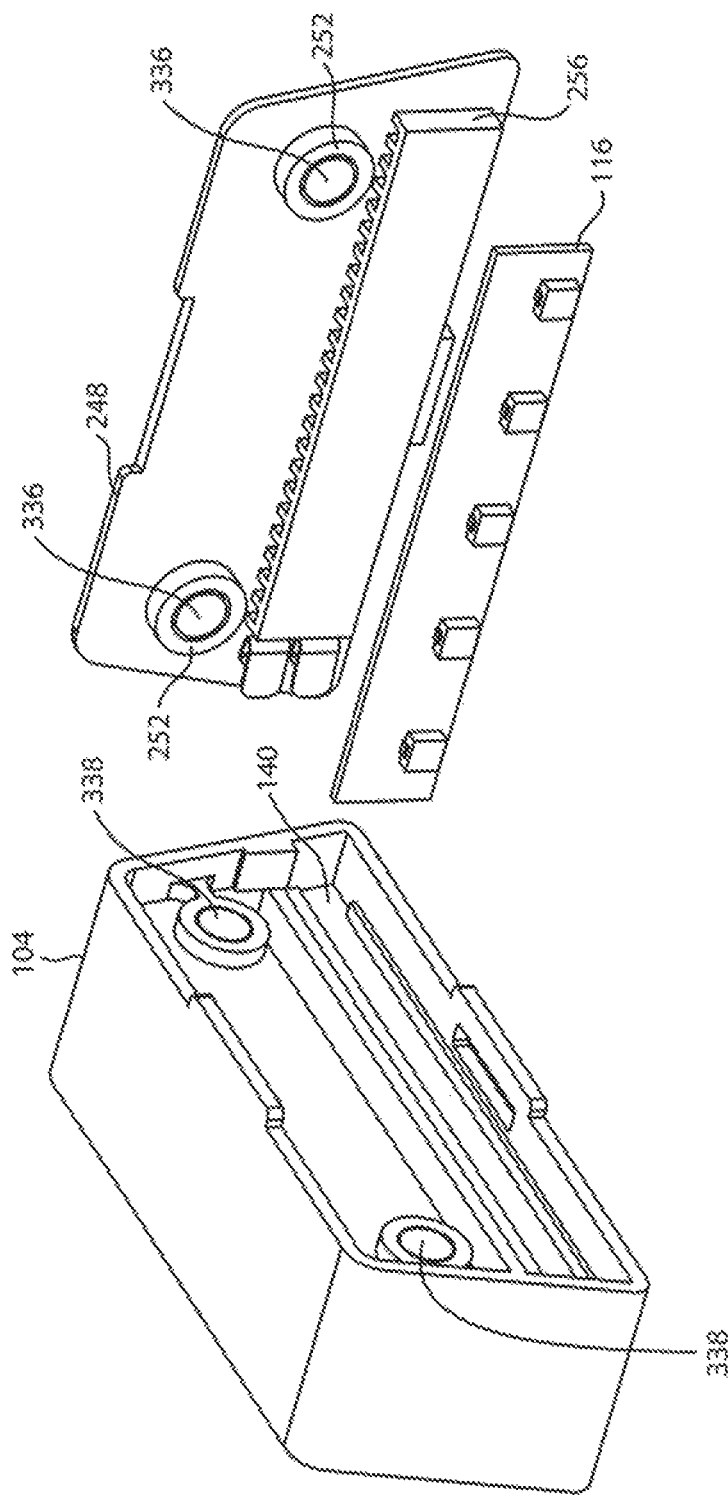
FIG. 35 is a perspective view of the housing end member of FIG. 34 in an open condition.

In accordance with another aspect of this disclosure, which may be used with one or more other aspects disclosed herein, the housing 104 may have an openable end wall to assist in moving the cartridge to the inserted position. As exemplified in FIGS. 33-35, housing end wall 248 may be movable (e.g. removable or openable) to provide access to housing recess 140 to insert and remove cartridge 116, and closeable to hold cartridge 116 in the inserted position. In this regard, housing end wall 248 may be considered a driving member in that movement of housing end wall 248 may drive cartridge 116 into the inserted position.

Housing end wall 248 may be connected to housing 104 in any manner that allows housing end wall 248 to be moved (e.g. removed or opened) to provide access to housing recess 140 for inserting and removing cartridge 116. For example, housing end wall 248 may be translatable (e.g. slidably connected to housing 104), or rotatable (e.g. pivot ably connected to housing 104) while remaining connected to housing 104, or completely removable from housing 104 as shown. In the illustrated example, housing end wall 248 is removably connected to housing 104 by housing end wall fasteners 252.

Fasteners 252 may be any fastener suitable for removably connecting housing end wall 248 to housing 104. Further, housing 104 may include any number of fasteners 252. In the example shown, fasteners 252 include magnets 336. Each magnet 336 aligns with a magnetically attractable component 338 (e.g. another magnet or a ferromagnetic component) to form a mating magnetic pair, which connects housing end wall 248 to housing 104. The mating magnetic pairs may include a magnet 336 on housing end wall 248 and a magnetically attractable component 338 on housing 104, or vice versa. There can be any number of magnetic pairs. In the illustrated example, there are two magnetic pairs. In other embodiments, there may be just one, or greater than two magnet pairs.

In use, the user may disconnect fasteners 252 to move housing end wall 248 to obtain access to cartridge 116 in housing recess 140. For example, the user may manually (i.e. by hand) apply a removing force to housing end wall 248, which overcomes the closure force of magnets 336, to remove housing end wall 248 from housing 104. Cartridge 116 may then be removed for repair or replacement by a new cartridge.

Optionally, as exemplified, heat sink 256 may be provided with a housing having an openable end wall. In such a case, heat sink 256 may be connected to housing end wall 248. Heat sink 256 may be permanently connected to housing end wall 248. Alternatively, heat sink 256 may be removably connected to end wall 248. This can allow heat sink 256 to be easily cleaned, repaired, or replaced. In other embodiments, heat sink 256 is not connected to housing end wall 248, and instead removably positioned in housing recess 140 after cartridge 116 is inserted, before housing end wall 248 recloses housing recess 140. In other embodiments, cartridge 116 includes a heat sink 256.

Figure 36:
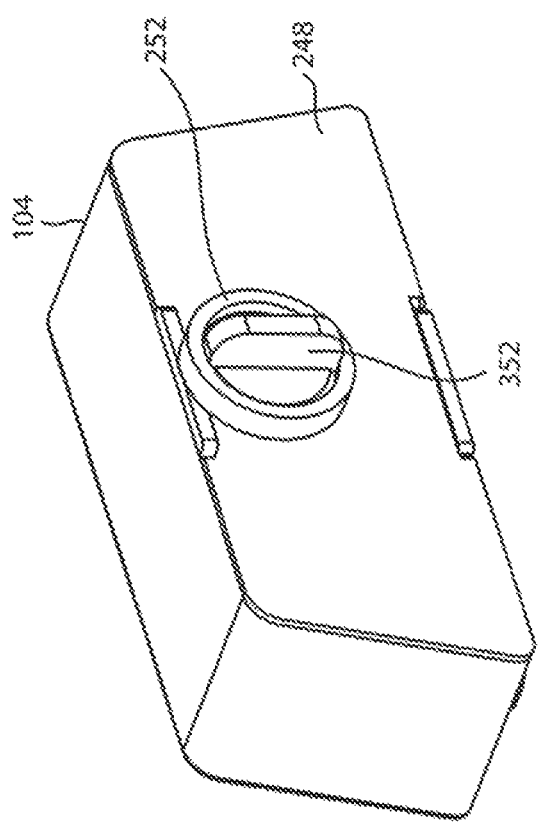
FIG. 36 is a perspective view of a housing end member in a closed condition in accordance with another embodiment.
Figure 37:
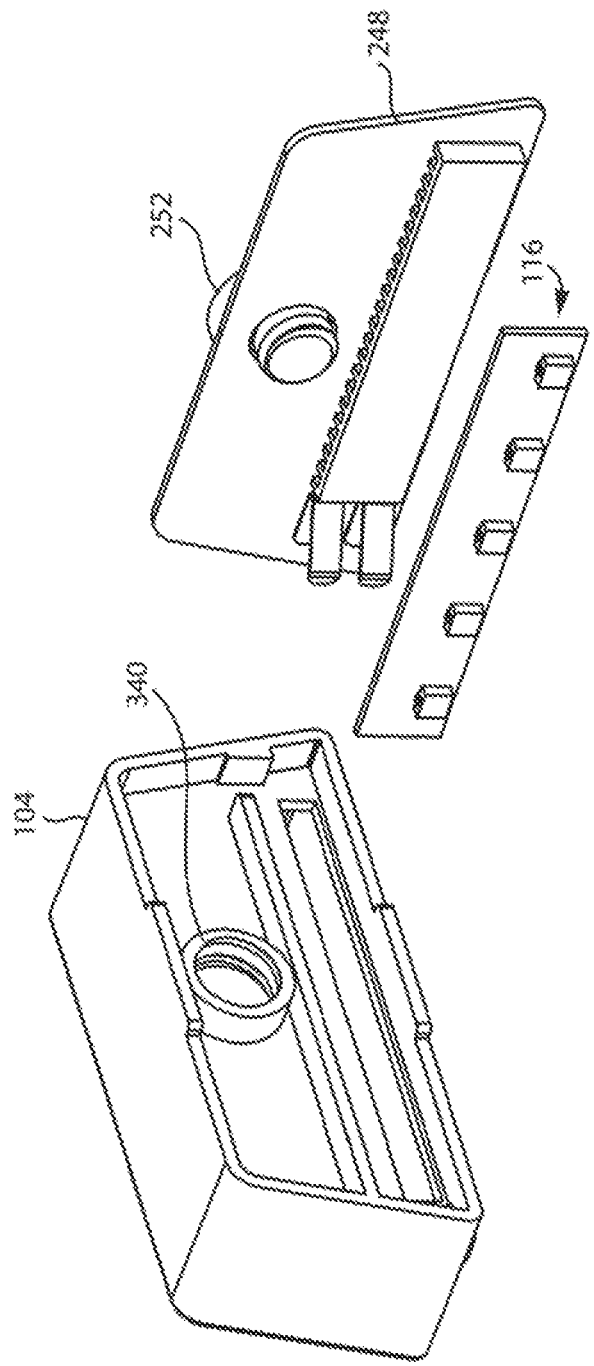
FIG. 37 is a perspective view of the housing end member of FIG. 36 in an open condition.
Figure 38:
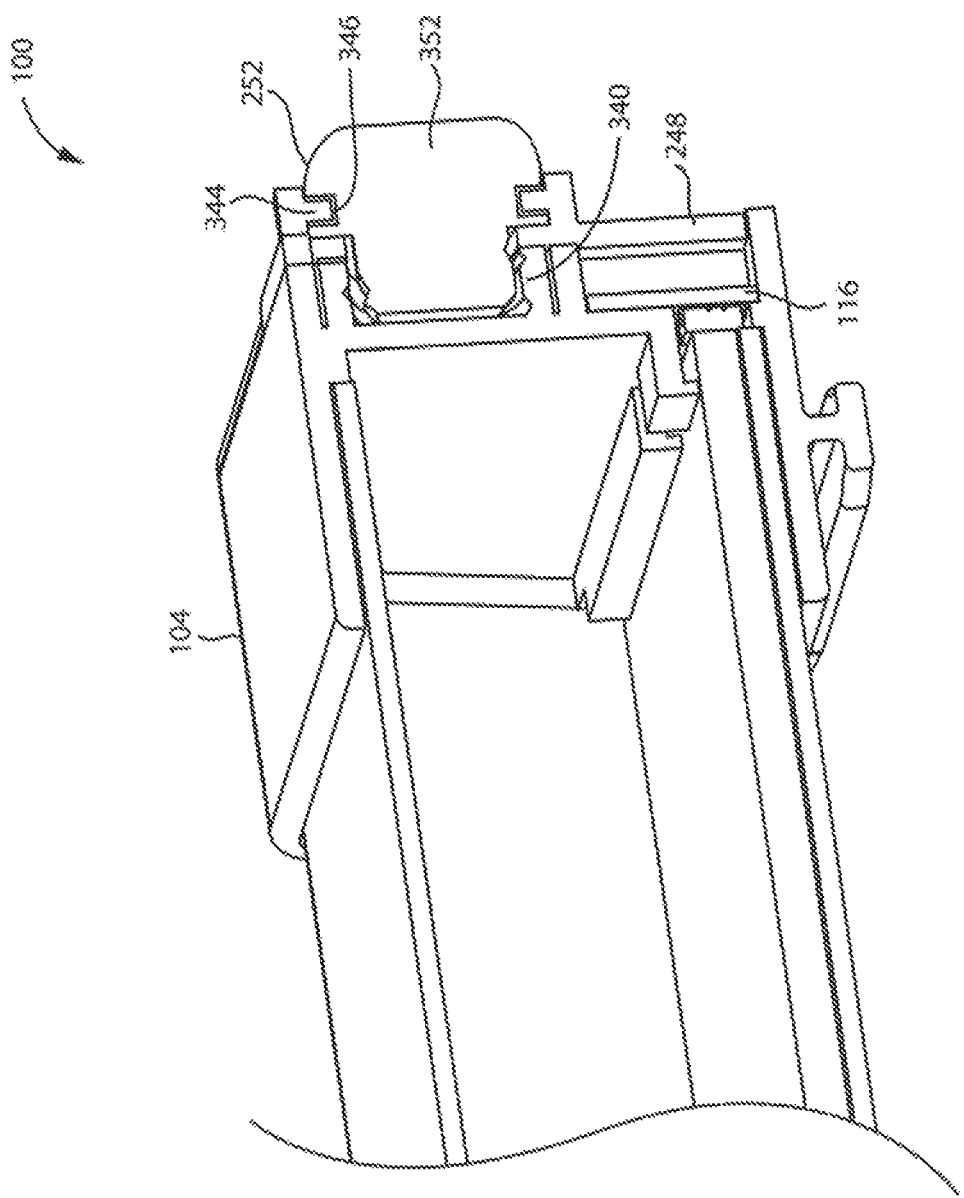
FIG. 38 is a cross-sectional view of an LED light source including the housing end member of FIG. 36.

Reference is now made to FIGS. 36-38. In some embodiments, the housing end wall fastener 252 may be a threaded fastener and housing 104 may include a threaded receptacle 340 to receive the threaded fastener 252. In use, threaded fastener 252 may be aligned with threaded receptacle 340 and rotated (e.g. using a tool or by hand) to drive the threaded fastener 252 into threaded receptacle 340, thereby joining housing end wall 248 to housing 104. In the reverse case, threaded fastener 252 may be rotated to withdraw threaded fastener 252 from threaded receptacle 340, whereby housing end wall 248 can be separated from housing 104.

Threaded fastener 252 may be configured to remain connected to housing end wall 248 when housing end wall 248 is removed from housing 104. An advantage of this design is that it avoids having to separately handle and store threaded fastener 252 and housing end wall 248 while, e.g. cartridge 116 is removed and replaced. This can be a real convenience where, for example there are hundreds or thousands of LED light sources 100 to service in a facility. As shown, threaded fastener 252 may be connected to housing end wall 248 in any manner that allows threaded fastener 252 freedom to rotate. In the illustrated example, housing end wall 248 includes a shoulder 344, which is received in a groove 346 formed in threaded fastener 252 to rotatably connect threaded fastener 252 to housing end wall 248.

Threaded fastener 252 may be rotatable by hand or using a tool (e.g. screw driver). An advantage of a hand rotatable threaded fastener 252 is that no tool is required. An advantage of a tool rotatable threaded fastener 252 is that it can be smaller and more tamper resistant. In the illustrated example, threaded fastener 252 includes a handgrip 352 which is readily grasped by hand and torqued to rotate threaded fastener 252 to tighten or loose threaded fastener 252. It will be appreciated that threaded fastener may alternately use a bayonet mount.

Figure 39:
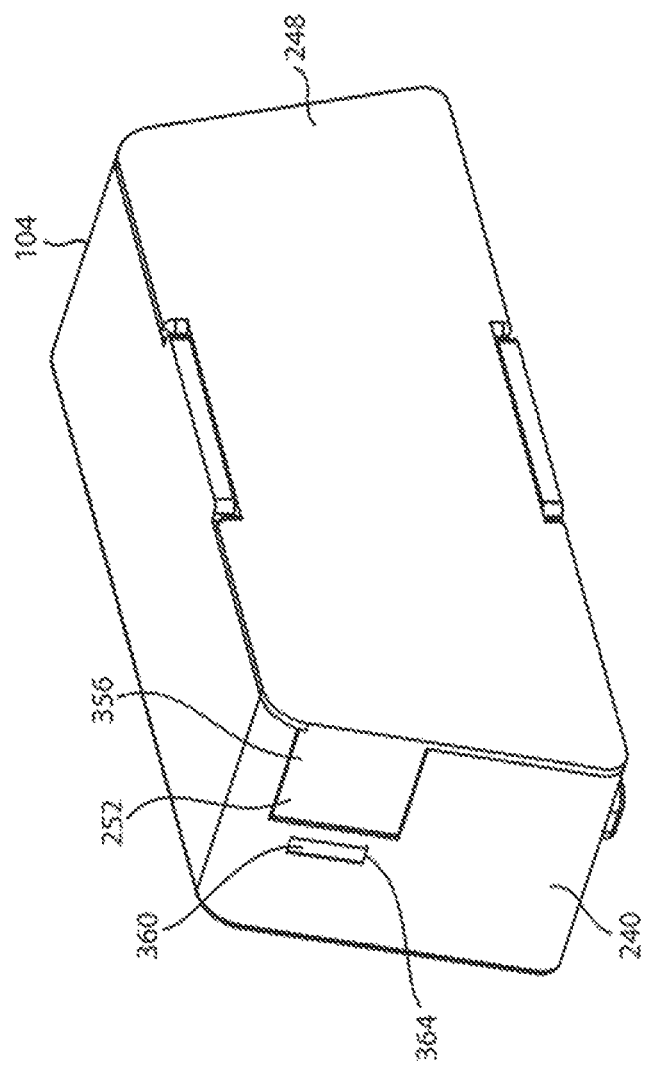
FIG. 39 is a perspective view of a housing end member in a closed condition, in accordance with another embodiment.
Figure 40:
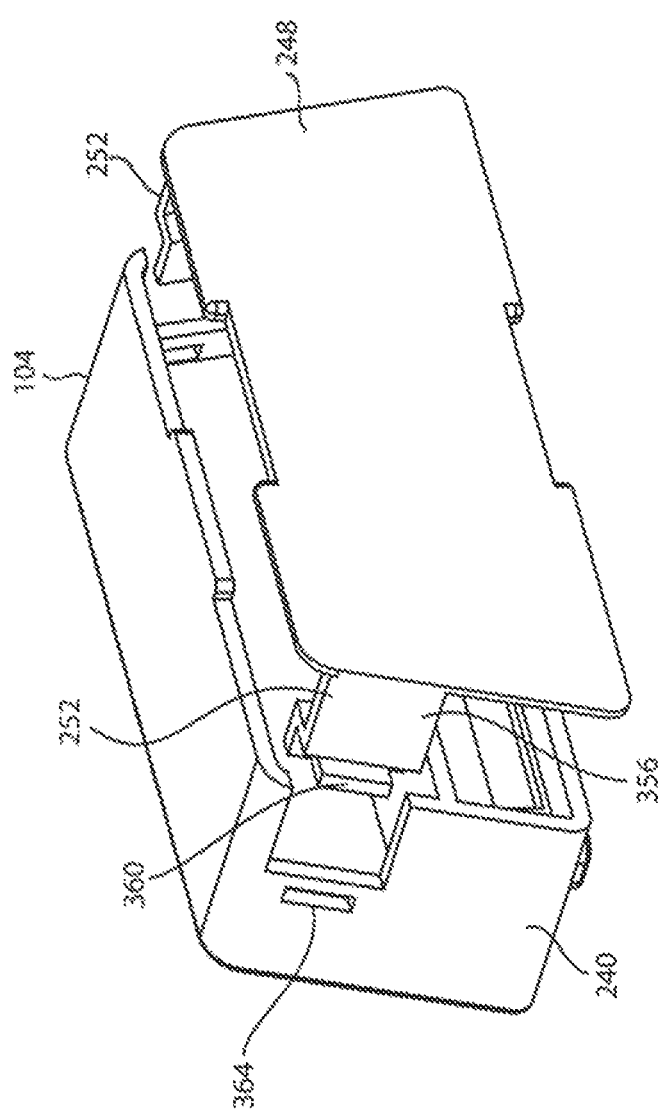
FIGS. 40-41 are perspective views of the housing end member of FIG. 39 in an open condition.
Figure 41:
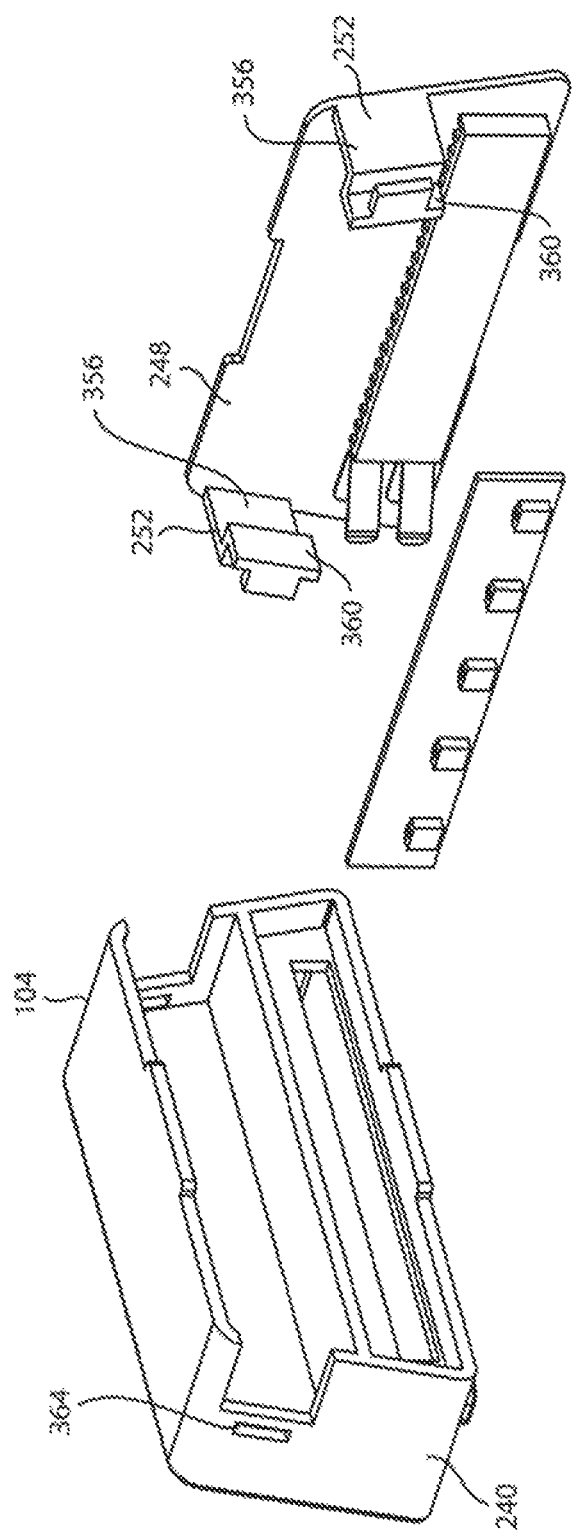
Figure 42:
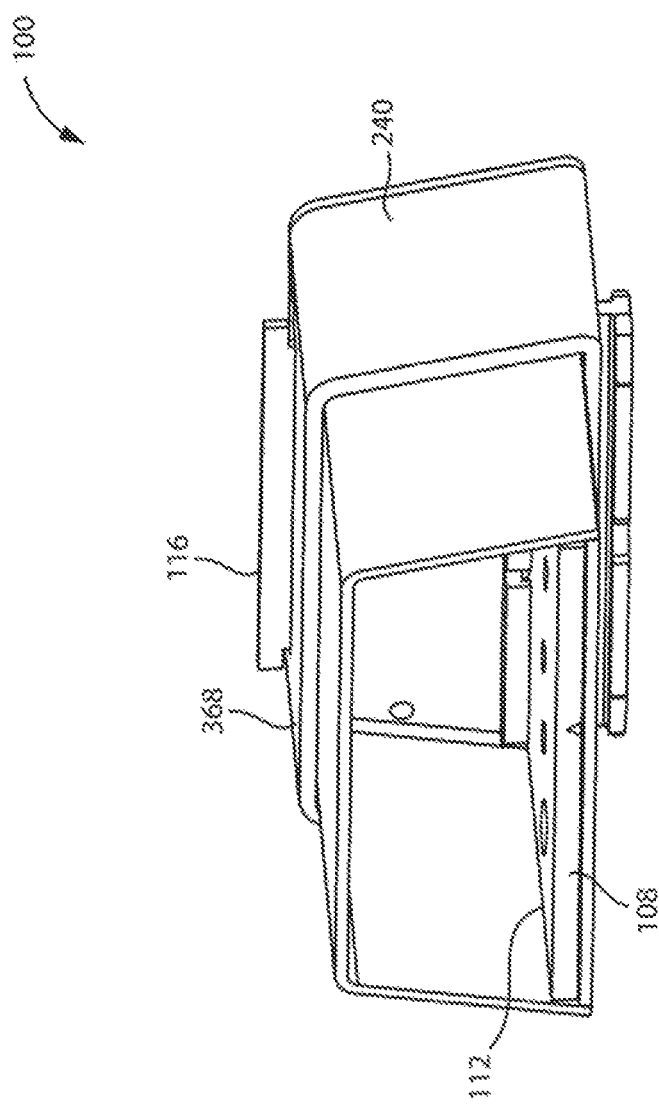
FIG. 42 is a cross-sectional view of an LED light source in accordance with another embodiment.
Figure 43:
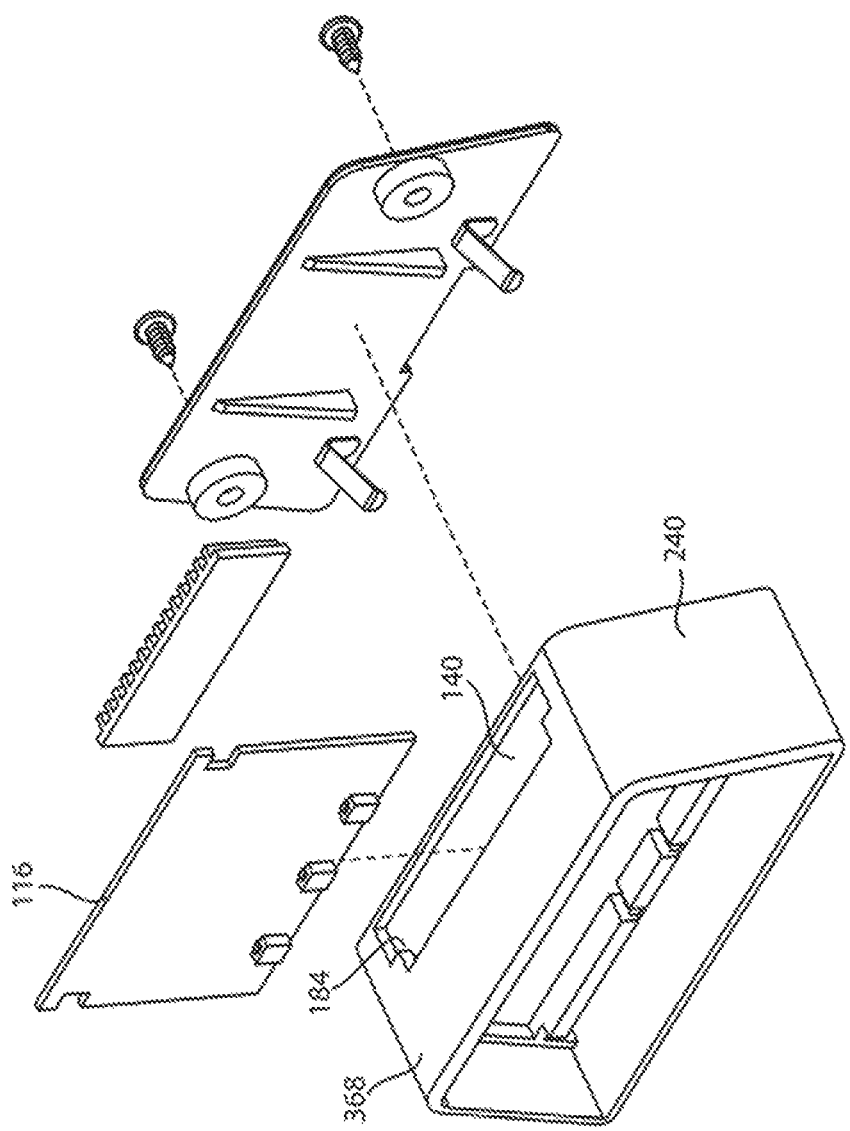
FIG. 43 is an exploded view of a housing end member of the LED light source of FIG. 42.
Figure 44:
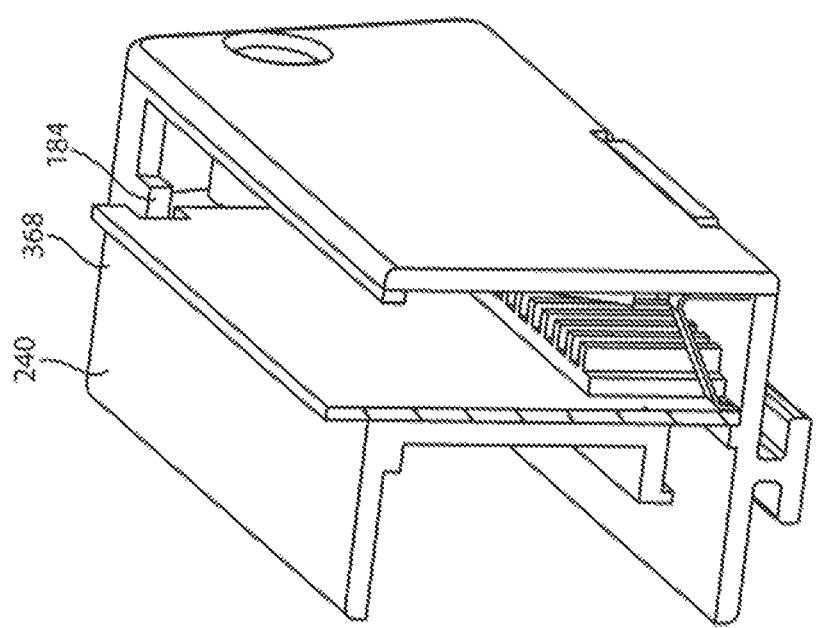
FIG. 44 is a cross-sectional view of the housing end member of FIG. 43 showing a cartridge in an inserted position.

Reference is now made to FIGS. 39-41. In some embodiments, fasteners 252 may be formed as buckles. An advantage of this design is that the buckles 252 may be easily integrally formed (e.g. molded or cast) with housing end wall 248, which can reduce the number of components and assembly costs. Buckles 252 may take any form that is selectively user operable to connect and disconnect housing end wall 248 and housing 104. In the illustrated example, each buckle 252 includes a resiliently flexible spring arm 356 including a hook 360 at a free end thereof. Housing sidewall 240 includes a recess 364 (e.g. an aperture) to receive each hook 360. In use, spring arms 356 are deflected inwardly and moved to align hooks 360 with their corresponding recesses 364, and then released to spring back outwardly whereby hooks 360 insert into recesses 364. In this state, buckles 252 connect housing end wall 248 to housing 104. To remove housing end wall 248 from housing 104, spring arms 356 may be again deflected inwardly to remove hooks 360 from their corresponding recesses 364, thereby freeing housing end wall 248 from connection to housing 104.

Use of Multiple Cartridges

In accordance with another aspect of this disclosure, which may be used with one or more other aspects disclosed herein, a single light source 100 may include a plurality of cartridges 116, which may be the same or different. FIG. 47 shows an example including one light guide 108, which receives light from one cartridge 116 received in one housing recess 140 of one housing end member 224. However, LED light source 100 can have any number of light guides 108 and any number of cartridges 116 in these and other embodiments. FIGS. 48-54 illustrate exemplary configurations of LED light source 100 having a plurality of light guides 108 and/or a plurality of cartridges 116.

FIG. 48 exemplifies an embodiment of LED light source 100 including one light guide 108 and two cartridges 116. As shown, each housing end member 224 may include a housing recess 140, and a cartridge 116 may be receivable in each housing recess 140 to emit light into the light guide 108. Each cartridge 116 is shown emitting light into a different one of light guide end faces 144 or 148. An advantage of this design is that it can allow for more even illumination and/or more control over the illumination of light guide 108. For example, cartridges 116 may be substantially identical and illuminate both of light guide end faces 144 and 148 with the same light intensity to provide more even illumination of light guide 108 across its longitudinal length 152. Alternatively, cartridges 116 may be different from each other to provide differential lighting intensity across light guide longitudinal length 152. In the illustrated example, cartridge 1161 has three LEDs 164, and cartridge 1162 has two LEDs 164. All else being equal, this may allow cartridge 1161 to illuminate light guide end face 144 with greater light intensity than the illumination of light guide end face 148 by cartridge 1162. This pattern of side-illumination may provide a desired light emission pattern from light guide 108 for the purpose of illuminating a subject in a desired manner (e.g. for better readability or visibility, or more dramatic effect).

FIG. 49 exemplifies an embodiment of LED light source 100 including two light guides 108 and two cartridges 116. As shown, housing end member 224 includes a housing recess 140 that holds two cartridges 116. Alternatively, housing end member 224 may include two separate recesses 140, each of which holds one cartridge 116. The light guides 108 are shown extending from opposite longitudinal ends 266 and 270 of housing end member 224. Cartridge 1161 and 1162 include LEDs 164 oriented to shine in opposite longitudinal directions so that cartridge 1161 emits light into light guide 1081, and cartridge 1162 emits light into light guide 1082. An advantage of this design is that cartridges 116 are centralized, which can simplify cartridges replacement. For example, where LED light source 100 is mounted high on a ceiling, a ladder may not need to be repositioned to access both cartridges 116. Instead, the central location of cartridges 116 in the same housing end member 224 may allow both cartridges 116 to be accessed (e.g. for repair or replacement) from one ladder position. Also, this design may be more compact and simpler to manufacture and assemble in that fewer housing end members 224 may be required, all else being equal.

FIG. 50 exemplifies an embodiment of LED light source 100 including two light guides 108 and four cartridges 116. As shown, housing 104 includes an inner end member 2241 between two outer end members 2242 and 2243. The first light guide 1081 is connected to end members 2241 and 2242, and the second light guide 1082 is connected to end members 2241 and 2243. Inner end member 2241 is shown carrying two cartridges 116 which have LEDs 164 oriented to direct light in longitudinally opposite directions into light guide end faces 144 or 148, substantially as described with respect to FIG. 49. Outer end members 2242 and 2243 are shown each carrying a cartridge 116 having LEDs 164 oriented to direct light into the light guide end face 144 or 148 of light guides 1081 and 1082 respectively. An advantage of this design is that it provides a central location in end member 2241 for two of the cartridges as discussed above with reference to FIG. 49, and also provides two sided illumination of light guides 108 for more even illumination and/or more control over the illumination of light guides 108 as discussed above with reference to FIG. 48. Also as discussed above with reference to FIG. 48, cartridges 116 may be identical to one another, or one or more (or all) of cartridges 116 may be different. In the illustrated example, cartridges 116 in inner end member 2241 are shown having five LEDs 164 each, and cartridges 116 in outer end members 2242 and 2243 are shown having three LEDs 164 each.

Figure 51:
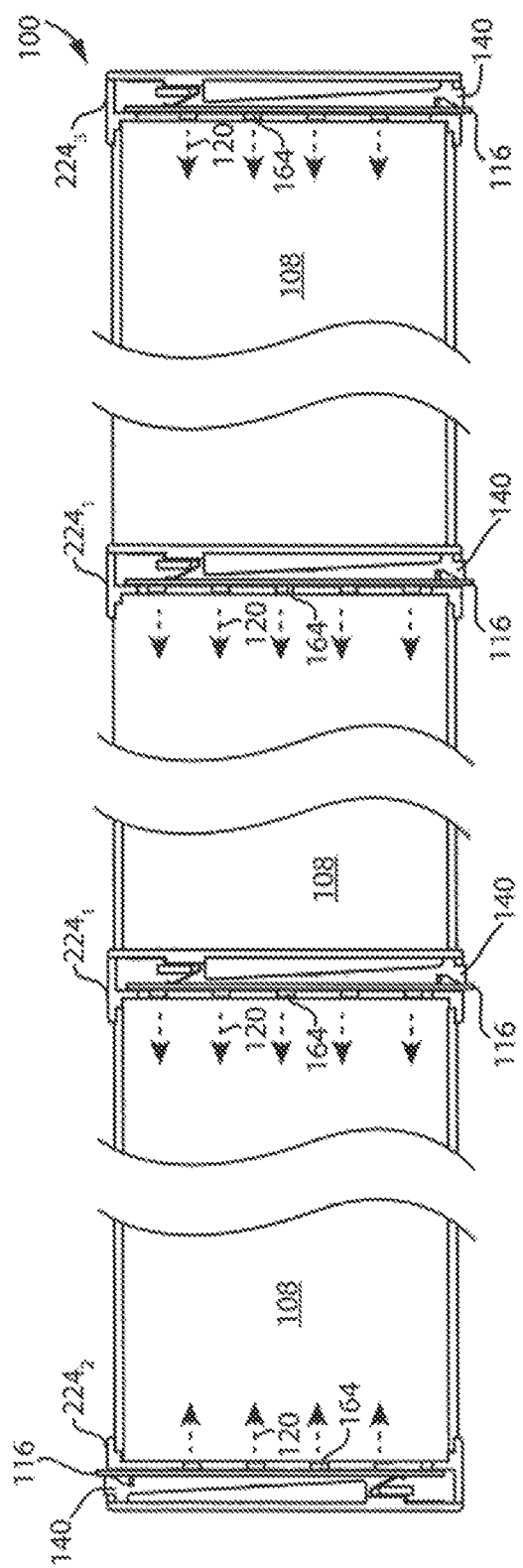
FIG. 51 is a schematic view of a LED light source including four cartridges in four housing end members, in accordance with an embodiment.
Figure 52:
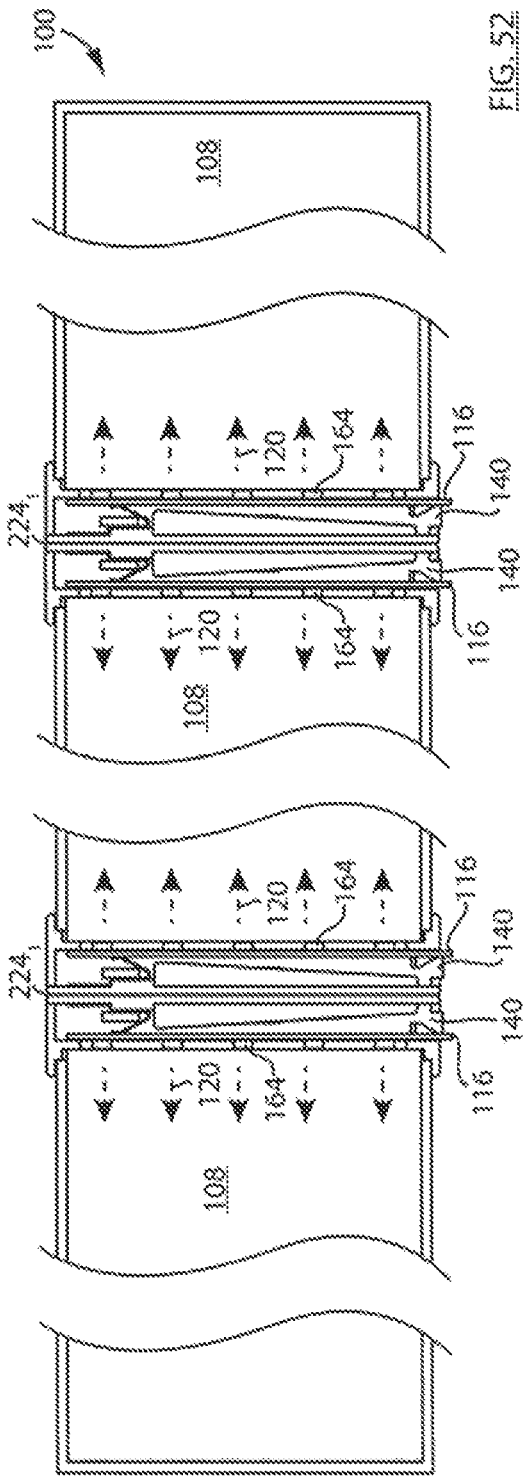
FIG. 52 is a schematic view of a LED light source including four cartridges in two housing end members, in accordance with an embodiment.

As exemplified in FIGS. 51-52, housing 104 may include any number light guides 108 connected longitudinally in series by any number of inner end members 2241. An advantage of this design is that this can allow for a compact and substantially continuous arrangement of light guides 108, such as for ceiling-mounted lighting of a large area room (e.g. office space). There may be one or two outer end members 2242 and 2243 as seen in FIG. 51, or these outer end members may be omitted as in FIG. 52. FIGS. 51-52 illustrate embodiments of LED light source 100 including three light guides 108. However, in alternative embodiments, there may be four or more light guides 108 arranged in series.

FIG. 51 exemplifies an example where each inner end member 2241 holds a cartridge 116 having LEDs 164 that collectively direct light into one of the adjacent light guides 108. Alternatively or in addition, one or more of inner end members 2241 may contain a plurality of cartridges 116 that together direct light in opposite longitudinal directions to illuminate both adjacent light guides 108 as in FIG. 52. As exemplified, each inner end member 2241 may include two housing recesses 140 arranged back-to-back to receive cartridges 116 with LEDs 164 oriented to face opposite longitudinal directions.

As exemplified in FIG. 53, LED light source 100 may include a plurality of cartridges 116 which are arranged to emit light into a single light guide end face 144 or 148. In other words, LED light source 100 may include a many-to-one relationship of cartridges 116 to illuminated light guide end face 144 or 148. An advantage of this design is that it allows one cartridge 116 containing a subset of the LEDs 164 which illuminate the end face 144 or 148 to be replaced, instead of replacing a cartridge 116 containing all of the LEDs 164 illuminating that end face 144 or 148. As a result, the number of working LEDs 164 that are removed when a cartridge 116 is replaced due to one or more failed LEDs 164 may be reduced.

Any number of cartridges 116 may be positioned to illuminate a light guide end face 144 or 148. In the illustrated embodiment, each housing end member 224 is configured to receive four cartridges 116 that in pairs emit light into the same light guide end faces 144 or 148. Cartridges 116 may be positioned transversely side-by-side as shown, and/or stacked in the thickness dimension of light guide 108.

As exemplified in FIG. 54, an inner end member 2241 holding a plurality of cartridges 116 may include a heat sink 256 thermally connected to the plurality of cartridges 116 to dissipate heat generated by the plurality of cartridges 116. As shown, the heat sink 256 may be positioned between the cartridges 116. An advantage of this design is that it allows one heat sink 256 to service a plurality of cartridges 116, which can reduce the number of heat sinks 256 in LED light source 100. As a result, LED light source 100 may be lighter, less expensive, and easier to assemble than an LED light source 100 having a discrete heat sink 256 for each cartridge 116, all else being equal.

Non-Planar Light Guides

In accordance with another aspect of this disclosure, which may be used with one or more other aspects disclosed herein, the light guide 108 may have a light emitting surface 112 that is not planar. For example, the light emitting face may be round.

As exemplified in FIGS. 55-56, LED light source 100 is formed in the shape of a typical incandescent lightbulb having an engagement end 380 for insertion into a light fixture socket. Engagement end 380 may be any type of bulb base known in the art for electrical engagement with a light fixture socket. For example, engagement end 380 may be a screw base as shown (e.g. a medium base E27), a twist & lock base (e.g. a 10 mm GU10), or a pin base (e.g. a 9 mm G9). Similar to other embodiments, LED light source 100 includes a removable cartridge 116 that allows many or most components of LED light source 100 to be reused.

As shown, LED light source 100 may include a diffuser 136, a light guide 108, a cartridge 116, a housing 104, and a bulb engagement end 380. Cartridge 116 is removably mounted to housing 104 to emit light into light guide first end face 144, and light guide 108 re-emits the light from light emitting locations 114 towards diffuser 136 which radiates light outwardly. Cartridge 116 is electrically connected (e.g. by wires or wirelessly) to engagement end 380 to power the cartridge LED(s) 164. Engagement end 380 delivers power to cartridge 116 from an external power source when connected to a light fixture socket.

Light guide 108 can take any shape that allows light to propagate longitudinally through internal reflection and emit through light emitting locations 114 on a light emitting face 112. Earlier embodiments of light guide 108 (see, e.g. FIG. 2) show a light guide 108 formed as a thin sheet. An advantage of this design is that it allows light guide 108 to emit light across a large area light emitting face 112, which may be desirable for providing even lighting over large rooms (e.g. offices) for example. FIG. 56 exemplifies an alternative embodiment including a light guide 108 formed as a rod. An advantage of this design is that it provides a light emitting face 112 facing many directions at once (e.g. 360 degree coverage). This can be desirable where LED light source 100 is formed as a lightbulb for use in light fixtures designed for lightbulbs that emit light in all directions (as in a traditional incandescent lightbulb). In the illustrated embodiment, light guide 108 is formed in the shape of a cylindrical rod having a circularly curved light emitting face 112. In other embodiments, light guide 108 may be formed in the shape of a rod having a different cross-section, such as triangular, rectangular, oval, or another regular or irregular cross-sectional shape, which may be solid or hollow.

Diffuser 136 can take any shape suitable for receiving and radiating light from light guide 108. For example, diffuser 136 may be shaped according to any known light bulb shape, such as a standard incandescent light bulb shape (bulb shape "A") as shown. In other examples, diffuser 136 may have a bulb shape with a North American letter designation, such as A, B, BT, BR, C, CA, CW, CP, E, ER, F, G, HK, K, MB, MR, P, PAR, PS, R, S, and T among others. As discussed previously, diffuser 136 is at least partially translucent, and may be completely transparent.

Figure 103:
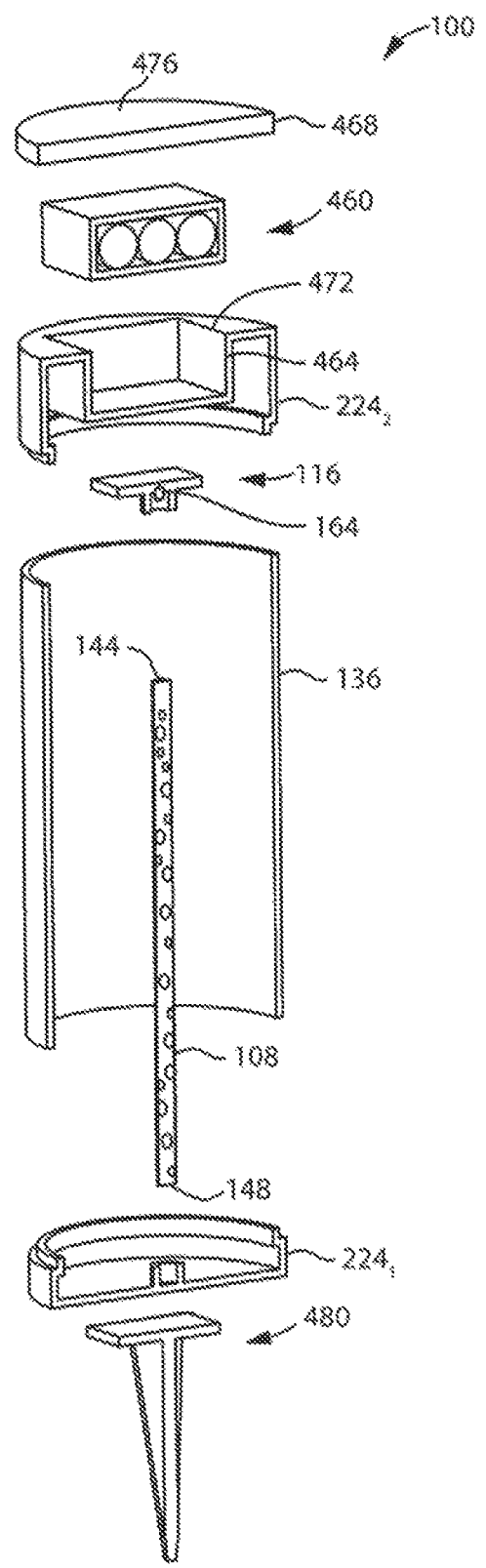
FIG. 103 is an exploded view of the cross-section of FIG. 102.
Figure 105:
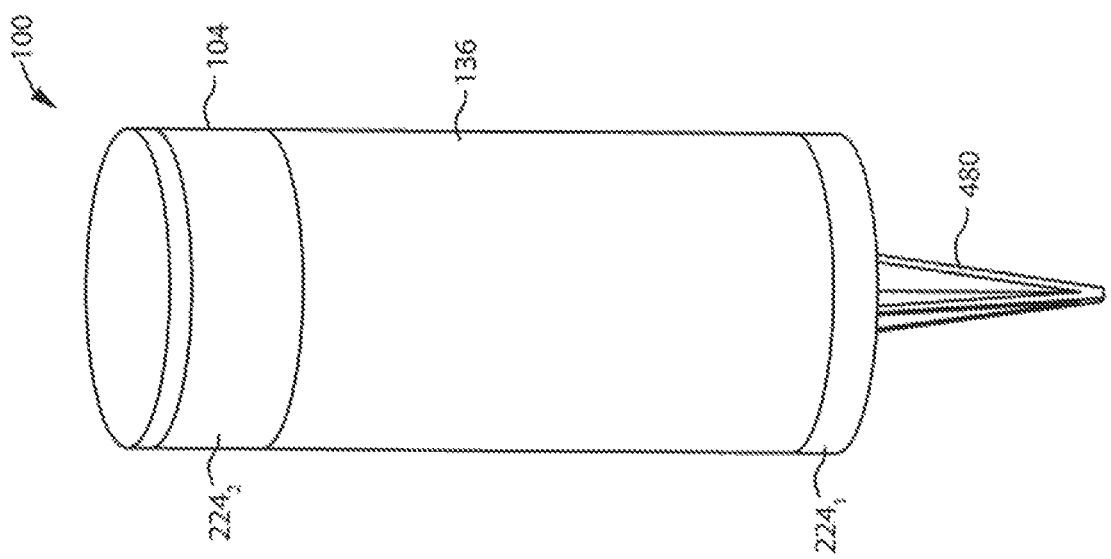
FIG. 105 is a perspective view of a LED light source including a mounting member in accordance with another embodiment.

As exemplified in FIGS. 101-103, LED light source 100 includes a diffuser 136 held between two housing end members 224. As show, light transmitting surface 136 has a substantially rectangular (e.g. square) cross-sectional shape. FIG. 105 shows another embodiment including a light transmitting surface 136 having a substantially circular cross-sectional shape. In other embodiments, light transmitting surface 136 can have any other regular or irregular cross-sectional shape.

Figure 57:
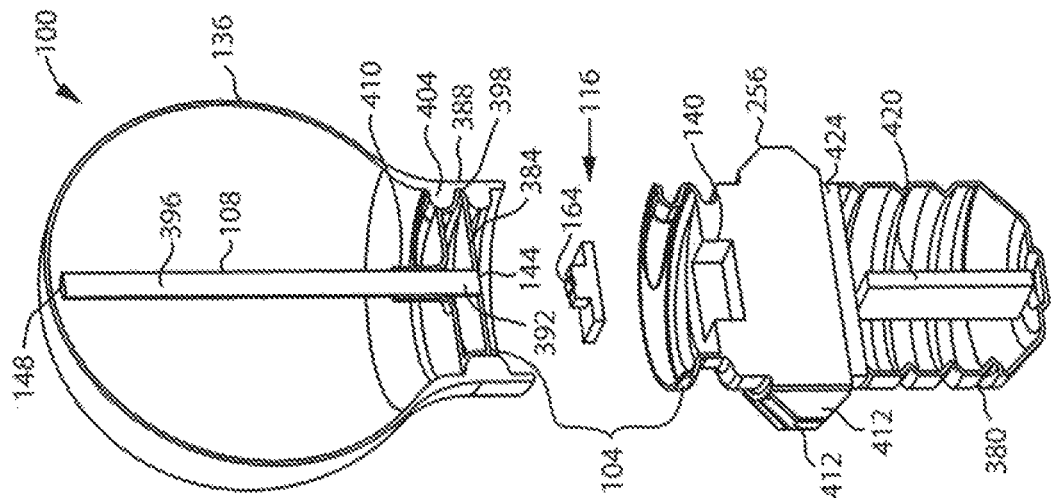
FIG. 57 is a cross-sectional view taken along line 57-57 in FIG. 55 showing an open condition and a cartridge removed.

Referring to FIGS. 56 and 57, light guide 108 extends within diffuser 136 to emit light towards diffuser 136 to be radiated outwardly. Light guide 108 may be secured within diffuser 136 in any manner. In the illustrated embodiment, LED light source 100 includes a light guide mount 384, which connects light guide 108 to diffuser 136. As shown, light guide mount 384 may be connected to diffuser 136 proximate diffuser lower end 388, and hold a lower portion 392 of light guide 108, whereby an upper portion 396 of light guide 108 extends upwardly away from light guide mount 384 into diffuser 136.

Light guide mount 384 may be secured to diffuser 136 in any manner. In the illustrated embodiment, light guide mount 384 is removably secured to diffuser 136. An advantage of this design is that is allows light guide mount 384 to be removed to access diffuser 136 for repair or replacement (e.g. replacement with a similar to different light guide 108). As shown, light guide mount 384 has external threads 398 which are sized to mate with internal threads 404 within light guide lower end 388. Alternatively, light guide mount 384 may be removably or permanently secured to diffuser 136 by a fastener (e.g. screws, bolts, rivets, hooks and loops, magnets, snaps), welds, or adhesives.

Light guide mount 384 can have any configuration suitable for holding light guide 108 within diffuser 136. In the illustrated embodiment, light guide mount 384 includes a recess or aperture 410 which is sized to receive light guide lower portion 392 with a press fit. Alternatively or in addition, light guide mount 384 may be connected to light guide 108 by screws, straps, adhesive, or welds for example. In some embodiments, light guide mount 384 may be integrally formed with light guide 108.

Still referring to FIGS. 56 and 57, cartridge 116 may be removably connected to housing 104 in any manner. In the illustrated example, housing 104 includes a housing recess 140 sized to receive cartridge 116. Cartridge 116 may fit into housing recess 140 with a press fit. Alternatively or in addition, cartridge 116 may be connected to housing 104 by a releasable fastener (e.g. screws, bolts, hooks and loops, magnets, or snaps).

Optionally, a heat sink may be provided. As exemplified, housing 104 includes a heat sink 256 that is thermally connected to cartridge 116 when cartridge 116 is connected to housing 104. As discussed previously, heat sink 256 can have any design suitable for removing heat from cartridge 116. In the example shown, heat sink 256 includes a plurality of fins 412 which extend outwardly from housing 104.

Housing 104 may be connected to diffuser 136 in any manner that holds the LED(s) 164 of cartridge 116 in close proximity (abutting or even in contact) with light guide first end face 144. Preferably, housing 104 is removably connected to diffuser 136. As exemplified in FIGS. 57-59, removing diffuser 136 can provide access to cartridge 116 for repair or replacement. Returning to FIGS. 56-57, housing 104 may have a removable threaded connection to diffuser 136. For example, housing 104 may include external threads 416 that are removably engageable with diffuser threads 404. Alternatively or in addition, housing 104 may be removably connected to diffuser 136 by another releasable fastener (e.g. screws, bolts, hooks and loops, magnets, bayonet mount, or snaps).

Controller

In accordance with another aspect of this disclosure, which may be used with one or more other aspects disclosed herein, LED light source 100 may include a controller 420, which is communicatively coupled to cartridge 116. Controller 420 may provide programmable and/or remote control of one or more aspects of the light emitted by the light source 100, (e.g., one or more of the light intensity, the number of LEDs that are energized, the color of the LEDs that are energized, the length of time that the LEDs are energized, the sequence in which the LEDs are energized). For example, controller 420 may be electrically interposed between bulb engagement end 380 and cartridge 116 to control the electrical power to cartridge 116.

Controller 420 may be integrated with cartridge 116. Alternatively, controller 420 may be a discrete component separate from cartridge 116, as shown in the illustrated embodiment. An advantage of this design is that it allows controller 420 to be reused as cartridge 116 is replaced, and allows controller 420 to be shielded from heat that cartridge 116 may generate. For example, a heat shield 424 formed of heat insulating material may be positioned between cartridge 116 and controller 420 to shield controller 420 from heat generated by cartridge 116. Heat shield 424 may be made of any thermally insulating material suitable for shielding controller 420 from the heat generated by cartridge 116 (e.g. having a thermal conductivity of less than 1 W/mK at 20° C.).

Figure 59:
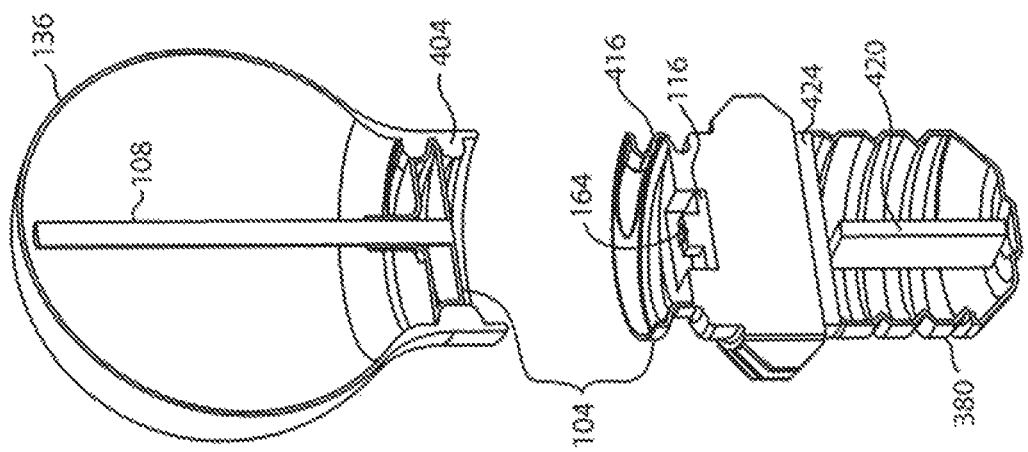
FIG. 59 is a cross-sectional view taken along line 57-57 in FIG. 55 showing the open condition.
Figure 58:
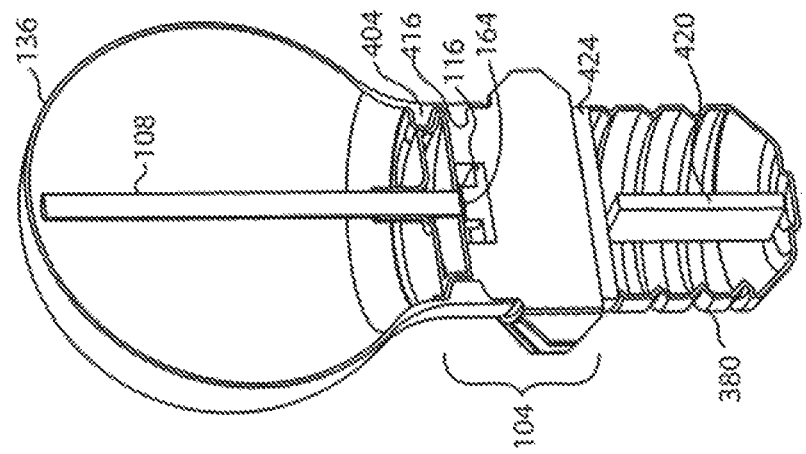
FIG. 58 is a cross-sectional view taken along line 57-57 in FIG. 55 showing a closed condition.

FIGS. 58, 59, and 57 illustrate a method of removing cartridge 116 from LED light source 100, such as for repair or replacement. As shown, diffuser 136 may be disconnected from housing 104 to expose cartridge 116, and then cartridge 116 may be removed from housing 104 and optionally replaced with a new or repaired cartridge 116.

Figure 62:
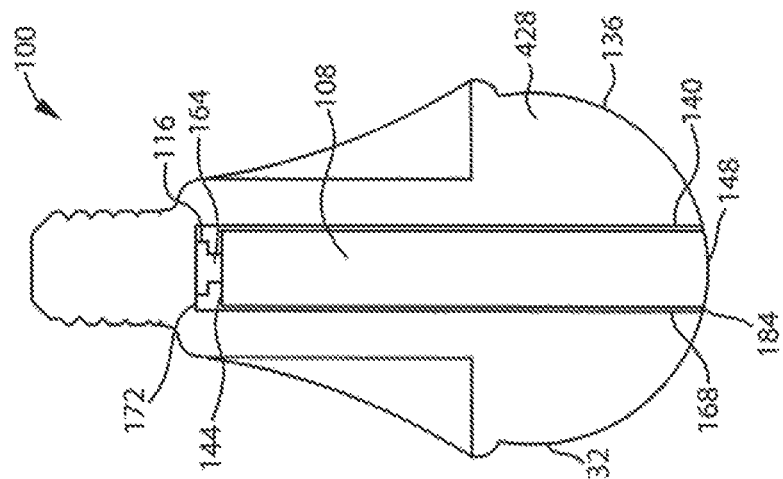
FIG. 62 is a cross-sectional view taken along line 62-62 in FIG. 60.
Figure 61:
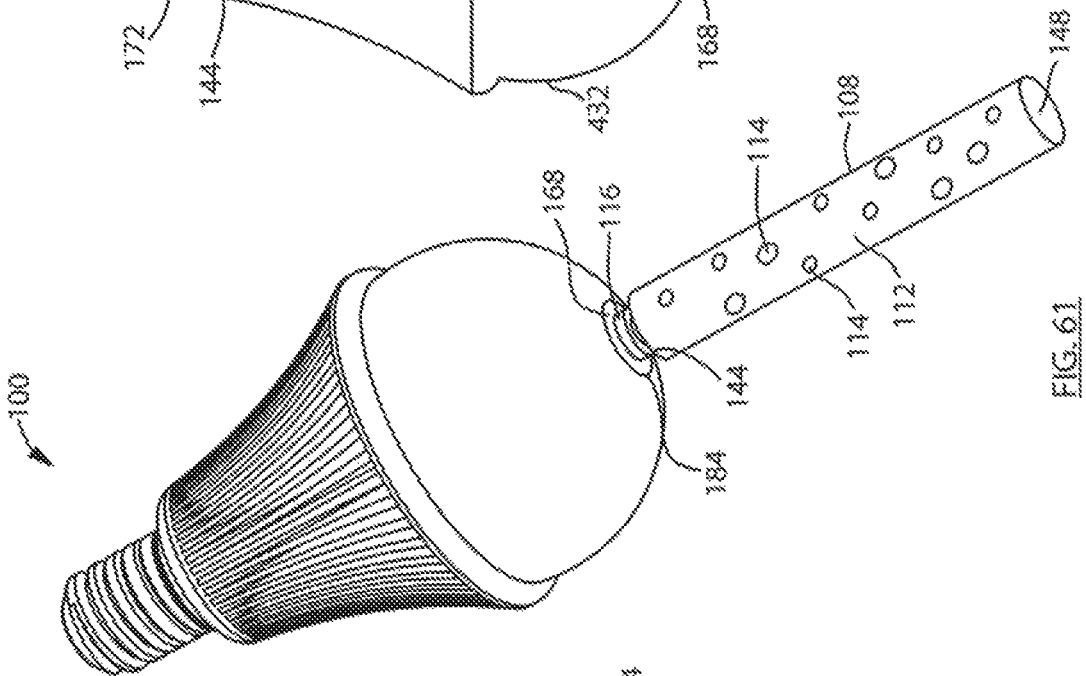
FIG. 61 is a perspective view of the LED light source of FIG. 60 with a cartridge removed.
Figure 60:
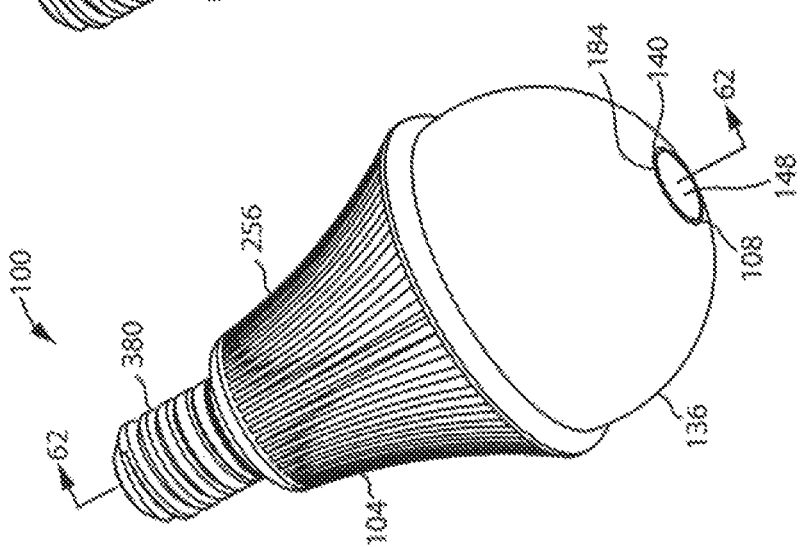
FIG. 60 is a perspective view of a LED light source formed as a light bulb in accordance with another embodiment.

FIGS. 60-62 illustrate an alternate method of removing cartridge 116. In the illustrated embodiment, LED light source 100 is formed as a light bulb including a bulb engagement end 380 and a housing 104. The housing 104 includes a diffuser 136 (also referred to as a light transmitting surface), and defines an interior 428. A cartridge 116 is receivable in the housing interior 428, and removable such as for repair or replacement. As exemplified, housing 104 includes a housing recess 140 having an insertion end 168 for inserting and removing cartridge 116 and light guide 108. When cartridge 116 and light guide 108 are inserted into housing recess 140, cartridge 116 is electrically connected to bulb engagement end 380 to receive power from a light fixture socket, and LED(s) 164 of cartridge 116 are oriented to emit light into light guide end face 144.

It will be appreciated that, in any embodiment, cartridge 116 and light guide 108 may together form a disposable and replaceable unitary component of LED light source 100. An advantage of this design is that it allows cartridge 116 to be well aligned and permanently connected to light guide 108, ensuring efficient transmission of light from cartridge 116 into light guide 108. Alternatively, cartridge 116 may be separable from light guide 108 so that light guide 108 can be reused in connection with many cartridges 116. An advantage of this design is that it allows more of LED light source 100 to be reused and less of LED light source 100 to be disposed, thus decreasing the cost of operating LED light source 100 and decreasing the size, weight, and environmental impact of the disposable components of LED light source 100.

Figure 65:
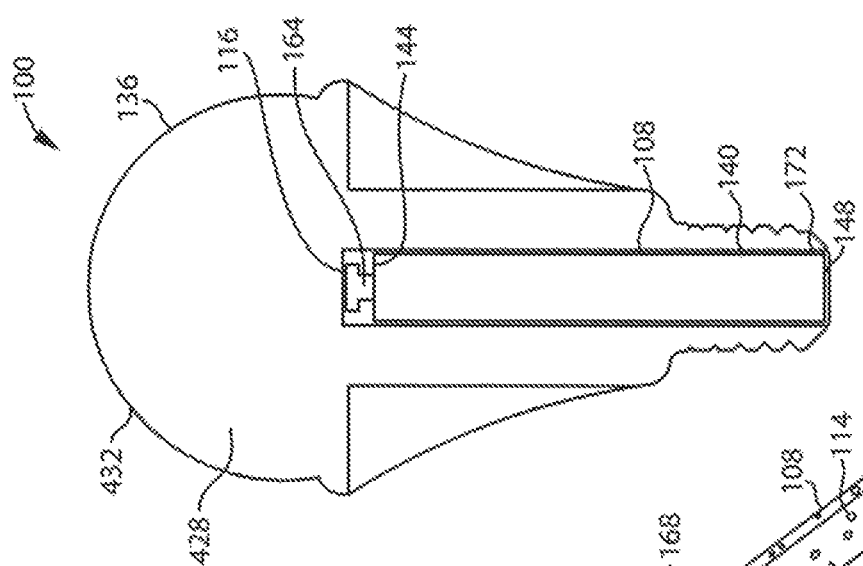
FIG. 65 is a cross-sectional view taken along line 65-65 in FIG. 63.
Figure 64:
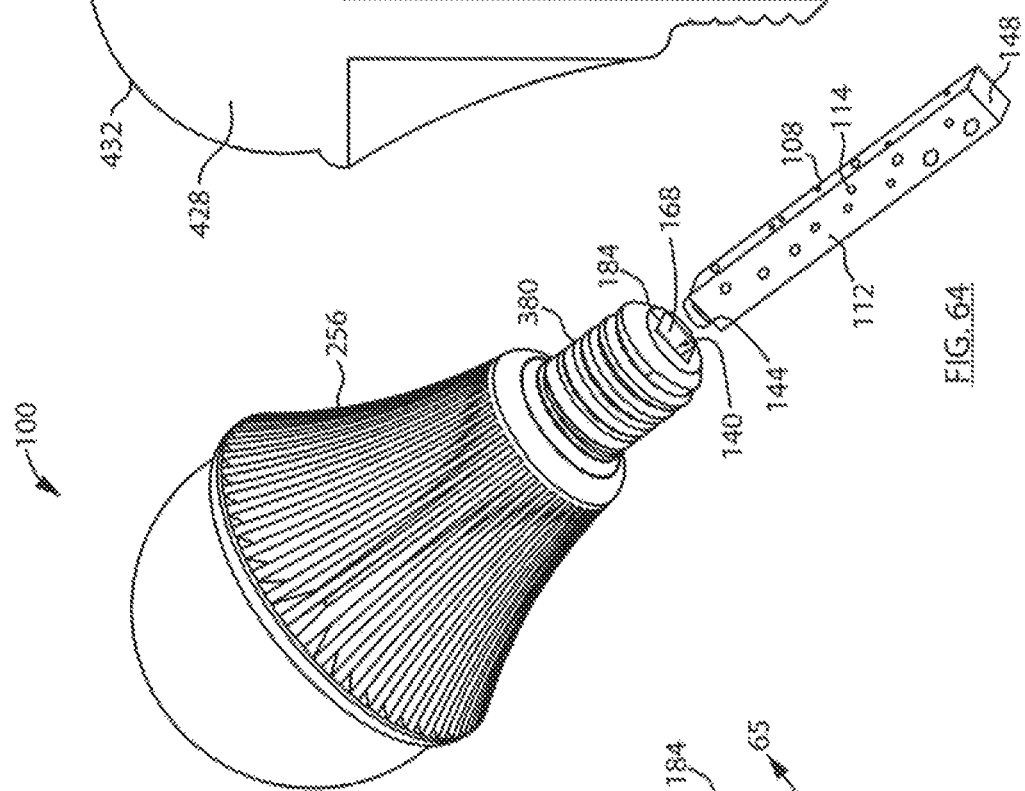
FIG. 64 is a perspective view of the LED light source of FIG. 63 with a cartridge removed.
Figure 63:
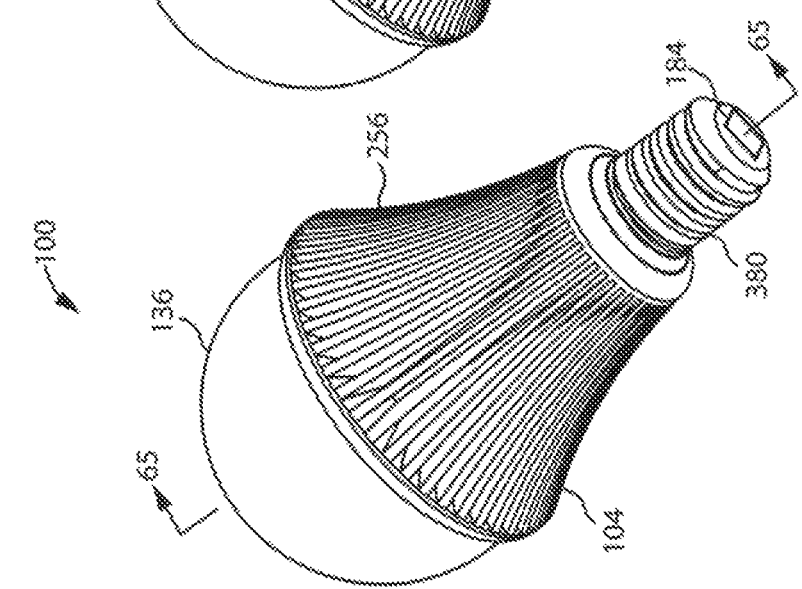
FIG. 63 is a perspective view of a LED light source formed as a light bulb in accordance with another embodiment.

Still referring to FIGS. 60-62, recess insertion opening 184 may be positioned anywhere proximate an outer surface of LED light source 100 that allows for user access to remove and replace cartridge 116. In the illustrated example, insertion opening 184 is provided on diffuser 136. An advantage of this design is that it provides user access to insertion opening 184 to remove and replace cartridge 116 while bulb engagement end 380 remains inserted in a light fixture socket. Reference is now made to FIGS. 63-65. In alternative embodiments, insertion opening 184 is provided on bulb engagement end 380. An advantage of this design is that cartridge 116 is prevented from being removed (accidentally or intentionally) while bulb engagement end 380 is inserted in a light fixture socket. This may be an important consideration in some environments, such as factories with heavy machinery that produce vibrations that may cause a cartridge to fall out. Also, this design allows diffuser 136 to have a contiguous outer surface without openings or holes that can allow dirt or liquids to enter. This may be advantageous for outdoor uses of LED light source 100.

Recess 140 can have any shape suitable for receiving light guide 108 and cartridge 116. FIGS. 60-65 illustrate embodiments having rod shaped light guides 108, including a cylindrical light guide 108 (FIGS. 60-62), and a square cross-section light guide (FIGS. 63-65). Recess 140 may be a bore hole in LED light source 100 shaped to correspond with light guide 108. For example, FIGS. 60-62 show a cylindrical recess 140, and FIGS. 63-65 show a square cross-section recess 140.

Referring to FIGS. 60-62, light guide second end face 148 may define a portion of LED light source outer surface 432 when inserted in recess 140. An advantage of this design is that it can allow easy access to remove light guide 108 to access cartridge 116 for repair or replacement. FIGS. 66-68 illustrate an alternative embodiment where LED light source 100 includes an end cap 440 that closes light guide 108 and cartridge 116 within recess 140, and which defines a portion of the LED light source outer surface 432. An advantage of this design is that end cap 440 may allow for better control over the character of the light emitted through light guide second end face 148. For example, end cap 440 may be constructed with similar or identical light transmission properties as diffuser 136 (diffusivity, color, etc.) such that light emitted from light guide second end face 148 through end cap 440 is characteristically similar to light emitted by light guide light emitting face 112 through diffuser 136.

Cartridge 116 may be positioned anywhere within recess 140 that allows cartridge LEDs 164 to emit light into a light guide end face 144 or 148. FIGS. 60-62 show an example in which cartridge 116 is positioned at recess inner end 172 proximate bulb engagement end 380. An advantage of this design is that it shortens the electrical connection distance between cartridge 116 and bulb engagement end 380, which may simplify the electrical wiring within LED light source 100. FIGS. 66-68 exemplify an alternate example in which cartridge 116 is positioned proximate recess insertion end 168 when inserted in recess 140. As shown, light guide 108 is positioned inwardly of cartridge 116. An advantage of this design is that it can allow access to cartridge 116 (e.g. for repair or replacement) without having to remove light guide 108.

Figure 71:
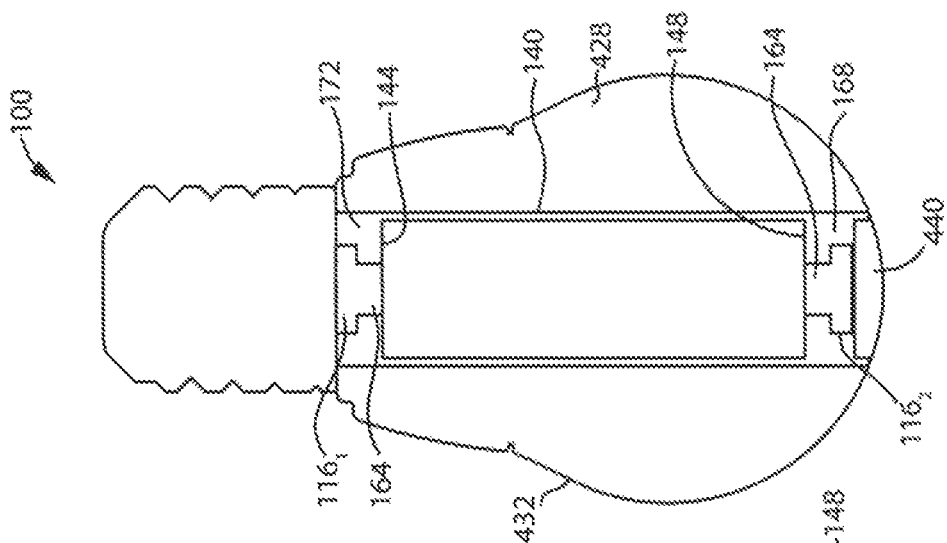
FIG. 71 is a cross-sectional view taken along line 71-71 in FIG. 69.
Figure 70:
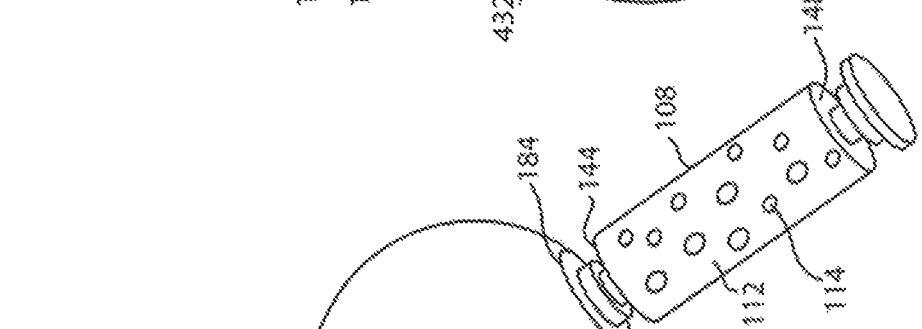
FIG. 70 is a perspective view of the LED light source of FIG. 69 with a cartridge removed.
Figure 69:
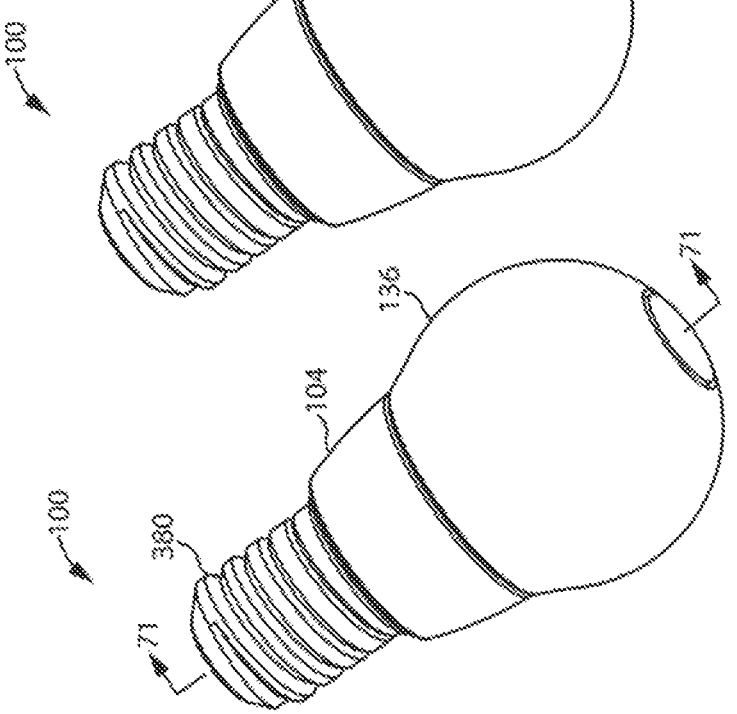
FIG. 69 is a perspective view of a LED light source formed as a light bulb in accordance with another embodiment.

FIGS. 69-71 illustrate another embodiment including a first cartridge 1161 positioned proximate recess inner end 172, a second cartridge 1162 positioned proximate recess insertion end 168, and a light guide 108 positioned between the first and second cartridges 1161 and 1162. Cartridge 1161 emits light into light guide first end face 144, and cartridge 1162 emits light into light guide second end face 148. An advantage of this design is that it allows for relatively greater and more even or controlled illumination of light guide 108. Cartridges 1161 and 1162 may be permanently connected to light guide 108, and disposable with light guide 108. Alternatively, cartridges 1161 and 1162 may be separable from light guide 108 so that light guide 108 can be reused with new or repaired cartridges 116.

Direct Emission of Light from an LED

Figure 74:
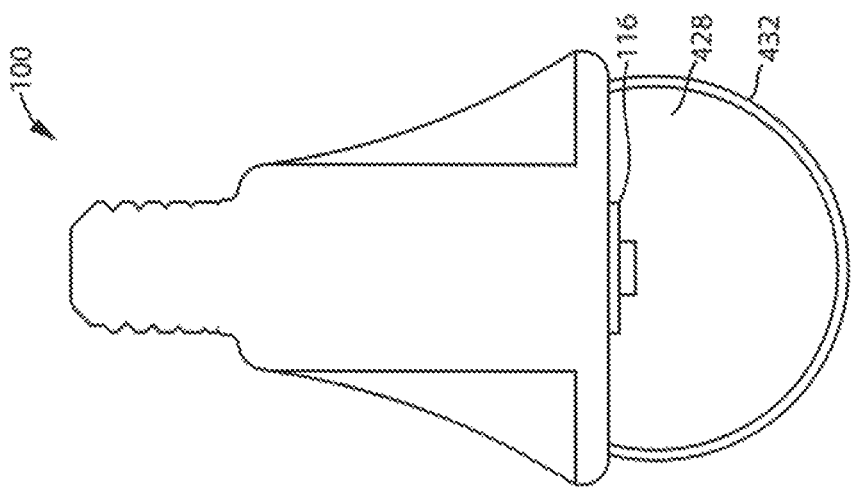
FIG. 74 is a cross-sectional view taken along line 74-74 in FIG. 72.
Figure 73:
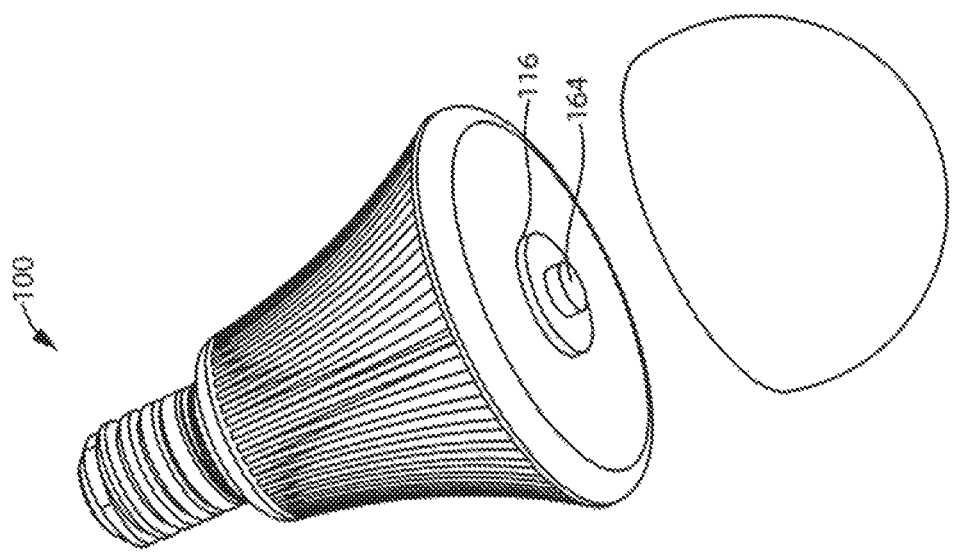
FIG. 73 is a perspective view of the LED light source of FIG. 72 with a diffuser removed.
Figure 72:
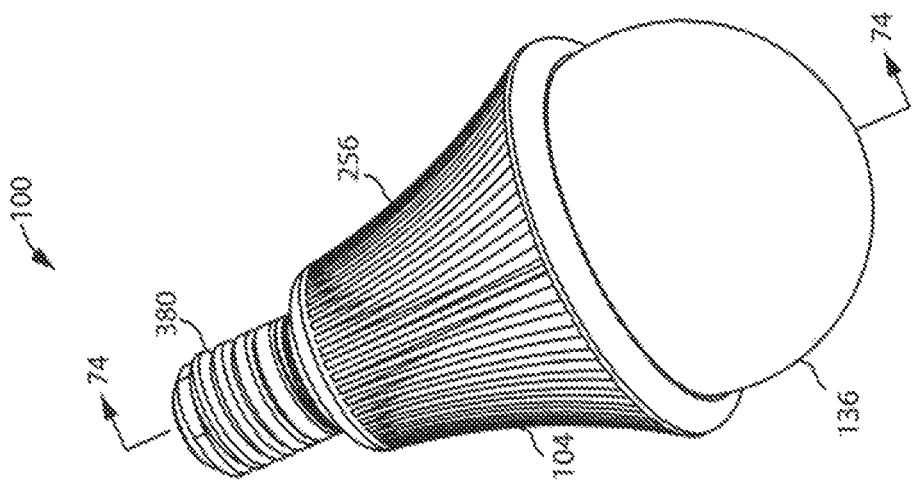
FIG. 72 is a perspective view of a LED light source formed as a light bulb in accordance with another embodiment.

In accordance with another aspect of this disclosure, which may be used with one or more other aspects disclosed herein, a light guide 108 may not be used. Instead, as exemplified in FIGS. 72-74, LED light source 100 may not include a light guide 108. An advantage of this design is that the light attenuation, cost, and complexity associated with including a light guide 108 is mitigated. In the illustrated example, cartridge 116 is removably connected to housing 104 beneath a diffuser 136. As shown, diffuser 136 may be removable to provide access to remove or replace cartridge 116.

Diffuser 136 can have any shape suitable for radiating light from cartridge 116 onto a subject to be illuminated. In the illustrated embodiment, diffuser 136 is dome-shaped, such that LED light source 100 has the shape of a typical incandescent light bulb. FIGS. 75-77 illustrate an alternate embodiment where diffuser 136 is substantially flat (e.g. planar), such that LED light source 100 has the shape of a halogen light bulb. As shown, housing 104 includes a recess 140 to accommodate cartridge 116 beneath the flat diffuser 136.

Figure 80:
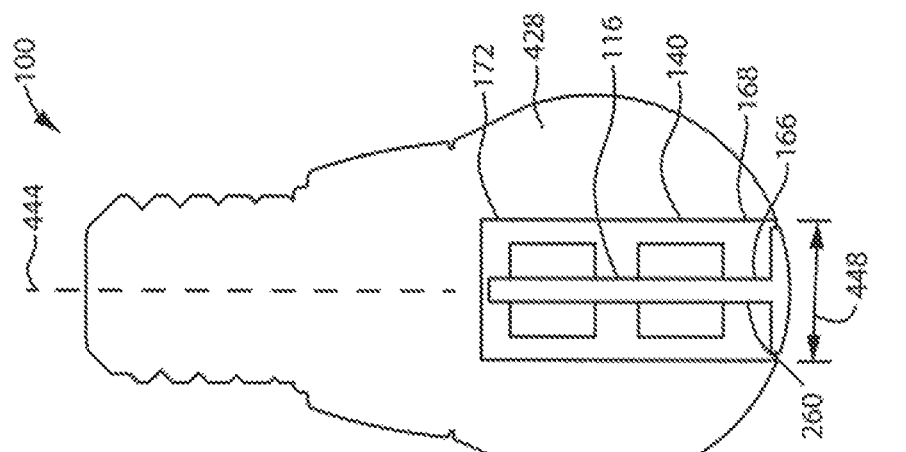
FIG. 80 is a cross-sectional view taken along line 80-80 in FIG. 78.
Figure 79:
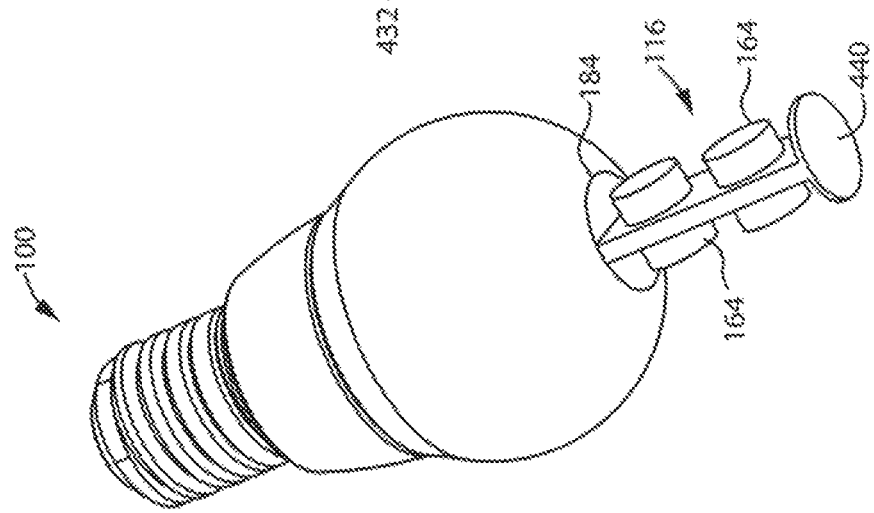
FIG. 79 is a perspective view of the LED light source of FIG. 78 with a cartridge removed.
Figure 78:
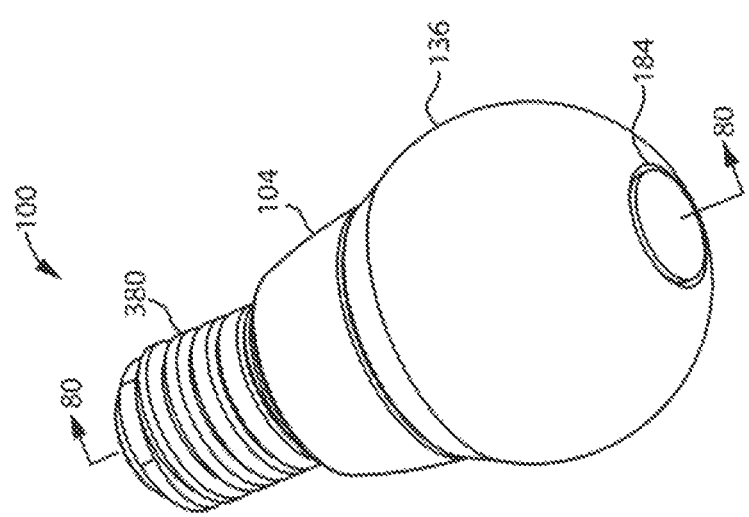
FIG. 78 is a perspective view of a LED light source formed as a light bulb in accordance with another embodiment.

Reference is now made to FIGS. 78-80. As shown, LED light source 100 may include a cartridge 116, containing a plurality of LEDs 164, which is removably receivable in housing interior 428. As shown, LED light source 100 may be free of light guides in some embodiments. Instead, cartridge 116 may emit light directly towards light transmitting surface 136. An advantage of this design is that it may reduce light attenuation associated with light transmission through a light guide.

LEDs 164 may be provided on any one or more faces of cartridge 116. In the illustrated embodiment, LEDs 164 are provided on a plurality faces, namely opposed cartridge faces 166 and 260. An advantage of this design is that it allows LEDs 164 to emit light in opposite directions, and thereby better illuminate light transmitting surface 136, which radiates the light onto the subject to be illuminated.

Each cartridge face 166 and 260 may include any number of LEDs 164 arranged in any configuration. In the illustrated embodiment, LEDs 164 are distributed and spaced apart longitudinally along the bulb axis 444. An advantage of this design is that it allows cartridge 116 to have a narrower width 448, and therefore require a smaller insertion opening 184 to be formed in light transmitting surface 136.

Figure 83:
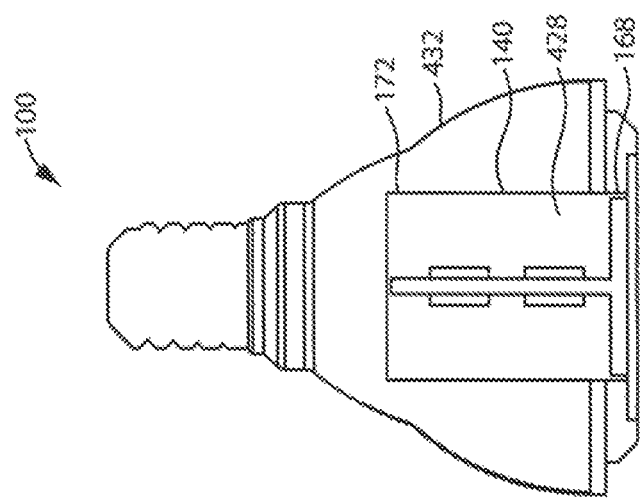
FIG. 83 is a cross-sectional view taken along line 83-83 in FIG. 81.
Figure 82:
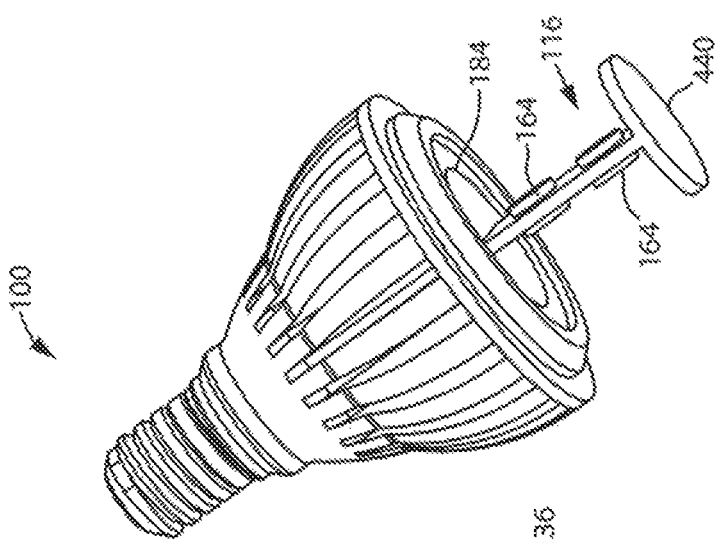
FIG. 82 is a perspective view of the LED light source of FIG. 81 with a cartridge removed.
Figure 81:
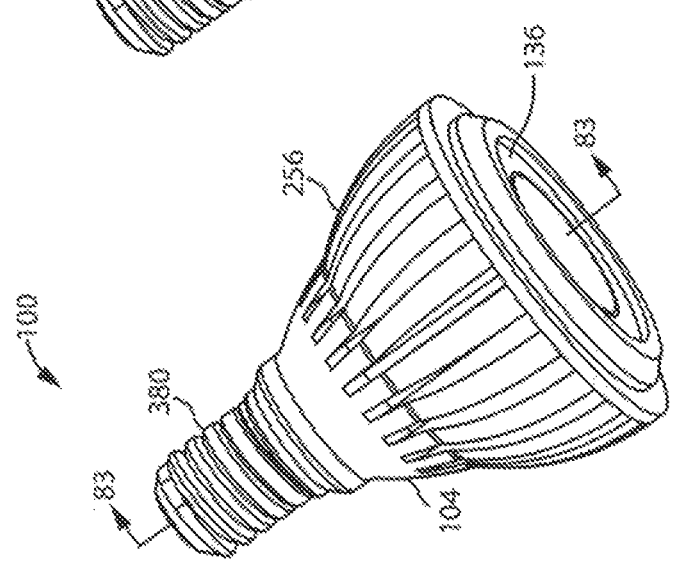
FIG. 81 is a perspective view of a LED light source formed as a light bulb in accordance with another embodiment.

FIGS. 81-83 illustrate an embodiment of LED light source 100 similar to FIGS. 75-77, except, for example that LED light source 100 has the shape of a halogen light bulb.

Also, housing 104 is shown including a heat sink 256. As shown, heat sink 256 may define an outer surface of housing 104 and may encircle cartridge 116 when cartridge 116 is received in housing interior 428. An advantage of this design is that it may provide an enlarged area heat sink 256, which can allow heat produced by cartridge 116 to be dissipated more efficiently.

Reference is now made to FIGS. 84-86. In some embodiment, cartridge 116 may not include an end cap 440. As shown, this can substantially reduce cartridge width 448, and consequently allow recess width 192 and insertion opening width 452 to be narrowed. As a result, light transmitting surface 136 may have a greater surface area, all else being equal.

In some embodiment, cartridge outer end portion 456 may extend outboard of light transmitting surface 136. An advantage of this design is that cartridge 116 may be more easily grasped by hand for removal and replacement. In other embodiments, cartridge 116 is wholly positioned within housing 104.

Reference is now made to FIGS. 87-89. In some embodiments, LED light source 100 may accommodate a plurality of cartridges 116 within housing 104. An advantage of this design is that it may allow just one cartridge 116 containing a subset of the LED light source's LEDs 164 to be replaced (while keeping the other cartridge(s) 116 in place), instead of having to replace a single cartridge 116 containing all of the LEDs 164 within light source 100. Consequently, fewer working LEDs 164 may be disposed when a cartridge 116 is removed due to one or more failed LEDs 164.

In the illustrated embodiment, housing 104 includes two recesses 140, each of which is sized to receive a cartridge 116. In alternative embodiments, housing 104 may include a recess 140 which can accommodate a plurality of cartridges 116. Cartridges 116 may be positioned and oriented anywhere within housing 104. In the illustrated embodiment, each cartridge 116 is aligned parallel with and spaced apart from bulb axis 444. An advantage of this design is that cartridges 116 may evenly illuminate light transmitting surface 136.

Reference is now made to FIGS. 90-93. Cartridge 116 may include any number of faces 166, each of which may include any number of LEDs 164. In the illustrated example, cartridge 116 has a cross-shape including eight cartridges faces 166, and each cartridge face 166 is shown including two LEDs 164. Thus, an advantage of having a cartridge 116 with many faces 166 is that it can accommodate a greater number of LEDs 164, which may collectively be capable of emitting greater light intensity, all else being equal.

In some embodiment, cartridge 116 may include a heat sink 256 positioned behind and between adjacent cartridge faces 166. For example, behind each cartridge front face 166 may be a cartridge rear face 260 which is thermally coupled to a heat sink 256. As shown, heat sink 256 may have a cross-shaped cross-section with outer faces 264 in thermal contact with cartridge rear faces 260. An advantage of this design is that it may provide a compact arrangement of cartridge faces 166 and effective dissipation of heat generated by LEDs 164.

Reference is now made to FIGS. 94-97. Recess 140 may be formed in any portion of housing 104, and may be oriented in any direction. In the illustrated embodiment, housing recesses 140 are oriented transversely (e.g. perpendicularly) to bulb axis 444. As shown, this allows cartridges 116 to be inserted laterally into housing 104. An advantage of this design is that depending on the shape of LED light source 100, this may allow housing 104 to accommodate more cartridges 116 bearing more LEDs 164.

As shown, each cartridge 116 may be shaped and inserted like a tray bearing one or more LEDs 164 on one or more of its surfaces 166 and 260. In the illustrated example, there are three cartridges 116 and each cartridge includes one or more LEDs 164 on its upper surface 166. FIGS. 98-100 illustrate another embodiment including cartridges 116 having LEDs 164 provided on their lower surfaces 260. Alternatively, or in addition, one or more of cartridges 116 may have LEDs 164 on both surfaces 166 and 260.

Weather Sealing

In accordance with another aspect of this disclosure, which may be used with one or more other aspects disclosed herein, in some embodiments LED light source 100 may be weather-sealed. An advantage of this design is that it may allow LED light source 100 to be safely used in outdoor environments. As exemplified in FIGS. 75-77, housing 104 is shown including a seal 436 (e.g. a resiliently deformable member, such as an O-ring) that engages with diffuser 136 (e.g. by physical contact) when diffuser 136 is connected to housing 104. As shown, seal 436 may be provided on an outer surface 368 of housing 104 surrounding cartridge 116, and engage with a rear surface 174 of diffuser 136. Alternatively, or in addition, diffuser 136 may include a seal 436 that engages housing 104 when diffuser 136 is connected to housing 104. In any case, seal 436 may inhibit the passage of liquid, dirt, and/or air through the interface of diffuser 136 and housing 104, thereby protecting cartridge 116 within.

Energy Storage Member and/or Energy Generating Member

In accordance with another aspect of this disclosure, which may be used with one or more other aspects disclosed herein, in some embodiments, LED light source 100 may include an energy storage member 460 and/or an energy generating member 476 (see for example FIGS. 101-103). Energy storage member 460 may be any device suitable for powering cartridge 116. In some embodiments, energy storage member 460 has sufficient power capacity when charged to power cartridge LEDs 164 to at least 60% power rating for at least an hour. For example, energy storage member 460 may be one or more batteries or supercapacitors. An advantage of this design is that it can allow LED light source 100 to operate while untethered to an external power source, such as mains electric power. Further, it may be useable as an emergency lighting source when there is a power outage.

The energy storage member may be provided at any location. For example, the energy storage member may be provided in the apparatus itself, for example, a lighting fixture, a frame as discussed subsequently or any other apparatus that has the LED light source. Alternately, the energy storage member may be part of a power cord that electrically connects the apparatus to a power outlet (e.g., a household power outlet). Therefore, the energy storage member may be provided in or as part of the electrical plug that is plugged into a wall outlet or in line with the power cord that extends between the electrical plug and the apparatus.

As exemplified, energy storage member 460 may be positioned within housing 104. For example, housing 104 may include an energy storage recess 464 sized to accommodate energy storage member 460. In some embodiments, as discussed previously, energy storage recess 464 may be weather sealed to inhibit entry of water, snow, and dirt into storage recess 464 when closed. An advantage of this design is that it can allow LED light source 100 to be used outdoors or in other hazardous environments. For example, energy storage recess 464 may include an insertion opening 472 for inserting energy storage member 460 into energy storage recess 464, and an energy storage recess cover 468 which closes and seals insertion opening 472.

Energy storage recess cover 468 may be movable between a closed position in which energy storage recess cover 482 closes insertion opening 472, and an open position in which energy storage recess cover 482 is moved away from insertion opening 472 to allow access to energy storage member 460. An advantage of this design is that it can allow access to energy storage member 460 for repair or replacement. In other embodiments, energy storage recess cover 468 is permanently connected or integrally formed with insertion opening 472, prohibiting energy storage recess 464 from opening once closed. An advantage of this design is that it can provide a more robust seal between recess cover 468 and insertion opening 472.

In some embodiments, LED light source 100 may alternately or in addition include an energy generating member 476 that is electrically connected to energy storage member 460 and/or the LEDs. An advantage of this design is that it can continuously or periodically recharge energy storage member 460 to allow LED light source 100 to operate autonomously (i.e. without user interaction) for a prolonged period of time. In the illustrated embodiment, energy generating member 476 is a solar panel. As shown, solar panel 476 may form or be incorporated into energy storage recess cover 482. In other embodiments, energy generating member 476 may include a wind generator (not shown). In other embodiments, LED light source 100 may not include an energy generating member 476, and instead depend upon energy storage member 460 being recharged by other means or being replaced.

Mounting Member

Figure 104:
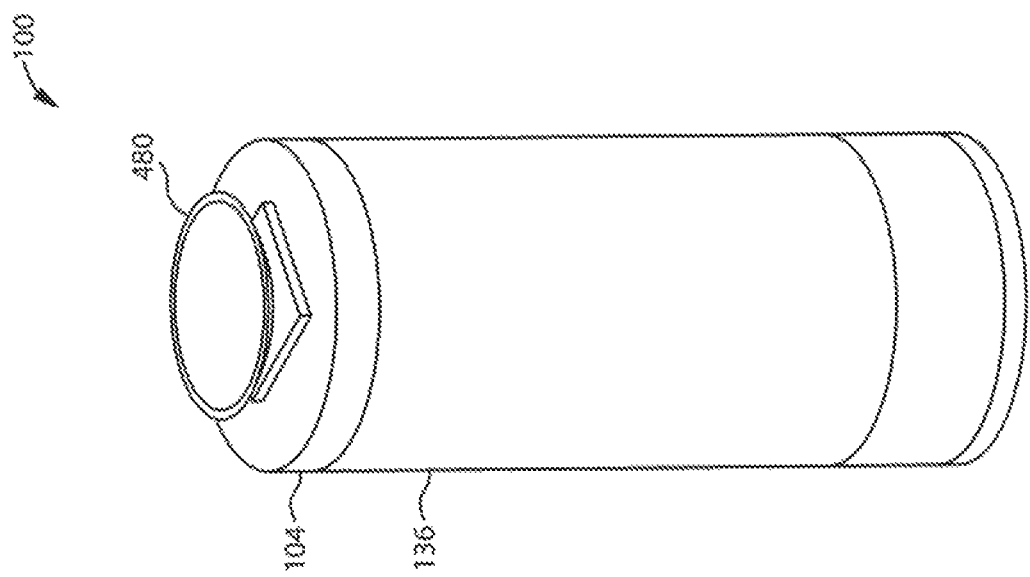
FIG. 104 is a perspective view of a LED light source including a mounting member in accordance with another embodiment.

In accordance with another aspect of this disclosure, which may be used with one or more other aspects disclosed herein, LED light source 100 may include a mounting member 480 (see for example FIGS. 101-103). Mounting member 480 can be any device that can secure LED light source 100 onto a surface. An advantage of this design is that it allows LED light source 100 to be more versatile in its placement. In the illustrated embodiment, LED light source 100 includes a spike 480 connected to and extending outwardly of housing 104. Spike 480 may be pushed into a ground surface (e.g. soil) to support LED light source 100 in an upright orientation on that ground surface. FIG. 104 shows another embodiment including a suction cup 480 that can be suctioned onto a smooth surface, such as a window or tile.

Figure 107:
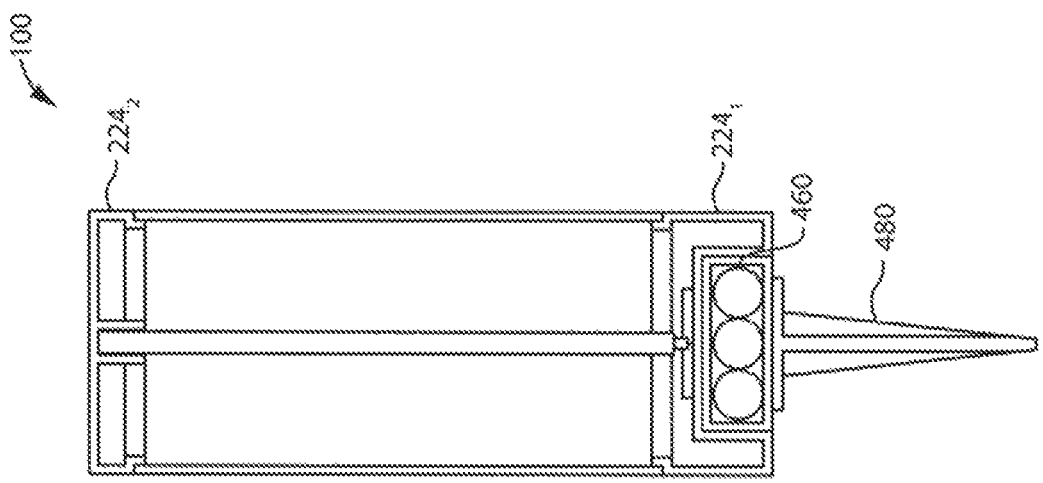
FIG. 107 is a cross-sectional view of a LED light source including a mounting member in accordance with another embodiment.
Figure 108:
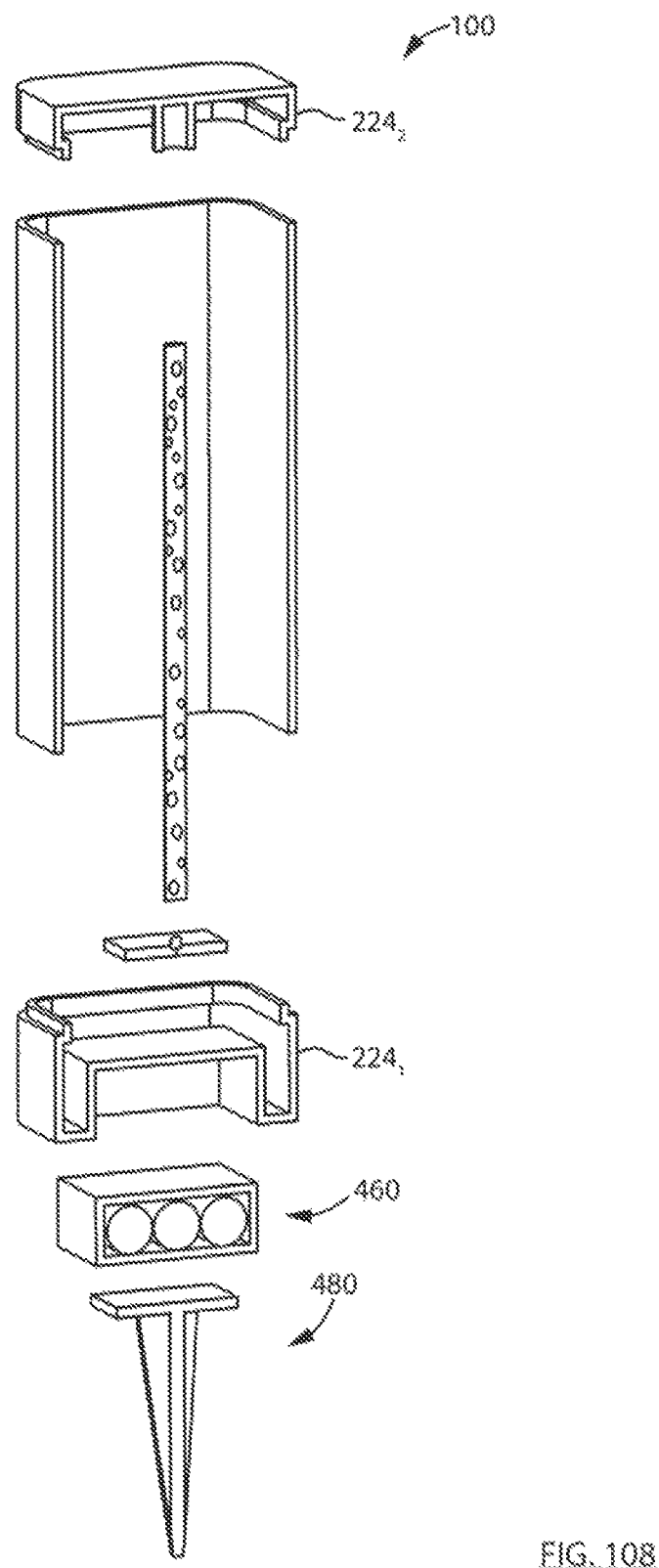
FIG. 108 is an exploded view of the cross-section of FIG. 107.

Returning to FIGS. 101-103, mounting member 480 can extend from any portion of LED light source 100. In the illustrated embodiment, mounting member 480 extends longitudinally outwardly from housing end member 2241 and energy storage member 460 is positioned within housing end member 2242. An advantage of this design is that it can provide ample space for an energy generating member 476 at the end member 2242 where energy storage member 460 is located. FIGS. 107-108 exemplify another embodiment in which mounting member 480 extends longitudinally from housing end member 2241 and energy storage member 460 is positioned within housing end member 2241. An advantage of this design is that it can shift the weight of the energy storage member 460 to proximate the mounting member 480, which can improve the mounting stability of LED light source 100.

Partial Emission of Light

Figure 106:
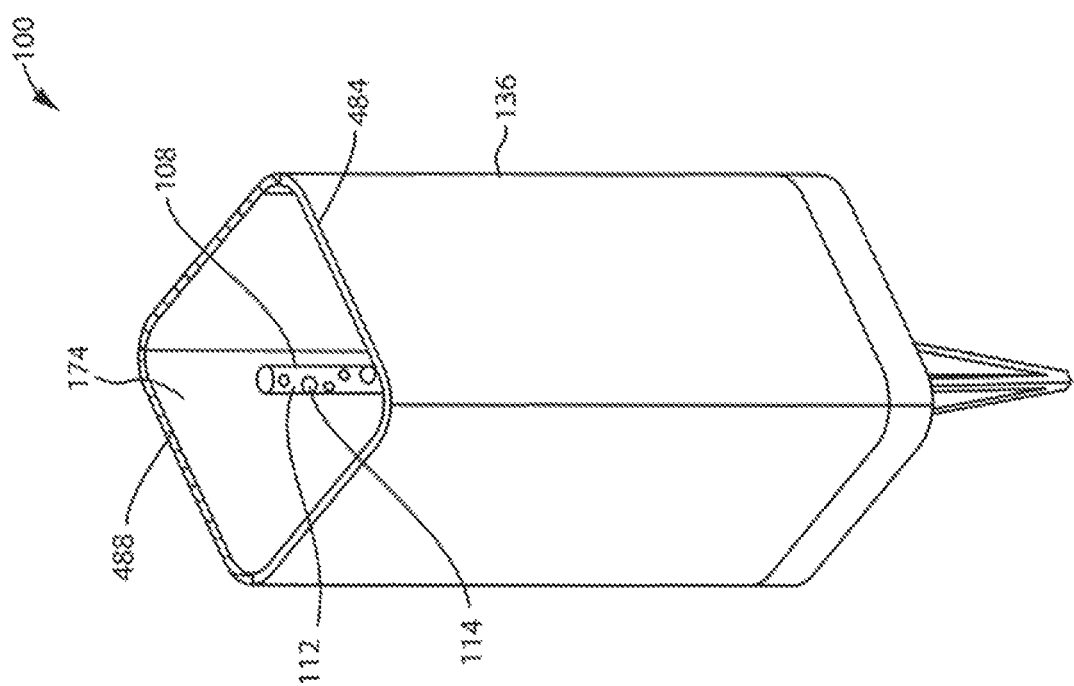
FIG. 106 is a cross-sectional view taken along line C-C in FIG. 101 in accordance with an embodiment.

In accordance with another aspect of this disclosure, which may be used with one or more other aspects disclosed herein, a light guide having a non-planar emission surface may be provided with a diffuser which emits light in only one or more directions. An advantage of this aspect is that light may be directed to illuminate a portion of the space surrounding the light source 100. As exemplified in FIG. 106, light transmitting surface 136 includes a light emitting portion 484, and an opaque portion 488 (identified with crosshatching). Light emitting portion 484 is at least translucent (i.e. translucent or transparent) to permit light from light guide 108 to pass therethrough and illuminate the surrounding volume. Opaque portion 488 is opaque and in some cases reflective to light from light guide 108. An advantage of this design is that it allows LED light source 100 to focus light emissions in some directions (i.e. through light emitting portion 484) and to block light emissions in other directions (i.e. through opaque portion 488). In the illustrated embodiment, light transmitting surface 136 includes one contiguous light transmitting portion 484 and one contiguous opaque portion 488, which are substantially equal in size. In other embodiments, light transmitting portion 484 and opaque portion 488 may be discontiguous (e.g. striped or spotted) and may be represented in different proportions. It will also be appreciated that the opaque portion 488 may allow some light therethrough and accordingly may not be fully opaque.

An inner surface 174 of opaque portion 488 may be reflective (e.g. mirrored) to reflect light from light guide 108 to light emitting portion 484. An advantage of this design is that at least a portion of light that strikes opaque portion 488 may be emitted outwardly from light emitting portion 484.

Frame

Figure 109:
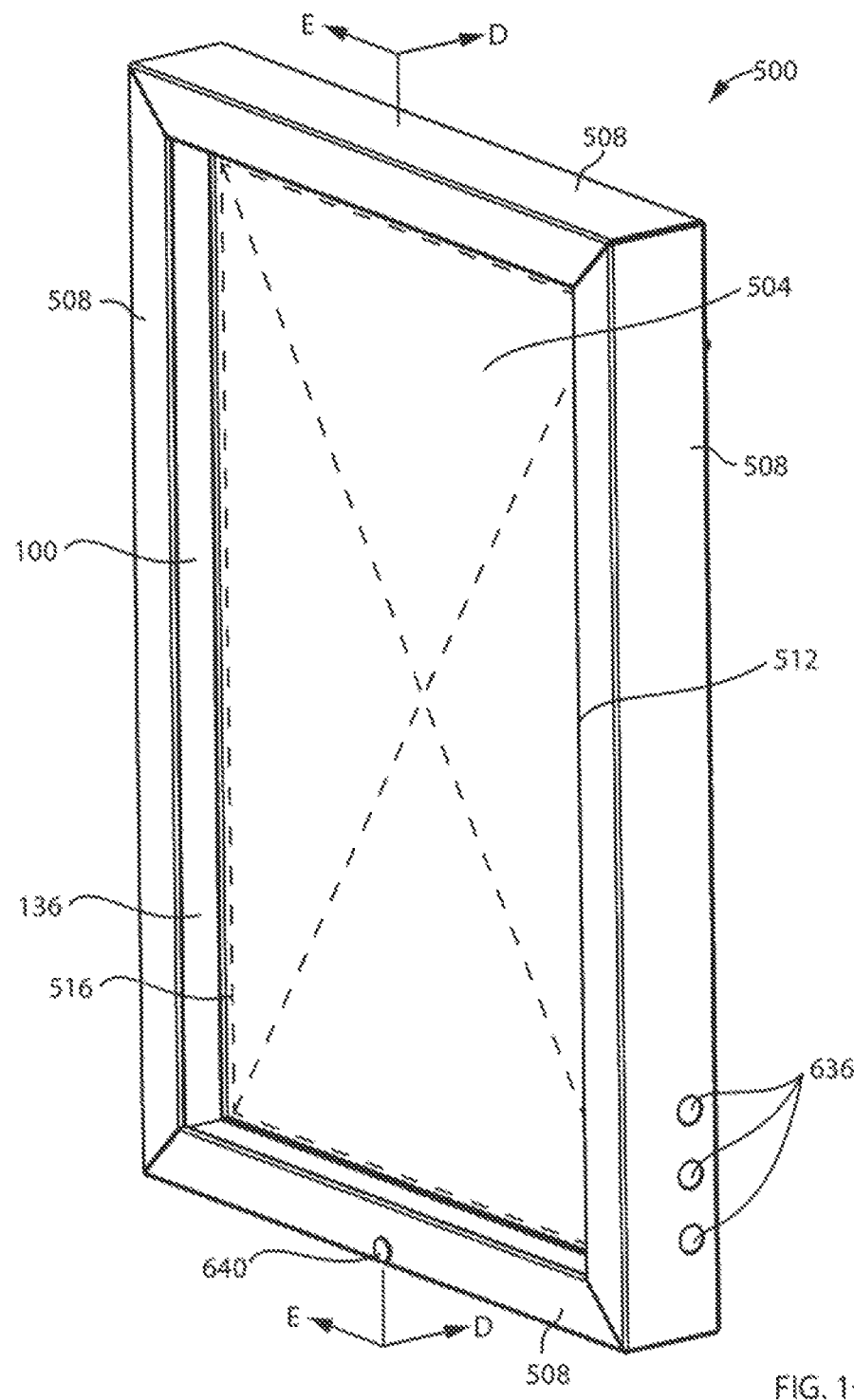
FIG. 109 is a perspective view of a frame in accordance with an embodiment.
Figure 110:
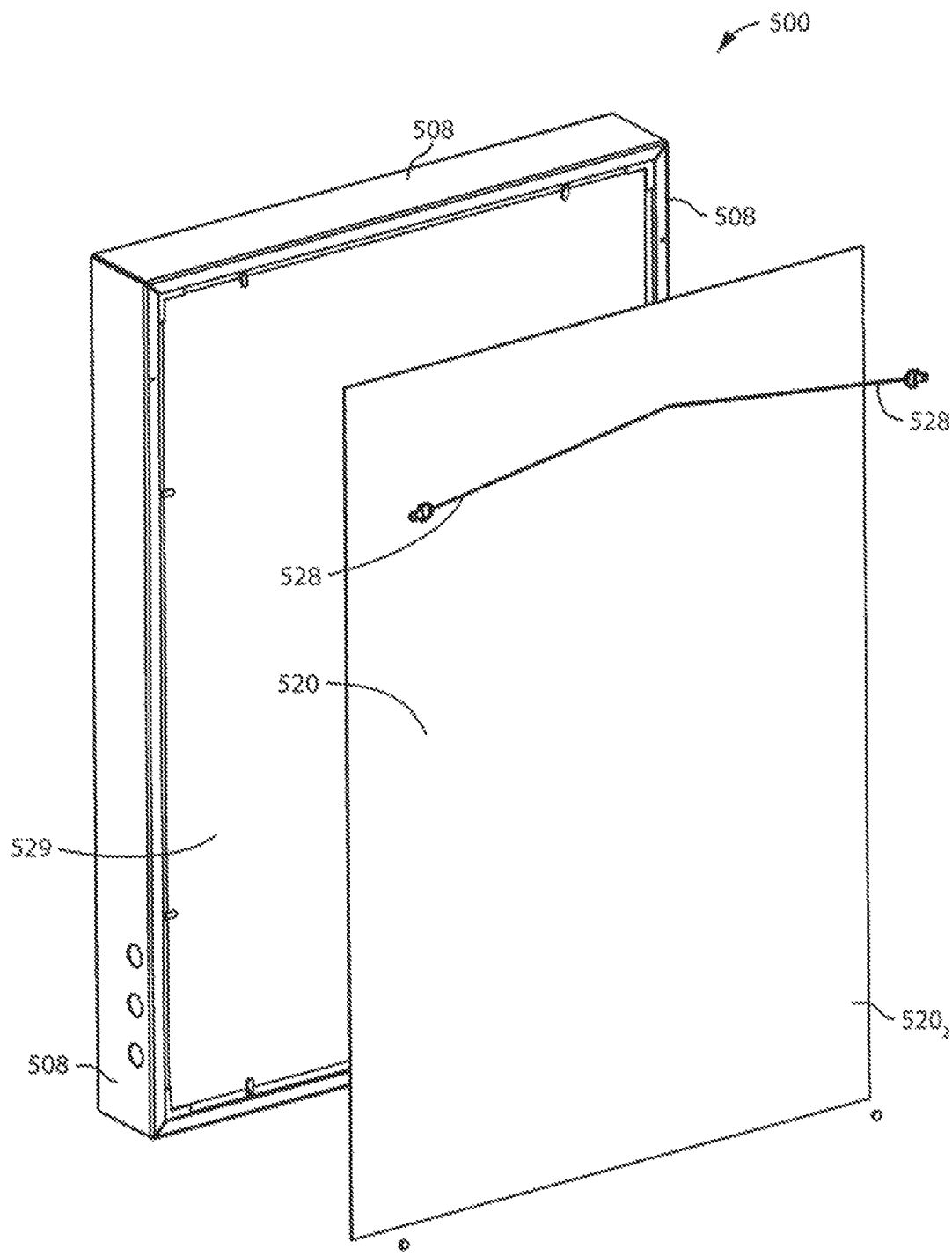
FIG. 110 is a rear perspective view of the frame of FIG. 109 with a backing removed.

In accordance with another aspect of this disclosure, which may be used with one or more other aspects disclosed herein, a frame, such as for art, may be provided with uses a light source having any one or more of the features set out herein. As exemplified in FIG. 109 to FIG. 111, a frame 500 for artwork 504 is provided. The artwork 504 may be a substantially planar 'picture-type' artwork, such as a photo, a print, a painting, or the like. Frame 500 includes one or more LED light source 100 to illuminate artwork 504. As shown, LED light source 100 may include one or more light guides 108 which are endwise illuminated by LEDs and which emit light from a light emitting face 112 towards artwork 504 through light transmitting surface 136. An advantage of frame 500 is that it can provide energy efficient and controllable illumination of an artwork 504.

Frame 500 includes one or more side panels 508 that together define an inner opening 512 through which the artwork 504 is viewable. Inner opening 512 may extend in a plane 516. Alternately, the frame may define an opening that extends in 3 dimensions. Inner opening 512 may be of any shape. For example, frame 500 may have the shape of a parallelogram (e.g. rectangle) having four side panels 508 connected end-to-end as shown. An advantage of this design is that most artwork is parallogrammatic so that a parallelogrammatic frame is widely compatible. In other embodiments, frame 500 may have any other regular or irregular shape formed by any other number of side panels 508. For example, frame 500 may include just one side panel 508 formed in a circle, three side panels 508 connected end to end in a triangle, or a plurality of side panels 508 configured in the shape of a dog. Thus, frame 500 can have side panel(s) 508 shaped to accommodate artwork 504 of any shape.

As exemplified, frame 500 may also include one or more backing layers 520, which cover a rear face 524 of artwork 504. As shown, artwork 504 may be positioned between backing layer(s) 520 and the front face of frame side panels 508. In the illustrated embodiment, frame 500 includes a rigid backer 5201 (e.g. chip board) and a flexible backer 5202 (e.g. paper). Artwork 504 may be attached directly to frame side panels 508, or held in place against frame side panels 508 by backing layer(s) 520. Frame 500 may also include a hanger 528 (e.g. wire hanger) secured to frame side panel(s) 508 or frame backing layer(s) 520.

As discussed previously, and as exemplified in FIGS. 112-113A, LED light source 100 may include one or more endwise-illuminated light guide 108 wherein each light guide 108 may extend longitudinally along part or all of any one or more of frame side panels 508. For example, each light guide 108 may have a longitudinal length 152 that is at least 40%, 50%, 60%, 70%, 80% or 90% of the corresponding side length 532 of the frame inner opening 512. An advantage of this design is that it allows light guides 108 to emit light over all or substantially the entire artwork 504. In the illustrated embodiment, light guide 108 extends along each frame side panel 508, and each light guide longitudinal length 152 is approximately equal to frame inner opening longitudinal length 532.

As discussed previously, and as exemplified, LED light source 100 may include a plurality of LEDs 164 which are positioned to emit light into light guide end faces 144. A diffuser 136 may be spaced inwardly towards an opposed side panel 508 of each light guide 108. As exemplified, diffusers 136 may be formed as planar members that are end wise connected to form a closed perimeter around frame inner opening 512. An advantage of this design is that it can allow diffusers 136 to diffuse all light emitted towards artwork 504 by light guides 108. In other embodiments, LED light source 100 may not include a diffuser 136. For example, the light emitted by light guide 108 may be sufficiently diffuse for the particular artwork 504 being illuminated. Alternately, a diffuser may overlie part or all of a light guide 108. It will be appreciated that the diffuser may be non-planar (e.g., convex).

Figure 111:
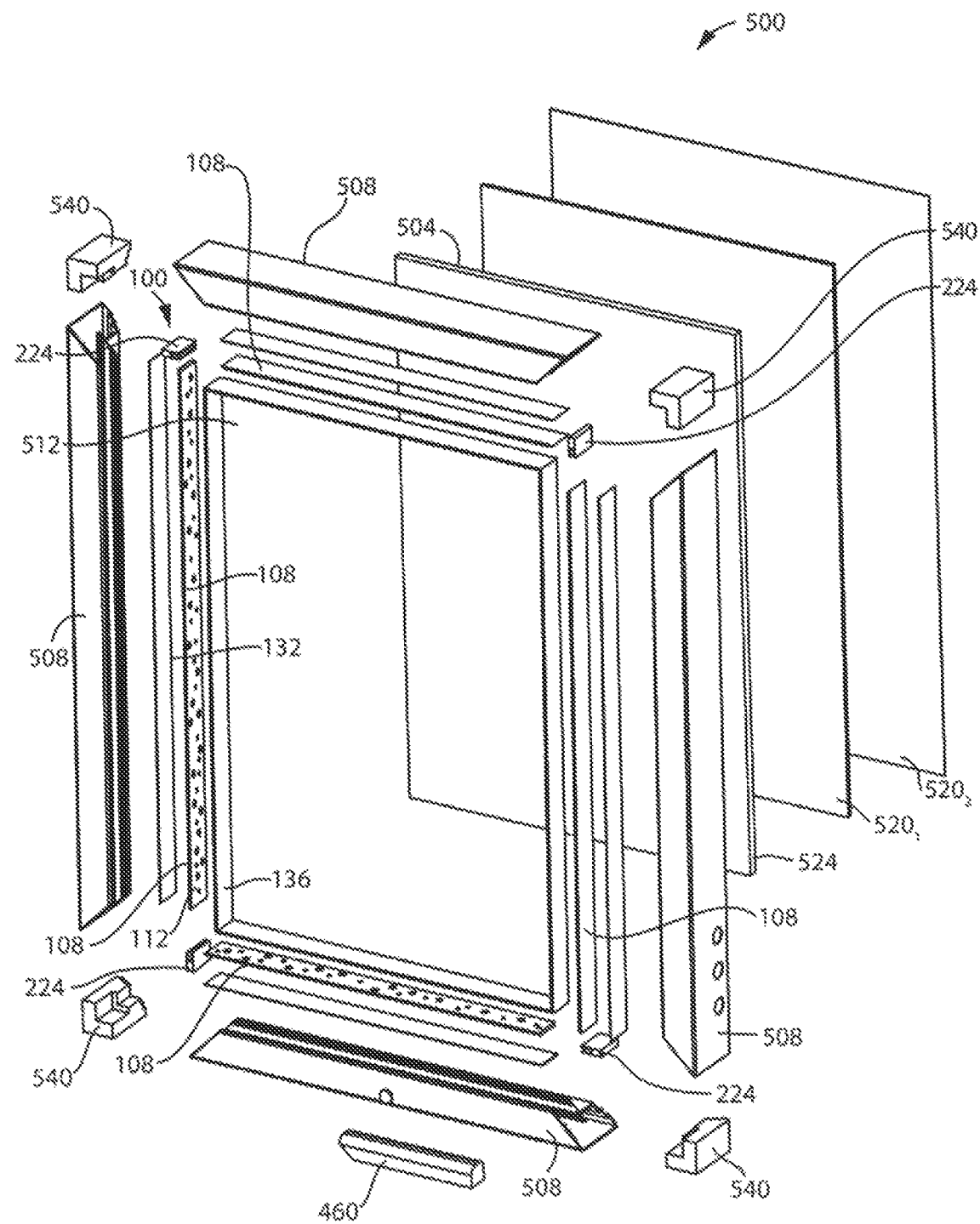
FIG. 111 is an exploded view of the frame of FIG. 109.

Referring to FIG. 111, frame side panels 508 may be connected in any manner, such as by fasteners (e.g. screws, bolts, nails, rivets), magnets, snaps, press fits, or integral forming. In some embodiments, frame side panels 508 are removably connected. An advantage of this design is that it can allow for at least some disassembly to access LED light source 100 or other components that may require repair or replacement. In the illustrated embodiment, frame side panels 508 are connected by frame corner members 540. As shown, each frame corner member 540 may removably connect the two adjacent frame side panels 508. Removing a frame corner member 540 may provide access to, e.g. LEDs, which may be carried on a removable cartridge or a housing end member 224 located adjacent the frame corner member 540.

Figure 112:
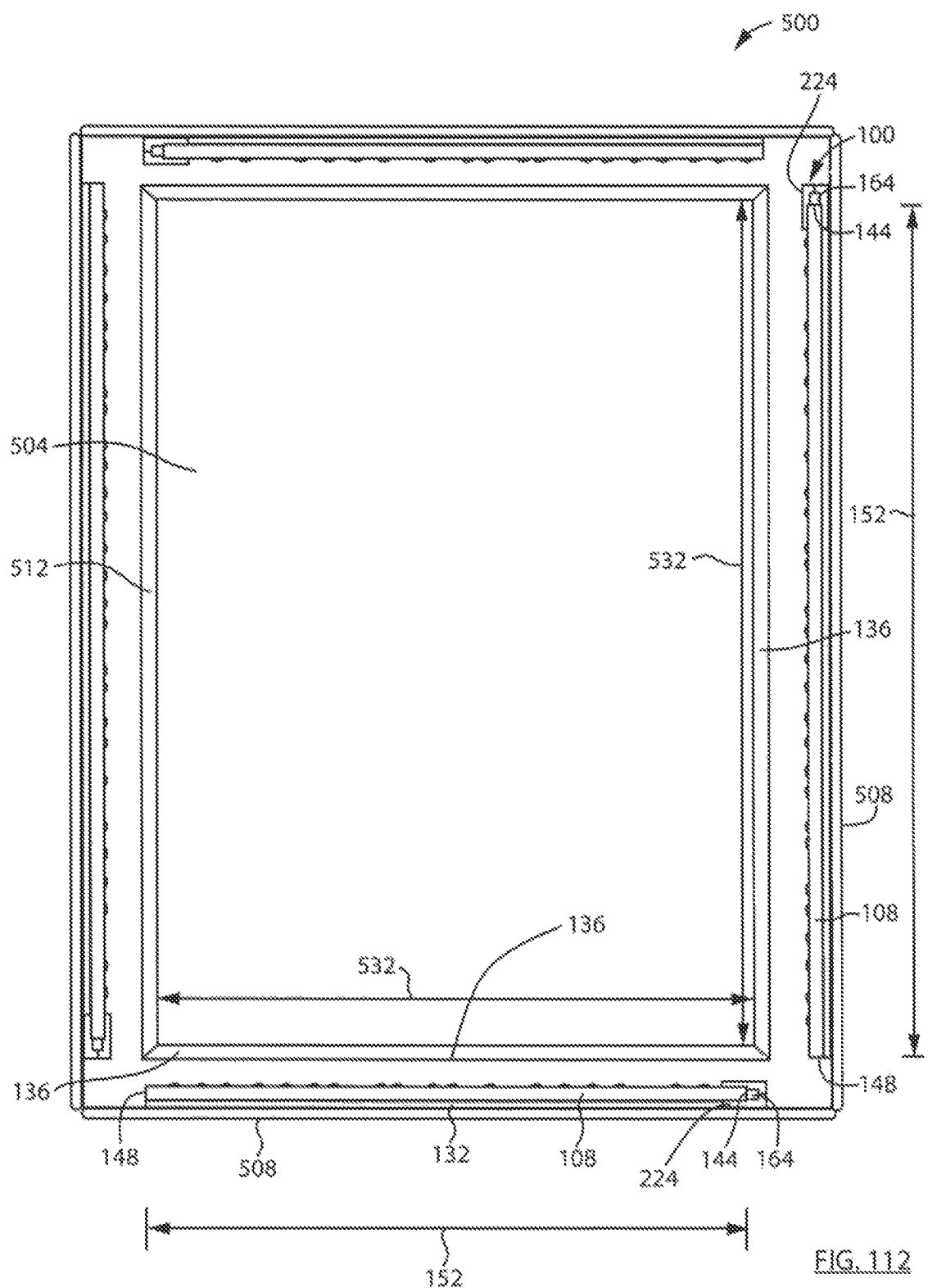
FIG. 112 is a cross-sectional view taken along line D-D in FIG. 109, in accordance with an embodiment.
Figure 113A:
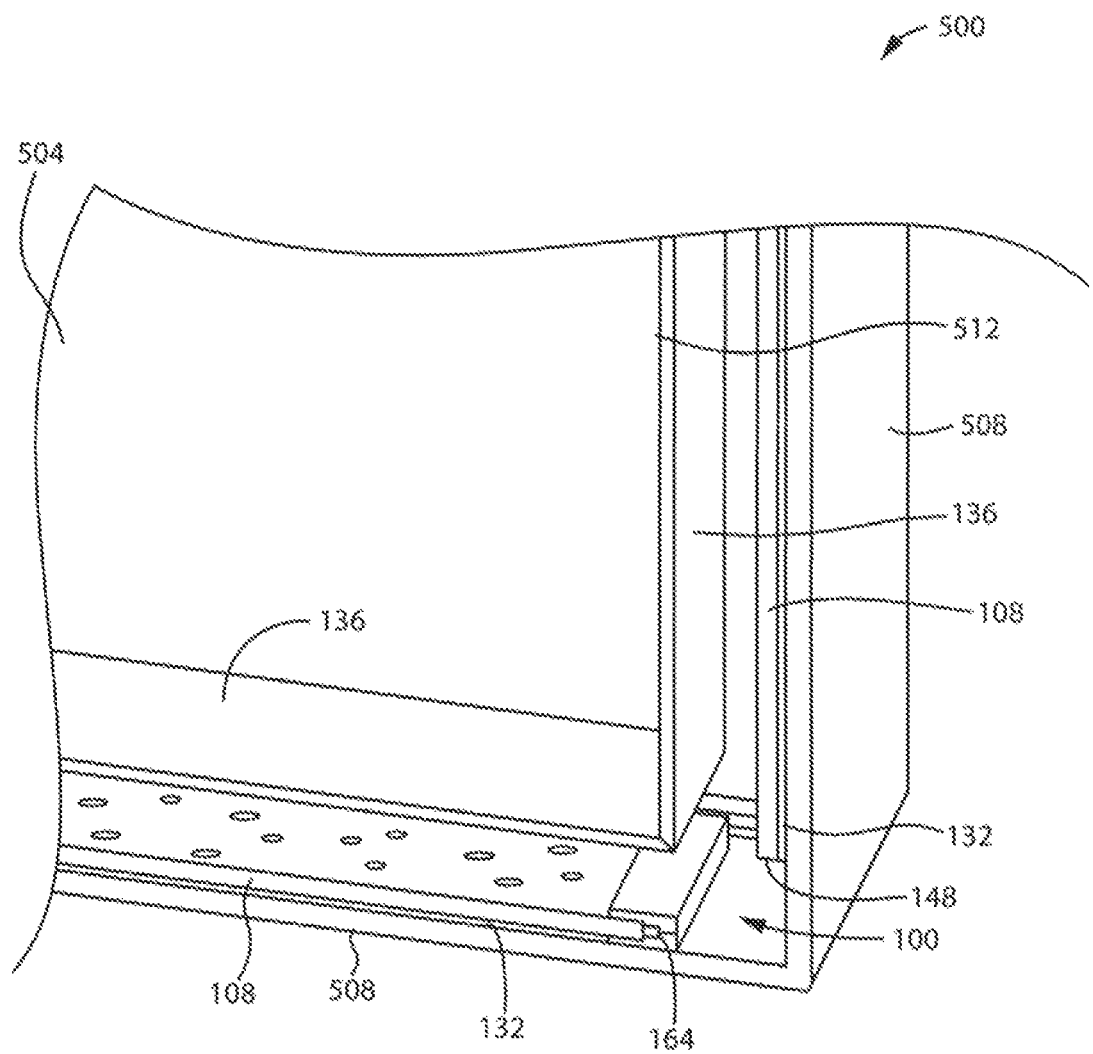
FIG. 113A is a partial cross-sectional view taken along line D-D in FIG. 109, in accordance with an embodiment.

As exemplified in FIG. 112, LED light source 100 may include any arrangement of LEDs 164 suitable to emit light into light guide end faces 144 and/or 148. In the illustrated example, each light guide 108 has an end face 144 endwise illuminated by an LED 164 (or group of LEDs 164) proximate a different corner of frame 500. As exemplified, one housing end member 224 holding the LEDs 164 is positioned proximate a different corner of the frame 500. An advantage of this design is that it can provide a relatively large space within frame 500 for the housing end member 224, LEDs 164, and any associated heat sink, wiring and/or electronics.

Figure 113B:
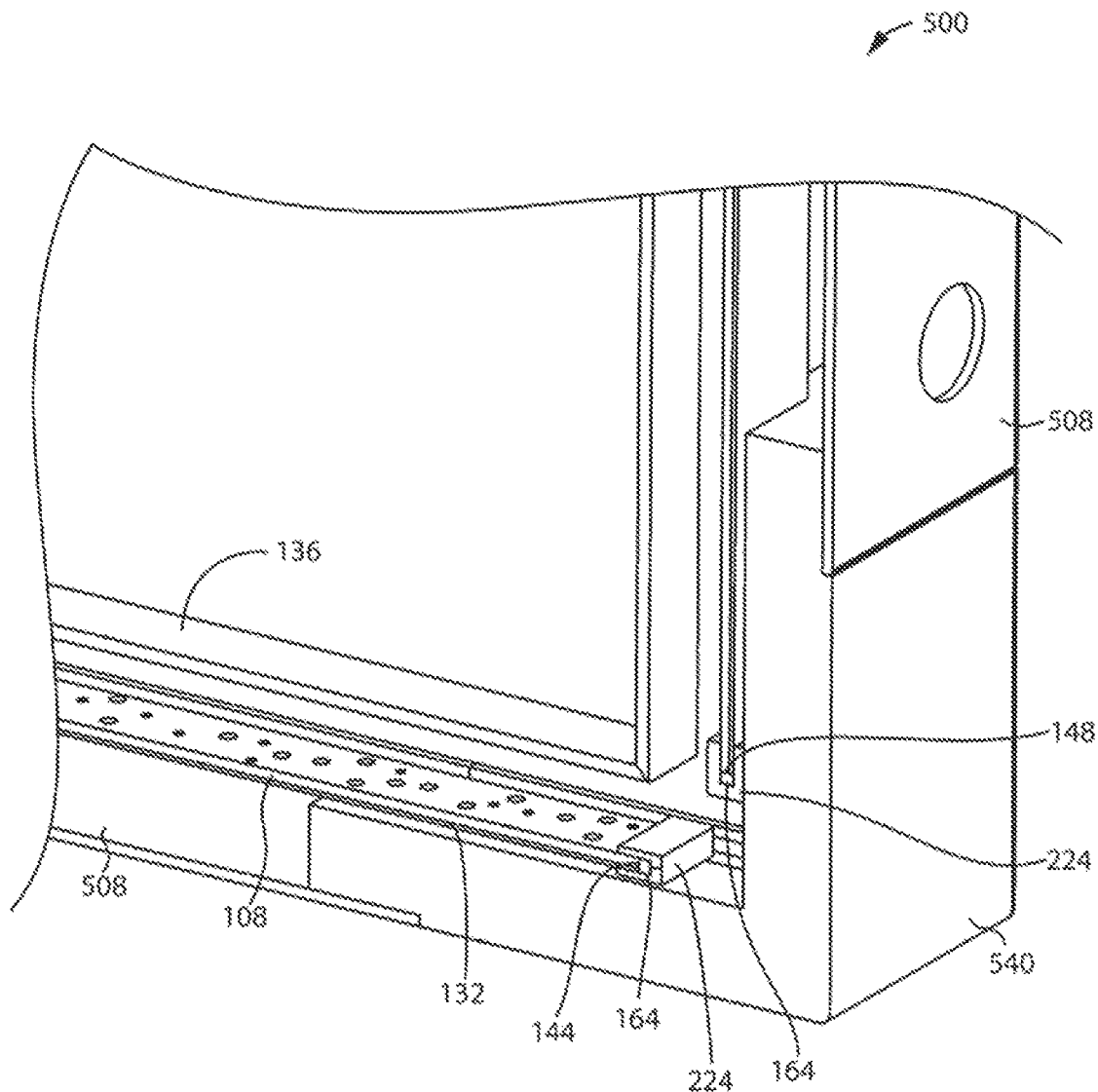
FIG. 113B is a partial cross-sectional view taken along line D-D in FIG. 109 in accordance with another embodiment.

Referring to FIG. 113B, in some embodiments, there may be two housing end members 224 holding LEDs 164, which illuminate light guide end faces 144 or 148 of different light guides 108 associated with different frame side panels 508, located proximate one frame corner 540. An advantage of this design is that two (sets) of LEDs 164 may be accessible from one corner, such as by moving frame corner member 540. In some embodiments, one or more (or all) light guides 108 within frame 500 may be illuminated from both of their end faces 144 and 148, by positioning LEDs 164 that illuminate in two directions within or proximate each frame corner member 540. An advantage of this design is that it can provide greater, more even, or better controlled illumination of each light guide 108.

Figure 114:
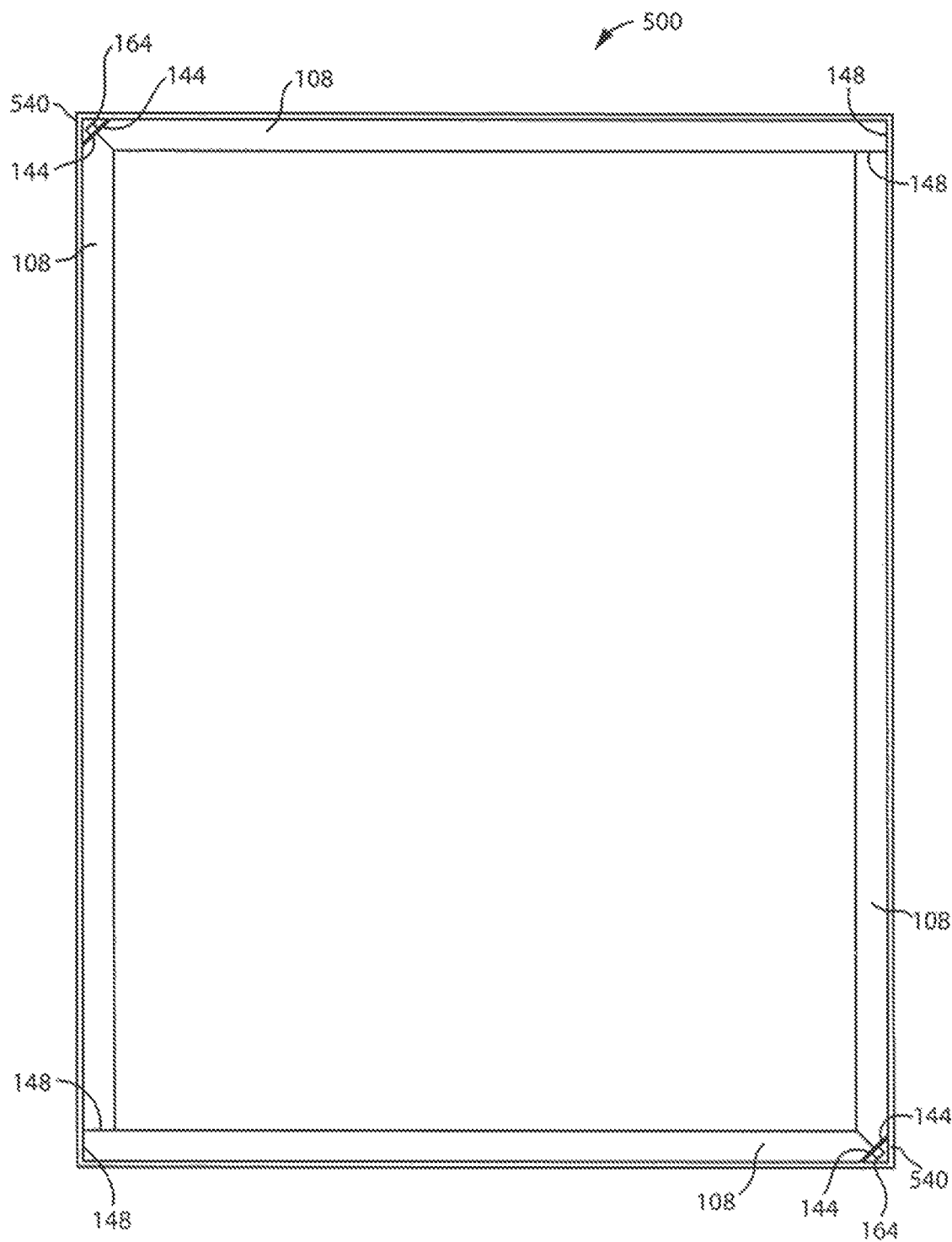
FIG. 114 is a schematic view of a frame in accordance with an embodiment.
Figure 115:
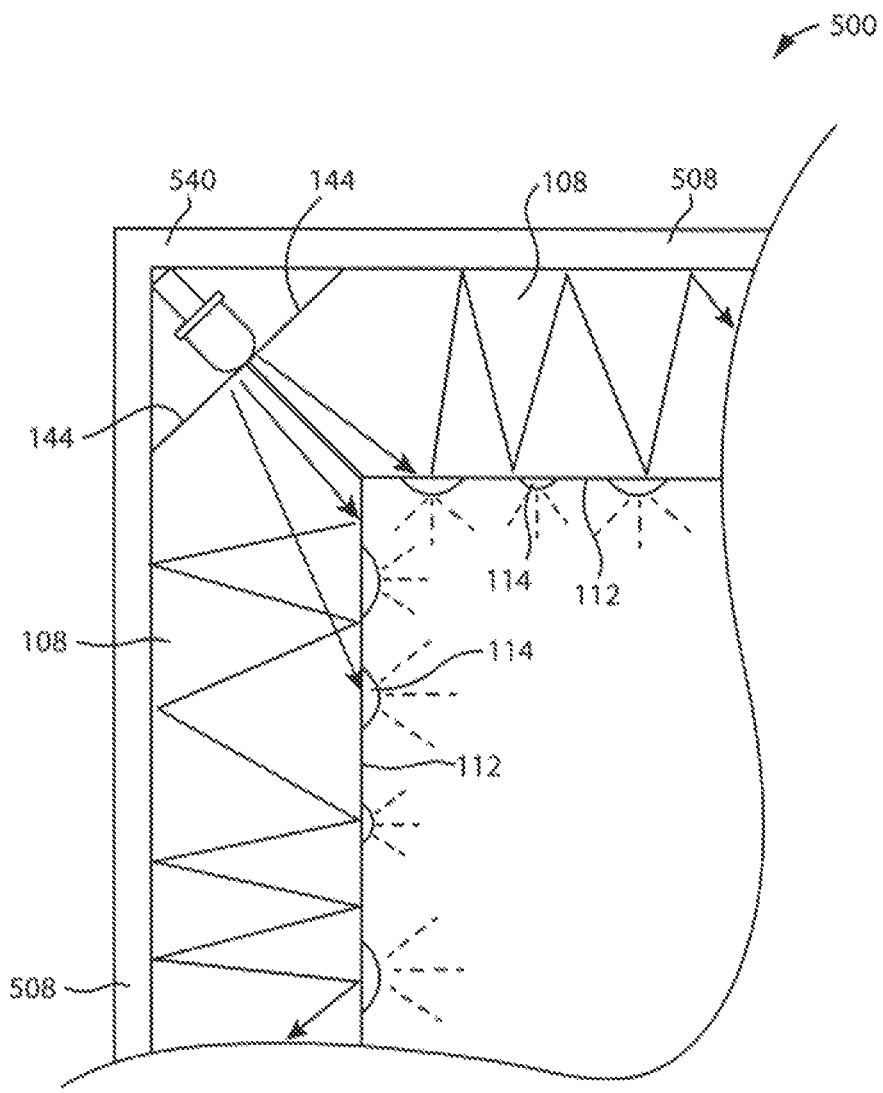
FIG. 115 is an enlarged portion of one of the corners of the schematic of FIG. 114.

As exemplified in FIGS. 114 and 115, in some embodiments, one or more LEDs 164 may be positioned and oriented to each emit light simultaneously into two light guide end faces 144 or 148. An advantage of this design is that it can reduce the number of LEDs 164 and associated components of LED light source 100. In the illustrated embodiment, an LED 164 is positioned within each of two frame corner members 540 and oriented to emit light into light guide end faces 144 of the two light guides 108 that meet at that corner 540. As shown, LED 164 emits light into light guides 108 at an angle that results in internal reflection and longitudinal propagation of the light along the longitudinal length of each light guide 108.

Figure 116:
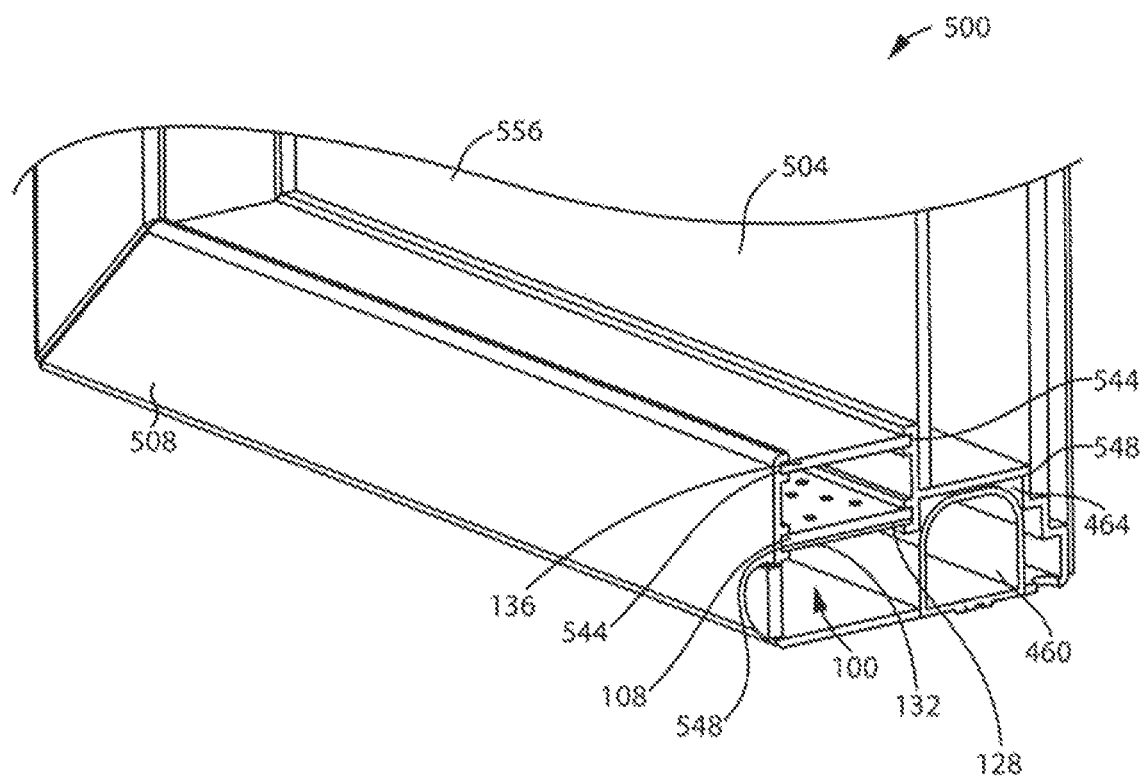
FIGS. 116-132 are partial cross-sectional and cross-sectional perspective views taken along line E-E in FIG. 109, in accordance with various embodiments.

As exemplified in FIG. 116, in some embodiments, frame side panel 508 may be configured to hold LED light source 100, or components thereof, in position. As shown, frame side panel 508 may include diffuser retention slots 544 which retain diffuser 136, and light guide retention slots 548 which retain light guide 108. Light guide retention slots 548 may also hold reflector 132 in contact with light guide rear face 128.

Figure 117:
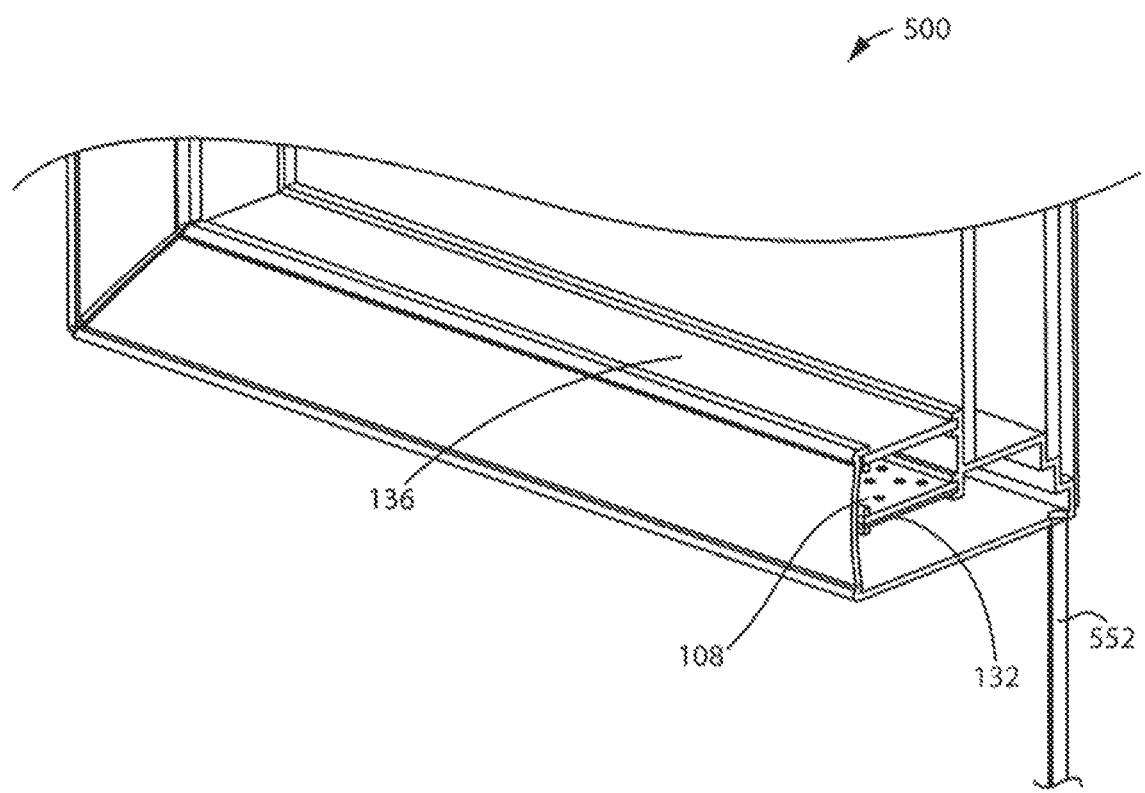
Figure 118:
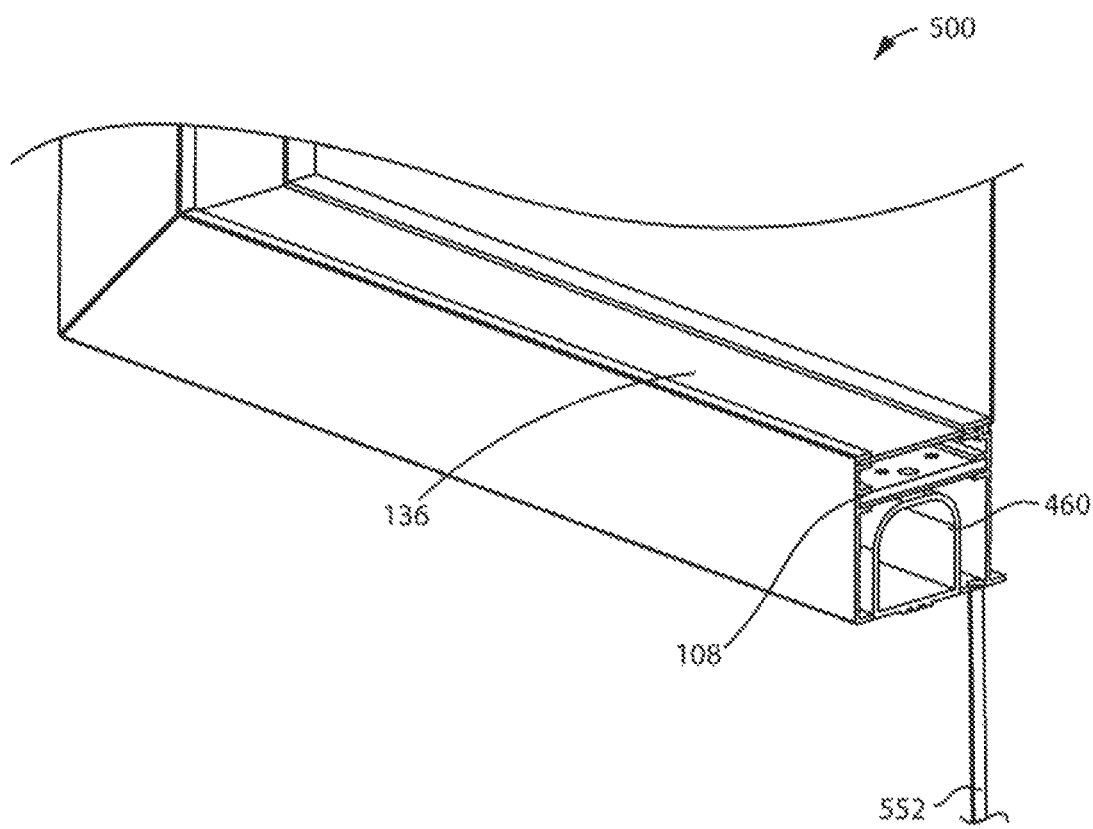

Frame 500, including LED light source 100, may be powered by any power source. In the illustrated embodiment, LED light source 100 includes an energy storage member 460, positioned, e.g., within an energy storage recess 464, for supplying power to frame 500. An advantage of this design is that it allows frame 500 to operate where an external power connection may be unavailable or inconvenient. FIG. 117 shows an example including a power cord 552 which is electrically connectable to external power. An advantage of this design is that it does not rely on an internal energy storage member which can require periodic replacement or recharging. FIG. 118 shows another example including a power cord 552 and an energy storage member 460. An advantage of this design is that the external power source through power cord 552 can charge energy storage member 460, which can supply power to frame 500 during power outages.

If there is a power outage, the LED light source of the frame may alternately operate as emergency lighting. It will be appreciate that if a power cord is provided as in FIG. 118, then the energy storage member may be charged from the power cord at any time the power cord is plugged in. Accordingly, if the power cord is plugged in at all times (or hard wired to an electrical supply) then the LED light source may be available as a fully charged emergency lighting source.

Figure 119:
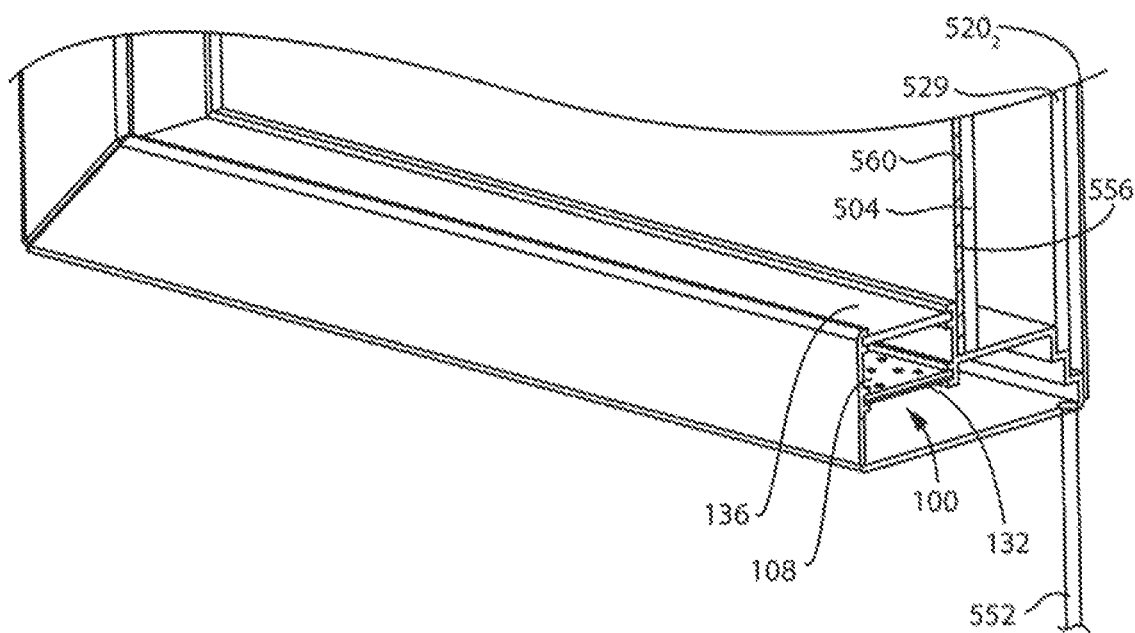
Figure 120:
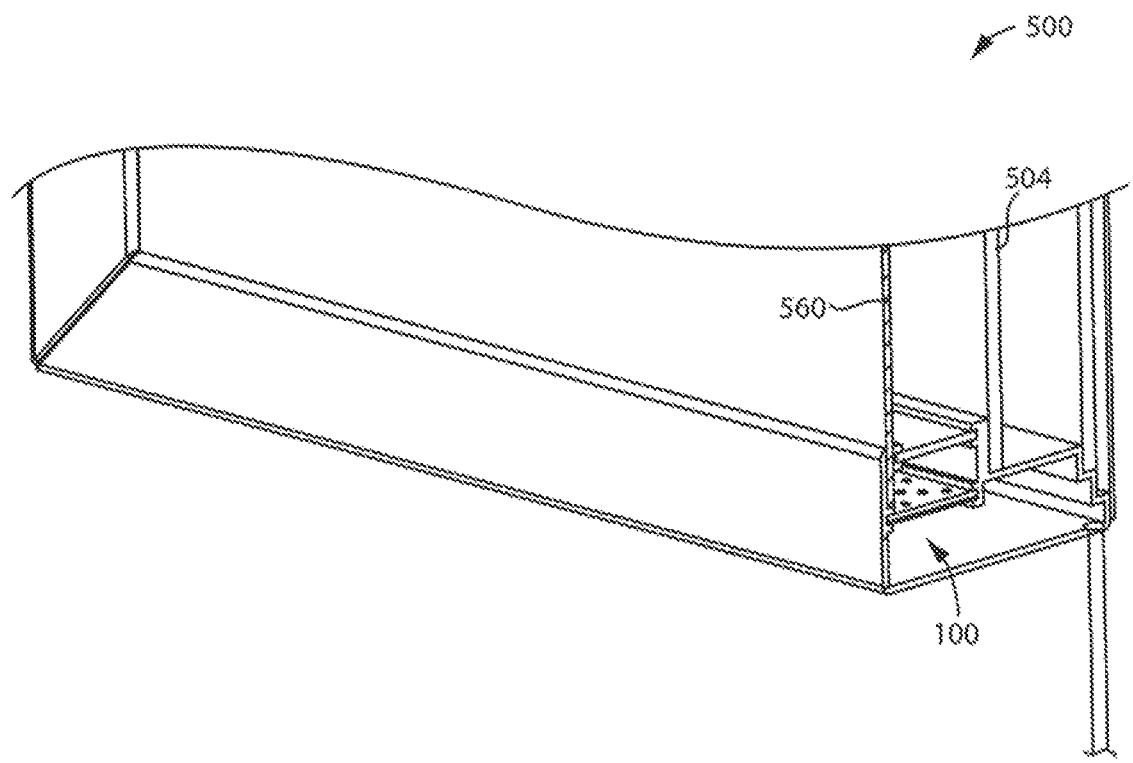

As exemplified in FIG. 116, in some embodiments, light emitted by LED light source 100 (whether directly from light guide 108 or radiated through diffuser 136) may directly illuminate artwork 504. As shown, there may not be provided any covering that overlays the artwork front face 556. An advantage of this design is that it allows the artwork 504 to receive light unattenuated by a covering, and may permit users to physically touch the artwork 504 if appropriate. For example, the artwork front face 556 may include media (e.g. paint) which creates an uneven surface texture with which users can interact. FIG. 119 shows an alternative embodiment including a transparent cover 560 (e.g. transparent glass or plastic) which overlays artwork front face 556. An advantage of this design is that it can protect artwork 504 from user contact and the environment (e.g. liquids and humidity). In some embodiments, cover 560 is configured to reflect, absorb, or otherwise obstruct passage of specific light wavelength bands. For example, cover 560 may be substantially opaque to UV light that may damage artwork 504. Cover 560 may be positioned rearwardly of LED light source 100 as shown, or outwardly of LED light source 100 as in FIG. 120. An advantage of positioning cover 560 outwardly of LED light source 100 is that it can also provide protection for light source 100.

Figure 121:
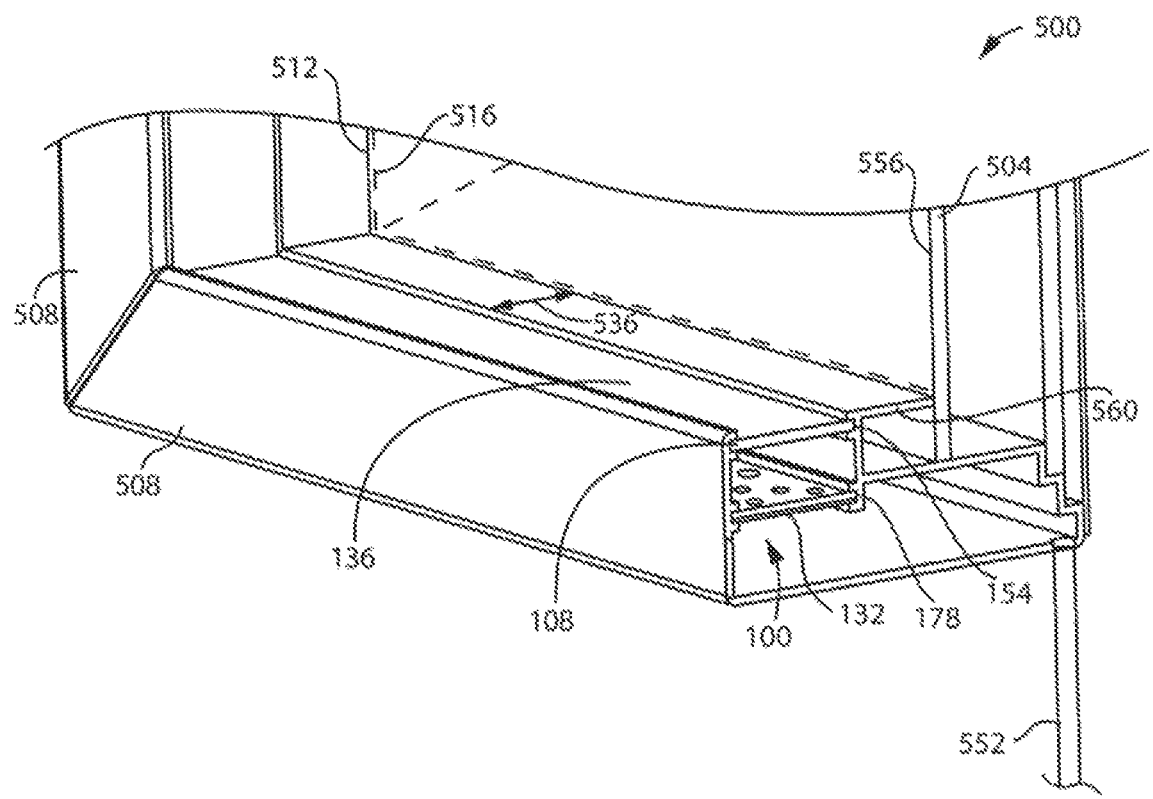
Figure 122:
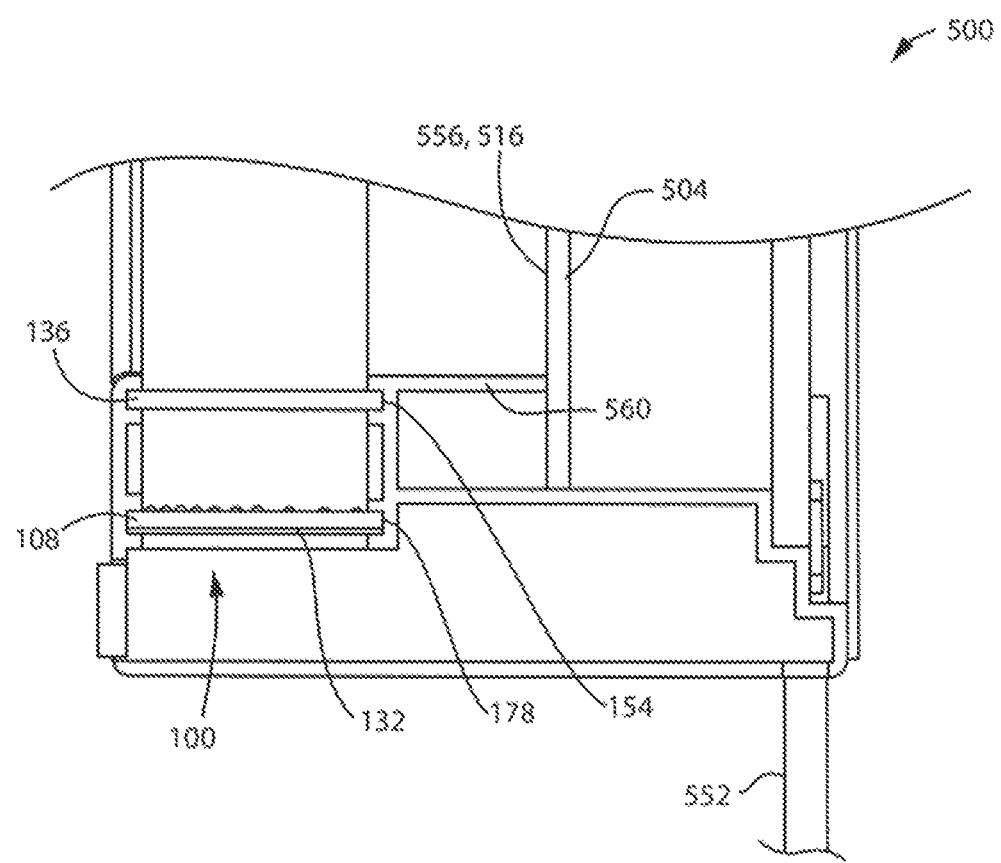

As exemplified in FIGS. 121 and 122, in some embodiments, LED light source 100 may be spaced forwardly of the artwork 504 and/or frame opening plane 516. For example, light guide rear side 178 and/or diffuser rear side 154 may be outwardly spaced apart from the plane 516 of frame inner opening 512 by a distance 536 of, e.g., 0.25 to 1 inches. An advantage of this design is that it can increase the angle of incidence between light emitted by LED light source 100 and artwork 504, which can allow the emitted light to better distribute across the artwork front face 556. As exemplified, frame 500 may include a spacer 560 that abuts artwork 504 to retain the rearward spacing between LED light source 100 and artwork 504. Spacer 560 may be an integral component of frame side panels 508 as shown, or a separate component from frame side panels 508.

Figure 123:
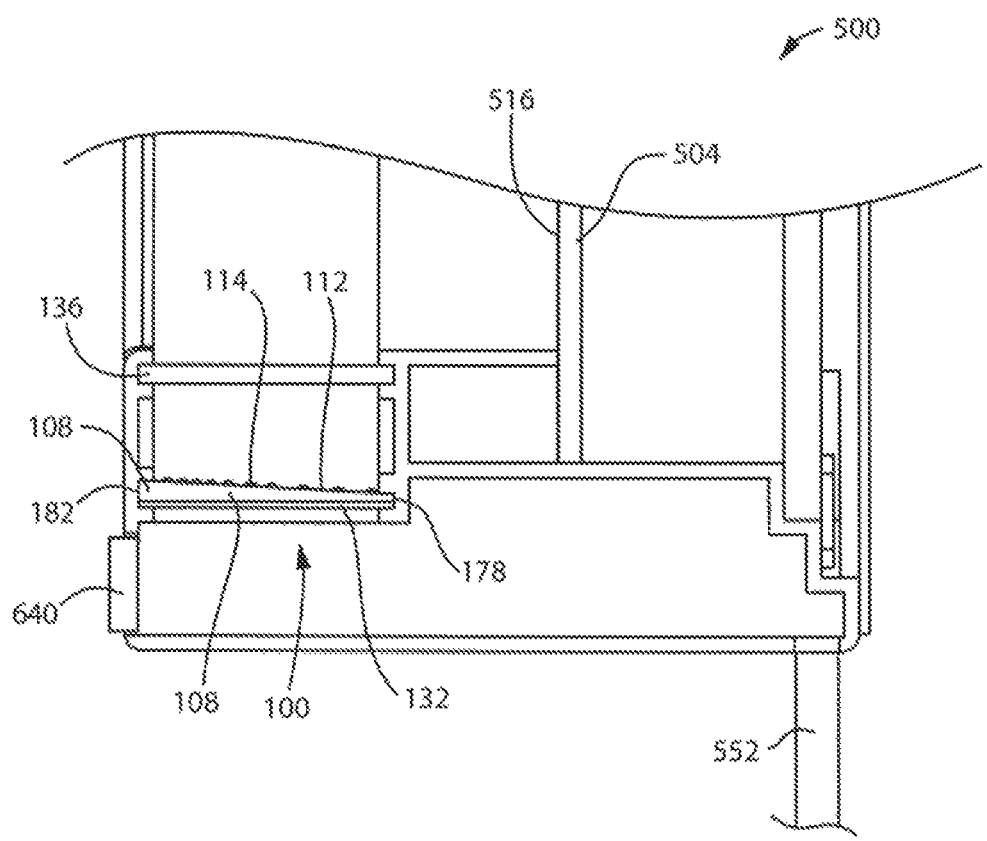

As exemplified in FIG. 123, in some embodiments, light guide light emitting face 112 may be angled to face rearwardly from vertical, and non-parallel to frame opening plane 516 (and therefore artwork 504). An advantage of this design is that it can allow light emitted by LED light source 100 to be directed towards frame opening plane 516, so that a greater portion of the emitted light strikes artwork 504, and therefore provides greater illumination of artwork 504, all else being equal.

Figure 124:
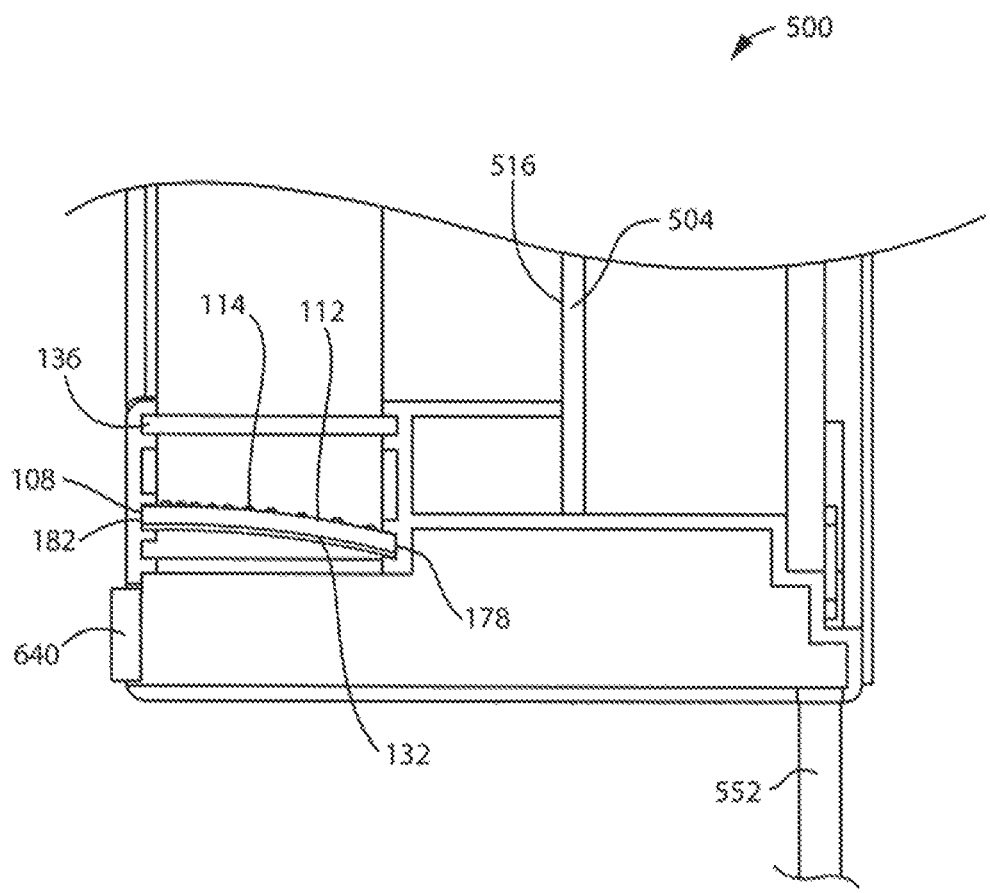
Figure 125:
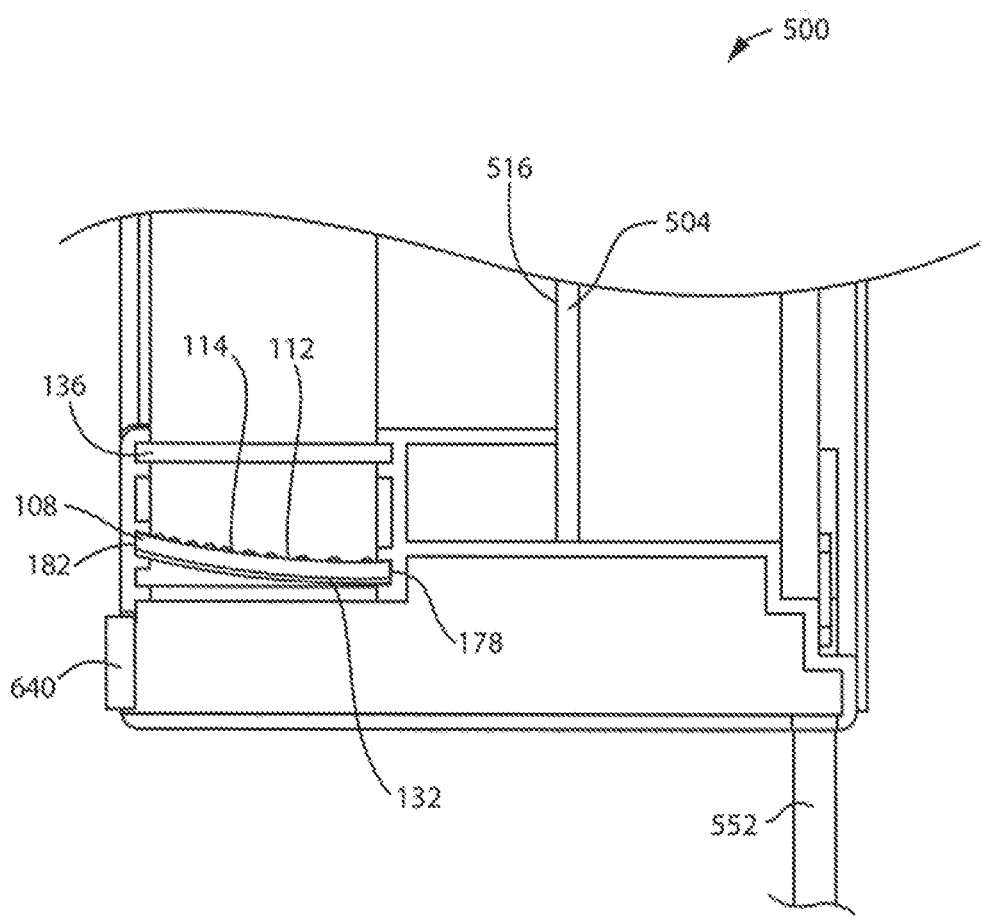
Figure 126:
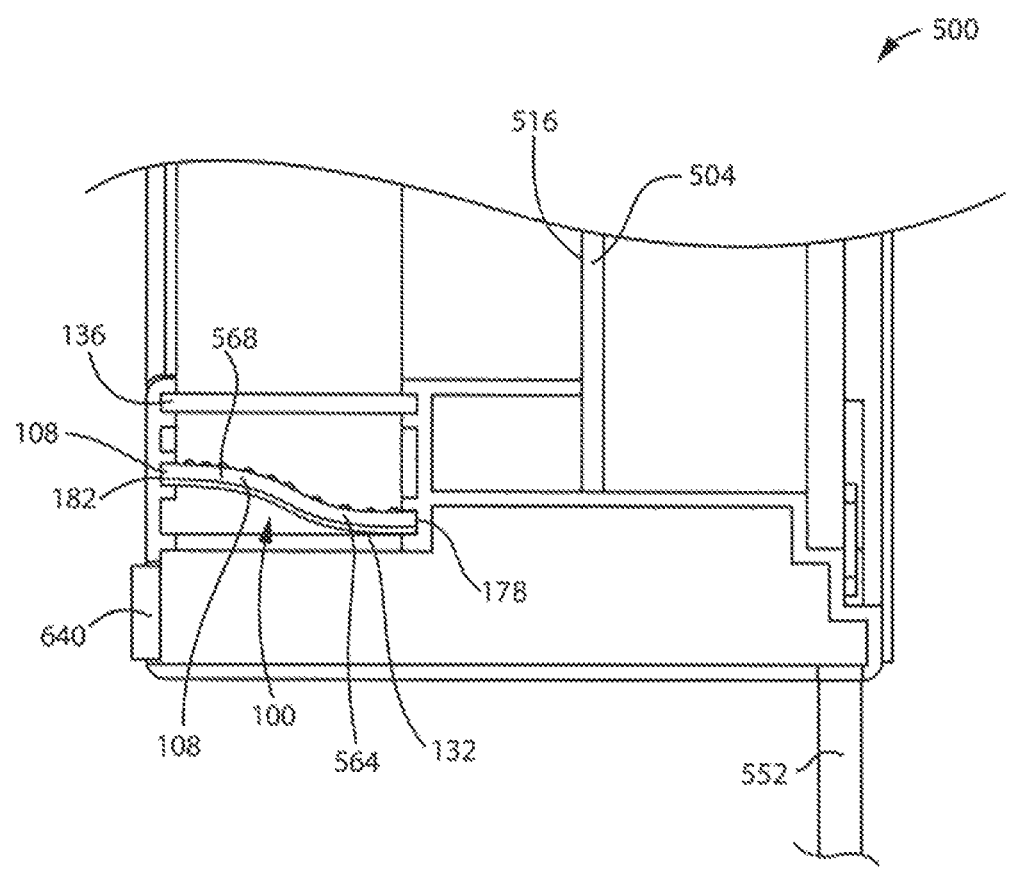

Light guide light emitting face 112 can have any surface profile suitable for illuminating artwork 504. In the illustrated example, light guide light emitting face 112 is substantially planar and angled to face rearwardly from vertical towards opening plane 516. FIGS. 124 and 125 show other examples including a light guide light emitting face 112 that is convexly (FIG. 124) and concavely (FIG. 125) curved between light guide rear side 178 and front side 182. FIG. 126 shows another example including a light guide light emitting face 112 that has a rear concave portion 564 and a front convex portion 568.

Figure 127:
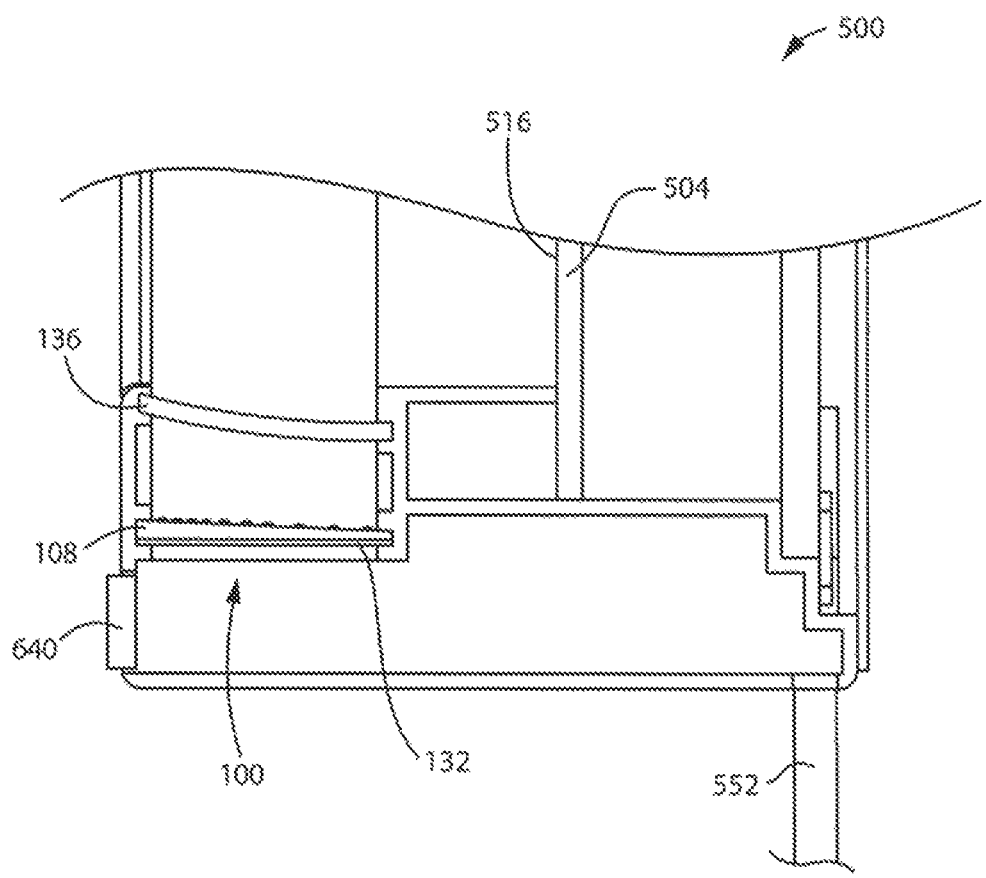
Figure 128:
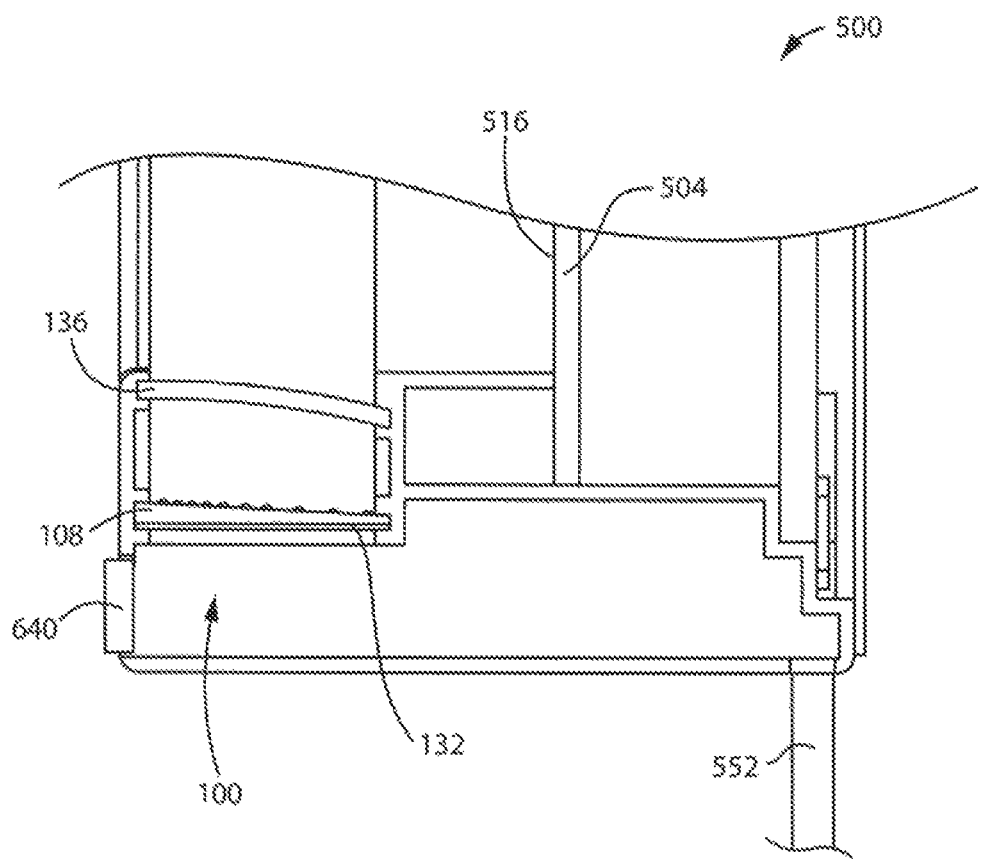
Figure 129:
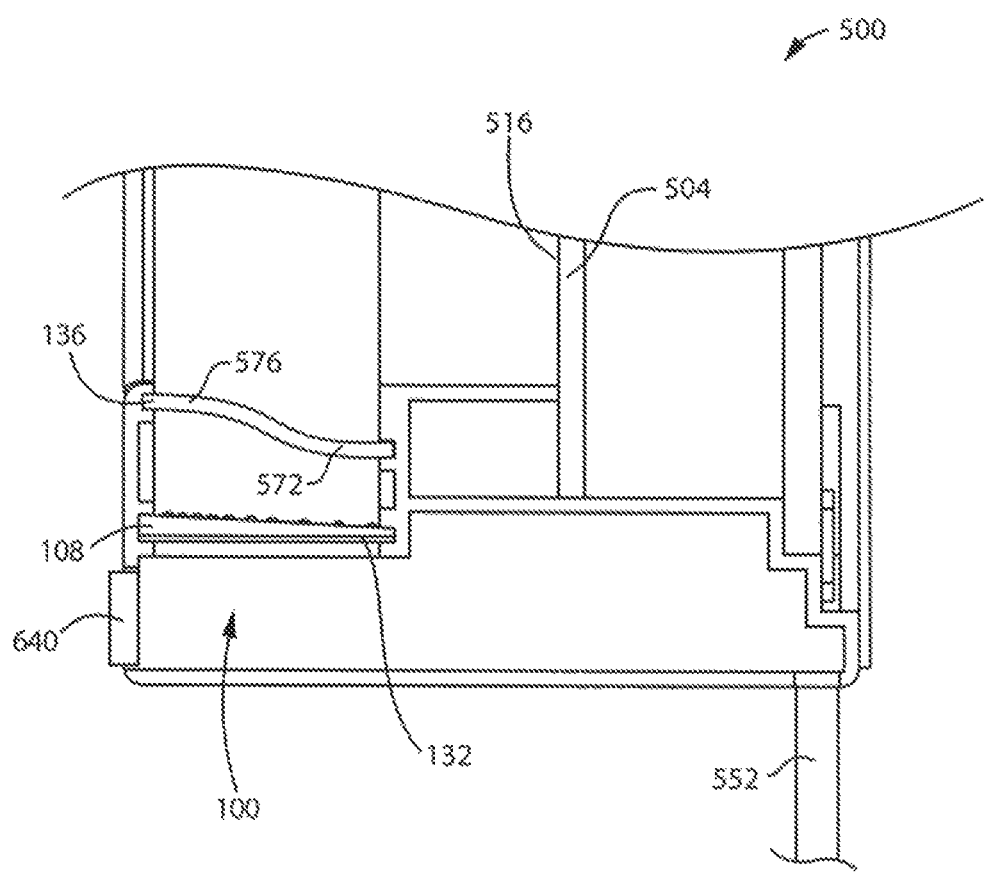

Light guide light emitting face 112 may be at a non 0 degree angle to an axis that is perpendicular to the front face of the artwork, e.g., non-parallel with diffuser 136 as exemplified in FIGS. 124-126, or parallel with an axis that is perpendicular to the front face of the artwork. In some embodiments, diffuser 136 may be angled to face rearwardly from vertical towards opening plane 516. An advantage of this design is that it can allow light radiated by diffuser 136 to be focused towards frame opening plane 516, so that a greater portion of the radiated light strikes artwork 504, and therefore provides greater illumination of artwork 504, all else being equal. Similar to light guide light emitting face 112, diffuser 136 may be substantially planar, concave (FIG. 127), or convex (FIG. 128). FIG. 129 shows another example including a diffuser 136 having a rear concave portion 572 and a front convex portion 576.

Figure 130:
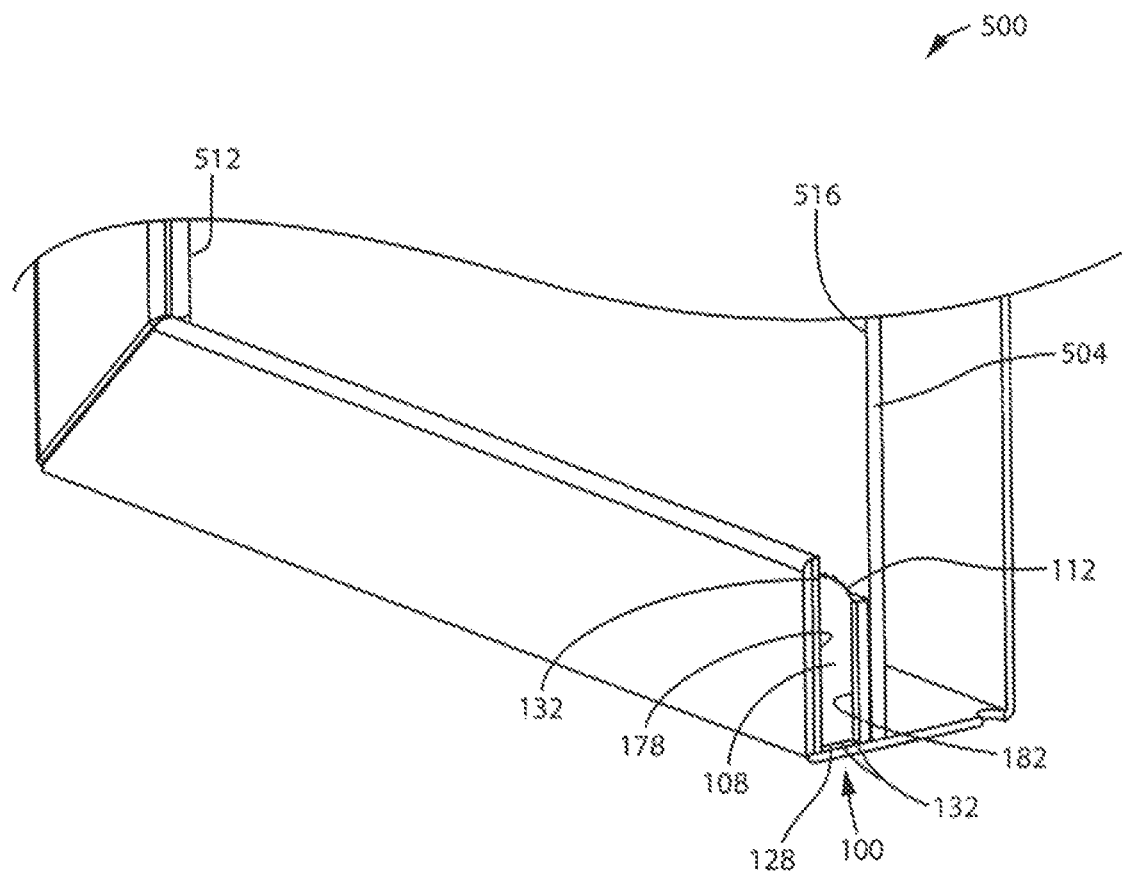

As exemplified in FIG. 130, in some embodiments, LED light source 100 may not include a diffuser. As shown, light emitted from light guide light emitting face 112 may emit light inwardly towards frame inner opening plane 516 without passing through a diffuser. In this case, light guide 108 may emit sufficiently diffuse light for the particular artwork 504 being illuminated so that a diffuser is unnecessary or unwanted. An advantage of this design is that it avoids the cost, weight, and light attenuation associated with a diffuser. As exemplified, the light emitting face 112 faces towards the artwork and is curved so as to emit light so as to spread out across the front face of the artwork.

As previously discussed, LED light source 100 may include any number of reflectors 132 associate with any faces of light guide 108. For example, LED light source 100 may include reflector(s) 132 positioned so that collectively they reflect light emitted from two or more faces of light guide 108 other than light guide light emitting face 112. An advantage of this design is that less light propagating through light guide 108 may be lost through faces other than light emitting face 112. As a result, the efficiency of LED light source 100 may be improved. In the illustrated embodiment, LED light source 100 includes reflectors 132 positioned adjacent light guide bottom face 128, light guide rear side 178, and light guide front side 182. The reflectors 132 may be one contiguous reflector or three discrete reflectors. The reflectors 132 may be in contact with or spaced apart from their respective faces 128, 178, and 182. In some embodiments, reflector 132 of light guide front side 182 may extend inwardly beyond light emitting face 112. An advantage of this design is that it allows reflector 132 to reflect stray light emitted from light emitting face 112 back towards frame inner opening 512 (and artwork 504).

Figure 131:
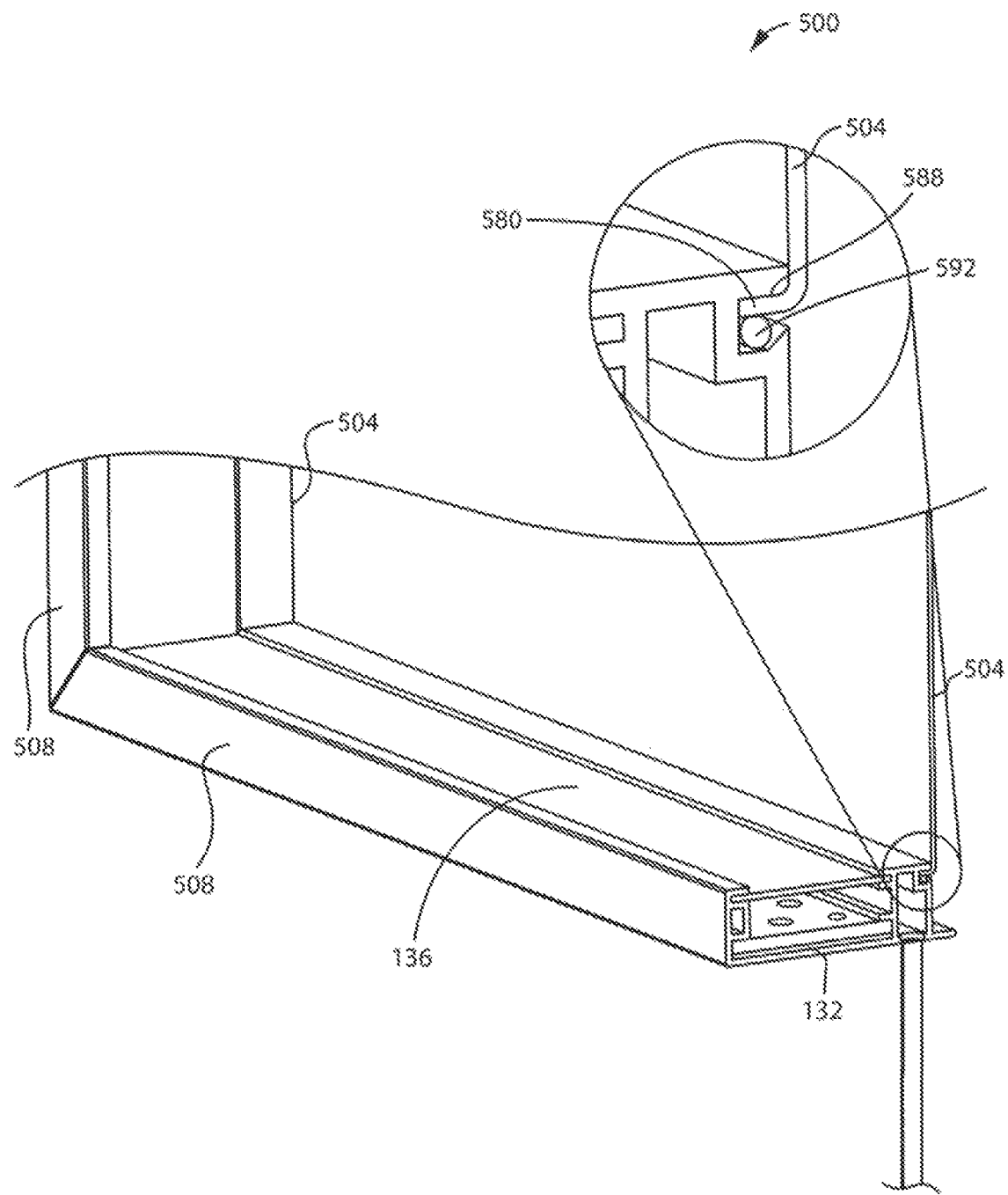

The artwork may be secured in the frame by any method known in the art. For example, the artwork may be unmounted and stretched when mounted in the frame. As exemplified in FIG. 131, frame 500 holds artwork 504 in a manner that conceals a peripheral portion 580 of artwork 504. An advantage of this design is that it hides the unsightly peripheral portion 580 which is fastened to frame 500 (e.g. for the purpose of stretching the artwork 504 flat). In the illustrated embodiment, a rear portion 584 of frame side panel 508 includes an artwork retention slot 588 sized to receive and firmly grasp artwork peripheral portion 580. As shown, artwork retention slot 588 is positioned rearward of LED light source 100 and therefore hidden from view.

Artwork retention slot 588 can hold artwork peripheral portion 580 in any manner. In the illustrated embodiment, artwork retention slot 588 includes a resiliently deformable member 592 that allows artwork peripheral portion 580 to be wedged into artwork retention slot 588. An advantage of this design is that it provides a non-destructive, selectively removable manner of holding artwork peripheral portion 580.

Figure 132:
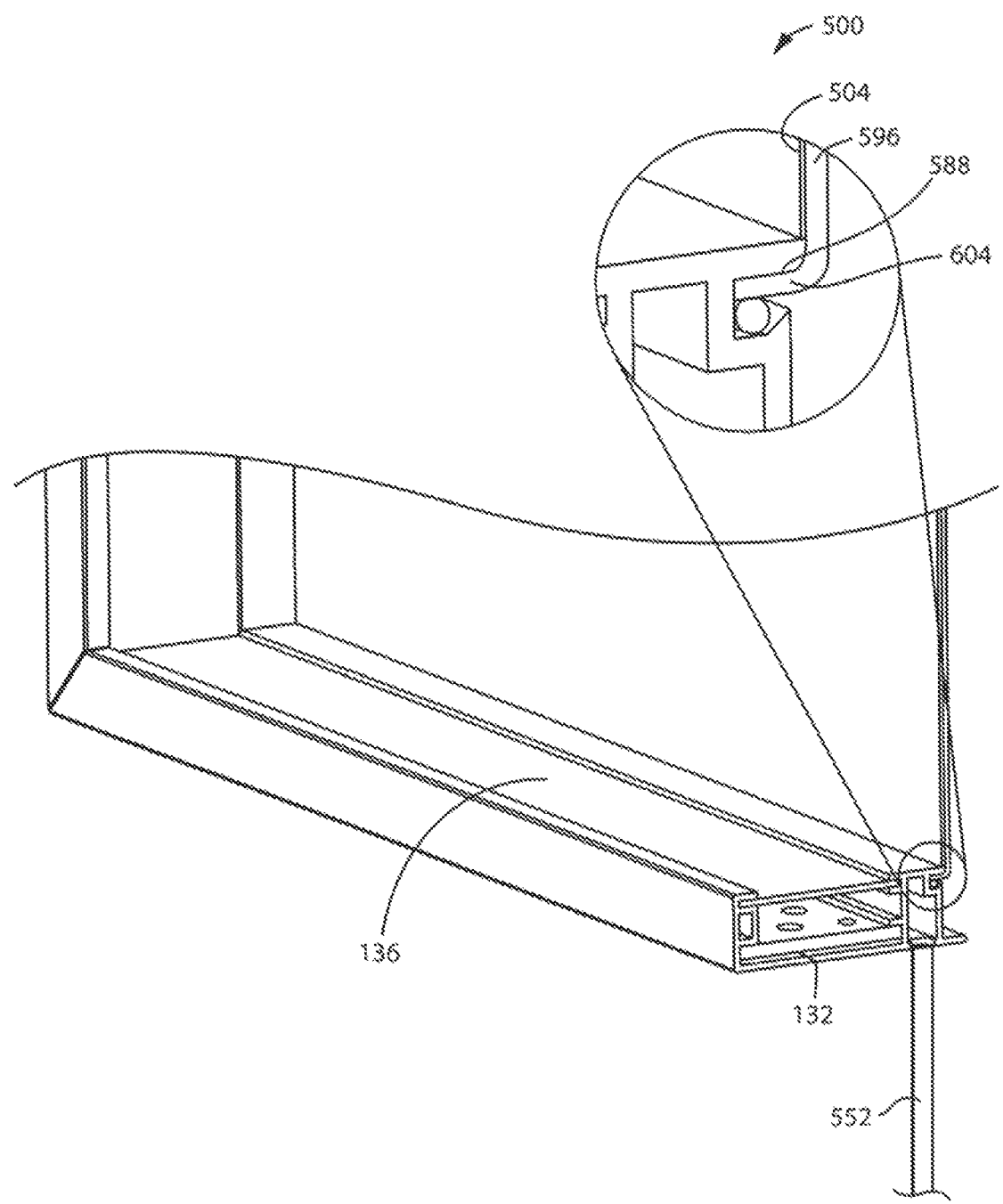

FIG. 132 exemplifies another embodiment in which artwork 504 is applied to (e.g. bonded to) a canvas backing 596, and a peripheral portion 604 of canvas backing 596 is held in artwork retention slot 588.

Figure 133:
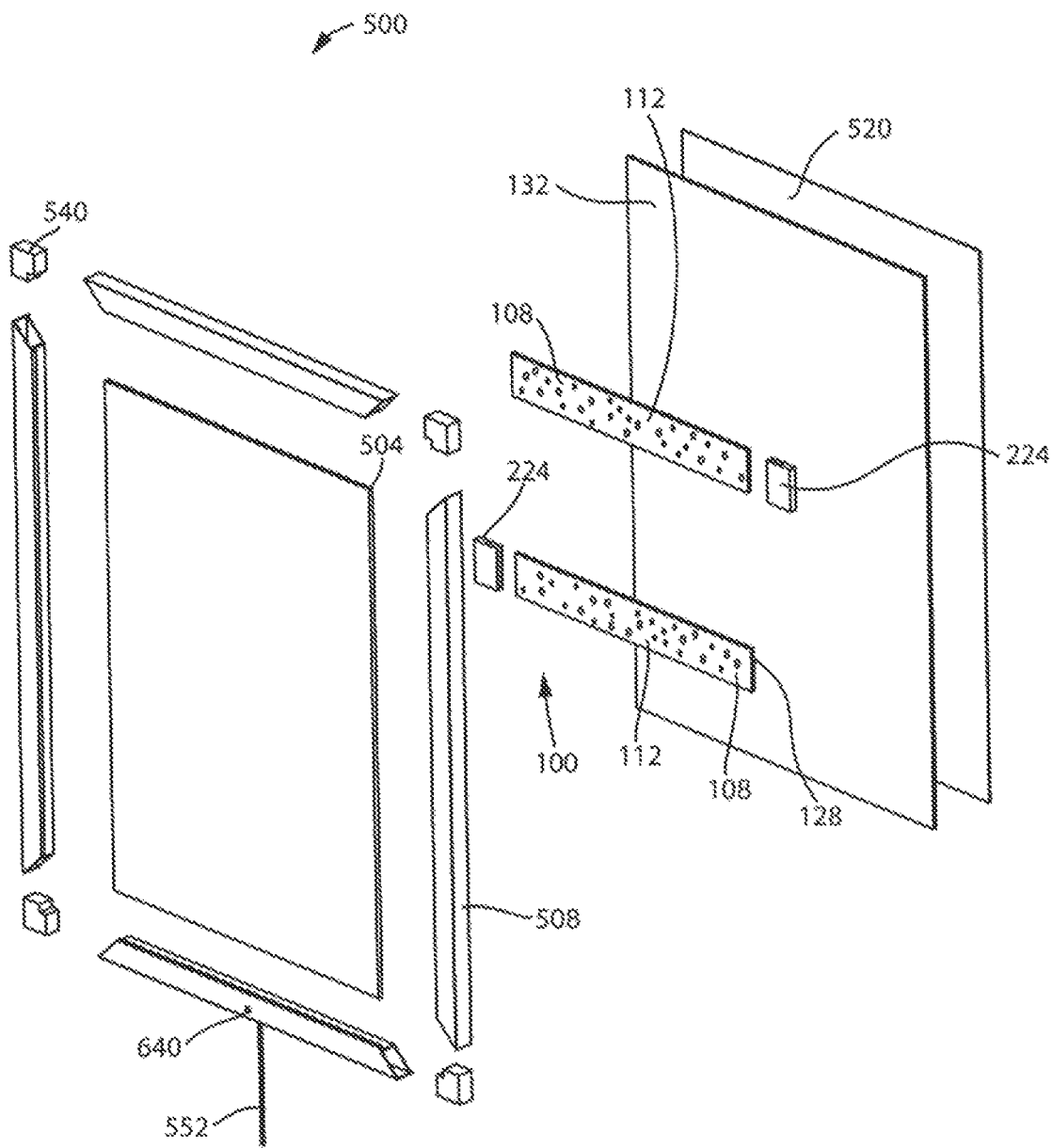
FIG. 133 is an exploded view of the frame of FIG. 109 in accordance with another embodiment.
Figure 134:
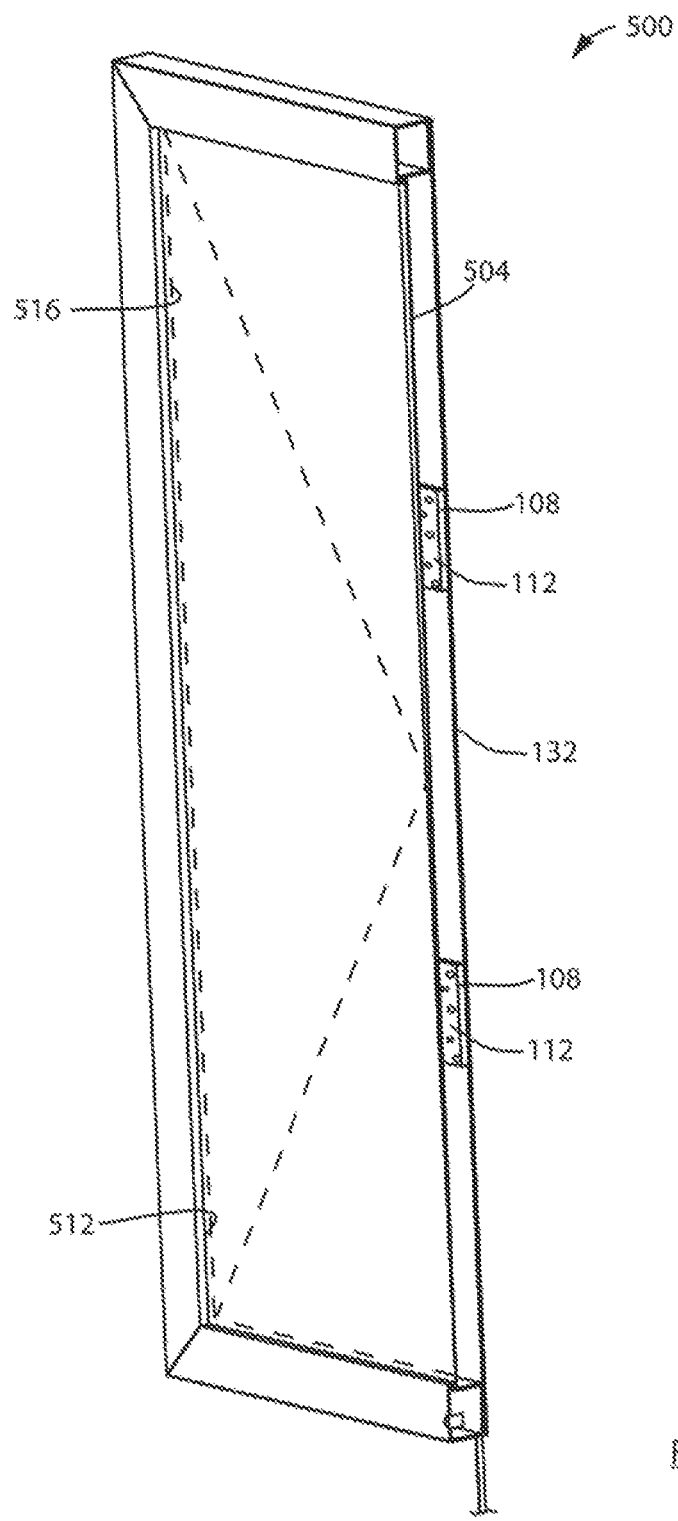
FIG. 134 is a cross-sectional view taken along line E-E in FIG. 109 in accordance with an embodiment.
Figure 135:
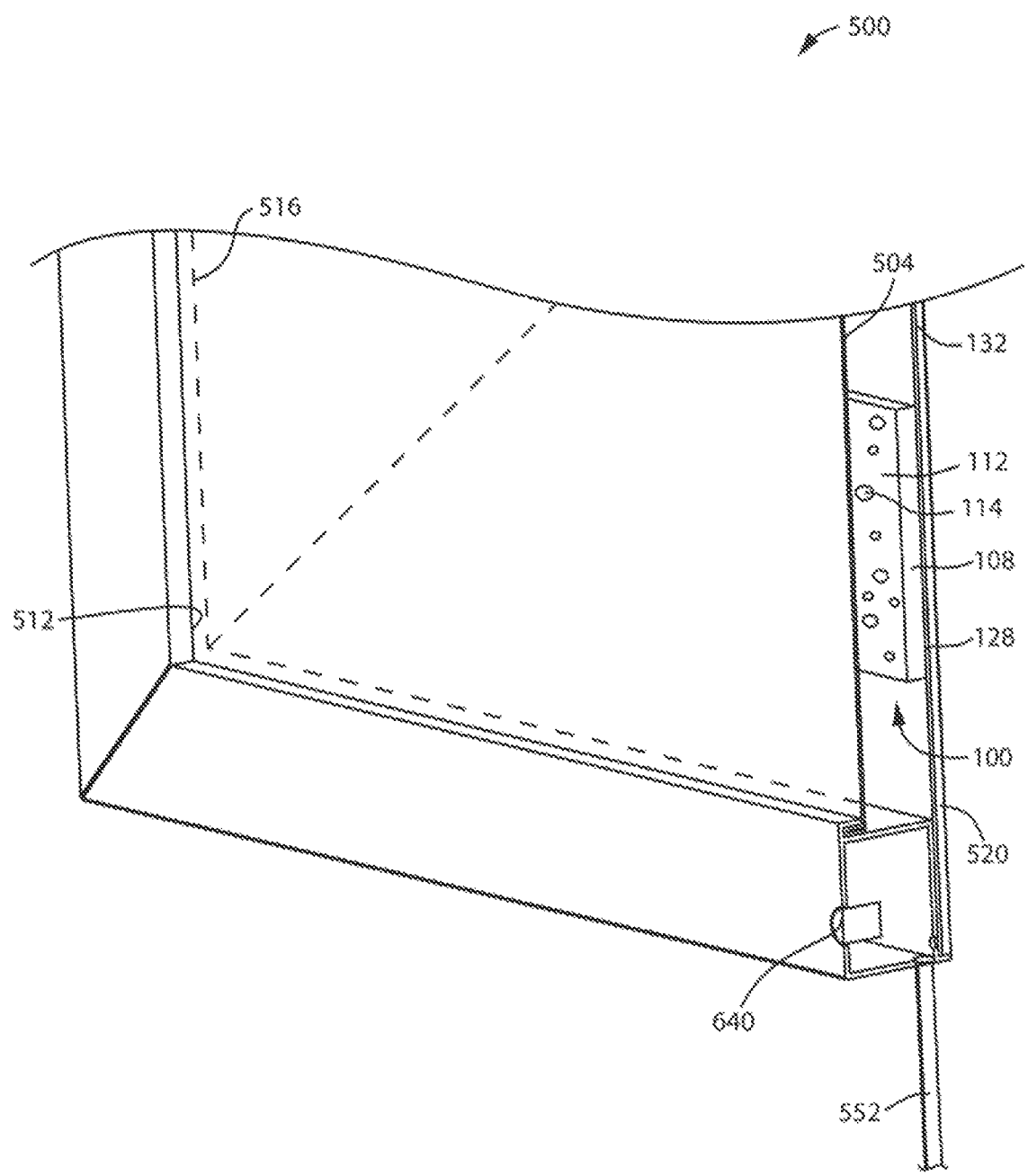
FIG. 135 is a partial cross-sectional view taken along line E-E in FIG. 109, in accordance with an embodiment.

Alternately or in addition to using light sources in one or more of the side panels, the light source 100 may back light part or all of the artwork. Backlighting may be used if the artwork is, e.g., translucent. As with the light source 100 used in the side panels, the light source used for back lighting may use a light source having any one or more of the features set out herein. As exemplified in FIG. 133-135, frame 500 includes an LED light source 100 that backlights artwork 504. LED light source 100 can include any number of light guides 108, which have light emitting faces 112 that collectively underlay (are positioned rearward of the artwork and have a light emitting face 112 that faces towards the artwork) any portion (or all) of the area of frame inner opening 512. In the illustrated embodiment, LED light source 100 includes two spaced apart light guides 108, each endwise-illuminated by LEDs held by a housing end member 224. As shown, light guides 108 are positioned rearward of frame inner opening plane 516 and artwork 504. Light guides 108 can have any shape and orientation. In the illustrated embodiment, light guides 108 extend longitudinally in a horizontal direction, and are spaced apart in a vertical direction. In other embodiments, light guides 108 may extend longitudinally in a vertical direction or another direction, and may be spaced apart in any direction or side-by-side.

As exemplified, light emitting faces 112 are spaced rearwardly of artwork 504. An advantage of this design is that it allows light emitted by light guides 108 to spread-out across a wider area before striking artwork 504. For example, light emitting faces 112 may be spaced rearwardly of frame inner opening plane 516 by, e.g., 0.25 to 1 inches. In some embodiments, LED light source 100 may not include a diffuser between light emitting face 112 and artwork 504. For example, the substrate of artwork 504 (e.g. canvas) may behave as a suitable diffuser for the art thereon.

As discussed previously and as exemplified, LED light source 100 may include a reflector 132 positioned rearwardly of light guides 108. Reflector 132 may have a size that corresponds to the light guide rear faces 128 as in previous examples, or may extend over an area greater than light guide rear faces 128. In the illustrated example, reflector 132 is sized to overlay substantially the entire frame inner opening 512. An advantage of this design is that it allows reflector 132 to reflect light emitted (e.g. by reflection or otherwise) from artwork 504, and therefore improve the lighting efficiency of frame 500.

Figure 136:
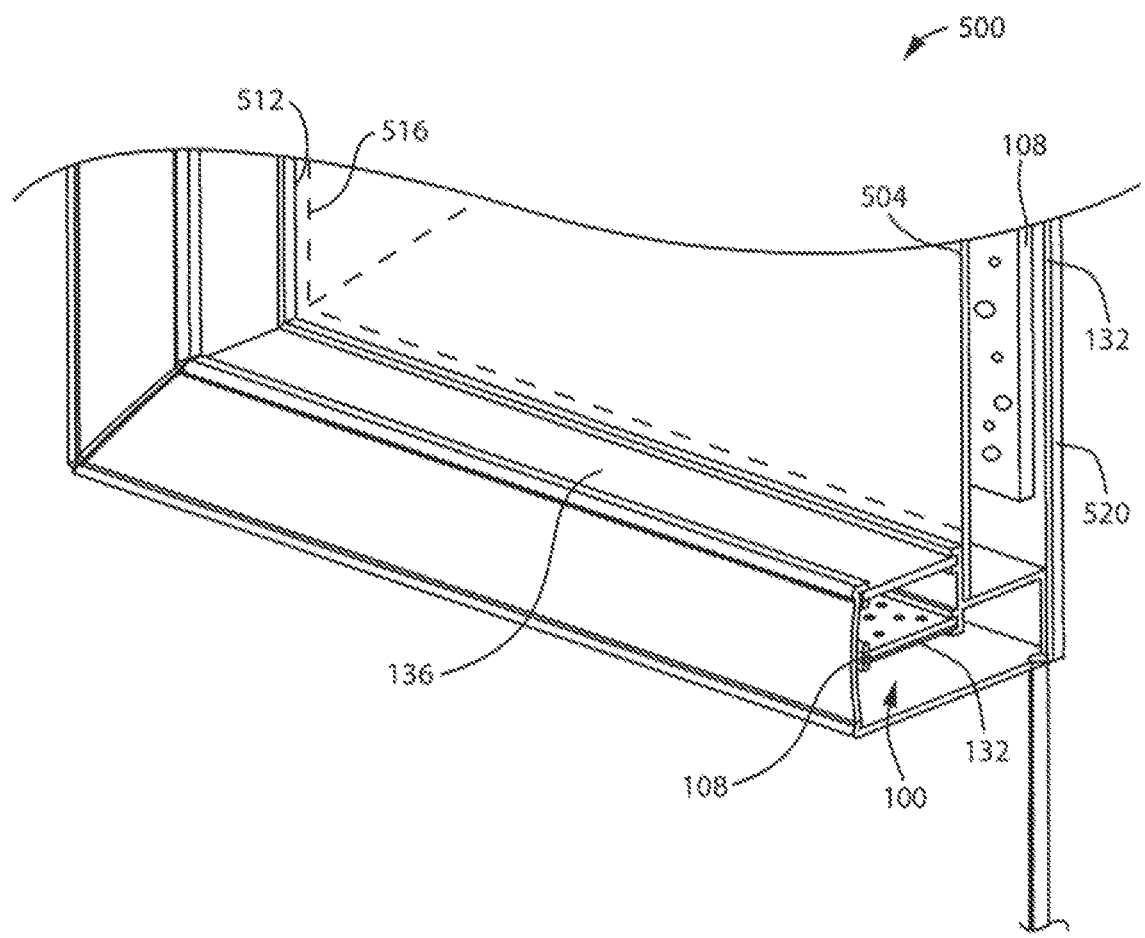

Frame 500 may include a LED light source 100 that provides side lighting, backlighting, or both. FIG. 136 shows an example of a frame 500 including an LED light source 100 which includes a light guide 108 rear of frame inner opening plane 516 to provide backlighting, and a light guide 108 positioned forward of frame inner opening plane 512 to provide side lighting.

Figure 137:
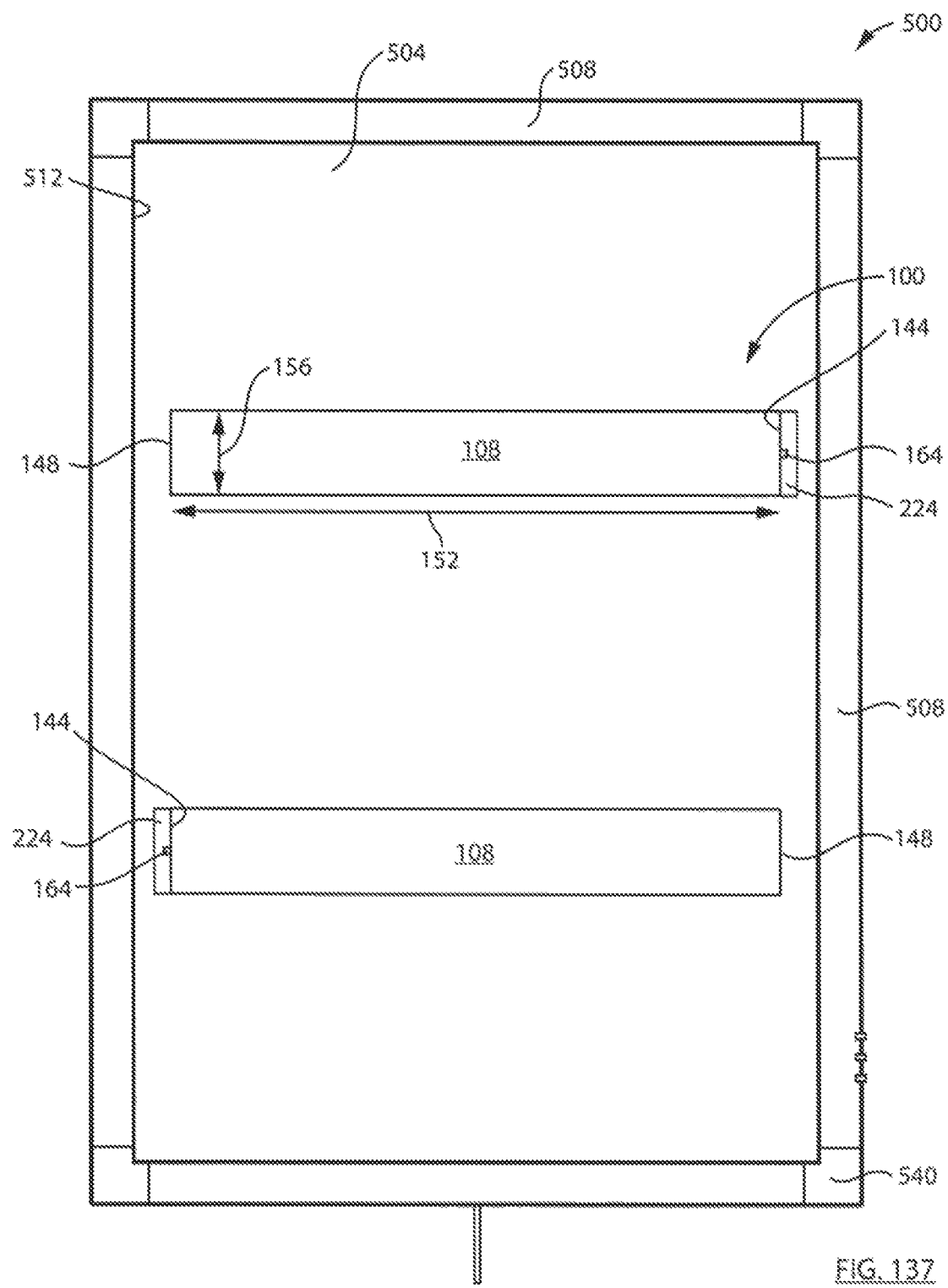
Figure 138:
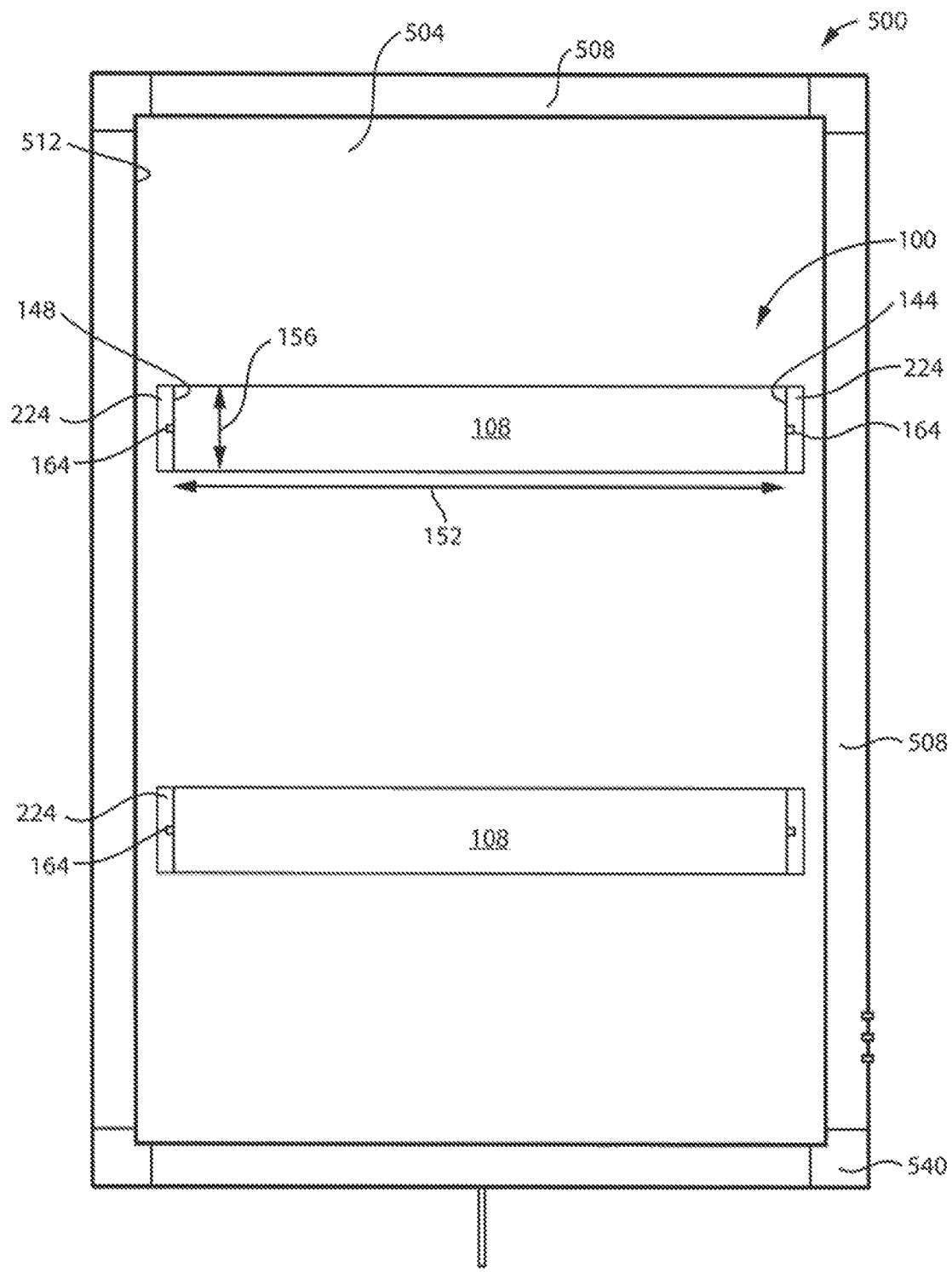

As exemplified in FIGS. 137-138, LED light source 100 may include backlighting light guides 108 illuminated from one or both end faces 144 and 148. For example, FIG. 137 shows light guides 108 illuminated from one end face 144 or 148 each. As discussed previously and as exemplified, light guides 108 may be illuminated from opposite end faces 144 or 148. An advantage of this design is that it can provide more even illumination by spacing apart LEDs 164 on opposite sides of frame 500. FIG. 138 shows another example including light guides 108 each illuminated at both of their respective end faces 144 and 148.

Figure 139:
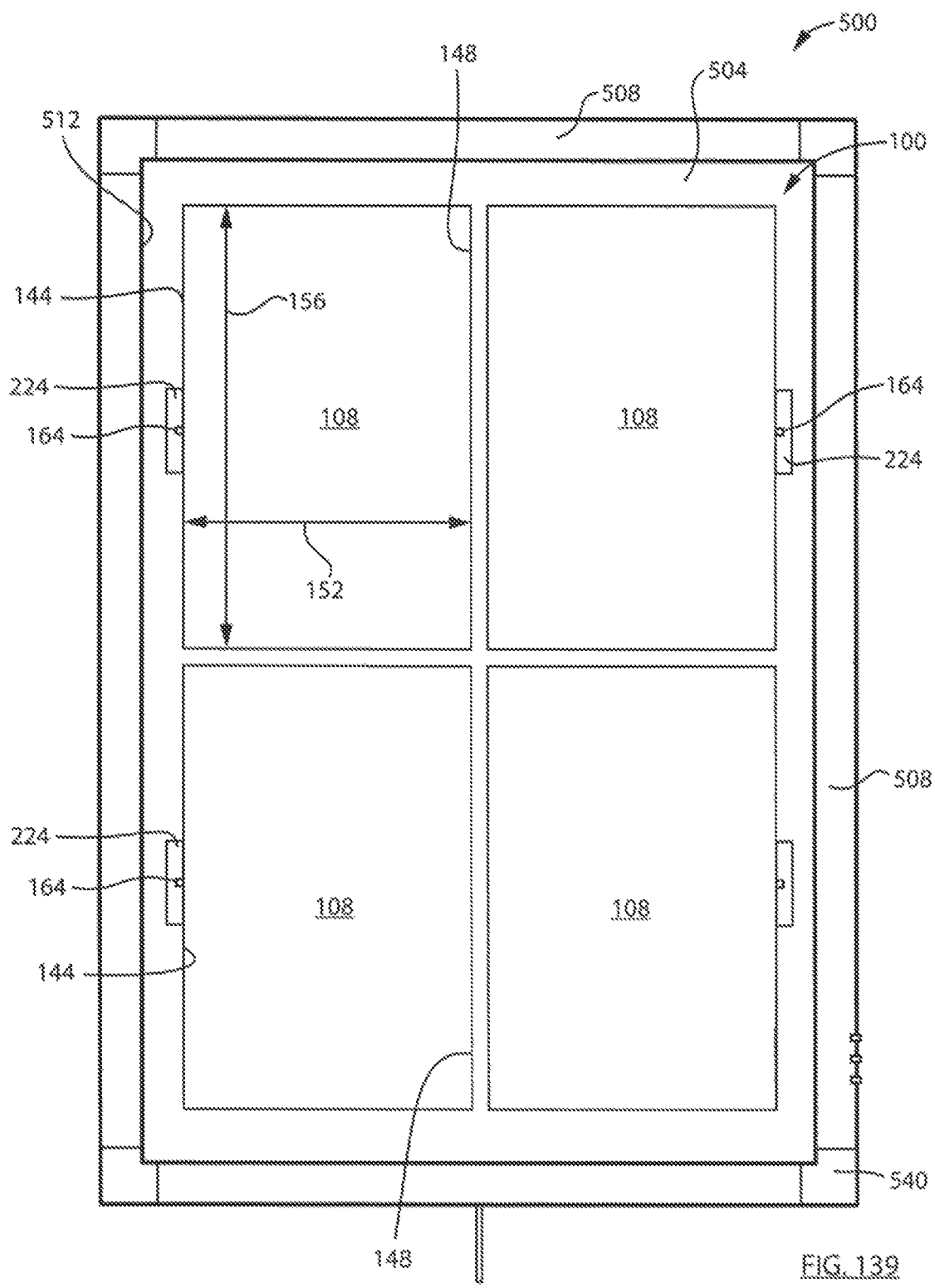
Figure 140:
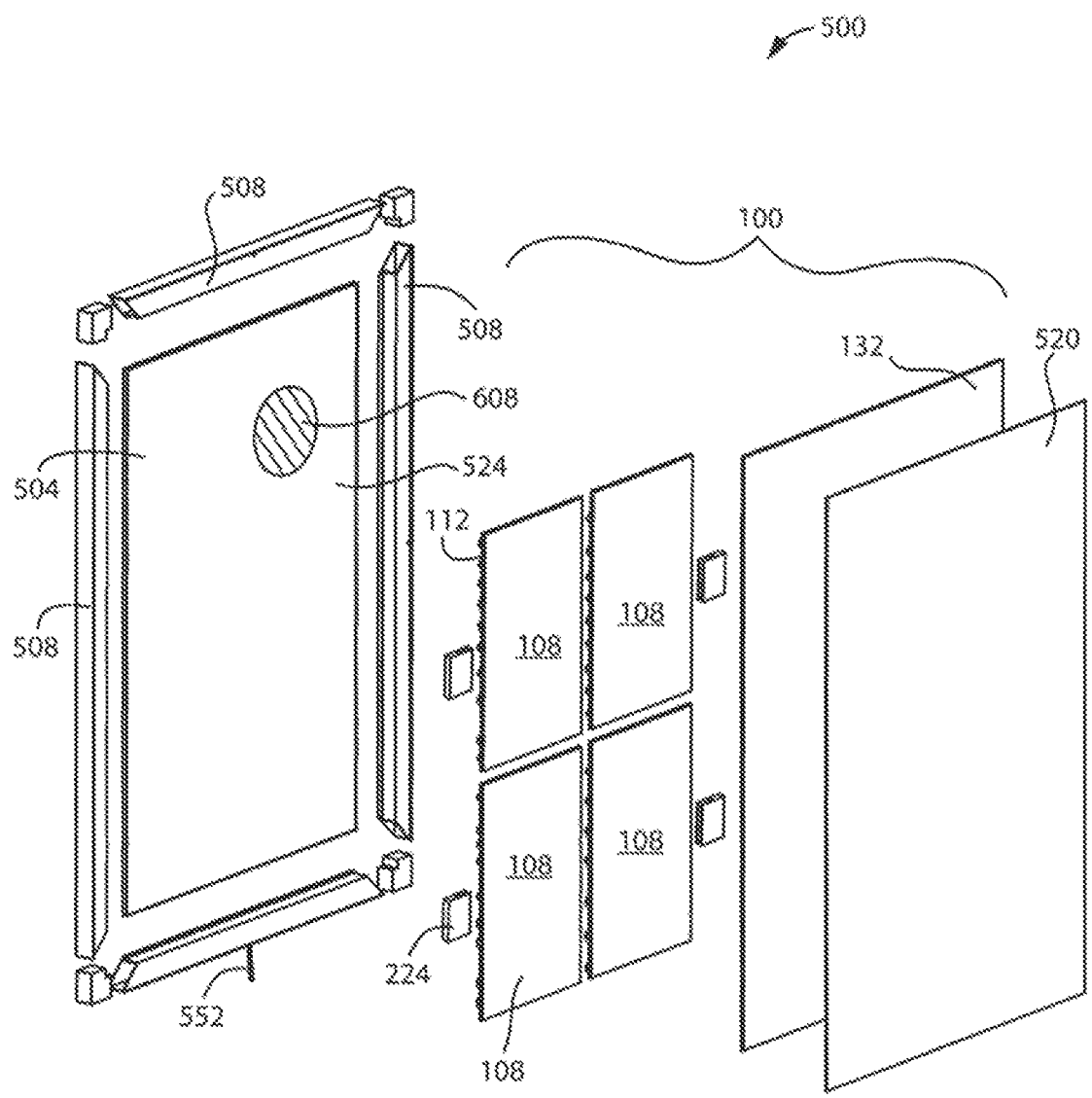

LED light source 100 may include any number of light guides 108 of any longitudinal length 152 and transverse width 156, so that collectively light guides 108 underlay any portion or all of the area of frame inner opening 512. The illustrated example includes two light guides 108 that collectively underlay approximately 15% of the area of frame inner opening 512. FIG. 139 shows another example including four light guides 108 that collectively underlay approximately 75% of the area of frame inner opening 512. In some cases, it may be preferable to have light guide(s) 108 that collectively underlay a wide area (e.g. at least 25%) of frame inner opening 512 to more evenly backlight artwork 504.

Alternatively or in addition, LED light source 100 may include a plurality of light guides 108 each having only one light emitting face 112. An advantage of this design is that each artwork may be backlit by a light guide 108 illuminated by different LEDs 164 selected particularly for that artwork 504. This can allow for greater variation in the backlighting of the two artworks 504.

As exemplified in FIGS. 150-151, in any of the embodiments of frame 500 described or shown herein, LEDs 164 of LED light source 100 may be carried on a removable cartridge 116 in accordance with any embodiment of cartridge 116 described or shown herein. The illustrated embodiment shows an example in which a cartridge 116 is insertable into and removable from a recess 140, and when inserted the LED(s) 164 of cartridge 116 are positioned and oriented to emit light into a light guide first end face 144 or 148. Recess 140 may include a recess opening 184 formed in frame corner 540 as shown, or a frame side panel 508.

Light Mask

In accordance with another aspect of this disclosure, which may be used with one or more other aspects disclosed herein, a light mask 608 may be positioned between LED light source 100 and artwork 504. Mask 608 can be any element that overlays only a portion of artwork 504 (i.e. does not overlay another portion of artwork 504) and which alters the extent to which the LED light source 100 illuminates part of the artwork (e.g., inhibits, diminishes, filters, alters the colour of the light or otherwise alters light emitted by LED light source 100). For example, as exemplified in FIG. 40, mask 608 may be a discrete disc of material, or a coating (e.g. UV or fluorescent paint) applied to artwork rear face 524 or light guide light emitting face 112 or a further substrate. An advantage of this design is that it can provide fine control over the color and/or intensity of light that backlights different portions of artwork 504. For example, it may be desirable to position a mask 608 behind a solid-black portion of artwork 504 to inhibit LED light source 100 from backlighting this portion and causing the black to appear as grey. In another example, it may be desirable to position a colored or fluorescent mask 608 under a similarly colored portion of artwork 504 to enhance the color of that portion of artwork 504, which may otherwise tend to lose color saturation when backlit. In another example, it may be desirable to position a mask 608 behind a lighter portion of artwork 504 to reduce the backlighting of this portion and thereby enabling more backlighting of darker portions of the artwork. It will be appreciated that the mask 608 may be applied to one or more portions of a clear substrate (e.g., glass, plastic) which is of the same size as the artwork and may be separately mounted in the frame.

Positioning of the Light Emitting Locations

In accordance with another aspect of this disclosure, which may be used with one or more other aspects disclosed herein, the light emitting locations 114 may be distributed over the surface of light guide light emitting face 112 in any manner that provides a desired distribution of light output. In some embodiments, a density of light emitting locations 114 is substantially equal across the whole of light guide light emitting face 112. An advantage of this design is that it allows large sheets of light guide material to be manufactured and divided arbitrarily for use in LED light sources 100 without concern over registering the light emitting locations 114 to particular portions of each light guide 108 cut from the sheet.

Figure 141:
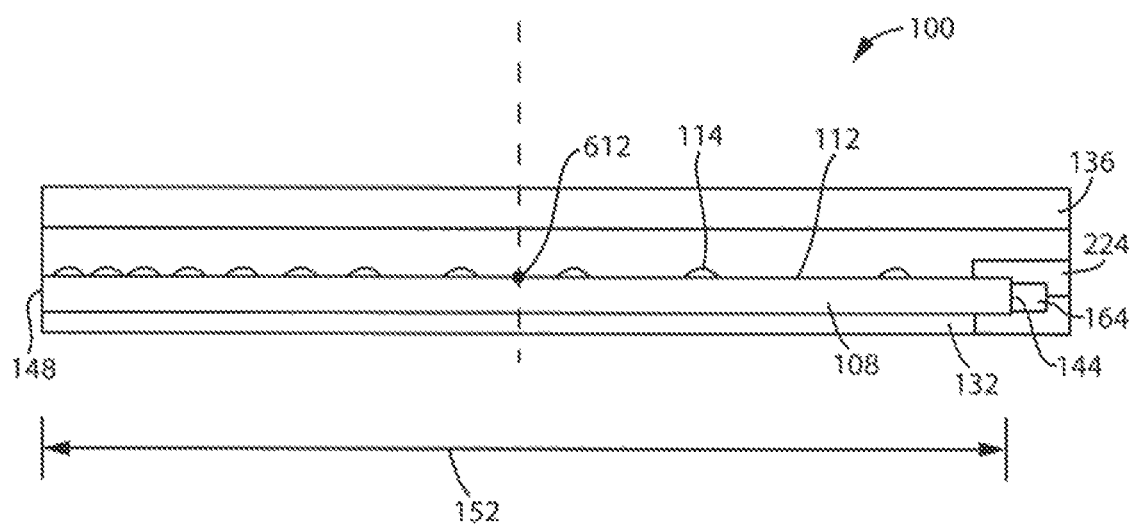

As exemplified in FIG. 141, light guide 108 may have light emitting locations 114 unevenly distributed over light guide light emitting face 112. An advantage of this design is that it can allow light guide 108 to emit light at a level of illumination that is substantially the same across light guide light emitting face 112, or to emit light with a higher level of illumination in some areas compared to others, depending on the arrangement of light emitting locations 114. For example, FIG. 141 shows a light guide 108 illuminated from light guide first end face 144 by LED(s) 164. The quantum of light within light guide 108 decreases from first end face 144, where no light has yet been deflected out or absorbed by light emitting locations 114, to light guide second end face 148, by which point much of the light traveling from light guide first end face 144 has been deflected out or absorbed by light emitting locations 114. As shown, light guide 108 may have light emitting locations 114 that increase in density longitudinally from the first end face 144 to the second end face 148. An advantage of this design is that this can allow light guide 108 to emit light at a level of illumination that is substantially the same along the longitudinal length 152 of light guide 108. For example, the level of illumination emitted at the longitudinal middle 612 of light emitting face 112 may be ±20% of a level of illumination emitted proximate light guide first end face 144, and in some examples ±10% of a level of illumination emitted proximate light guide first end face 144.

Figure 142:
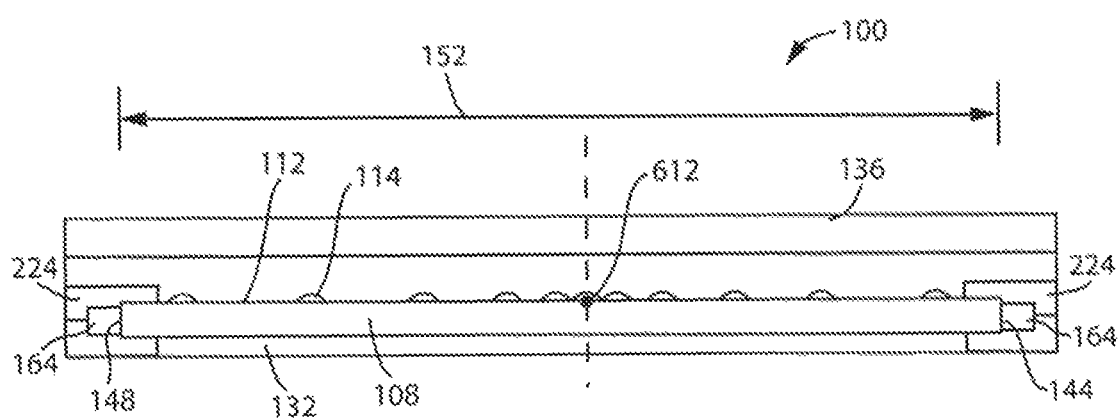

FIG. 142 exemplifies another embodiment including a light guide 108 illuminated from both of light guide first and second end faces 144 and 148 by LEDs 164. As shown, light guide 108 may have light emitting locations 114 that increase in density longitudinally from the first and second end faces 144 and 148 to the light guide longitudinal middle 612. Once again, this can allow light guide 108 to provide a generally even level of illumination along the longitudinal length 152 of light emitting face 112.

FIG. 123 exemplifies an example including a light guide 108 that is illuminated by LEDs from a longitudinal end face. In this example, the light emitting locations 114 proximate light guide rear side 178 may contribute illumination to a relatively smaller portion of artwork 504 than the light emitting locations 114 proximate light guide front side 182 due to their closer proximity to artwork 504. In the illustrated example, light emitting locations 114 increase in density transversely from light guide rear side 178 to light guide front side 182. An advantage of this design is that it can allow light guide 108 to provide more even illumination across the height of artwork 504 by allowing greater light to emit from the front portion of light guide light emitting face 112 which directs light to a relatively greater area of artwork 504. As a result, a person viewing the artwork 504 may view a generally evenly illuminated image.

Figure 143:
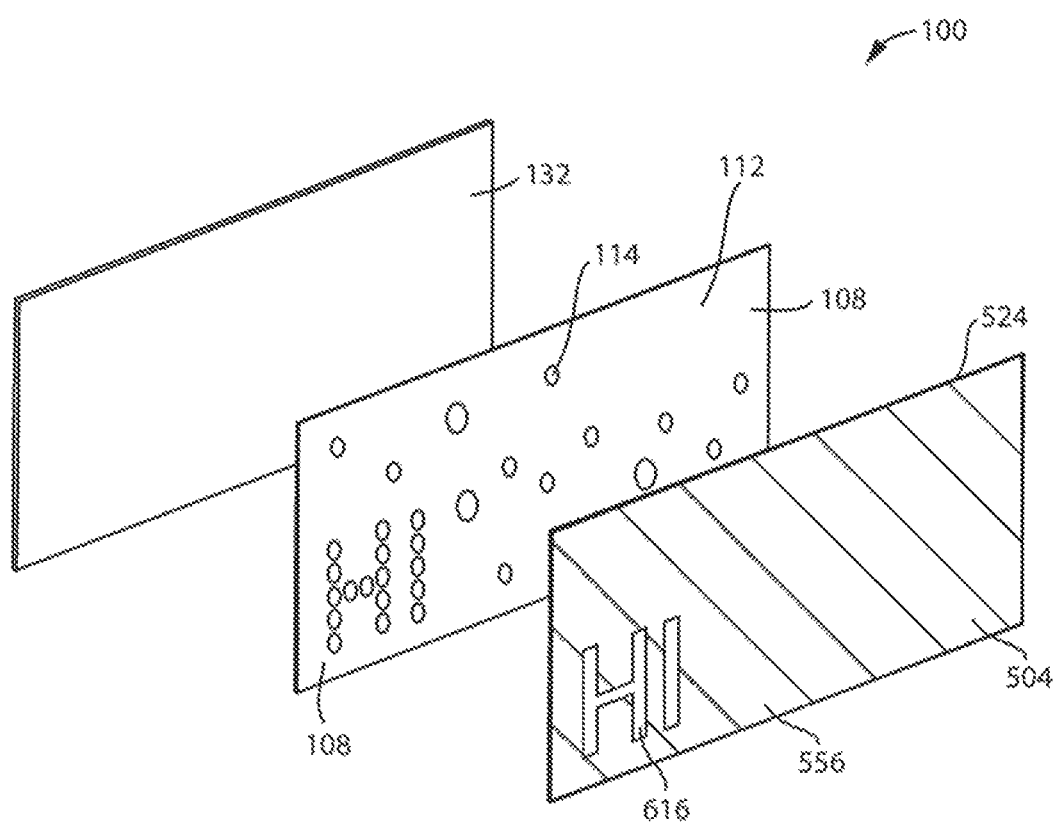

FIG. 143 exemplifies another embodiment including an LED light source 100 which illuminates an image 504 having a region 616 of a different color and/or density (e.g. color density) and/or light transmissivity. In some cases, the difference in color, density, or light transmissivity of the image region 616 may result in uneven illumination from image front face 556 when the entire image 504 is evenly backlit through image rear face 524. In the illustrated example, light guide light emitting face 112 has light emitting locations 114 positioned to enhance the illumination of image region 616 so that a person viewing the image front face 556 views a generally evenly illuminated image, or optionally an enhanced illumination in one or more portions of the artwork. As shown, light guide light emitting face 112 may have a greater density of light emitting locations 114 aligned behind image region 616 than elsewhere on light guide light emitting face 112. This can allow light guide 108 to provide greater illumination to image region 616 so that image region 616 may appear brighter or, if image region 616 is a darker colour than the rest of the artwork, then to enable image region to, e.g., have about the same level or illumination.

Variable Reflection

In accordance with another aspect of this disclosure, which may be used with one or more other aspects disclosed herein, reflector 132 may provide different levels of reflection to thereby provide more light and/or different coloured lights in one or more regions.

Figure 144:
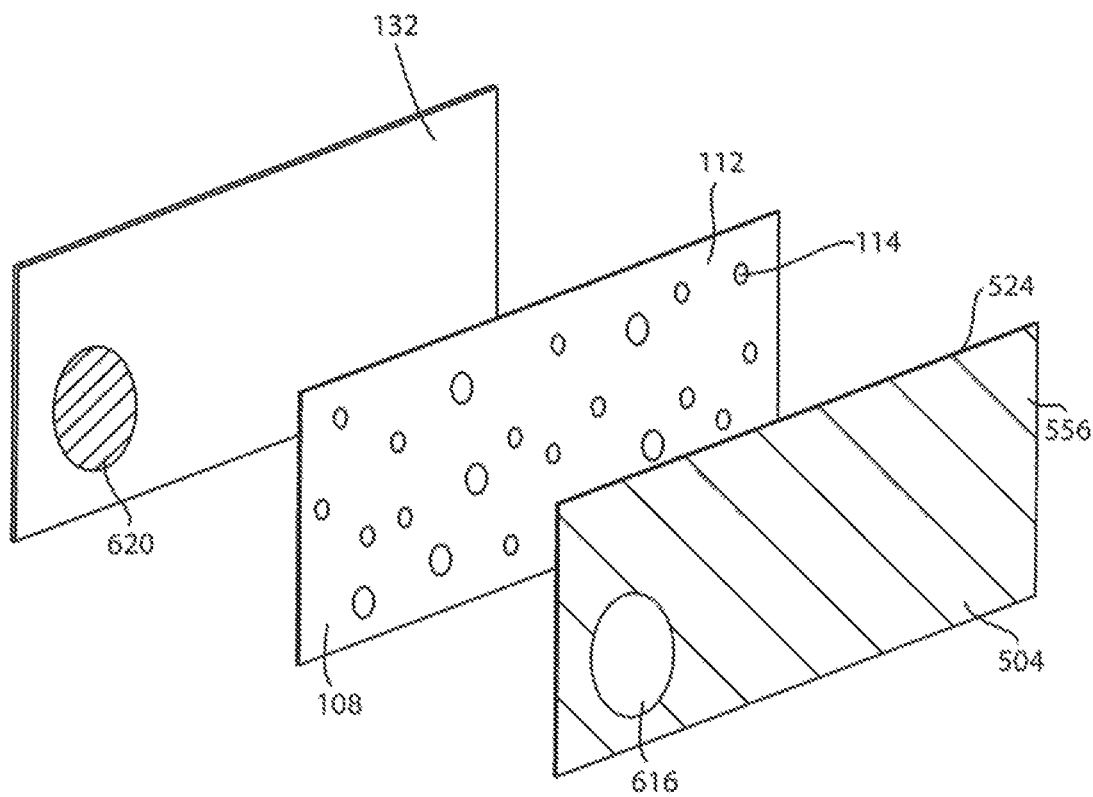

FIG. 144 exemplifies another embodiment including an LED light source 100 which illuminates an image 504 having a region 616 of a different color, density, and/or light transmissivity. As shown, reflector 132 may include a reflector region 620, which is aligned with the image region 616. Reflector region 620 differs from the remainder of reflector 132 in that it is configured to reflect or emit (e.g. photoluminescently) light having a different color. For example, reflector region 620 may be colored, include (e.g. overlaid by) a filter material, or include (e.g. overlaid by) a photoluminescent material (e.g. fluorescent or phosphorescent material). For example, reflector region 620 may comprise UV or fluorescent paint. The color of light reflected or emitted by reflector region 620 may correspond with or compliment the color of image region 616. This can help improve the color (e.g. color saturation or color accuracy) of image region 616 when backlit by LED light source 100.

Variable Thickness of the Light Guide

In accordance with another aspect of this disclosure, which may be used with one or more other aspects disclosed herein, the thickness of the light guide may be varied so as to adjust the level of illumination emitted by one or more portions of the light guide.

Figure 145:
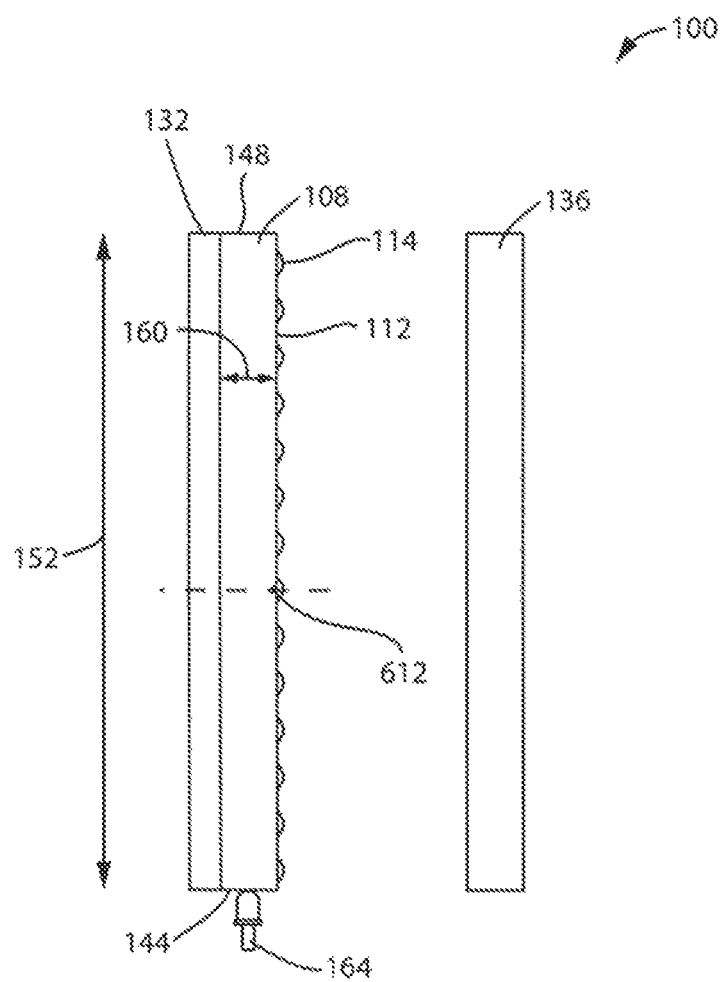
Figure 146:
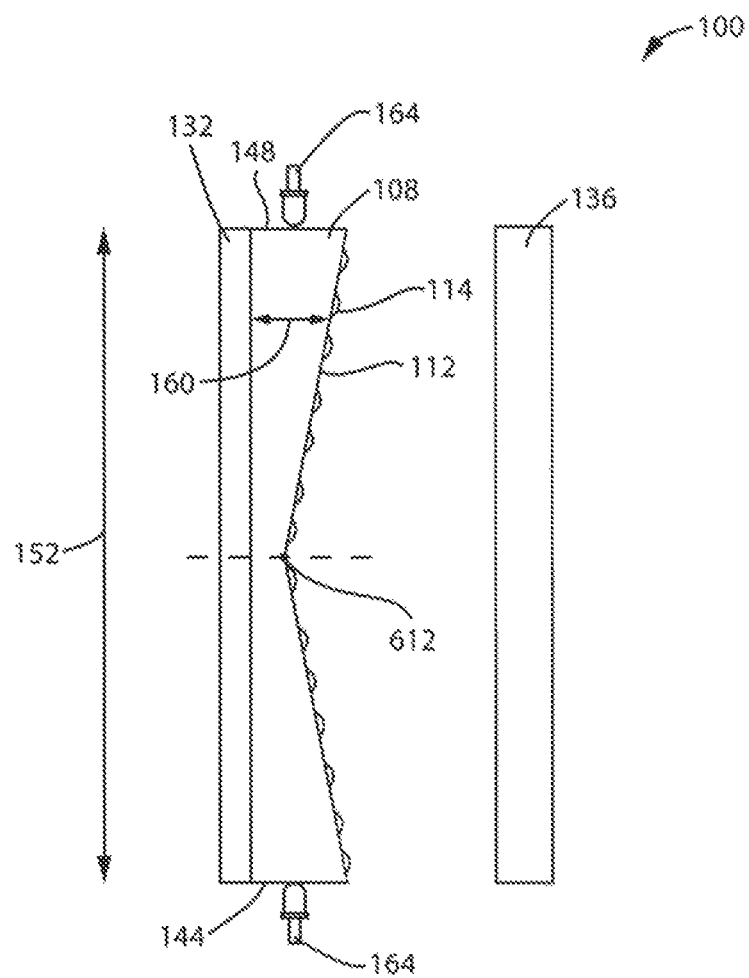

FIG. 145-146 exemplify a light guide 108 having a thickness 160. As shown in FIG. 145, thickness 160 may be substantially constant along a dimension (such as longitudinal length 152 as shown, or transverse width) of light guide 108. FIG. 146 exemplifies an embodiment in which thickness 160 varies along a dimension (such as longitudinal length 152 as shown, or transverse width) of light guide 108. In the illustrated example, light guide thickness 160 decreases from the illuminated light guide end faces 144 and 148 to light guide longitudinal middle 612. The variation in thickness can be used as an alternative to or in addition to variation in light emitting location density to control the level of illumination emitted from light guide light emitting face 112, such as to attain generally even illumination emitted across light emitting face 112. In other embodiments, light guide thickness 160 may increase or decrease in a different manner, such as increasing from longitudinal end faces 144 and 148 to light guide longitudinal middle 612 or decreasing from an illuminated light guide end face 144 to a non-illuminated light guide end face 148.

Double Sided Frames

Figure 147:
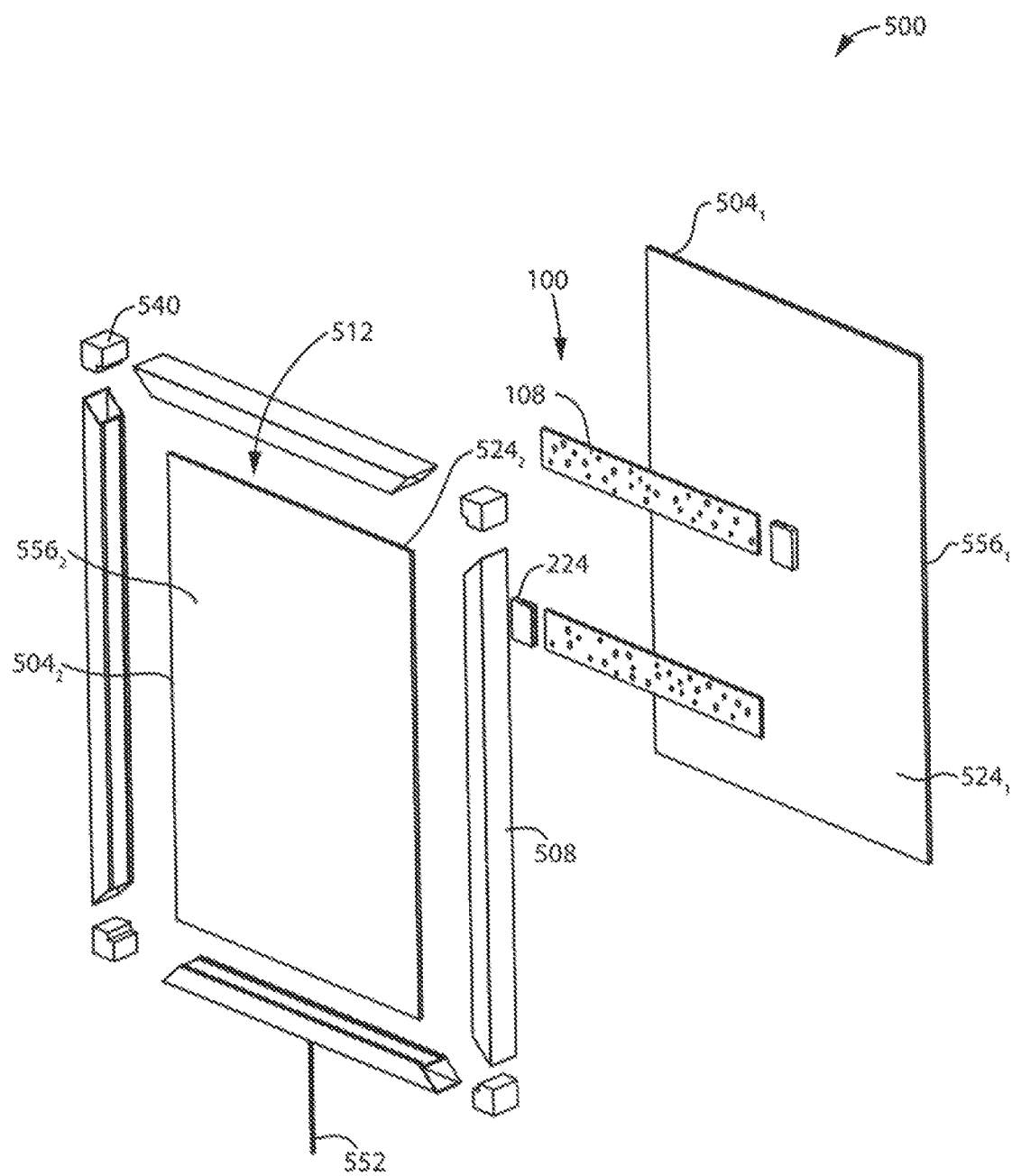

In accordance with another aspect of this disclosure, which may be used with one or more other aspects disclosed herein, frame 500 may be "double-sided" in that it provides support for two artworks 504 within frame inner opening 512 (see for example FIG. 147). As exemplified, the artwork rear faces 524 face each other, and the artwork front faces 556 face outwardly in opposite directions. An LED light source 100 may be positioned between artwork rear faces 524 to provide backlighting to both artworks 504. An advantage of this design is that it provides a compact arrangement for displaying two backlit artworks 504 (e.g. as compared with two separate frames 500 each containing one artwork 504).

Figure 148:
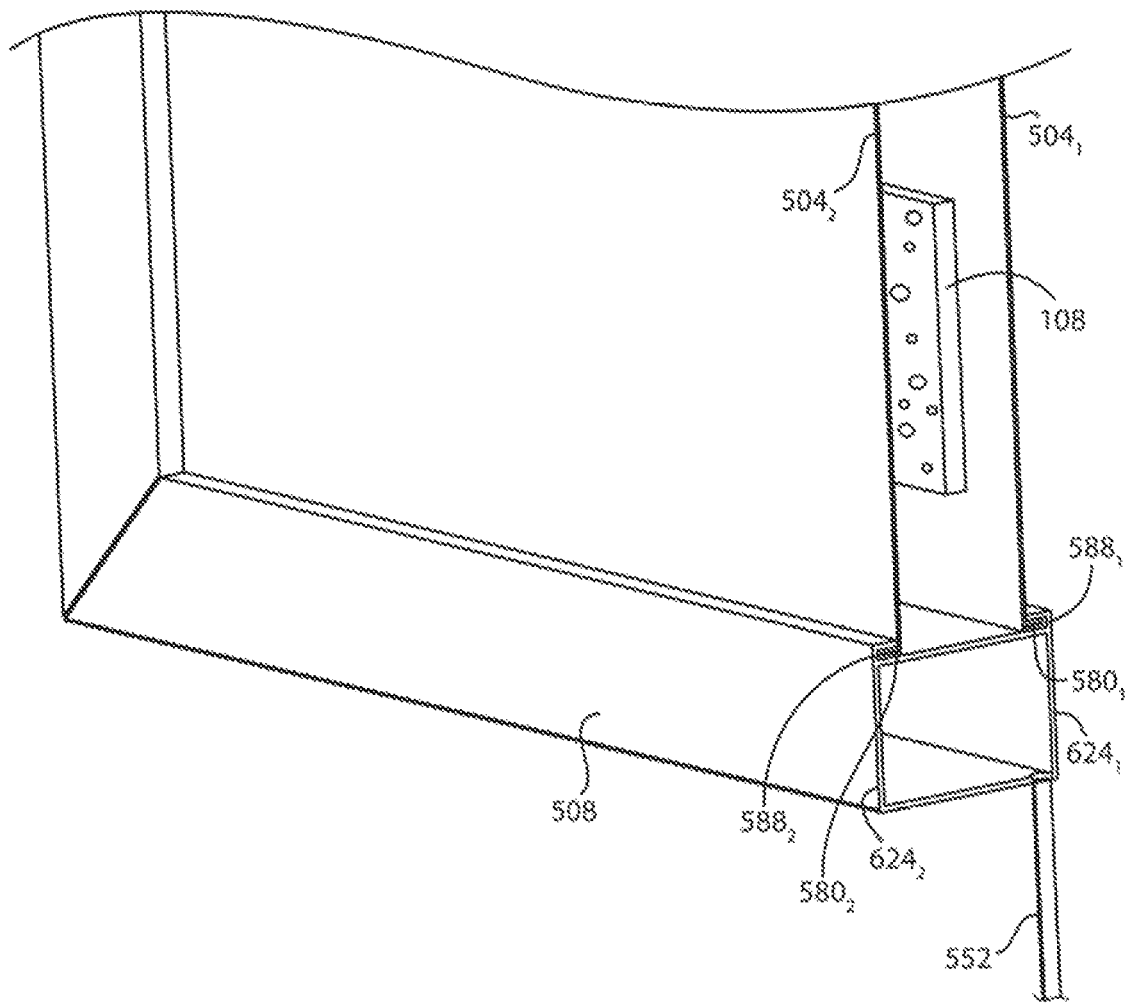

As shown in FIG. 148, frame 500 may include first and second artwork retention slots 5881 and 5882 which hold peripheral portions 5801 and 5802 of first and second artworks 5041 and 5042 respectively. For example, frame side panels 508 may include first and second artwork retention slots 5881 and 5882 which face inwardly from proximate the first and second sides 6241 and 6242 of frame side panels 508.

Double Sided Light Guide

Figure 149:
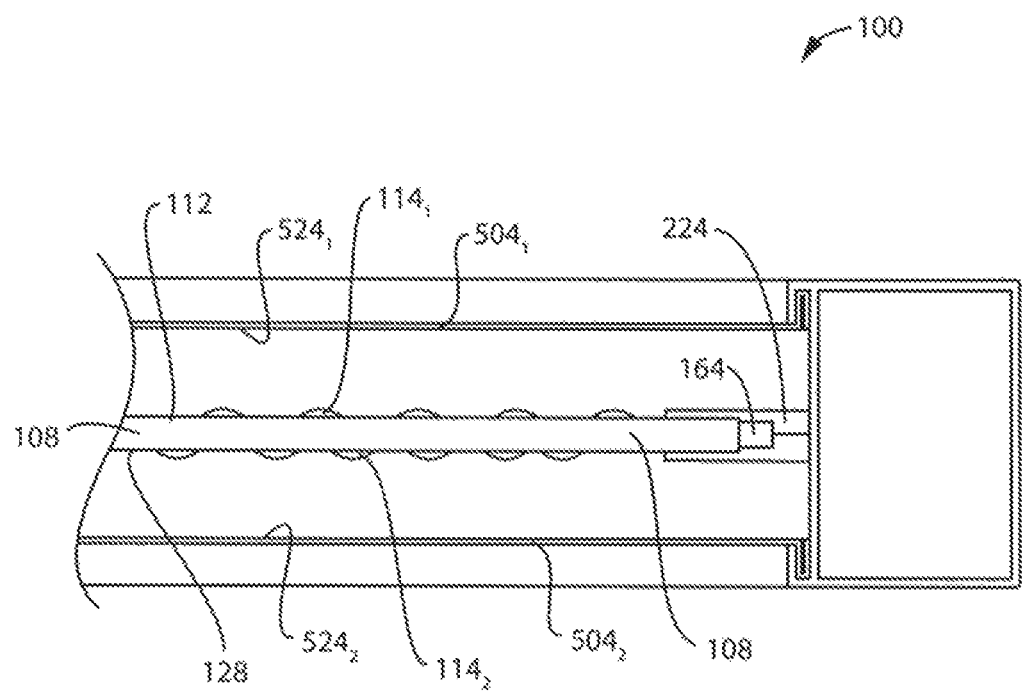

In accordance with another aspect of this disclosure, which may be used with one or more other aspects disclosed herein, a light guide may have more than one light emitting face 112. Therefore, a planar light guide may have opposed front and rear light emitting surfaces, As exemplified in FIG. 149, LED light source 100 may include one or more light guides 108 including dual light emitting faces 112 and 128 which emit light in opposite directions towards artwork rear faces 5241 and 5242 of artworks 5041 and 5042 respectively. As shown, both light emitting faces 112 and 128 may include light emitting locations 114. Accordingly, LED light source 100 may not include a reflector 132 positioned to reflect light emitted from either of light emitting faces 112 and 128. As shown, light emitting faces 112 and 128 are spaced apart from the artwork rear face 5241 or 5242 they illuminate respectively.

In some embodiments, the light emitting locations 1141 on light guide light emitting face 112 be the same or identical to the light emitting locations 1142 on light guide light emitting face 128. An advantage of this design is that substantially identical backlighting may be provided to both of artwork 5041 and 5042 from the light guide 108. In the illustrated embodiment, the light emitting locations 1141 on light guide light emitting face 112 differ from the light emitting locations 1142 on light guide light emitting face 128. An advantage of this design is that it allows dissimilar artwork 5041 and 5042 to be provided with different backlighting (e.g. so that a person viewing the artwork front faces 5561 and 5562 views generally evenly illuminated artwork). The differences in the light emitting locations 114 may be one of pattern (e.g. location density), type (e.g. discontinuities vs. light scattering material vs. photoluminescent spots), size or shape, color, or combinations thereof.

Alternate Modes of Operation

In accordance with another aspect of this disclosure, which may be used with one or more other aspects disclosed herein, frame 500 may include an LED light source that can be operated to emit light in a selected one of a plurality of modes. The plurality of modes may differ by color (e.g. select activation of LEDs of certain colors), level of illumination (e.g. power to the LEDs), region of illumination (e.g. select illumination of a subset of light guides), sequence of illumination, duration of illumination of a region or combinations thereof.

FIG. 152 is a schematic illustration of a circuit 628 of LED light source 100 in accordance with an embodiment. As shown, circuit 628 may include a controller 632 that receives input from one or more user inputs 636, and/or one or more sensors 640 (also seen in FIG. 109), and in response directs the mode of operation of LEDs 164. An advantage of this design is that it allows LEDs 164 to operate responsive to environmental conditions or user inputs, which can result in better power efficiency or better user experience.

Controller 632 can be any device suitable for directing the mode of LEDs 164 responsive to input from user inputs 636 and/or sensors 640. For example, controller 632 may include a processor or microcontroller, or may be an integrated circuit, or a logical arrangement of conductors (e.g. wires)

and other components (e.g. logic gates, transistors, etc.) that can perform the functionality described herein. Sensor 640 may be a motion sensor, or it may detect levels of sound, illumination in a room or the sound of voices, In some embodiments, controller 632 is operable to change the level of illumination produced by LED(s) 164 in response to inputs from one or more sensor(s) 640 and/or user input(s) 636. For example, controller 632 may be operable to vary the power delivered from the energy storage member 460 to the LED(s) 164. The power may be varied by voltage (e.g. reducing the voltage to reduce the level of illumination) or by varying the pulse width modulation (e.g. reducing the duty cycle to reduce the level of illumination). As an example, FIGS. 153A and 153B exemplify a power supply circuit 628 that can be toggled between a first mode in which batteries 460 can are connected in parallel (FIG. 153A) and a second mode in which batteries 460 are connected in series (FIG. 153B), in response to input from sensor(s) 640. In the series connection (FIG. 153B), the LEDs 164 receive greater voltage and therefore generate greater illumination than in the parallel connection (FIG. 153A). Power supply circuit 628 can be toggled between the parallel and series connection configurations by moving a switch 630 in response to input from sensor(s) (or by manual operation) between a first position (FIG. 153A) and a second position (FIG. 153B).

Returning to FIGS. 109 and 152, sensor 640 can be any device that can detect an environmental condition. For example, sensor 640 may be a presence sensor, such as a sound sensor, heat sensor or a motion sensor. An advantage of this design is that it can allow controller 632 to operate LEDs 164 in a different mode (e.g. at an increased level of illumination or by turning the light source on) when sensor 640 indicates nearby human presence (e.g. detects motion or sound indicative of human presence). In the context of an artwork frame 500, this can provide greater power efficiency where, for example controller 632 increases the level of illumination of LEDs 164 when a person is nearby to view the artwork 504, and decreases the level of illumination of LEDs 164 (and thus conserving energy) when no one is detected nearby.

Alternatively or in addition, sensor(s) 640 may include a light sensor that can detect ambient light. For example, sensor 640 may sense the intensity and color of light shining on frame 500 (and artwork 504 by extension). In the context of artwork frame 500, this can provide greater visibility and color accuracy to artwork 504 where, for example controller 632 changes the level of illumination and color of LEDs 164 to compliment the sensed intensity and color of light shining on frame 500. Variations in light intensity and color may be especially prevalent where frame 500 is exposed to natural daylight.

User input 636 may be any device suitable for sensing manual user interaction. For example, user input 636 may include a switch such as a button (e.g. mechanical, resistive, or capacitive button), or slider for example. In some embodiments, user input 636 may be operatively connected to energy storage member 460 (or another power supply), and movable between a first position in which the energy storage member 460 is in a first power mode (e.g. series connected batteries) and a second position in which the energy storage member 460 is in a second power mode (e.g. parallel connected batteries).

Referring to FIG. 154, frame 500 can include any number of sensors 640. For example, frame 500 is shown including four spaced apart sensors 640. Sensors 640 can be positioned anywhere on frame 500. For example, sensors 640 may be positioned at different frame corner member 540. Referring to FIGS. 152 and 154, sensors 640 may be light sensors that provide input to controller 632. In response, controller 632 may direct the mode of LEDs 164. For example, where frame 500 includes a plurality of light guides 108 (see, e.g. FIG. 139), controller 632 may separately control power to the LEDs 164 illuminating those different light guides 108 in accordance with input from sensors 640 proximate those light guides 108. As an example, if sunlight is shining on the top half of artwork 504 (and thus detected by the upper two sensors 640), controller 632 may direct the LEDs 164 for the light guides that illuminate the top half of artwork 504 to reduce their level of illumination (e.g. by reducing the power level to those LEDs 164).

Meltable Electrically Conductive Member

In accordance with another aspect of this disclosure, which may be used with one or more other aspects disclosed herein, the LEDs may be provided in a circuit such that if one LED were to fail, the remaining LEDs may continue to operate. As exemplified in FIG. 155, each LED 164 (or grouping of LEDs 164) may be electrically connected in parallel with energy storage member 460 (or other power source). An advantage of this design is that it allows electrical power to pass through each LED 164 independently of the other parallel connected LEDs 164. For example, if one LED 164 was to fail, an interruption of electrical power across this failed LED 164 would not interrupt the flow of electrical power across the other parallel connected LEDs 164.

In the illustrated embodiment, each LED 164 is electrically connected to the circuit by a meltable electrically conductive member 644. An advantage of this design is that it can allow the LED 164 to be automatically electrically disconnected if the LED 164 fails in a way that causes the LED 164 to generate heat (e.g. due to electrical resistance of the failed LED 164). This can help prevent the failed LED 164 from causing heat damage to the remainder of the circuit 628, or worse causing a fire. Further, this can eliminate further power consumption by a failed LED 164.

Meltable electrically conductive member 644 can be any electrically conductive device that melts at a temperature corresponding to a temperature of a failed LED 164 receiving the rated current of that LED 164. For example, meltable electrically conductive member 644 may melt at a temperature above 80° C. In some examples, meltable electrically conductive member 644 may include fuse wire.

Shelving Unit or Drawer or Wall Panel or Ceiling Tile

In accordance with another aspect of this disclosure, which may be used with one or more other aspects disclosed herein, the light source may be incorporated into part of a shelving unit, drawer, wall panel or ceiling tile. The light source may use any one or more features disclosed herein.

As exemplified in FIG. 156, a shelving unit 652 (e.g. kitchen cabinet) includes an LED light source 100. As exemplified, LED light source 100 may be incorporated into a shelf 656 to provide lighting above, below, or both above and below the shelf 656. In the illustrated embodiment, shelf 656 includes a light guide 108 extending horizontally within an interior of the shelf 656 and having light emitting locations 114 on both an upper surface 112, and a lower surface 128. An advantage of this design is that LED light source 100 can provide illumination both above and below shelf 656.

In some embodiments, LED light source 100 defines an exterior surface of shelf 656. For example, LED light source 100 may include an upper diffuser 1361 defining an upper surface 660 of shelf 656, and a lower diffuser 1362 defining a lower surface 664 of shelf 656. As shown in FIG. 157, LED light source 100 may include LEDs 164 positioned within an interior of shelf 656 and oriented to illuminate light guide end face 144. FIG. 158 shows an example in which shelf 656 includes a recess 140 for receiving a removable cartridge 116 bearing LEDs 164. In the illustrated example, recess 140 has an insertion opening 184 in shelf lower surface 664 for upwardly inserting cartridge 116 into recess 140. In other embodiments, recess 140 may have a recess in shelf upper surface 660 or another shelf surface for inserting cartridge 116 downwardly or horizontally for example.

As exemplified in FIGS. 156, 159 and 160, shelving unit 652 may include a door 668 that is movable (e.g. sliding or hinged) between a closed position (FIG. 159) and an open position (FIG. 160). Moving door 668 from the closed position to the open position may activate LED light source 100 (e.g. cause LED light source 100 to illuminate). For example, shelving unit 652 may include a sensor 672 (e.g. push switch, optical encoder, infrared movement sensor, light sensor, etc.) that detects when door 668 is moved to the open position, and in response activates LED light source 100. An advantage of this design is that it can allow LED light source 100 to reduce or cease consuming power when shelving unit door 668 is closed. As a result, electrical power consumption is reduced, and the time to failure for the LEDs of LED light source 100 may be extended.

In the illustrated example, sensor 672 is a push switch that disconnects LED light source 100 from power source 126 (which may be a power cord 552 or energy storage member 460) when door 668 is in the closed position, and that reconnects LED light source 100 to power source 126 when door 668 is in the open position. FIGS. 161 and 162 show another example including an energy storage member 460 (e.g. batteries) as the power source that sensor 672 disconnects and reconnects to LED light source as shelving unit door 668 is closed and opened. An advantage of this design is that an electrical connection to mains power is not required allowing simpler installation, and reduced energy consumption provides prolonged battery life.

FIGS. 163 and 164 illustrate an example in which shelving unit shelf 656 is removable from shelving unit 652. An advantage of this design is that it can allow shelf 656 to be sold independently (e.g. in standard shelf sizes) and easily inserted (e.g. retrofitted) into a shelving unit that did not before have such lighting functionality. Embodiments of shelf 656 including an internal energy storage member 460 (FIG. 161) as a power source can make installation and shelf height adjustment very simple by avoiding any issues related to external electrical wiring.

FIG. 165-167 show an example of an LED light source 100 incorporated into the lowermost shelf 656 of shelving unit 652. LED light source 100 may illuminate in one direction (e.g. upwards or downwards) or in two directions (e.g. upwards and downwards). In the illustrated embodiment, LED light source 100 includes an upper diffuser 136, which may define shelf upper surface 660, and a lower reflector 132, such that LED light source 100 emits light upwardly into the interior of shelving unit 652 and not downwardly. FIGS. 168-169 exemplify another embodiment, in which diffuser 136 and reflector 132 are reversed so that LED light source 100 emits lights downwardly (e.g. onto a kitchen counter below). As shown, LED light source 100 may be recessed from a lower end of shelving unit 652, which may be formed by under-cabinet molding 684 as shown. An advantage of this design is that it can help focus the light downwardly, which can mitigate shining light directly towards user's eyes. In still other embodiments, reflector 132 is replaced by a diffuser 136 so that LED light source 100 emits light both upwardly and downwardly.

As exemplified in FIGS. 170-171, any portion of shelving unit 652 may incorporate an LED light source 100 which can be configured to illuminate inside and/or outside of shelving unit 652. In the illustrated example, shelving unit 652 includes a front face 676 formed by LED light source 100. Front face 676 may be part of under-cabinet molding as shown or positioned elsewhere on shelving unit 652 (e.g. part of above-cabinet molding). As exemplified, light guide 108 may extend laterally across front face 676 between a front diffuser 136 that radiates light forwardly and a rear reflector 132.

As exemplified in FIG. 172, a plurality of LED light sources 100 may share a common power supply 688. An advantage of this design is that each LED light source 100 is not required to have its own independent source of power. In the illustrated example, a plurality of shelving units 652 are shown, each including at least one LED light source 100, and one common power supply 688 which is electrically connected to all of the LED light sources 100. Power supply 688 may be any device suitable for distributing power to the plurality of LED light sources 100. For example, power supply 688 may include an energy storage member (e.g. batteries) and/or may be electrically connected to mains power.

In some embodiments, power supply 688 may be remotely controlled. An advantage of this design is that the electronics to control the plurality of LED light sources 100 may be centralized into one device, which can coordinate their operation. For example, power supply 688 may receive control signals by wire or wirelessly (e.g. over Bluetooth or by infrared) from a control device such as a smartphone, a remote control, or a wall mounted control panel. The control signals may direct power supply 688 to vary the illumination intensity or color of the LED light sources 100 individually or as a group.

As exemplified in FIG. 173, a drawer 692 may include an LED light source 100. LED light source 100 may be incorporated into any one or more of the bottom wall 696, or side walls 704 of drawer 692. An advantage of this design is that it can provide illumination into a drawer which may be in shadow relative to the light source in the room. In the illustrated example, LED light source 100 includes a light guide 108 (and optionally a front diffuser and rear reflector) incorporated into each of the four side walls 704.

As exemplified in FIGS. 174 and 175, a shelving unit 652 may include an LED light source 100 incorporated into the shelving unit doors 668. An advantage of this design is that it can provide additional illumination to open drawers 692, to objects withdrawn from the shelving unit 652 (e.g. clothing), and to the user using the objects withdrawn from the shelving unit 652 (e.g. the user trying on clothing). As shown, LED light source 100 emits light from an inside face 712 of shelving unit door 668. In the illustrated example, shelving unit 652 is shown including a shelving unit sensor 672 that can activate LED light source 100 in response to sensing that shelving unit doors 668 are open.

As exemplified in FIGS. 176 and 177, the LED light source 100 shown may form or be incorporated into a wall panel or ceiling tile. As shown, LED light source 100 includes a light guide 108 and diffuser 136 which are held spaced apart by a plurality of longitudinally spaced apart spacers 716. An advantage of this design is that spacers 716 can support loads applied to diffuser 136 (e.g. weight of a standing person) to hold diffuser 136 spaced apart from light guide light emitting face 112.

Spacers 716 may be integrally formed with light guide 108 as shown, or discrete components that are positioned between light emitting face 112 and diffuser 136. In some embodiments, spacers 716 and diffuser 136 may include mating mechanical or locking connectors 720. An advantage of this design is that it can make it easy to assemble diffuser 136 with spacers 716. In some embodiments, mechanical connectors 720 may be removably connectable. This can allow diffuser 136 to be removed, such as to access light guide 108 for repair or replacement. In the illustrated embodiment, mechanical connectors 720 include male connectors 7201 which are securely receivable in female connectors 7202.

In the illustrated embodiment, housing 104 surrounds light guide 108 (including light emitting face 112) and diffuser 136. In some embodiments, housing 104 is sealed to diffuser 136 to inhibit the passage of liquid and dirt. An advantage of this design is that it can allow LED light source 100 to be used outdoors. FIG. 176 shows an example of LED light source 100 having a reflector 132 and one light emitting face 112. FIG. 177 shows an example of LED light source 100 having no reflector and two light emitting faces 112 and 128. As shown in FIG. 177, spacers 716 may be spaced apart and longitudinally distributed between light emitting face 112 and diffuser 1361, and between light emitting face 128 and diffuser 1362.

Floor Tile, Window Frame, Stair Case and Closet, Floor Mat

In accordance with another aspect of this disclosure, which may be used with one or more other aspects disclosed herein, the light source may be incorporated into part or all of a floor tile or window frame or s stair case or closet or floor tile. The light source may use any one or more features disclosed herein.

Reference is now made to FIGS. 178-179. As shown, LED light source 100 (e.g. as shown and described with respect to FIG. 176) may be formed as or incorporated into a floor tile 722 for an indoor or outdoor walkway 728. In the illustrated example, walkway 728 includes a plurality of floor tiles 722 incorporating LED light source 100, and a plurality of traditional floor tiles 724 (e.g. absent any lighting function).

In some embodiments, floor tile 722 may include a mounting member 732 that helps to join the floor tile 722 to adjacent floor tiles 722 or 724, and/or to the mounting substrate (e.g. dirt, gravel, or mortar). As shown, floor tile 722 may include one or more fasteners 736 that join diffuser 136 to housing 104, and which can be selectively released to remove diffuser 136, such as to access light guide 108 or other components of LED light source 100 within housing 104. Floor tiles 722 may be powered in any manner disclosed herein. In the illustrated embodiment, floor tiles 722 are electrically connected to each other, and receive electrical power from a solar panel 476.

As exemplified in FIGS. 180-182 window frame 744 is similar to frame 500 shown and described elsewhere in the application, except for example that window frame 744 holds a window pane 748 instead of artwork and a backing layer. As shown, window frame 744 includes frame side panels 508 that surround a frame inner opening 512 and hold a window pane 748. LED light source 100 may be incorporated into any one or more (or all) of frame side panels 508. Window frame 744 may be powered in any manner disclosed herein. In the illustrated embodiment, window frame 744 includes solar panels 476 that are electrically connected to LED light source 100 for providing power to the same. Window frame 744 may be part of any structure, such as a garage door 752 as shown, or a fixed building structure (e.g. a wall).

As exemplified in FIGS. 183-184, doorway 756 may include a door 760 and a door frame 764. As shown, door frame 764 may include an LED light source 100. An advantage of this design is that door frame 764 can provide illumination to the area near door frame 764. For example, door frame 764 may provide some initial illumination to a dark room on the opposite side of door 760, which can make finding and activating a light switch for the dark room easier and safer. Door frame 764 includes one or more frame side panels 508 which collectively define a frame inner opening 512 for door 760. In the illustrated example, door frame 764 includes two vertical frame side panels 5081 connected at their upper ends 768 by a horizontal frame side panel 5802.

LED light source 100 may form or be incorporated into any one or more of frame side panels 508, which can provide illumination in any direction(s). For example, LED light source 100 may provide illumination through any one or more (or all) of the front face 772, outer face 776, and inner face 780 of frame side panel 508. In the illustrated embodiment, LED light source 100 includes a light guide 108 having a light guide light emitting face 112 oriented to emit light inwardly towards a diffuser 136 which defines frame side panel inner face 772, which borders frame inner opening 512.

As exemplified in FIGS. 185-186, a staircase 784 in accordance is provided. As shown, staircase 784 may include an LED light source 100. For example, LED light source 100 may form or be incorporated into any one or more (or all) of stair risers 788 and stair treads 792 of staircase 784. An advantage of this design is that it can provide illumination (e.g. at night) for a user climbing or descending staircase 784. In the illustrated example, LED light source 100 includes a light guide 108 having a light guide light emitting face 112 oriented to emit light forwardly towards a diffuser 136 which defines riser front surface 796.

As exemplified in FIG. 187, closet 804, closet 804 may include a shelf 656 formed by or incorporating an LED light source 100. An advantage of this design is that shelf 656 can provide illumination to an interior of closet 804, which may be shadowed from the light source in the room when accessed by a user. In the illustrated embodiment, shelf 656 is positioned above (i.e. at a higher elevation) than closet rod 808. Shelf 656 may be mounted in positioned to one or more (or all) of closet rear wall 812 and closet side walls 816.

As exemplified in FIG. 188, closet 804 may include an illuminated closet rod 808. Closet rod 808 may be formed by or incorporate an LED light source 100 as shown. For example, light guide 108 may be formed as a rod. An advantage of this design is that it provides a light emitting face 112 facing many or all directions at once (e.g. 360 degree coverage). In the illustrated embodiment, light guide 108 is formed in the shape of a cylindrical rod having a circularly curved light emitting face 112. In other embodiments, light guide 108 may be formed in the shape of a rod having a different cross-section, such as triangular, rectangular, or another regular or irregular cross-sectional shape. As shown, diffuser 136 may be shaped as a hollow tube which surrounds light guide 108. Similar to light guide 108, diffuser 136 may have any cross-sectional shape, such as a circular, triangular, rectangular, or other regular or irregular cross-sectional shape.

As exemplified in FIGS. 189-191, floor mat 820 may include an LED light source 100 that shines light upwardly, and a power supply 688 that supplies power to the LED light source 100. An advantage of this design is that floor mat 820 can provide visibility to a user walking over or near the floor mat 820, such as in a dark bathroom or hallway at night. As shown, diffuser 136 may have an outer surface 824 that provides a supporting surface for a user to walk over.

In some embodiments, floor mat 820 may be flexible. For example, floor mat 820 may be at least sufficiently flexible to roll into a tubular configuration. An advantage of this design is that it can allow floor mat 820 to take on a more compact configuration for easier shipping or storage. As shown, light guide 108 may be composed of a thin flexible material such as polycarbonate having a thickness of 0.0625 in to 0.125 in.

Diffuser

In some embodiments, diffuser 136 may include a plurality of discrete projections 828 from light guide 108. Diffuser projections 828 may be arranged side-by-side overlaying light guide 108 according to any pattern. In the illustrated example, diffuser projections 828 are arranged in a grid pattern. Diffuser 136 can include any number of projections 828. For example, diffuser 136 may include 10 or more projections 828. In the illustrated embodiment, diffuser 136 includes 65 projections. As shown, diffuser projections 828 may angle away from each other when floor mat 820 is rolled into a tubular configuration. An advantage of this design is that it reduces tensile stress on the diffuser 136 when floor mat 820 is rolled.

Diffuser projections 828 can be made of any material suitable for walking over. In some embodiments, projections 828 are made of an elastomeric material, such as silicone. An advantage of this design is that it may be more comfortable for walking over, and may be able to resiliently accommodate deformations (e.g. stretching) caused by rolling floor mat 820.

Food Container

In accordance with another aspect of this disclosure, which may be used with one or more other aspects disclosed herein, the light source may be incorporated into a food container.

Reference is now made to FIG. 192, which shows a food container 832 supported on a supporting member 836. Food container 832 may be any article made to support food or drink, such as a cup, a bowl, or a plate for example. Supporting member 836 may be any article made to support food container 832, such as a counter tabletop, a serving tray, or a coaster. As shown, supporting member 836 may be formed by or incorporate an LED light source 100 that shines light towards food container 832. Further, food container 832 may function as a light guide, being composed of at least translucent material which conducts light from LED light source 100 through internal reflection, and including light emitting locations 114 associated with an exterior light emitting face 112 which shines light outwardly. An advantage of this design is that it allows food container 832 to shine light without having to incorporate a light source (e.g. LEDs 164) into the food container 832. Instead, LED light source 100 is incorporated into supporting member 836, which can allow food container 832 to be made dishwasher safe for example.

Art Display

In accordance with another aspect of this disclosure, which may be used with one or more other aspects disclosed herein, the light source may be incorporated into an art supply.

Reference is now made to FIGS. 193-194, which show an art display 840 which illuminates a supported artwork 844. Artwork 844 may be a three-dimensional artwork, such as a statue, a figurine, a trophy, a framed image, or any other object a user may wish to display and illuminate. As shown, art display 840 may include a base 848 formed by or incorporating an LED light source 1001 and an overhead LED light source 1002. The base 848 includes an upper surface 852 that supports artwork 844. An advantage of this design is that it can illuminate an artwork 844 from multiple directions. LED light source 1001 may shine light upwardly from base upper surface 852 to illuminate artwork 844 from below. LED light source 1002 may shine light downwardly to illuminate artwork 844 from above.

Furniture

In accordance with another aspect of this disclosure, which may be used with one or more other aspects disclosed herein, the light source may be incorporated into a furniture.

Reference is now made to FIGS. 195-196 which show furniture 856 in accordance with an embodiment. Furniture 856 may be any type of furniture, such as a chair as shown, a stool, a couch, a table (FIGS. 198-199), a desk, or a bed for example. Furniture 856 can incorporate an LED light source 100 to provide illumination from one or more furniture portions 860. An advantage of this design is that it can improve the visibility of the furniture 856 and/or the furniture surroundings, such as in the dark or low lighting conditions. Chair 856 includes a seat 864 supported on legs 868, and a backrest 872 extending upwardly from seat 864.

Any one or more of seat 864, legs 868, and backrest 872 may be an illuminated portion 860. In the illustrated embodiment, chair backrest 872 is an illuminated portion 860. Chair backrest 872 includes an illuminated light guide 108. Light guide 108 may be configured to illuminate in any direction, such as forwardly towards a seated user as shown, rearwardly, or both. In the example shown, LED light source 100 includes a diffuser 136 which forms a front surface 876 of chair backrest 872, and light guide 108 extends in a plane parallel to backrest front surface 876.

FIG. 197 shows another embodiment of chair 856 in which seat 864 is another illuminated portion 860. As shown, chair seat 864 includes an illuminated light guide 1082. Light guide 1082 may be configured to illuminate in any direction, such as downwardly towards the ground as shown, upwardly towards a seated user, or both. In the example shown, LED light source 100 includes a diffuser 1362 which forms a lower surface 880 of chair seat 864, and light guide 1082 extends in a plane parallel to seat lower surface 880.

FIGS. 198-199 show another example of furniture 856 incorporating an LED light source 100. In this example, furniture 856 is a table having legs 868 and a tabletop 884. As shown, tabletop 884 may be an illuminated portion 860 of table 856. In the example shown, tabletop 884 includes an illuminated light guide 108. Light guide 108 may be configured to illuminate in any direction, such as upwardly as shown, downwardly towards the ground, or both. In the example shown, LED light source 100 includes a diffuser 136 which forms an upper surface 888 of tabletop 884, and light guide 108 extends in a plane parallel to tabletop upper surface 888.

Returning to FIG. 195, LED light source 100 can be powered in any suitable manner, including any manner disclosed herein. In the illustrated example, furniture 856 includes a solar panel 476 and an energy storage member 460, which are electrically connected to LED light source 100 to supply power to the same. In some embodiments, solar panel 476 may operate to charge energy storage member 460. In other embodiments, solar panel 476 may supplement or replace energy storage member 460 as the power source of LED light source 100 when there is sufficient solar energy, and energy storage member 460 may be the sole supply of power to LED light source 100 when solar panel 476 generates insufficient power.

Solar panel 476 and energy storage member 460 may be attached to or incorporated into any portion of furniture 856. In the illustrated embodiment, solar panel 476 has a light collection face 892 positioned to form an upper surface 896 of chair backrest 872, and energy storage member 460 is positioned within one of chair legs 868. An advantage of this design is that it avoids adding bulk to chair 856.

Bicycle and Helmut

In accordance with another aspect of this disclosure, which may be used with one or more other aspects disclosed herein, the light source may be incorporated into a bicycle and/or a helmet.

As exemplified in FIGS. 200-201, bicycle 900 may include a frame 908, and a seat 912, wheels 916, and handlebars 920 mounted to frame 908. LED light source 100 may have a tubular configuration that can be mounted to any one or more of frame 908, seat 912, wheels 916, and handlebars 920 to provide outward illumination. An advantage of this design is that it can improve the visibility of bicycle 900 to motorists, which can make bicycle 900 safer to ride, especially at night.

In the illustrated example, LED light source 100 is mounted to handlebars 920. As shown, LED light source 100 (including light guide 108 and optionally a diffuser 136) may surround a portion of handlebars 920 in cross-section, and have an outward light emitting direction 120. To facilitate mounting, LED light source 100 may include two or more parts 924 which are movable (e.g. separable) to allow LED light source 100 to open and enclose around handlebars 920. In the illustrated embodiment, LED light source 100 includes two parts 924 which are removably connected by mechanical connectors 720, as shown. In other embodiments, LED light source 100 may include three or more parts 924. Alternatively, LED light source 100 may have a single part 924 with a seam 928, and which is sufficiently resiliently flexible to allow the seam 928 to be temporarily widened enough to insert or remove handlebars 920.

LED light source 100 can have a tubular shape that defines an inner opening 932 having any cross-sectional shape. For example, the cross-sectional shape of inner opening 932 may be circular as shown in FIG. 201, triangular, square, hexagonal, or another regular or irregular shape. FIGS. 202-203 illustrate an embodiment in which LED light source 100 has an inner opening 932 with a substantially square shape to accommodate a substantially square cross-section of bicycle frame 908.

LED light source 100 can be powered in any suitable manner, including any manner disclosed herein. FIG. 201 illustrates an example including an energy storage member 460. FIGS. 202-203 illustrate an example including an energy generating member 476. As shown, energy generating member 476 may be connected to rear wheel 916 to generate power from the rotation of rear wheel 916. An advantage of this design is that it can provide power to illuminate LED light source 100 whenever bicycle 900 is in motion, which may account for the most critical moments to have illumination.

As exemplified in FIGS. 204-205, a helmet 934 may be any suitable type of helmet, such as a bicycle helmet as shown, a motorcycle helmet, or a ski helmet for example. Helmet 934 may include an LED light source 100 which provides illumination to one or more illuminated portions 936. An advantage of this design is that it can provide helmet 934 with greater visibility to others (e.g. motorists, skiers) which can provide additional safety to the wearer. Depending on the light emitting direction and brightness, LED light source 100 may also be effective for illuminating the wearer's surroundings for enhanced visibility by the wearer.

In the illustrated example, helmet 934 includes an illuminated portion 936 at rear end 944. This can make helmet 934 highly visible to others (e.g. motorists) behind the wearer. As shown, a light guide 108 may be incorporated into helmet 934 with a rearward light emitting direction 120.

Alternatively or in addition, helmet 934 may include an illumination portion at front end 948. This can allow helmet 934 to illuminate the environment ahead of the wearer.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An assembly comprising:
   (a) a shelf comprising a recess and a longitudinally extending light guide, the light guide having an upper surface, a lower surface, a front side, a rear side, a first opposed side and a second laterally spaced apart opposed side, at least one of the upper surface and the lower surface having a plurality of light emitting locations, a substantially rigid cartridge that is removably positionable in the recess, the cartridge comprising a heat sink and at least one LED;
   (b) the energy storage member is operatively connected to the at least one LED in a first mode in which power is supplied to the at least one LED and a second mode in which the at least one LED is off; and,
   (c) a sensor operable to detect when a door is in an open position and, when the door is in an open position, the energy storage member is operatively connected to the at least one LED in the first mode
   wherein, when the cartridge is positioned in the recess and the energy storage member is operatively connected to the at least one LED in the first mode, light emitted by the at least one LED is directed into the light guide.

2. The assembly of claim 1 wherein the energy storage member comprises at least two batteries and, in the first mode, two or more of the batteries are connected in series.

3. The assembly of claim 1 wherein the sensor comprises a motion sensor.

4. The assembly of claim 1 wherein the sensor comprises a light intensity sensor.

5. The assembly of claim 1 wherein the sensor is part of the shelf.

6. The assembly of claim 1 wherein the upper surface of the light guide is an upper surface of the shelf or the lower surface of the light guide is a lower surface of the shelf.

7. The assembly of claim 1 wherein the lower surface of the light guide is a lower surface of the shelf.

8. The assembly of claim 1 wherein the upper surface of the light guide is an upper surface of the shelf.

9. The assembly of claim 1 wherein the upper surface has a plurality of light emitting locations.

\* \* \* \* \*